US009371057B2

(12) United States Patent
Kantajaranit et al.

(10) Patent No.: US 9,371,057 B2
(45) Date of Patent: Jun. 21, 2016

(54) VEHICLE SECURITY LOCKING SYSTEM HAVING A DRIVING FUNCTION LOCKING DEVICE

(71) Applicants: Kamol Kantajaranit, Bangkok (TH); Somchai Tiemsiriwat, Chonburi (TH); Suwat Petcharapirat, Prachuapkhirikhan (TH)

(72) Inventors: Kamol Kantajaranit, Bangkok (TH); Somchai Tiemsiriwat, Chonburi (TH)

(73) Assignees: Kamol Kantajaraniti (TH); Suwat Petcharapirat (TH)

( * ) Notice: Subject to any disclaimer, the term of this patent is extended or adjusted under 35 U.S.C. 154(b) by 0 days.

(21) Appl. No.: 14/370,900

(22) PCT Filed: Jan. 7, 2013

(86) PCT No.: PCT/TH2013/000001
§ 371 (c)(1),
(2) Date: Jul. 7, 2014

(87) PCT Pub. No.: WO2013/147715
PCT Pub. Date: Oct. 3, 2013

(65) Prior Publication Data
US 2015/0005986 A1 Jan. 1, 2015

(30) Foreign Application Priority Data

Jan. 6, 2012 (TH) .................... 1201000058
Mar. 21, 2012 (TH) .................... 1201001258
Oct. 16, 2012 (TH) .................... 1203001205
Nov. 2, 2012 (TH) .................... 1203001283

(51) Int. Cl.
G08B 21/00 (2006.01)
B60R 25/06 (2006.01)
B60R 25/10 (2013.01)

(52) U.S. Cl.
CPC ............... *B60R 25/066* (2013.01); *B60R 25/10* (2013.01); *B60R 2025/1013* (2013.01)

(58) Field of Classification Search
CPC ...................................................... B60R 25/066
USPC ............... 340/426.1, 246.11, 426.13–426.17; 307/10.1–10.5; 180/287
See application file for complete search history.

(56) References Cited

U.S. PATENT DOCUMENTS 5,251,466 A   10/1993  Chang
5,431,244 A    7/1995  Possobom
(Continued)

FOREIGN PATENT DOCUMENTS

WO        0114178 A1     3/2001
WO     2011068484 A1     6/2011
WO     2011087463 A2     7/2011

OTHER PUBLICATIONS

International Search Report and Written Opinion dated Mar. 17, 2014 in International Application No. PCT/TH2013/000001.

*Primary Examiner* — Jeffery Hofsass
(74) *Attorney, Agent, or Firm* — Kim Winston LLP

(57) ABSTRACT

A vehicle security system has a driving function locking device movable between a locked position for disabling a driving function of a vehicle and an unlocked position. The vehicle security system includes a controller, a remote control and a chip card. The controller is connected to an electrical power supply of the vehicle and is in communication with a transceiver. The remote control and chip card each communicate with the transceiver to lock and unlock the driving function locking device or temporarily disable the driving function locking device.

41 Claims, 105 Drawing Sheets

(56) References Cited

U.S. PATENT DOCUMENTS

| | | |
|---|---|---|
| 5,635,901 A | 6/1997 | Weinblatt |
| 6,059,687 A | 5/2000 | Durieux et al. |
| 6,703,721 B1 | 3/2004 | Kito |
| 2008/0045381 A1 | 2/2008 | Vermeersch et al. |
| 2009/0151412 A1 | 6/2009 | Chung et al. |
| 2011/0064224 A1 | 3/2011 | Rebuli |

Fig. 47
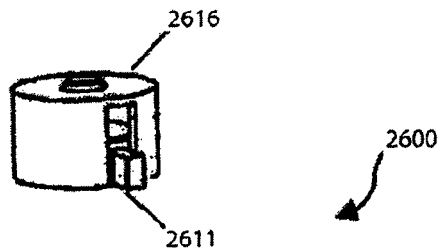
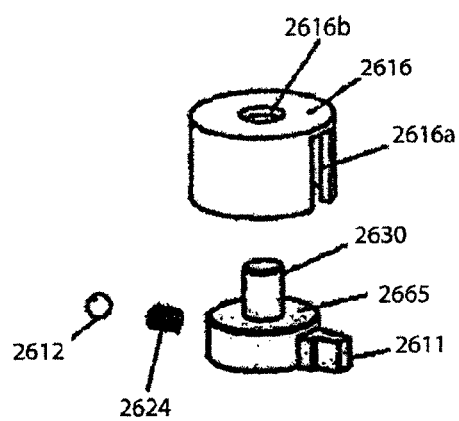
Fig. 48
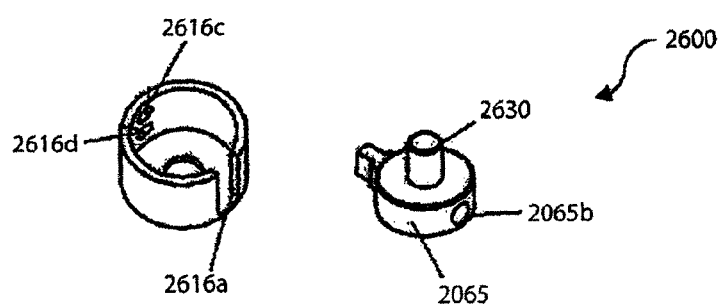
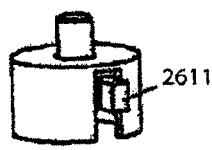

Fig. 104
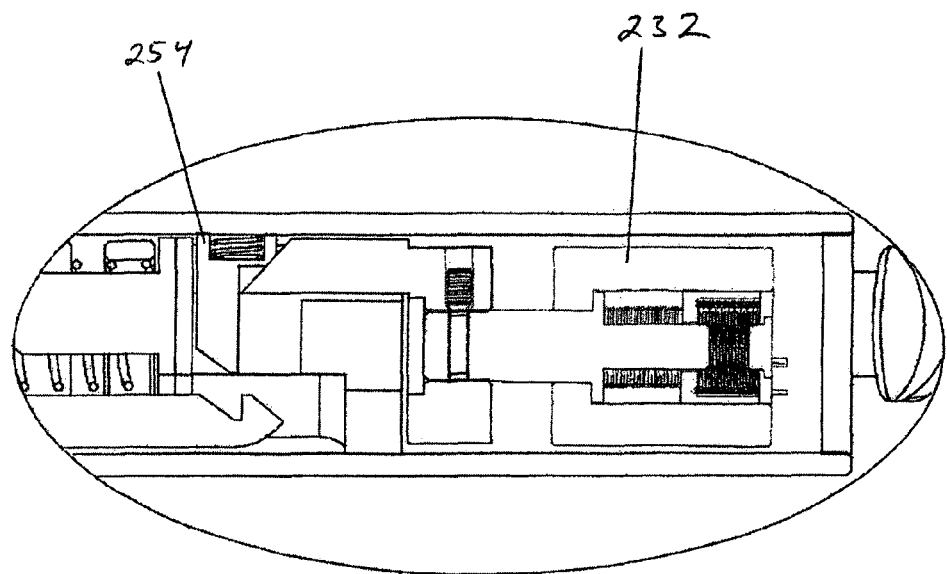
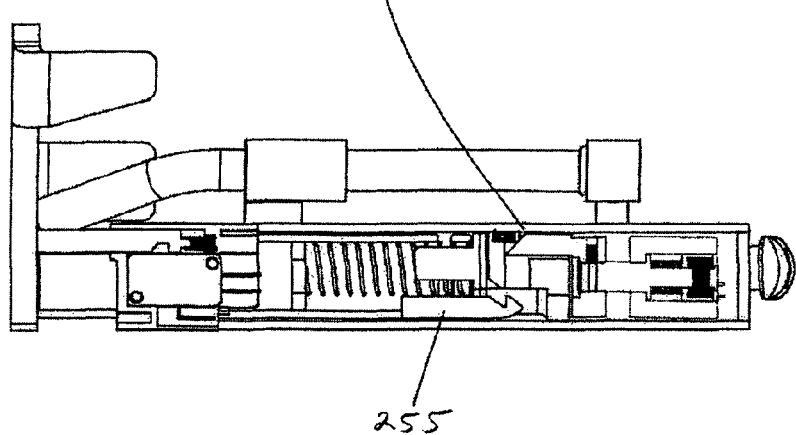
Fig. 103

Fig. 106
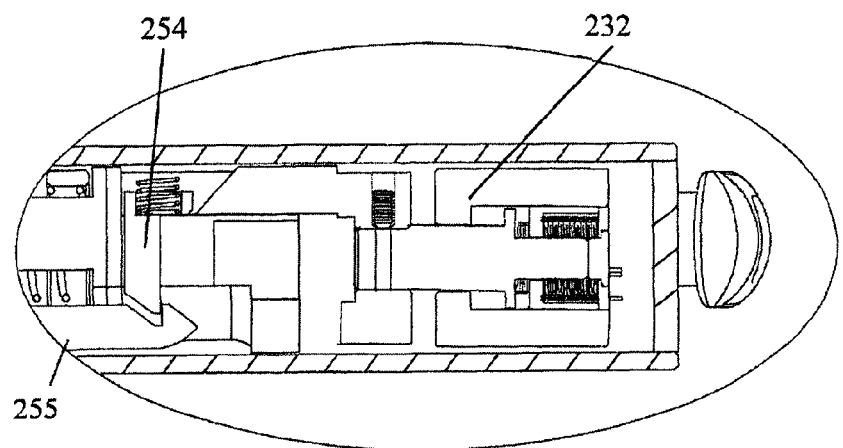
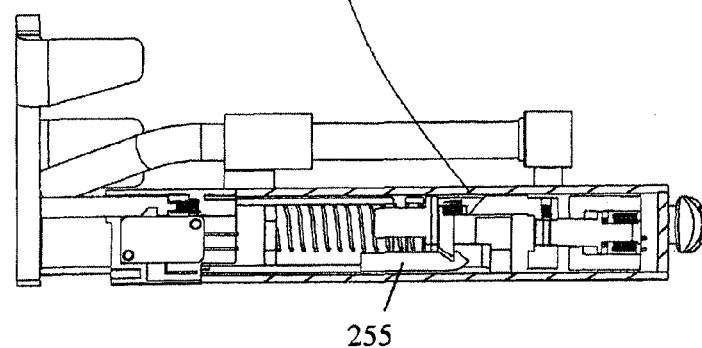
Fig. 105

VEHICLE SECURITY LOCKING SYSTEM HAVING A DRIVING FUNCTION LOCKING DEVICE

CROSS-REFERENCE TO RELATED APPLICATIONS

This application is a U.S. national phase application under 35 U.S.C. §371 of International Application No. PCT/TH2013/000001 filed on Jan. 7, 2013 which claims priority to Thailand application Nos. 1201000058 filed Jan. 6, 2012, 1201001258 filed Mar. 21, 2012, 1203001205 filed Oct. 16, 2012 and 1203001283 filed Nov. 2, 2012, the entire disclosures of which are hereby incorporated by reference in their entirety.

BACKGROUND OF THE INVENTION

The present invention relates generally to a vehicle security system having a driving function locking device. In particular, the present invention relates to a vehicle security system having a gear lever locking mechanism that can be locked and unlocked without a key.

Conventional gear lever locking devices include a mechanism for locking a typical gear lever of an automobile. The typical gear lever locking device can be a loop member for use in locking the gear lever only in one particular position according to the installation position. In addition, the aforementioned gear lever locking device's loop member may be unlocked by an unlocking key system. However, conventional gear lever locking devices have an operational drawback in that it does not allow a user to shift the locking position of the gear lever from the parking position (P position) to the neutral position (N position). Moreover, the commonly used or commercially available locking devices are locked with a key, which is more easily susceptible to tampering compared to remote control technology or chip cards, which require authentication by a controller.

Thus, there is still a need for a vehicle security system that is capable of locking a gear lever that addresses the aforementioned problems of conventional mechanical anti-theft devices. Such a need is satisfied by the vehicle security system of the present invention.

BRIEF SUMMARY OF THE INVENTION

In a first preferred embodiment, the present invention provides a vehicle security system that includes a driving function locking device, a controller, a remote control and a chip card. The driving function locking device can be, for example, a gear lever locking device as described in International Application Publication No. WO 2011/068484 A1 or a brake/clutch locking device as described in International Application Publication No. WO 2011/087463 A2. The driving function locking device is movable between a locked position for disabling a driving function of a vehicle and an unlocked position. The driving function locking device includes at least one of a motor and a solenoid to move the driving function locking device between locked and unlocked positions.

The remote control can be, e.g., a radio frequency identification remote control that communicates with a transceiver in communication with the controller. The remote control remotely locks and unlocks the driving function locking device or disables the driving function locking device all together, such as when the driving function locking device operates in a valet mode.

The chip card can be any conventional chip card (also referred to as a smart card or integrated circuit card) configured for its intended use. The chip card remotely communicates with the transceiver, e.g., by transmitting a locking command code.

The controller can be, e.g., a computer, a microcontroller, a logic controller and the like. The controller is connected to an electrical power supply of the vehicle and is in communication with the transceiver. The controller is configured to deactivate the driving function locking device when the transceiver receives a deactivation signal from both the chip card and the remote control. The controller is also configured to lock the driving function locking device in order to disable the driving function of the vehicle after a locking command code transmitted by the chip card is authenticated. Further, the controller is configured to automatically lock the driving function locking device to disable the driving function of the vehicle after a fixed period of time upon receipt of an auto command code transmitted by the remote control. Furthermore, the controller is configured to determine if the transmission of the vehicle is in a park "P" position or a neutral "N" position, and when in the park or neutral position, the controller locks the driving function locking device to disable the driving function of the vehicle after the command code provided by the chip card is authenticated. Alternatively, the controller automatically locks the driving function locking device to disable the driving function of the vehicle after a fixed period of time upon receipt of the command code provided by the remote control.

Additionally, when the driving function locking device is moved from the unlocked position to the locked position, the controller activates an engine cut-off switch for disabling an engine starter of the vehicle. At this time, an advisor (e.g., an LED) advises that the vehicle is disabled and the controller initiates operations in a low power mode (i.e., a sleep mode).

The driving function locking device can also be configured to unlock when the controller receives an unlocking command code from the chip card or the remote control, and authenticates the unlocking command code. Alternatively, the driving function locking device can be unlocked when a user toggles an ignition switch via a key of the vehicle a fixed number of times.

The vehicle security system can further include a tamper sensor. When the tamper sensor is activated, the controller locks the driving function locking device and activates an advisor (e.g., a siren or horn) to issue a warning.

In a second preferred embodiment, the present invention provides a vehicle security system that includes a driving function locking device and a controller. The driving function locking device can be, for example, a gear lever locking device as described in International Application Publication No. WO 2011/068484 A1 or a brake/clutch locking device as described in International Application Publication No. WO 2011/087463 A2, but with a locking mechanism that is movable between a locked position for disabling a driving function of a vehicle and an unlocked position by at least one of a motor and a solenoid to move the driving function locking device between locked and unlocked positions.

The controller can be, e.g., a computer, a microcontroller, a logic controller and the like. The controller is connected to an electrical power supply of the vehicle, an advisor, an engine cut-off, a lock sensor, a key control sensor and a tamper sensor. The advisor can be, for example, an LED, a buzzer, a horn, a siren, and the like. The engine cut-off disables an engine starter of the vehicle. The lock sensor is for determining whether the driving function locking device is in a locked or unlocked position.

The controller is configured to lock the driving function locking device only when the transmission of the vehicle is in a park "P" or a neutral "N" position, activate an advisor to advise that the driving function locking device is in the locked position, and activate the engine cut-off when the driving function locking device is locked. The controller is also configured to detect if an object has been inserted in a key switch of the vehicle, and if so, activate an advisor to issue a warning. Further, the controller is configured to activate the advisor to issue a warning if the tamper sensor is activated, and activate the advisor to issue a warning after a fixed time interval upon detecting an object in a key switch of the vehicle.

The controller can optionally be configured to activate an advisor to advise that the driving function locking device is in the locked position and activate the engine cut-off when the driving function locking device is locked. The controller is also configured to detect if an object has been inserted in a key switch of the vehicle, and if so, activates an advisor to issue a warning. Further, the controller is configured to activate the advisor to issue a warning if the tamper sensor is activated, and activate the advisor to issue a warning after a fixed time interval upon detecting an object in the key switch.

The driving function locking device is further configured to unlock when a user toggles an ignition switch via a key of the vehicle a fixed number of times.

In a third preferred embodiment, the present invention provides a vehicle security system that includes a driving function locking device, a controller and at least one of a remote control and a chip card. The driving function locking device is manually movable between a locking position for disabling a driving function of a vehicle and an unlocked position. The driving function locking device includes a driving member that moves a locking member assembly between a locked position and an unlocked position for securing the driving function locking device in the locked position. The controller is connected to an electrical power supply of the vehicle and is in communication with a transceiver. The remote control and chip card are each capable of communicating with the transceiver to lock and unlock the driving function locking device.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 47 is an exploded, perspective view of a sixth embodiment of an anti-lock mechanism for use with a brake/clutch locking device applicable to the vehicle security system of FIG. 1;

FIG. 48 is another exploded, perspective view of the sixth embodiment of an anti-lock mechanism for use with a brake/clutch locking device;

FIG. 103 is a partial cross-sectional plan view of vehicle security system of FIG. 99 with the driving function locking device in a locked position and the locking member assembly in an unlocked position;

FIG. 104 is an enlarged partial view of the driving function locking device of FIG. 103;

FIG. 105 is a partial cross-sectional plan view of vehicle security system of FIG. 99 with the driving function locking device in a locked position and the locking member assembly in a locked position;

FIG. 106 is an enlarged partial view of the driving function locking device of FIG. 105;

FIG. 113 is a partial cross-sectional elevational view of the vehicle security system of FIG. 109 in a locked position;

FIG. 113A is an enlarged partial view of a solenoid locking means of the vehicle security system of FIG. 109 in a locked position;

FIG. 114 is a partial cross-sectional elevational view of the vehicle security system of FIG. 114 in accordance with another embodiment of the present invention in an unlocked position;

FIG. 114A is an enlarged partial view of a solenoid locking means of the vehicle security system of FIG. 114 in an unlocked position;

FIG. 115 is a partial cross-sectional elevational view of the vehicle security system of FIG. 114 in a locked position;

FIG. 115A is an enlarged partial view of a solenoid locking means of the vehicle security system of FIG. 115 in a locked position;

FIG. 116 is an exploded perspective view of a vehicle security system in accordance with the second aspect of the fourth preferred embodiment of the present invention;

FIG. 117 is an exploded perspective view of a solenoid and lock assembly applicable to the embodiment of FIG. 114;

FIG. 118 is a schematic diagram of a controller for a vehicle security system in accordance with a first aspect of a fifth preferred embodiment of the present invention;

FIG. 119 is a schematic diagram of a controller for a vehicle security system in accordance with a second aspect of a fifth preferred embodiment of the present invention;

FIG. 120 is a schematic diagram of a controller for a vehicle security system in accordance with a third aspect of a fifth preferred embodiment of the present invention;

FIG. 121 is an exploded view of the controller according to the fifth preferred embodiment of the present invention as applied to a brake/clutch locking device applicable to the present invention;

Figure 122:
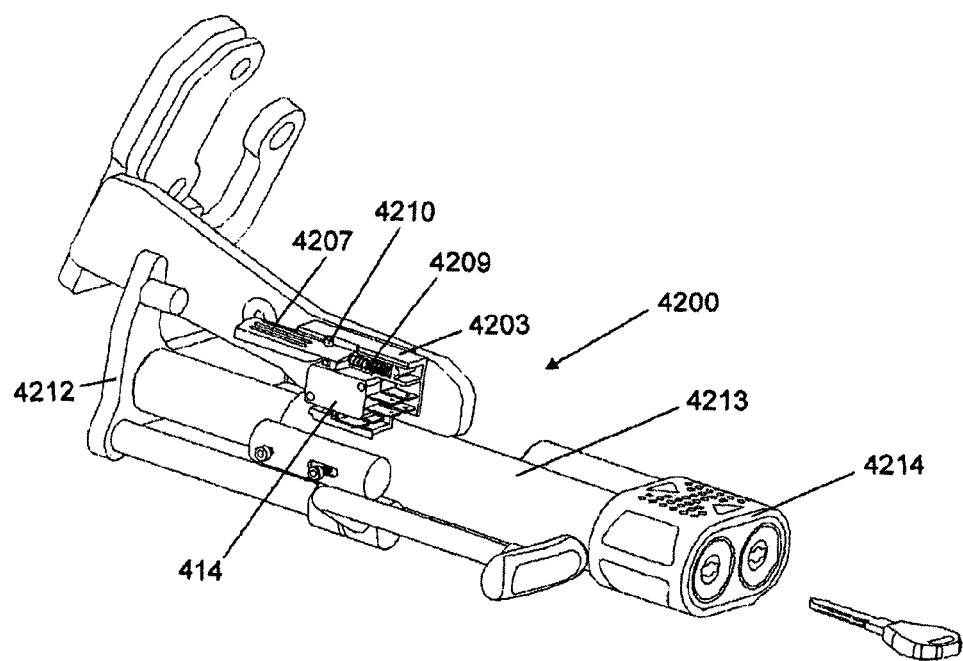
Figure 123:
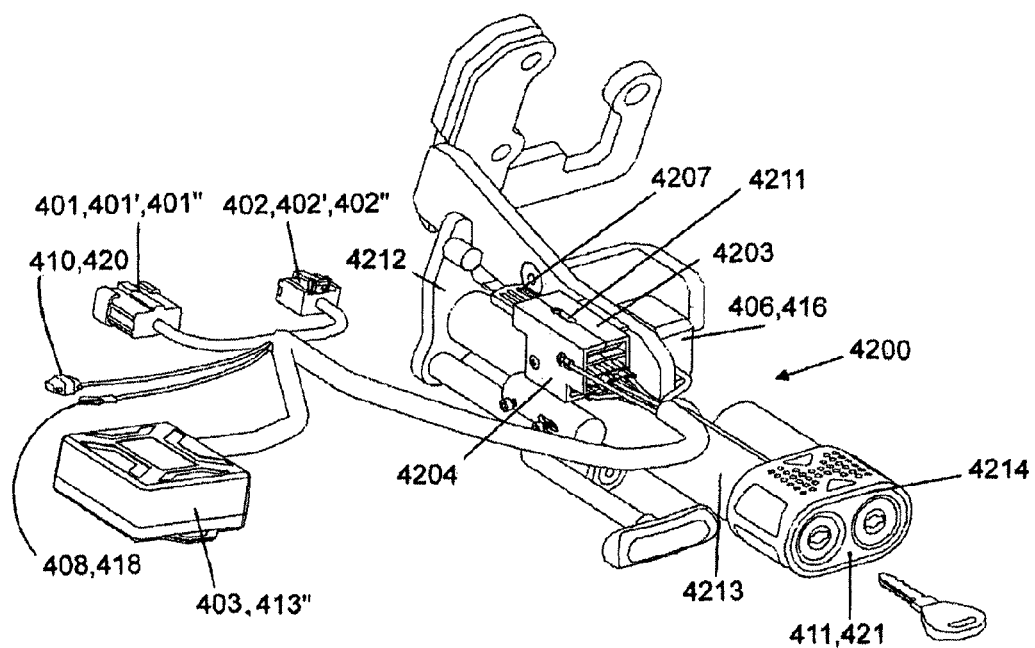
Figure 124:
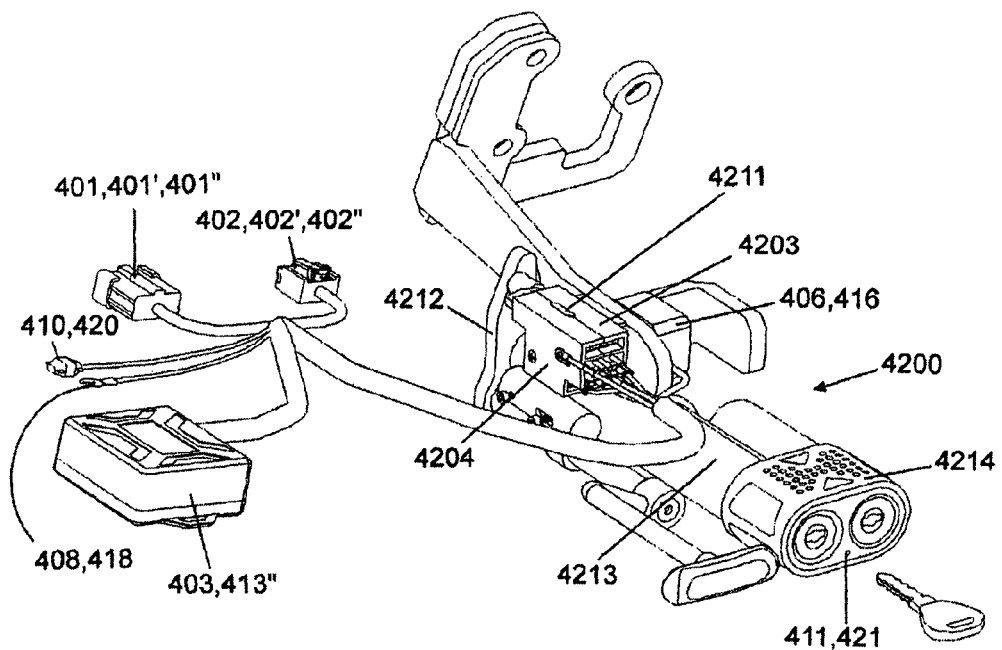
Figure 125:
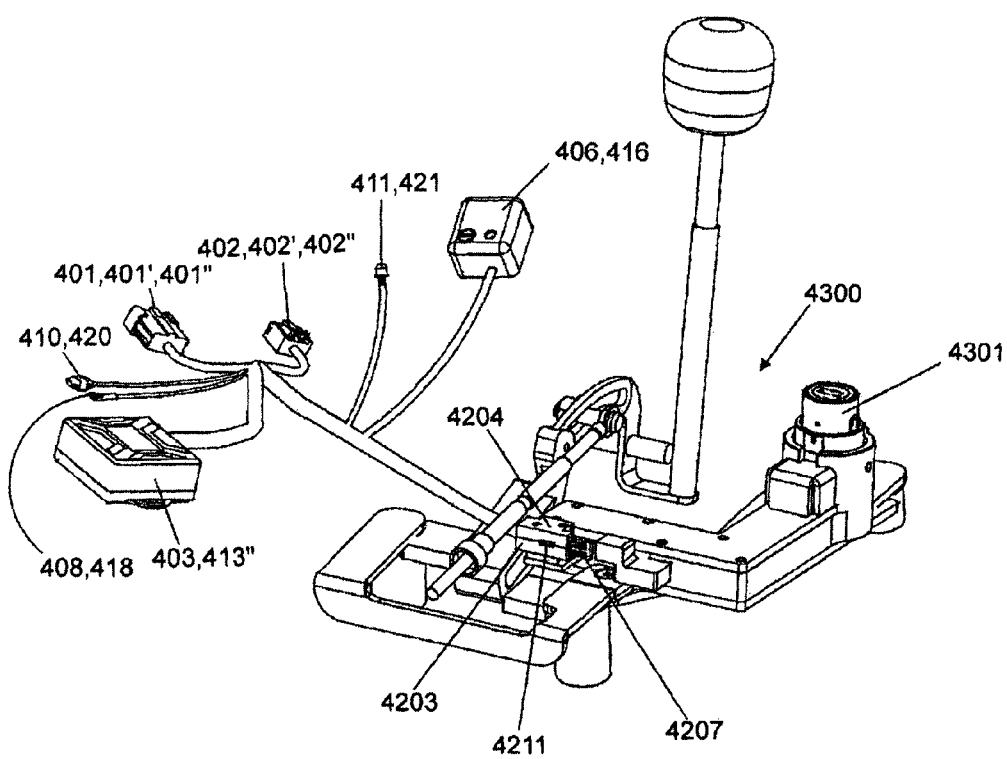
Figure 126:
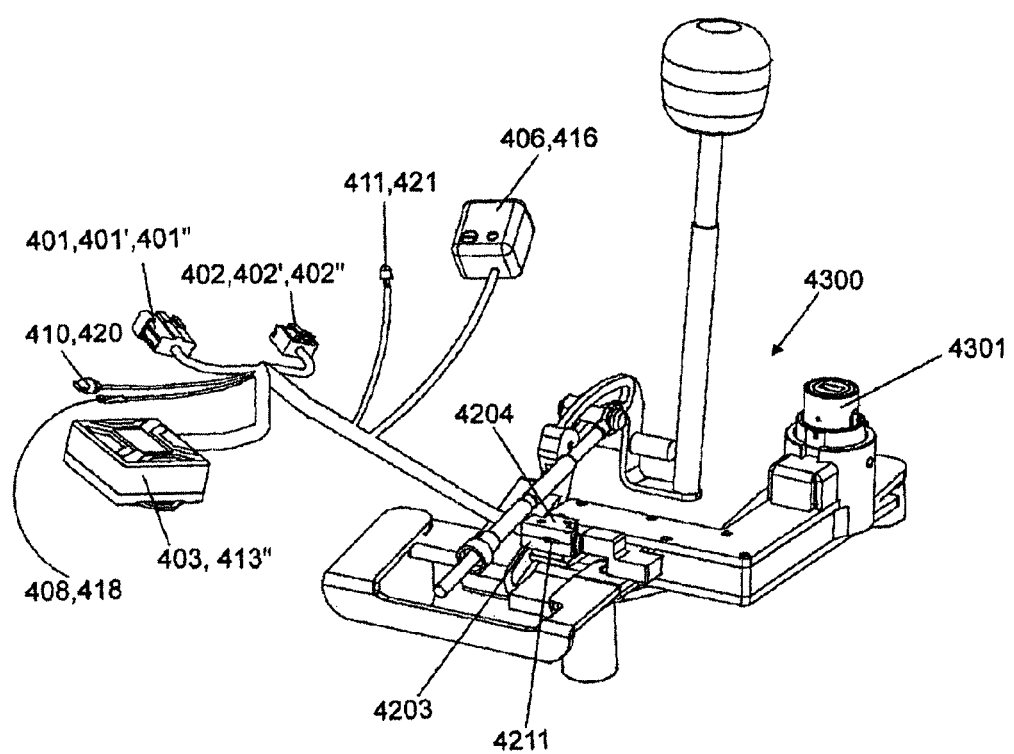
Figure 127:
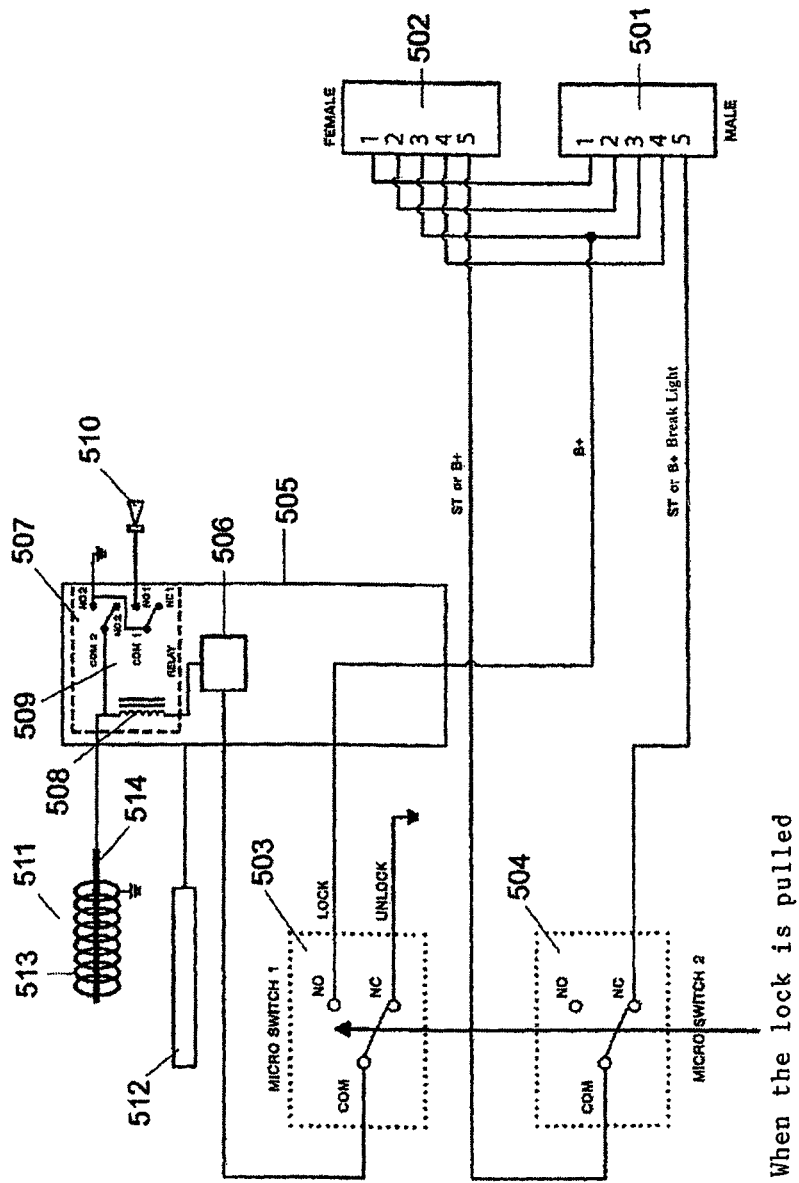
Figure 128:
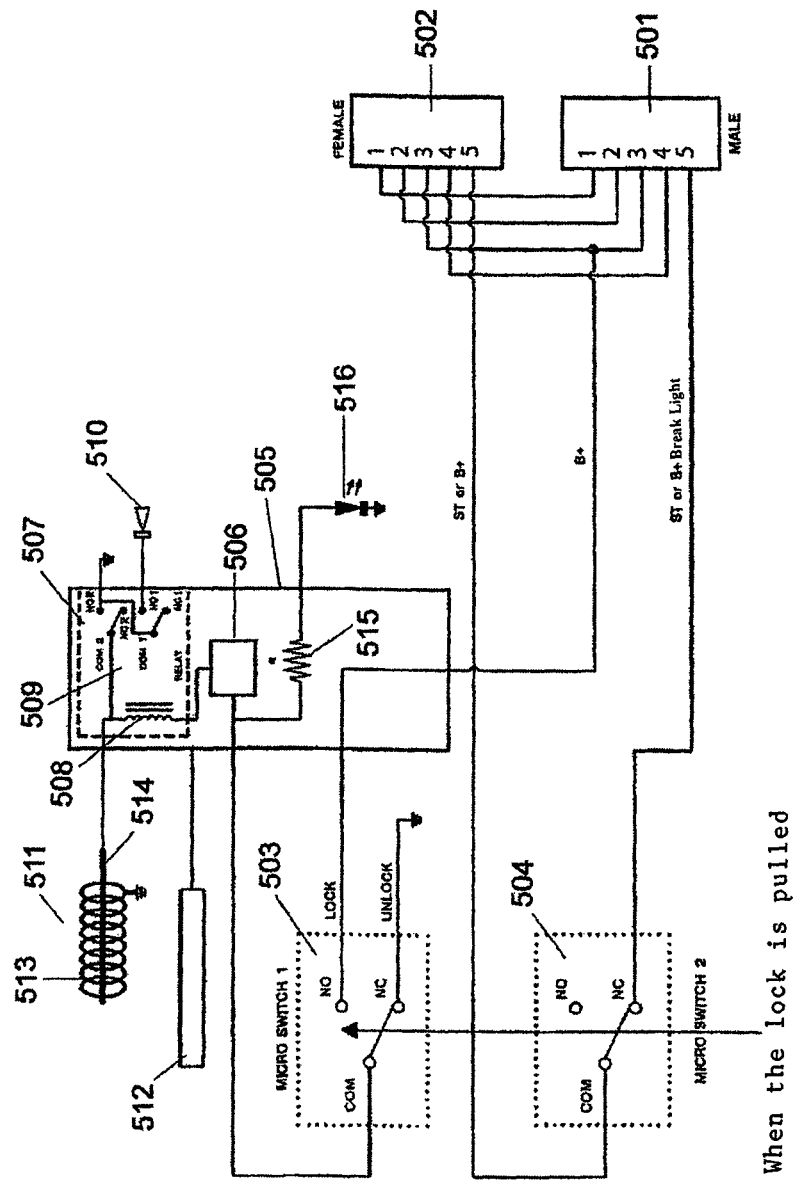
Figure 129:
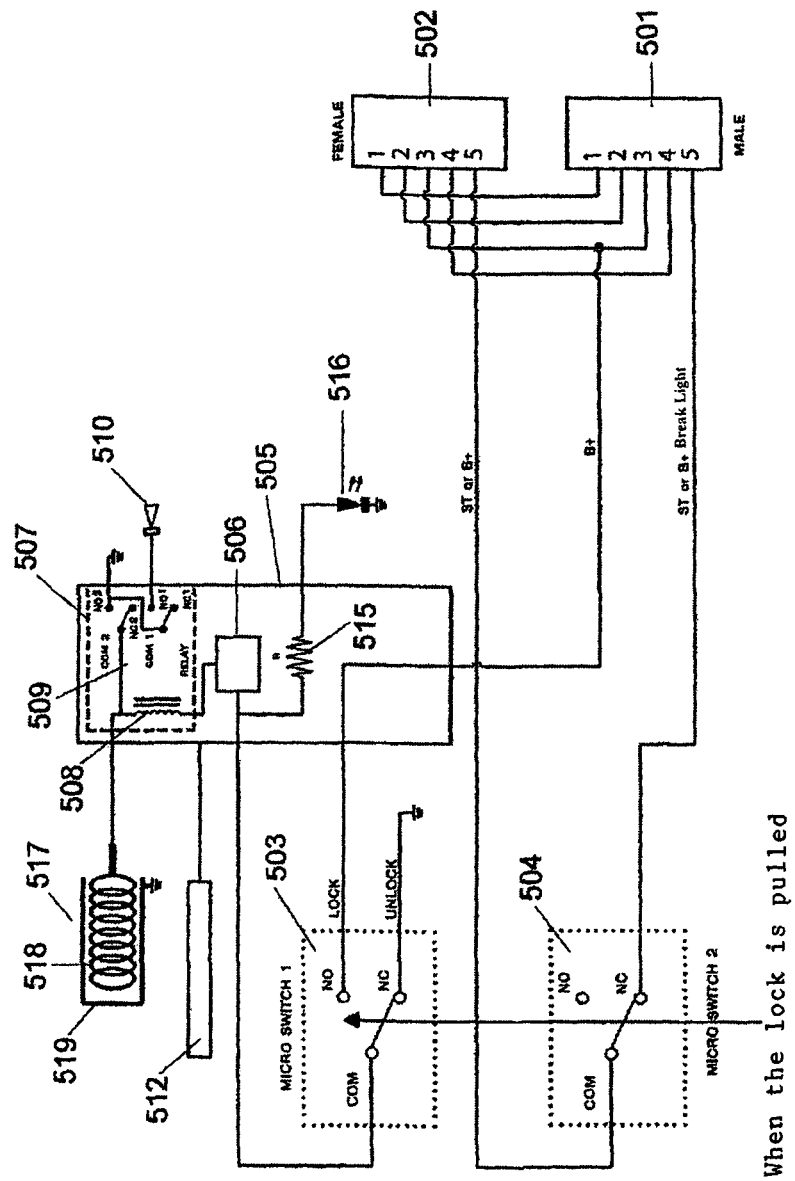
Figure 130:
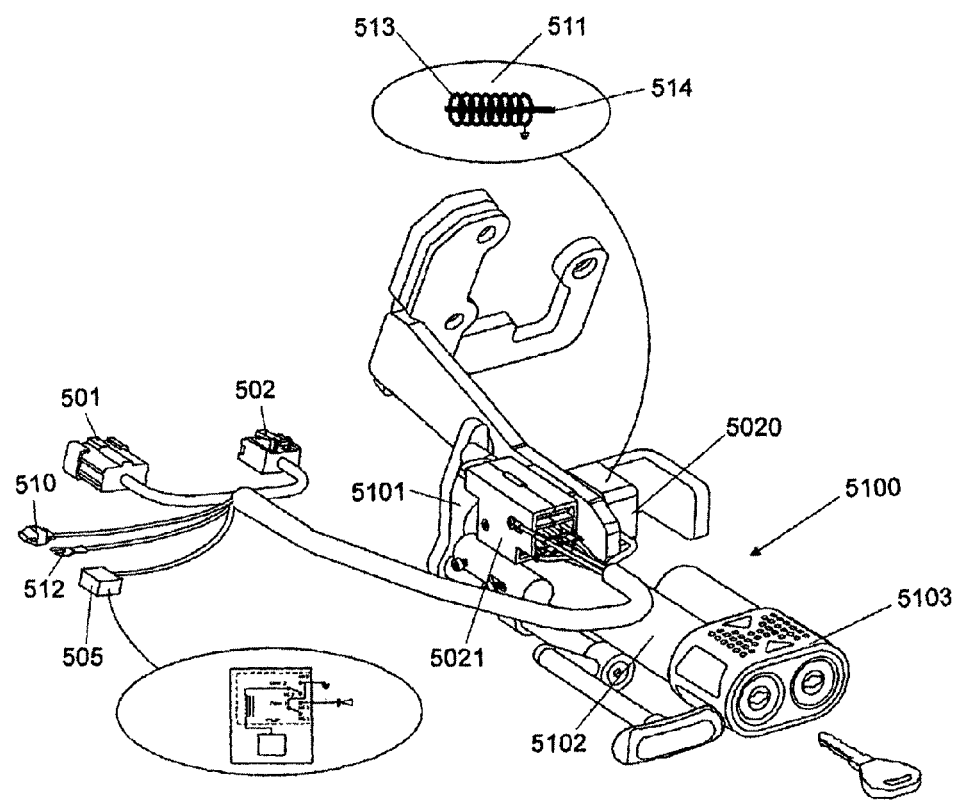
Figure 131:
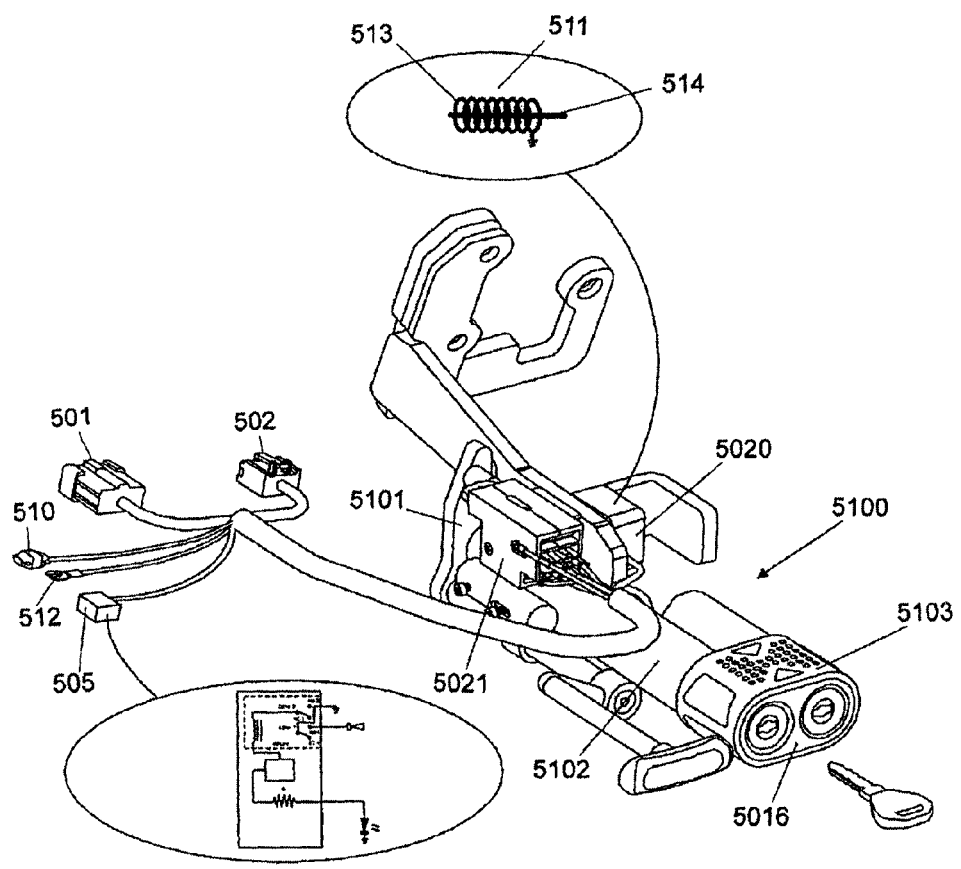
Figure 132:
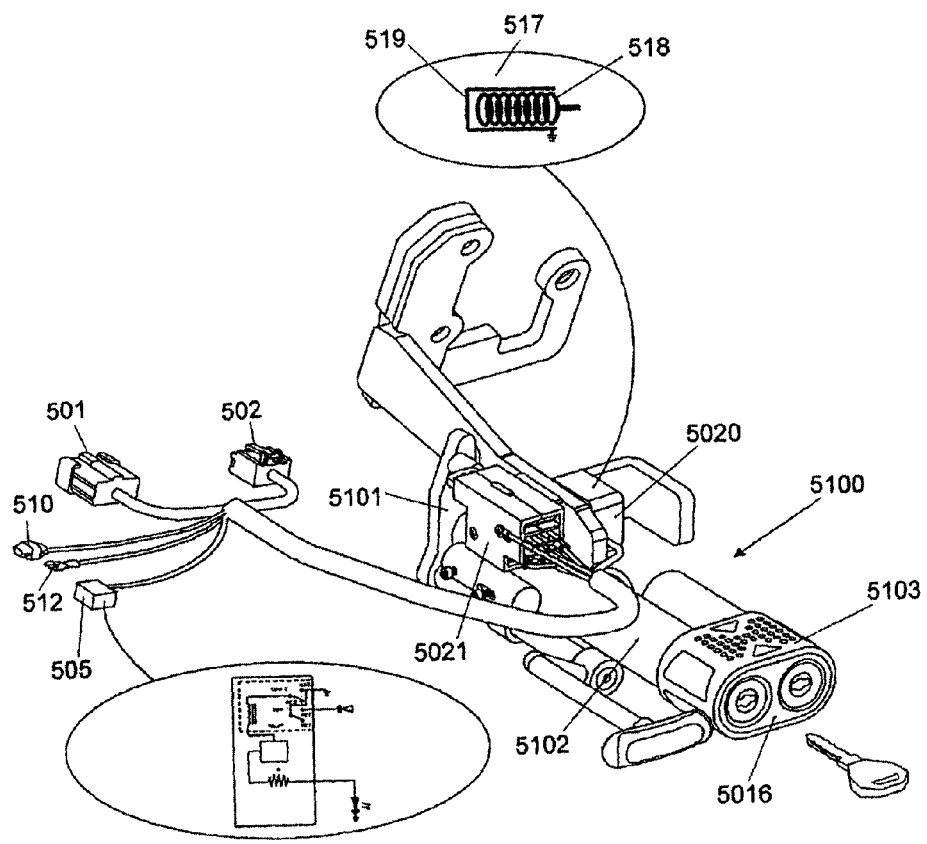
Figure 133:
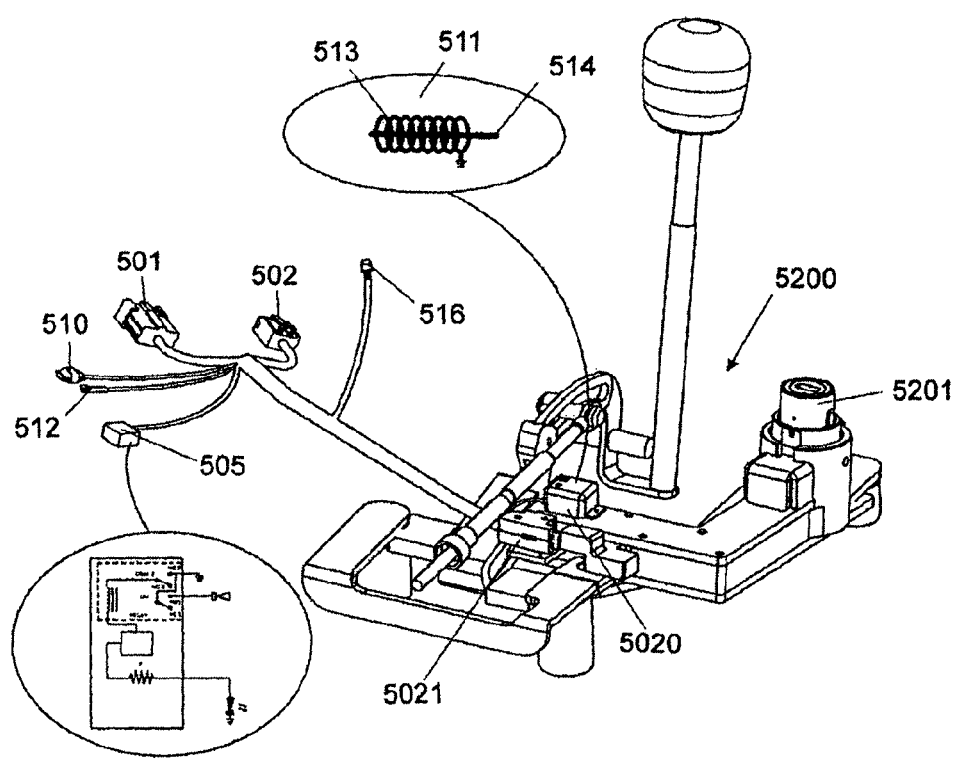
Figure 134:
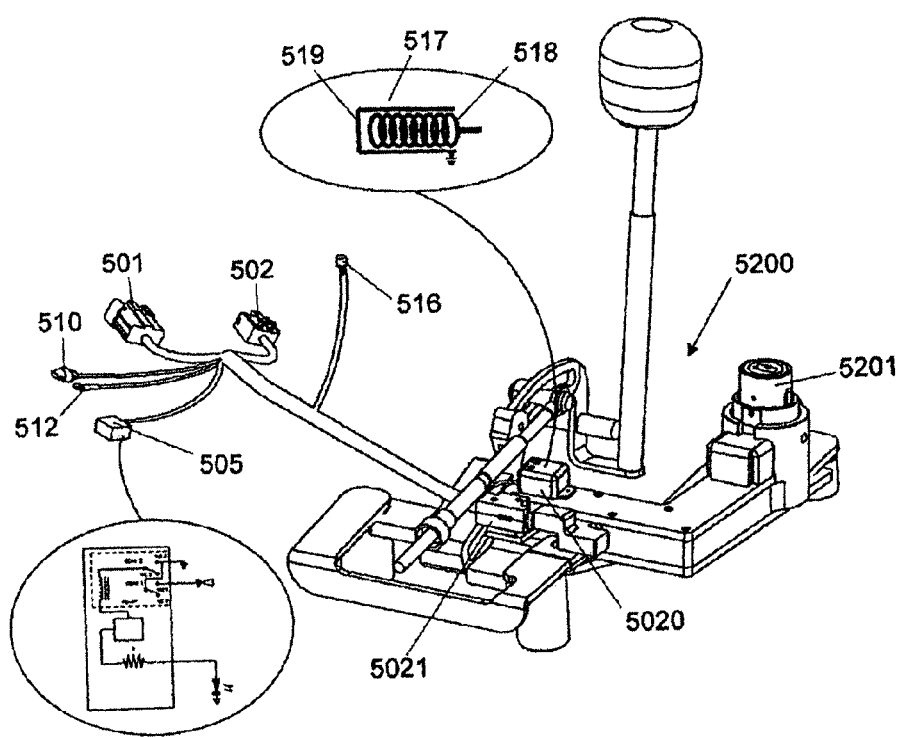

FIG. 122 is a perspective view of the controller according to the fifth preferred embodiment of the present invention as applied to a brake/clutch locking device applicable to the present invention;

FIG. 123 is a perspective view of the controller according to the fifth preferred embodiment of the present invention as applied to a brake/clutch locking device applicable to the present invention;

FIG. 124 is a perspective view of the controller according to the fifth preferred embodiment of the present invention as applied to a brake/clutch locking device applicable to the present invention;

FIG. 125 is a perspective view of the controller according to the fifth preferred embodiment of the present invention as applied to a gear locking device applicable to the present invention;

FIG. 126 is a perspective view of the controller according to the fifth preferred embodiment of the present invention as applied to a gear locking device applicable to the present invention;

FIG. 127 is a schematic diagram of a controller for a vehicle security system in accordance with a first aspect of a sixth preferred embodiment of the present invention;

FIG. 128 is a schematic diagram of a controller for a vehicle security system in accordance with a second aspect of a sixth preferred embodiment of the present invention;

FIG. 129 is a schematic diagram of a controller for a vehicle security system in accordance with a third aspect of a sixth preferred embodiment of the present invention;

FIG. 130 is a perspective view of the controller of FIG. 127 assembled to a brake/clutch locking device applicable to the sixth preferred embodiment of the present invention;

FIG. 131 is a perspective view of the controller of FIG. 128 assembled to a locking device applicable to the sixth preferred embodiment of the present invention;

FIG. 132 is a perspective view of the controller of FIG. 129 assembled to a brake/clutch locking device applicable to the sixth preferred embodiment of the present invention;

FIG. 133 is a perspective view of the controller of FIG. 128 assembled to a gear locking device applicable to the sixth preferred embodiment of the present invention; and FIG. 134 is a perspective view of the controller of FIG. 129 assembled to a gear locking device applicable to the sixth preferred embodiment of the present invention.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

Figure 1:
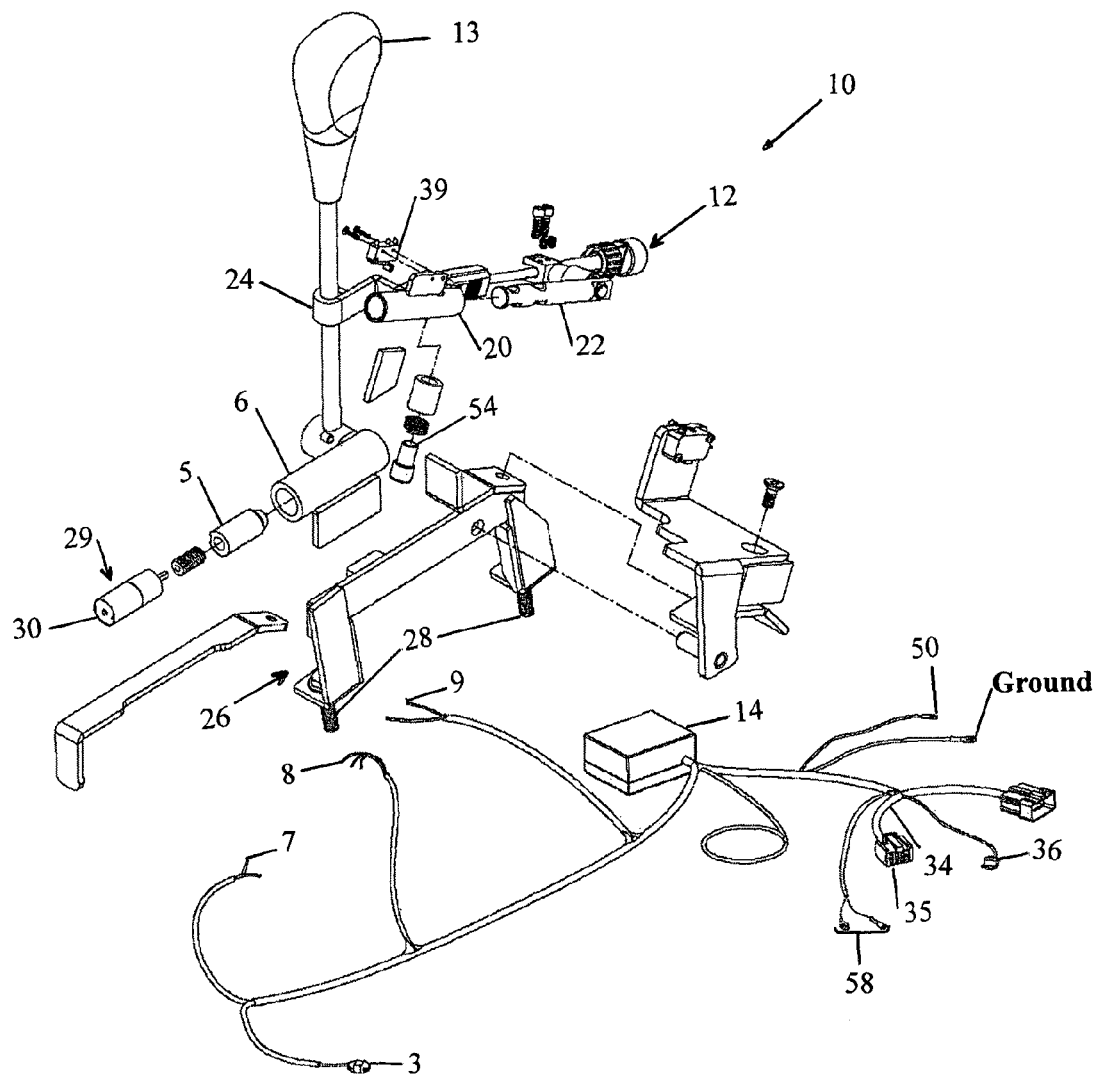
FIG. 1 is an exploded perspective view of a vehicle security system in accordance with a first preferred embodiment of the present invention.
Figure 2:
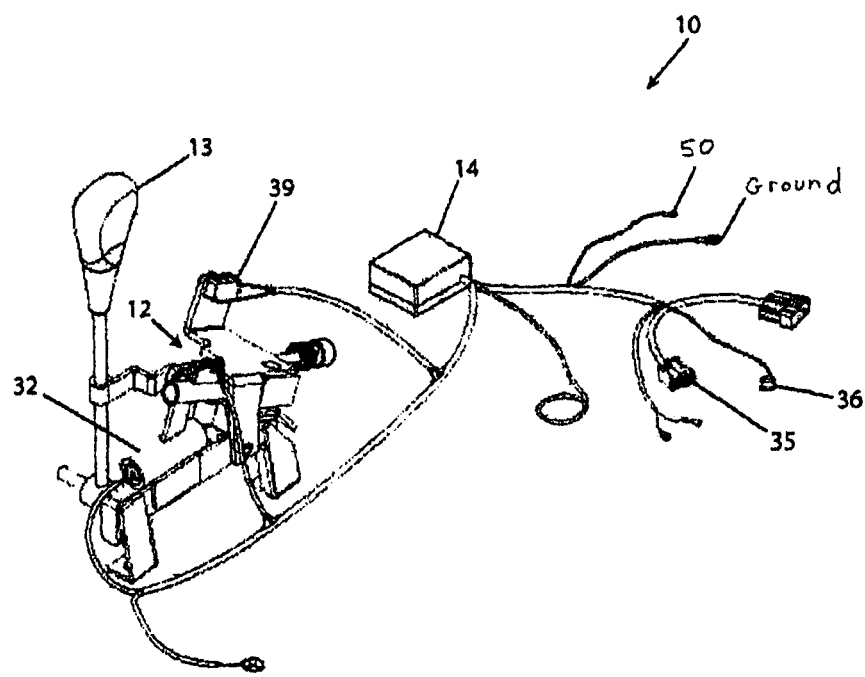
FIG. 2 is a perspective view of the vehicle security system of FIG. 1.
Figure 3:
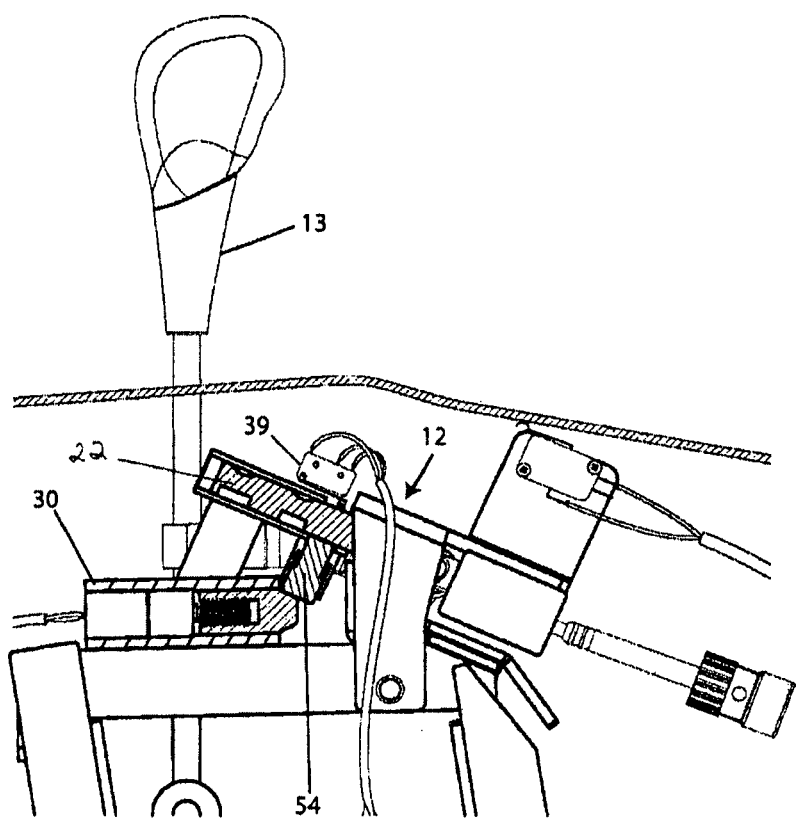
FIG. 3 is a partial cross-sectional side elevational view of the vehicle security system of FIG. 1 having a motor in an unlocked position.
Figure 4:
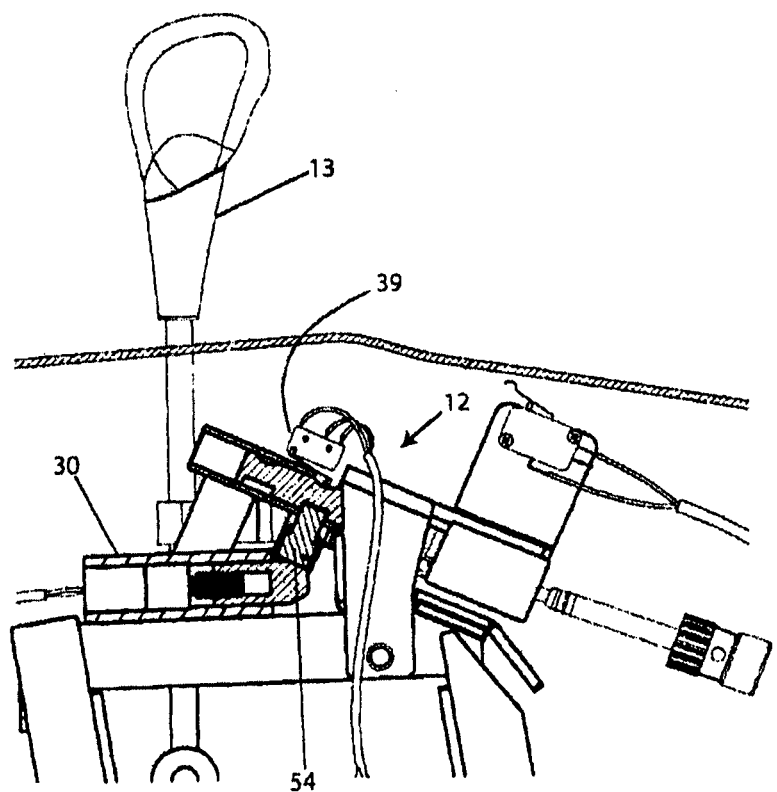
FIG. 4 is a partial cross-sectional side elevational view of the vehicle security system of FIG. 3 in a locked position.
Figure 6:
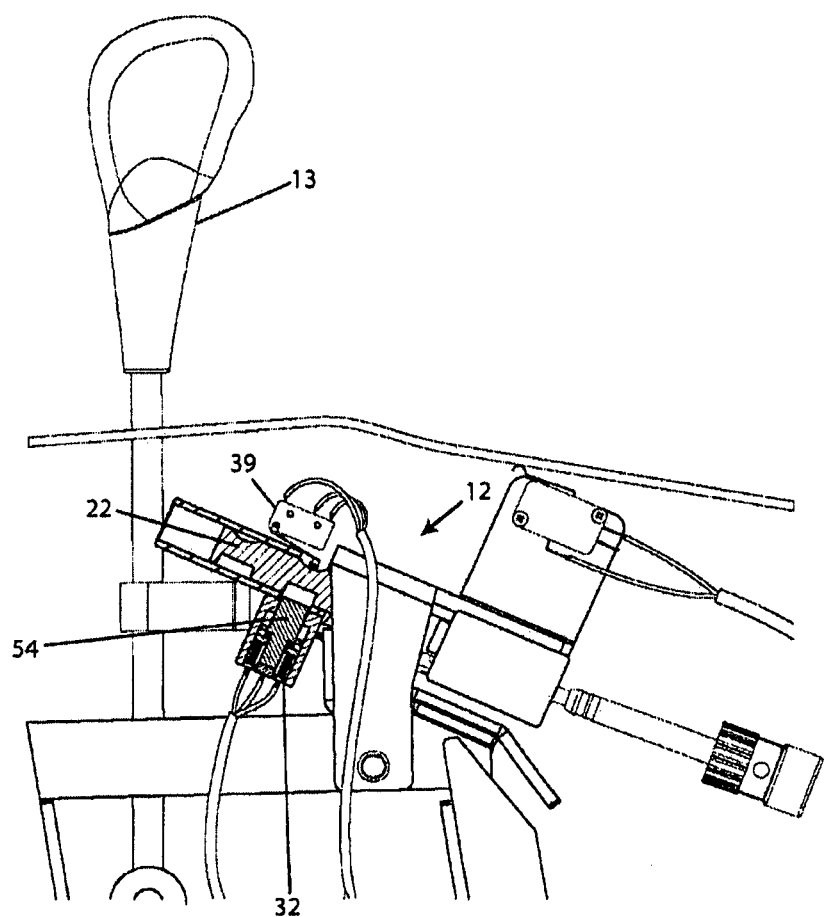
FIG. 6 is a partial cross-sectional side elevational view of the vehicle security system of FIG. 5 in a ready to lock position.
Figure 7:
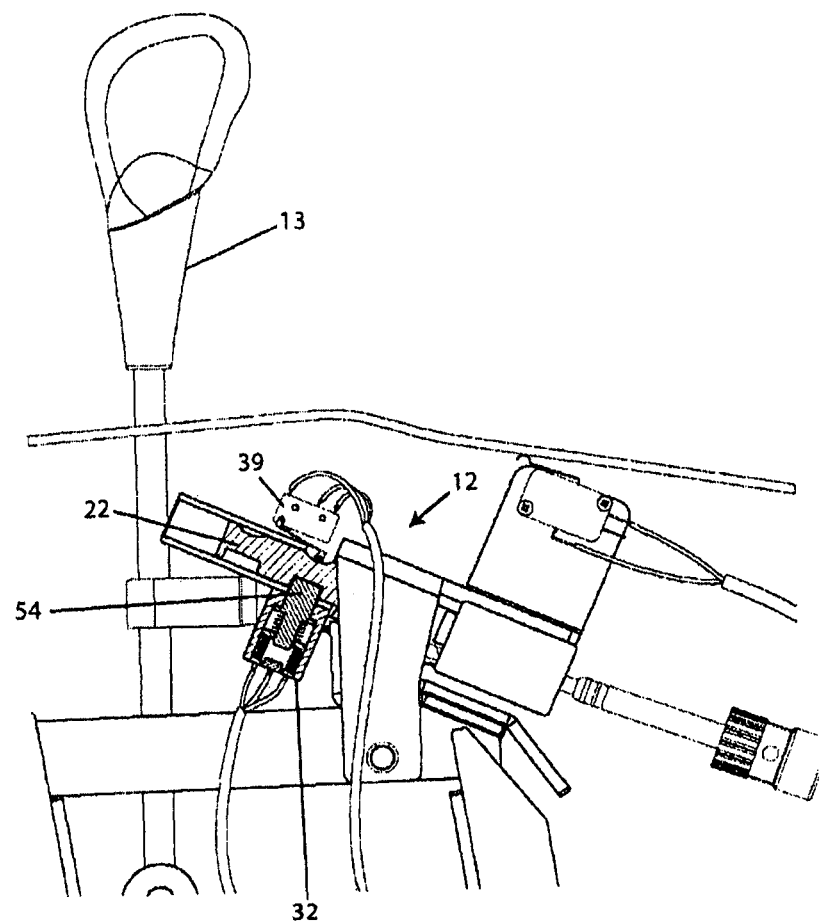
FIG. 7 is a partial cross-sectional side elevational view of the vehicle security system of FIG. 5 in a locked position.
Figure 8:
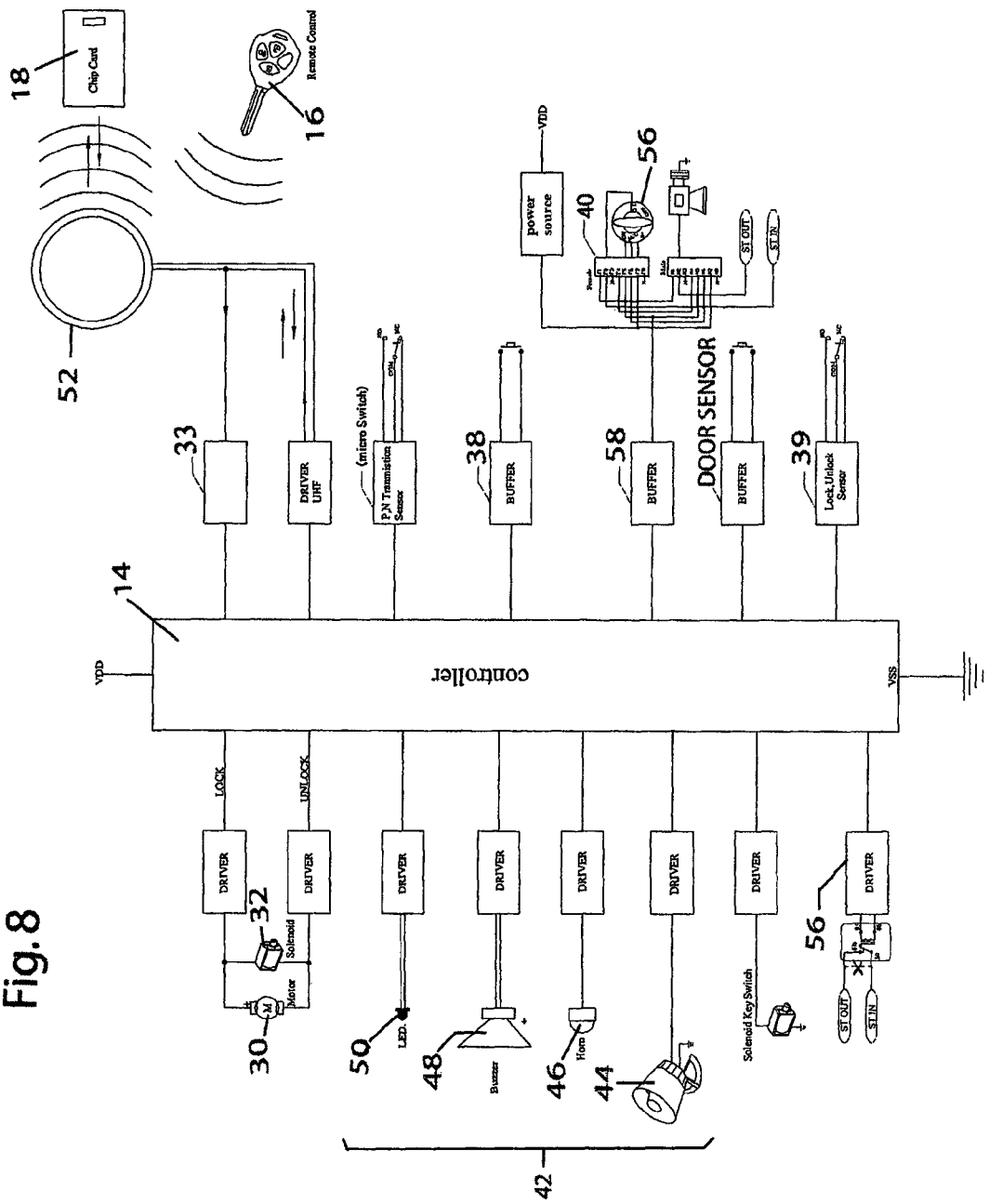
FIG. 8 is a schematic diagram of a controller of the vehicle security system of FIG. 1.

Referring to FIGS. 1-10A, in accordance with a first preferred embodiment, the present invention provides a vehicle security system 10 having a driving function locking device 12, a controller 14, a remote control 16 (FIG. 8) and a chip card 18 (FIG. 8). The remote control 16 and chip card 18 each remotely communicates with a transceiver 36 that is in communication with the controller 14. Specifically, FIGS. 1-4 illustrate a first aspect of the present invention for a vehicle security system 10 having a driving function locking device 12 configured as a gear lever locking device that includes a motor 30 as a driving member 29 that moves a locking pin 54 between locked and unlocked positions. That is, when the driving function locking device 12 is moved between a locked position (FIG. 4) for disabling a driving function of the vehicle and an unlocked position (FIG. 3), the locking pin 54 is moved from the unlocked position (FIG. 3) to the locked position (FIG. 4). In the locked position, the driving function locking device 12 locks the position of a gear lever 13 via an attachment fixture 24 to lock the driving function of the vehicle. That is, the gear lever 13 cannot be moved when the driving function locking device 12 is locked thereby disabling the driving function of the vehicle.

The driving function locking device 12 includes a sliding axle pipe 20 for slidably receiving a locking axle 22 and the attachment fixture 24 that securely attaches to the gear lever 13. The driving function locking device 12 also includes a fixing member 26 for securing the driving function locking device 12 to a mounting region (not shown) of the vehicle. The fixing member 26 can be securely attached to the mounting region via screws 28. Additionally, the driving function locking device includes a microswitch sensor 9 for detecting tampering with the gear console, another microswitch 8 for detecting the position of the gear 13, a connection 7 for connecting to a motor 30, a pushing member 5 operatively connected to the motor 30, an axial tube 6 for housing the motor 30 and an E-tap to a hand brake 3.

The driving function locking device 12 can be configured with the driving member 29 being the motor 30 (FIG. 4) or alternatively a solenoid 32 (FIGS. 5-7) to move the driving function locking device 12 between the locked and unlocked positions.

Figure 5:
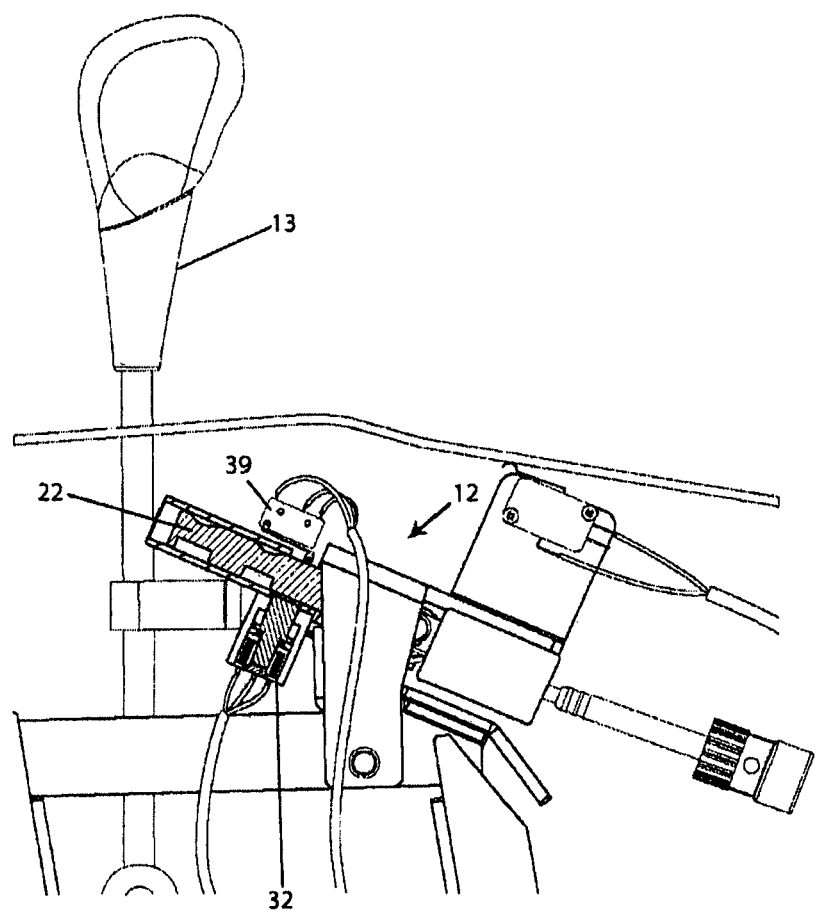
FIG. 5 is a partial cross-sectional side elevational view of the vehicle security system of FIG. 1 having a solenoid in an unlocked position.

FIGS. 1-4 illustrate the first aspect of the first preferred embodiment of the vehicle security system 10 having a driving function locking device 12 that includes the driving member 29 being a motor. FIGS. 5-7 illustrate a second aspect of the first preferred embodiment of the vehicle security system 10 having a driving function locking device 12 that includes the solenoid as the driving member 29.

The remote control 16 (FIG. 8) is configured to communicate with the transceiver 33 and can be, e.g., a radio frequency identification (RFID) remote control. The remote control 16 communicates with the transceiver 33 and is in communication with the controller 14. The remote control 16 operates to remotely unlock the driving function locking device 12. The remote control 16 is also configured to disable the driving function locking device 12 such that the driving function locking device 12 operates in a valet mode to prevent inadvertent or unwanted locking of the vehicle's driving function.

Referring to FIG. 8, the controller 14 can be, e.g., a microcontroller, a computer, a microprocessor, a logic controller, an integrated circuit and the like, and is in communication with the transceiver 33. The controller 14 is connected to an electrical power supply of the vehicle by power cable 34 and wire socket 35. The power cable 34 can be connected to an existing wire socket 40 (FIG. 8) of the vehicle. Additionally, the controller 14 is operatively connected to a lock sensor 39, a tamper sensor 38, one or more advisors 42, such as a siren 44, a horn 46, a buzzer 48, and a light emitting diode (LED) 50, and at least one of a motor 30 and a solenoid 32.

The controller 14 is configured to deactivate the driving function locking device 12 when the transceiver 33 receives a deactivation signal from both the chip card 18 and the remote control 16. The controller 14 is also configured to lock the driving function locking device 12 in order to disable the driving function of the vehicle after a locking command code transmitted by the chip card 18 is authenticated. The operation of the vehicle security system 10 having the driving function locking device 12 configured as a gear locking device that includes a solenoid 32 is shown in the flow diagram of FIG. 10, while the operation of the vehicle security system 10 having the driving function locking device 12 configured as a gear locking device that includes a motor 30 is shown in the flow diagram of FIG. 9.

Further, the controller 14 is configured to automatically lock the driving function locking device 12 to disable the driving function of the vehicle after a fixed period of time upon receipt of an auto command code transmitted by the remote control 16. Furthermore, the controller 14 is configured to determine if the transmission of the vehicle is in a park "P" position or a neutral "N" position, and when in the park or neutral position, the controller 14 locks the driving function locking device 12 to disable the driving function of the vehicle after the command code provided by the chip card 18 is authenticated. Alternatively, the controller 14 automatically locks the driving function locking device 12 to disable the driving function of the vehicle after a fixed period of time upon receipt of the command code provided by the remote control 16.

In operation, the driving function locking device 12 is manually moved to the ready to lock position, as further described below, and locked and unlocked with the remote control 16. When the driving function locking device 12 is moved from the unlocked position to the locked position, the controller 14 activates an engine cut-off 56 (FIG. 8) for disabling an engine starter of the vehicle. At this time, the advisor 42 (e.g., an LED 50) advises that the vehicle is disabled and the controller 14 initiates operations in a low power mode (i.e., a sleep mode).

The driving function locking device 12 can also be configured to unlock when the controller 14 receives an unlocking command code from the chip card 18 or the remote control 16 and authenticates the unlocking command code. However, when the unlocking command code is not authenticated by the controller 14, the controller 14 commands the advisor 42 to issue a warning.

The vehicle security system 10 includes the tamper sensor 38 and shock sensor. When the tamper sensor 38 is activated, the controller 14 activates the advisor 42 (e.g., a siren 44 or horn 46) to issue a warning. The tamper sensor 38 can be positioned at any location of the vehicle, such as near a window or door lock of the vehicle. The shock sensor operates similarly to the tamper sensor 38.

Figure 9:
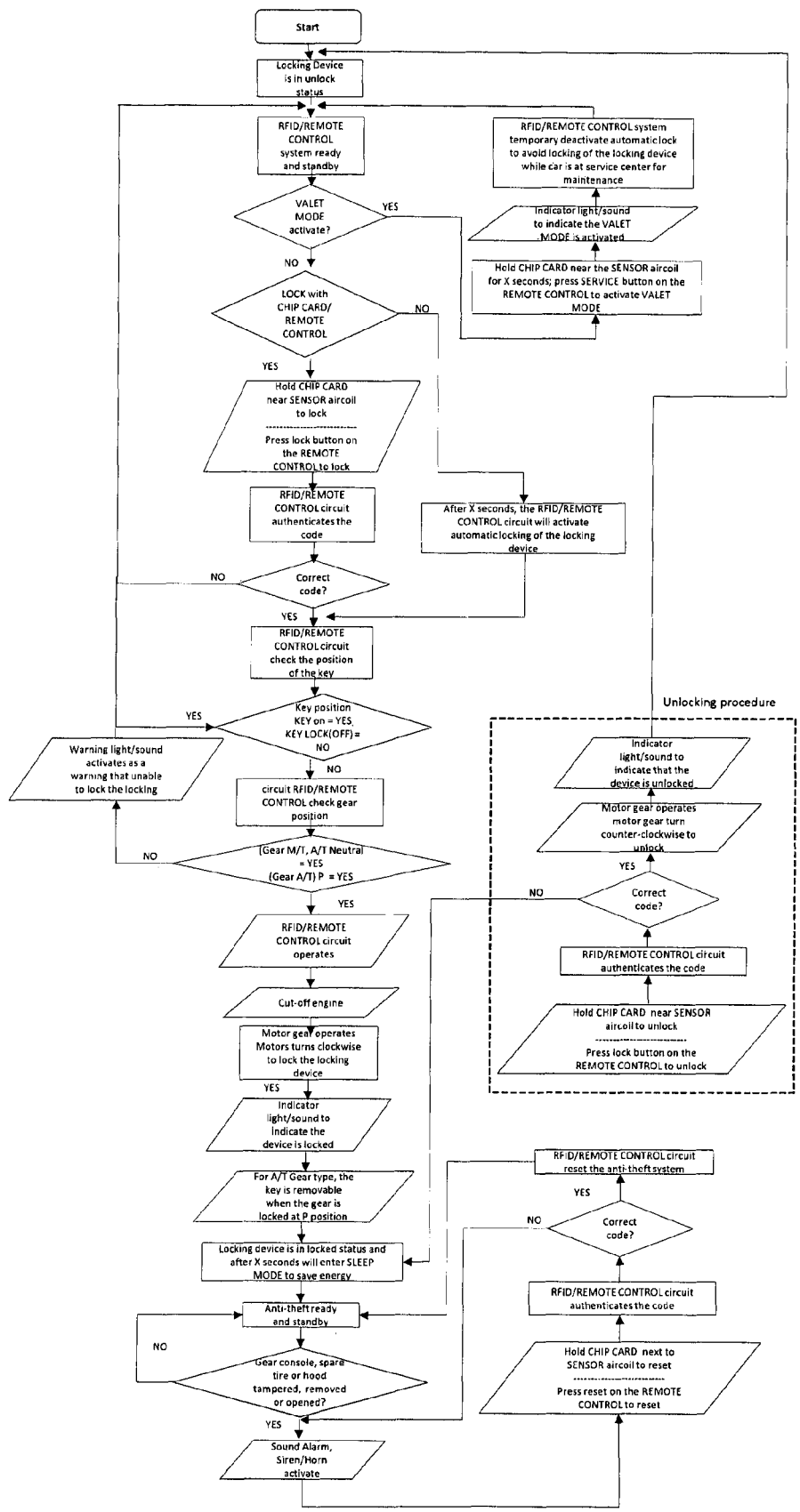
FIG. 9 is a flow diagram of the vehicle security system of FIG. 1 in accordance with a first aspect of the first preferred embodiment.

FIG. 9 shows a flow diagram of the operation of the vehicle security system 10 that includes the motor 30 for moving the driving function locking device 12 configured as a gear locking device between the locked and unlocked positions in accordance with the first aspect of the first preferred embodiment. The vehicle security system 10 is configured to start with the driving function locking device 12 in the unlocked position (FIG. 3) and the remote control 16 in a ready and/or standby status. A user manually pulls on a hand-pull of the driving function locking device 12 to move the driving function locking device 12 to the ready to lock position. Then the RFID or remote control is used to move the locking pin 54 to the locked position, thereby disabling the driving function of the vehicle via the driving function locking device 12.

A user can then choose whether or not to activate a valet mode of the vehicle security system 100. In the valet mode, the driving function locking device 112 is purposely disabled by the user. To activate the valet mode, the user holds the chip card 118 near an aircoil sensor 52 for a fixed predetermined amount of time, e.g., 2, 3, 4, or 5 or more seconds, in addition to pressing a service button on the remote control 16 to activate. The chip card 118 and remote control 116 then sends a deactivation signal to the controller 114, which is received by the transceiver 133. Afterwards, the advisor 142, such as a buzzer 148 or an LED 150, responds to indicate to the user that the valet mode is activated. At this time, the vehicle security system 100, which is configured to lock the vehicle's driving function, is temporarily deactivated to avoid inadvertent or unwanted locking/disabling of the vehicle's driving function, such as when the vehicle is being used by a valet service or at a service station for maintenance.

When the valet mode is not activated by the user, the user then has the option to lock the driving function locking device 112 with the chip card 118 or the remote control 116. If the vehicle security system's does not receive any signal to lock the vehicle within a predetermined amount of time, e.g., 2, 3, 4, 5, 6, 7, 8, 9, or 10 or more seconds, e.g., 40, 50 or 60 seconds, then the controller 114 will activate the driving function locking device 112 so as to move to the locked position.

To unlock the driving function locking device the user positions the RFID/remote control near a sensor e.g., aircoil sensor 52, to disengage the motor 30 and unlock the driving function locking device. If the user wishes to active the vehicle security system 10 by the remote control 16 or chip card 18, the user then either activates the remote control's lock button or holds the chip card 18 near the aircoil sensor 52 to transmit a locking command code to the controller 14, which is received by the transceiver 33. The controller 14 then authenticates the locking command code. If the locking command code is not authenticated, the remote control 16 resets back to its ready and/or standby state. If the locking command code is authenticated, the vehicle's security system 10 then operates to place the vehicle in a locked state and the vehicle security system 10 is fully activated.

After authentication of the locking command code, the vehicle security system 10 checks to determine whether the gear position of the vehicle is in the park "P" or neutral "N." If the gear is not in the P or N positions, the vehicle security system 10 sends a warning signal e.g., a visual or audio signal, that the vehicle security system 10 is unable to lock the driving function locking device 12. However, if the gear position is in P or N, no warning signal is provided and the motor 30 proceeds to move the driving function locking device to the locked position (FIG. 4).

In sum, the controller 14 is configured to determine if the gear lever 13 of the vehicle is in a park "P" gear position or a neutral "N" gear position. When in the park or neutral gear position, the controller 14 can function to lock the driving function locking device 12 to disable the driving function of the vehicle after a command code provided by the chip card 18 is authenticated or automatically locks the driving function locking device 12 to disable the driving function of the vehicle after a fixed period of time upon receipt of a command code provided by the remote control 14. Additionally, the driving function locking device 12 is configured to unlock when the controller 14 receives an unlocking command code from the chip card 18 or the remote control 16, and authenticates the unlocking command code.

After the vehicle security system 10 is moved to the locked position, the controller 14 activates the engine cut-off 56. Afterwards, the advisor 42 indicates that the vehicle security system 10 is locked and fully activated. For automatic transmission vehicles, the vehicle's key may be removed even if the gear lever is locked at the N position. Additionally, after the vehicle security system 10 is fully activated, the controller 14 is configured to operate in a sleep mode or a power down mode to save on power consumption.

In other words, when the driving function locking device 12 is moved from the unlocked position to the locked position, the controller 14 activates the engine cut-off 56 for disabling an engine starter of the vehicle, the advisor 42 advises that the vehicle is disabled, and a low power mode for operation of the controller 14 is initiated.

Additionally, while the vehicle security system 10 is in the locked position, if the gear lever 13 is tampered with or removed, the controller 14 activates an alarm, such as an audio alarm via, e.g., the horn 46 or siren 44. The controller 14 can detect whether or not the gear lever 13 is tampered with via the tamper sensor 38 which is attachable to the gear lever 13 and/or the driving function locking device 12, and in communication with the controller 14. If the alarm is activated, the alarm may be stopped by resetting the vehicle security system 10 using the chip card 18 or the remote control 16. After the controller 14 receives a deactivation code and determines that the deactivation code is authenticated, the driving function locking device 12 will move to the unlocked position and the advisor 42 will indicate that the vehicle security system 10 is unlocked. After the vehicle security system 10 is successfully unlocked, the vehicle security system 10 will reset and resume a ready and/or standby status. However, if the deactivation code is not correct, the alarm will continue to sound. In sum, the controller 14 is connected to the tamper sensor 38 and configured to lock the driving function locking device 12 and activate the advisor 42 to issue a warning when the tamper sensor 38 is activated. Alternatively, a shock sensor may be used in place of or in addition to the tamper sensor 38.

Figure 9A:
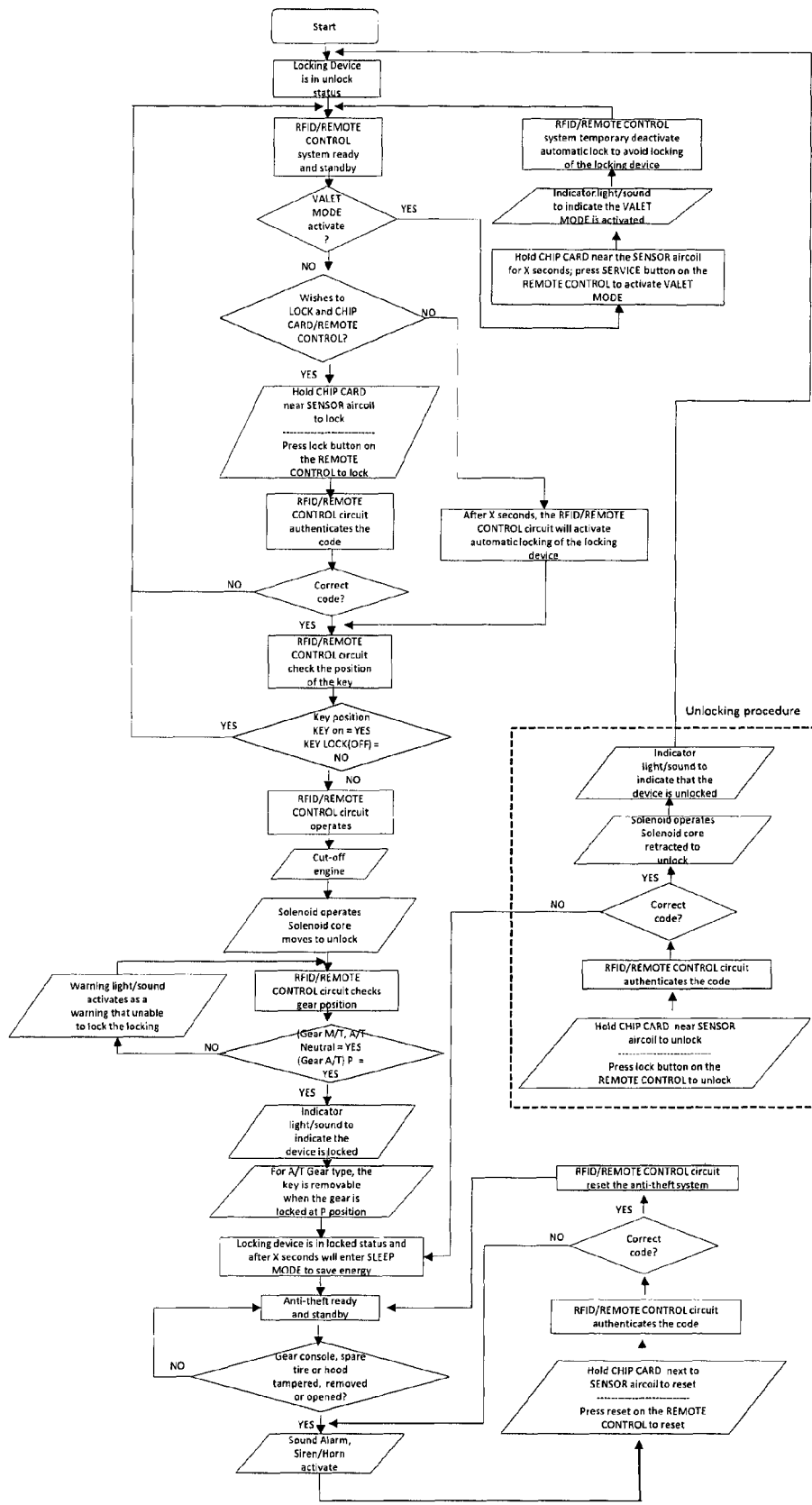
FIG. 9A is a flow diagram of the vehicle security system of FIG. 1 in accordance with a second aspect of the first preferred embodiment.

FIG. 9A shows a flow diagram of the operation of the vehicle security system 10 that includes a solenoid 32 for moving the driving function locking device 12 configured as a gear lever locking device in accordance with a second aspect of the first preferred embodiment. The operational characteristics of the second aspect of the first preferred embodiment are substantially the same as that of the first aspect of the first preferred embodiment.

Figure 10:
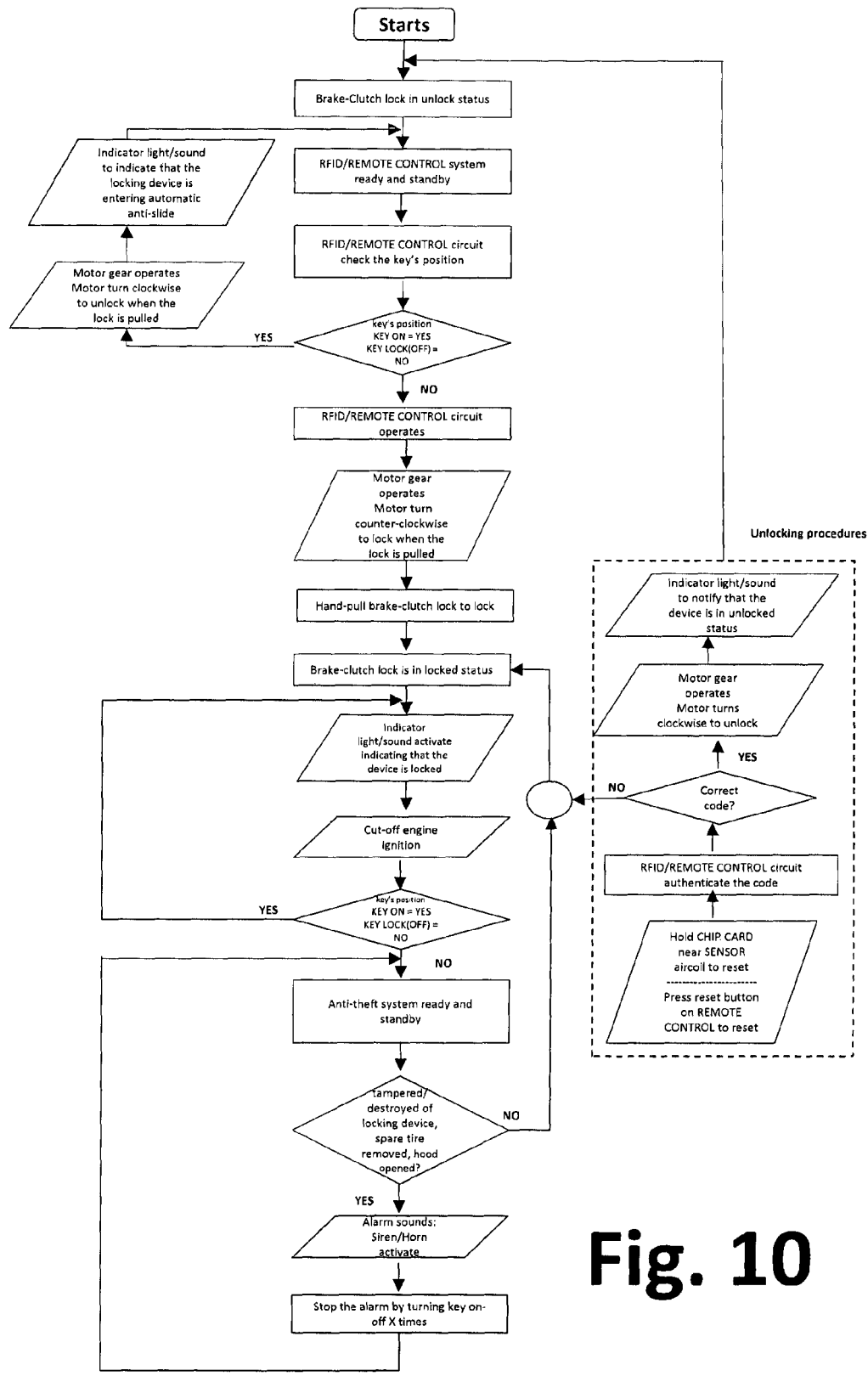
FIG. 10 is a flow diagram of the vehicle security system of FIG. 1 in accordance with a third aspect of the first preferred embodiment.

FIG. 10 shows a flow diagram of the operation of the vehicle security system 10 that includes a motor 30 (instead of a solenoid 32) for moving the driving function locking device 12 configured as a brake/clutch locking device between the locked and unlocked positions in accordance with a third aspect of the first preferred embodiment. The flow diagram of FIG. 10 is substantially the same to that of first aspect of the first preferred embodiment.

Figure 10A:
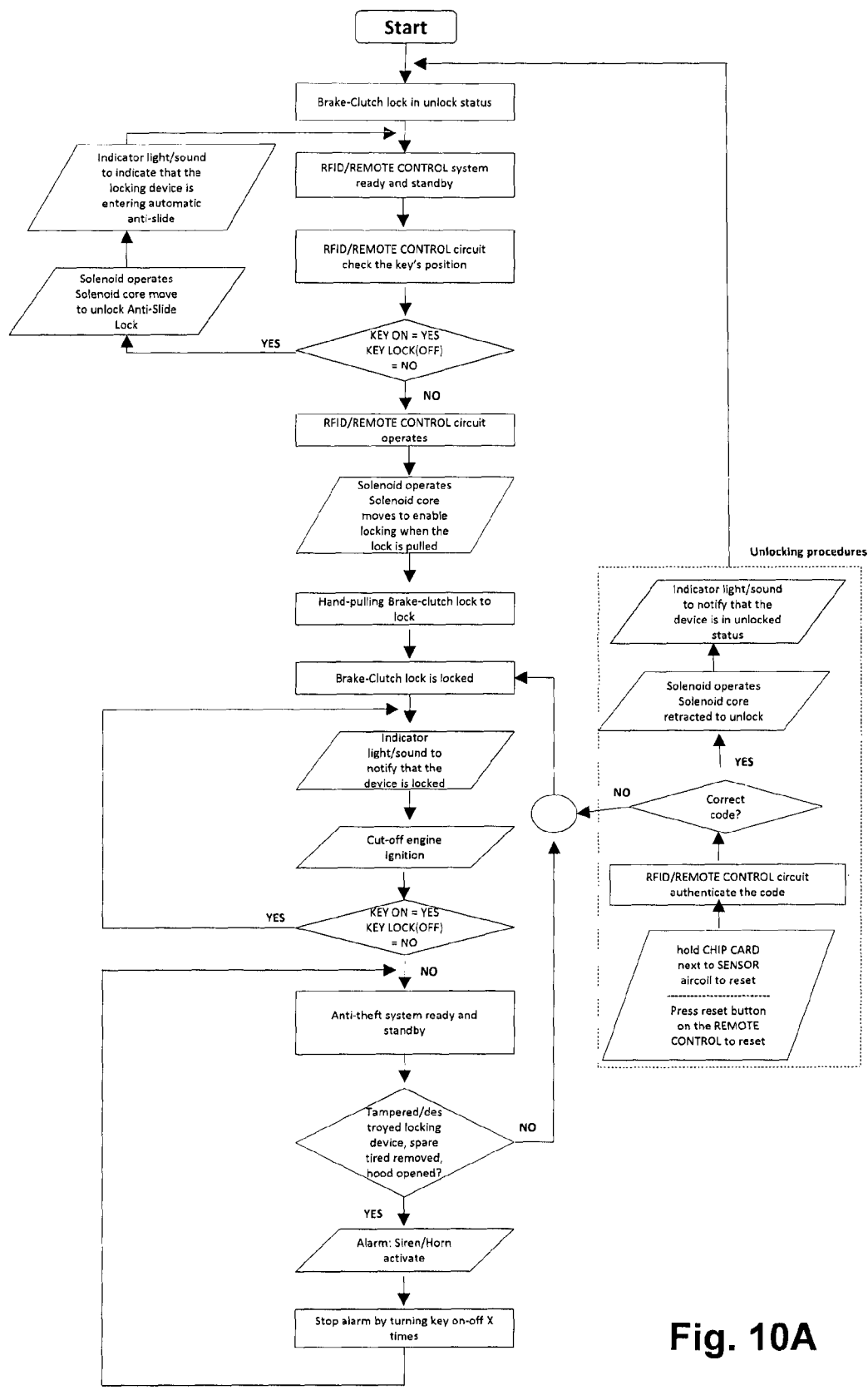
FIG. 10A is a flow diagram of the vehicle security system of FIG. 1 in accordance with a fourth aspect of the first preferred embodiment.

FIG. 10A shows a flow diagram of the operation of the vehicle security system 10 that includes the solenoid 32 for moving the driving function locking device 12 configured as a brake/clutch locking device in accordance with a fourth aspect of the first preferred embodiment. The operational characteristics of the fourth aspect of the first preferred embodiment are substantially the same as that of the first aspect of the first preferred embodiment.

The driving function locking device 12 can alternatively be, for example a gear lever locking device as described in International Application Publication No. WO2011/068484, the entire disclosure of which is hereby incorporated herein by reference.

Figure 11:
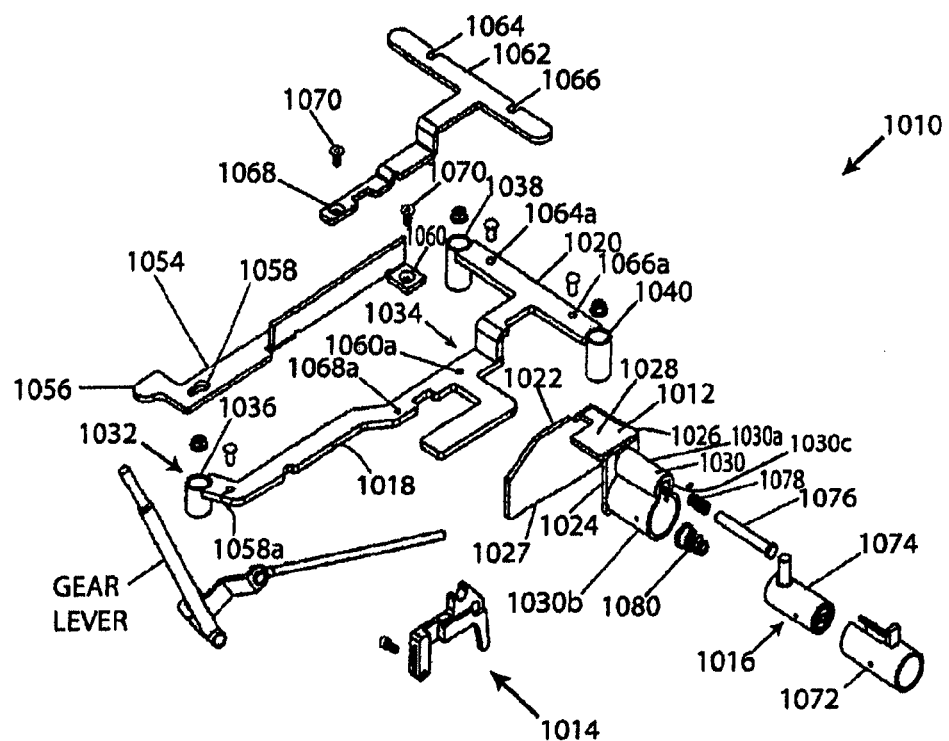
FIG. 11 is an exploded, perspective view of a gear lever locking device applicable to vehicle security system of FIG. 1.
Figure 12:
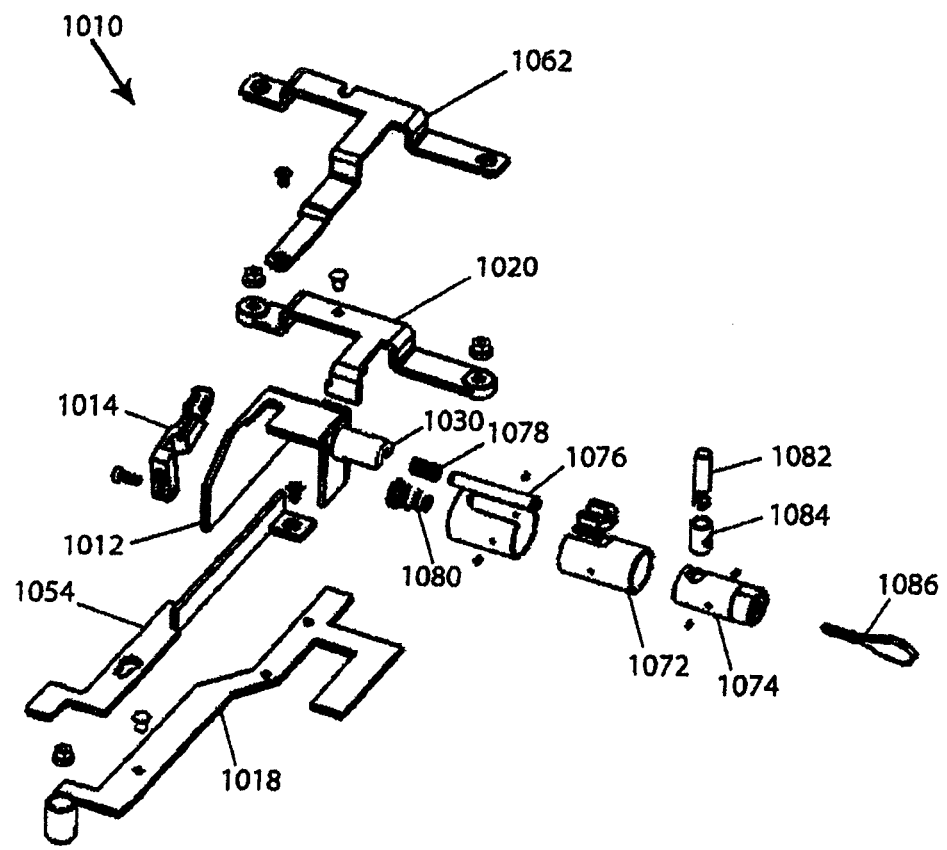
FIG. 12 is an exploded, perspective view of a gear lever locking device applicable to vehicle security system of FIG. 1.

For example, the driving function locking device 12 can be a gear lever locking device 1010 that includes a cover member 1012, a connector 1014, a locking mechanism 1016, a first fixing leg 1018, and a second fixing leg 1020, as best shown in FIGS. 11 and 12.

Figure 13:
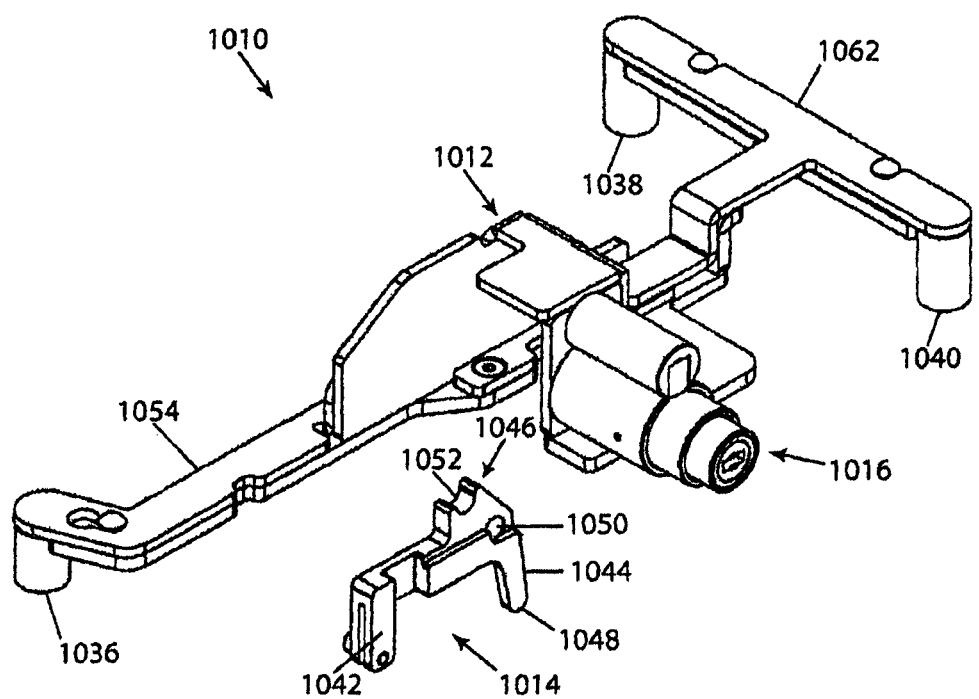
FIG. 13 is a perspective view of the gear lever locking device of FIG. 11.

The cover member 1012 is generally configured, as shown in FIG. 11, having an open box like configuration. The cover member 1012 includes first and second lateral walls 1022, 1024 and a rear side wall 1026. In addition, the cover member 1012 includes a top wall 1028 connected to the lateral side walls 1022, 1024 and the rear side wall 1026. The first and second lateral walls 1022, 1024, and the rear side wall 1026 collectively form a lower edge 1027 that couples with the first fixing leg 1018 and the second fixing leg 1020 (FIG. 13). A cover element 1030 extends perpendicularly form the second lateral wall 1024 for covering the locking mechanism 1016, as further described below.

The first fixing leg 1018 is generally configured, as shown in FIGS. 11 and 12. In general, the first fixing leg 1018 is a substantially planar member having an overall configuration in the shape of the letter "J". The first fixing leg 1018 includes a first end 1032 and an opposite second end 1034. The first end 1032 includes a tubular mounting member 1036. The tubular mounting member 1036 is also positioned to correspond to a position of an original mounting screw (not shown) on a vehicle about its gear lever. The second end 1034 is configured to attach to the second fixing leg 1020, as shown in FIG. 11.

The second fixing leg 1020 is generally configured, as shown in FIGS. 11 and 12. In general the second fixing leg 1020 is configured in the shape of the letter "T". The second fixing leg 1020 includes a first tubular mounting member 1038 and a second tubular mounting member 1040 about opposite ends of the second fixing leg 1020. The first and second tubular mounting members 1038, 1040 are positioned to correspond to the positions of original mounting screws (not shown) of the vehicle about its gear lever.

The first fixing leg and the second fixing leg 1018, 1020 attach to the cover member 1012. The gear lever locking device 1010 is attached to a vehicle about its gear lever owing to the position of the tubular mounting members 1036, 1038, 1040 of the first and second fixing legs 1018, 1020. That is, the gear lever locking device 1010 is attached to a vehicle's gear lever frame by screws mounted through the tubular mounting members 1036, 1038, 1040 which are received within the original mounting screw locations already positioned within the vehicle's gear lever mounting frame (not shown).

The connector 1014 is configured, as best shown in FIG. 13. The connector 1014 includes a fixing end 1042, a first end 1044 and a second end 1046. The fixing end 1042 includes respective holes for attaching the connector 1014 to a coupling part of the gear lever, a gear sling of the gear lever, or a gear sling connected to the gear lever. The first end 1044 is located opposite the fixing end 1042 and includes a pair of parallel flat protrusions 1048. The second end 1046 includes a hole 1050 and a groove 1052. The groove 1052 is configured about an upper portion of the second end 1046. The hole 1050 is spaced apart from the groove 1052 and positioned about a lower portion of the second end 1046. The groove 1052 and hole 1050 are configured to receive a locking stud 1076 (FIG. 12) of the locking mechanism 1016, as further described below. That is, the groove 1052 and hole 1050 correspond to one of a locked position and an unlocked position of the gear lever locking device 1010. When the connector 1014 is connected to a gear lever, it is housed within the cover member 1012.

The gear lever locking device 1010 also includes a first screw guard 1054 that is configured, as shown in FIG. 11. The first screw guard 1054 has a shape that complements the shape of the first fixing leg 1018. In particular, the first screw guard 1054 includes a planar section 1056 that covers the tubular mounting member 1036 of the first fixing leg 1018 when the first screw guard is fastened to the first fixing leg 1018. The first screw guard 1054 includes throughholes 1058, 1060 that correspond with respective throughholes 1058a, 1060a on the first fixing leg 1018 for attaching the first screw guard 1054 thereto using screws.

The gear lever locking device 1010 also includes a second screw guard 1062 generally configured, as best shown in FIG. 11. The second screw guard 1062 is shaped to compliment the shape of the second fixing leg 1020 and a part of the first fixing leg 1018. The second screw guard 1062 includes throughholes 1064, 1066, 1068 for fastening the second screw guard 1062 to the first and second fixing legs 1018 and 1020. The throughholes 1064, 1066, 1068 correspond in position to corresponding throughholes 1064a, 1066a, 1068a on the first and second fixing legs 1018, 1020 for attaching thereto by fasteners, such as screws 1070. The second screw guard 1062 includes ends that cover the first and second tubular mounting members 1038, 1040 of the second fixing leg 1020.

When fully assembled to the gear lever assembly of the vehicle, screws 1070 are blocked by the gear lever of the vehicle when the gear lever locking device 1010 is in the locked position, thereby preventing access to the screws 1070 by a person for purposes of disassembling the gear lever locking device 1010 from the vehicle. However, when the gear lever locking device 1010 is moved to the unlocked position, the screws 1070 are accessible for removal if needed.

Figure 18:
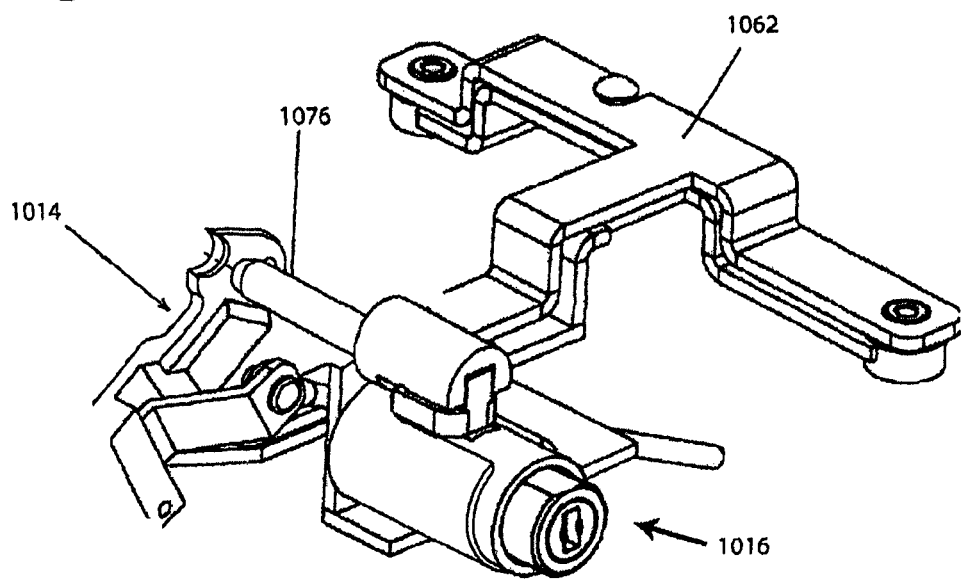
FIG. 18 is a top perspective view of the gear lever locking device of FIG. 11 without a cover element in an unlocked position.
Figure 19:
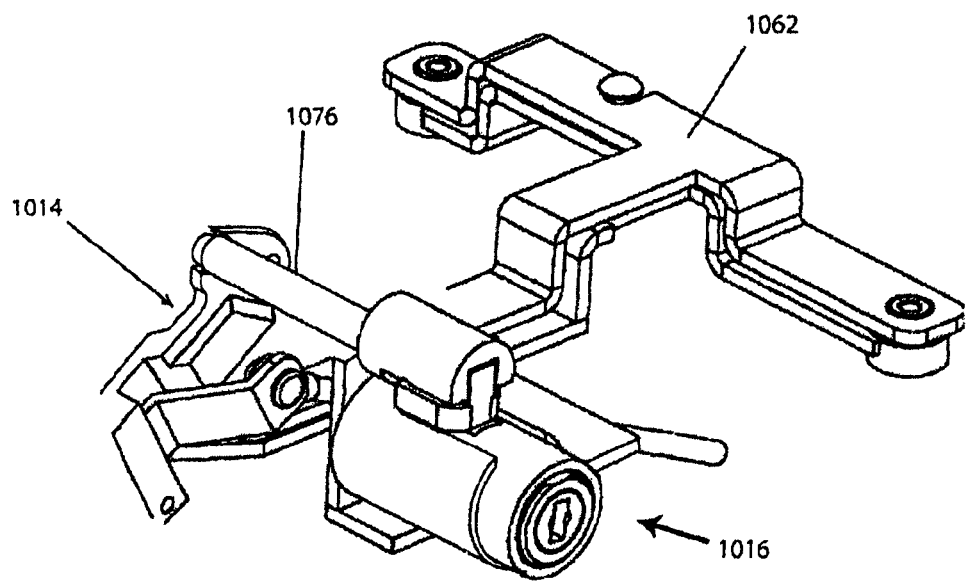
FIG. 19 is a top perspective view of the gear lever locking device of FIG. 11 without a cover element in a locked position.
Figure 20:
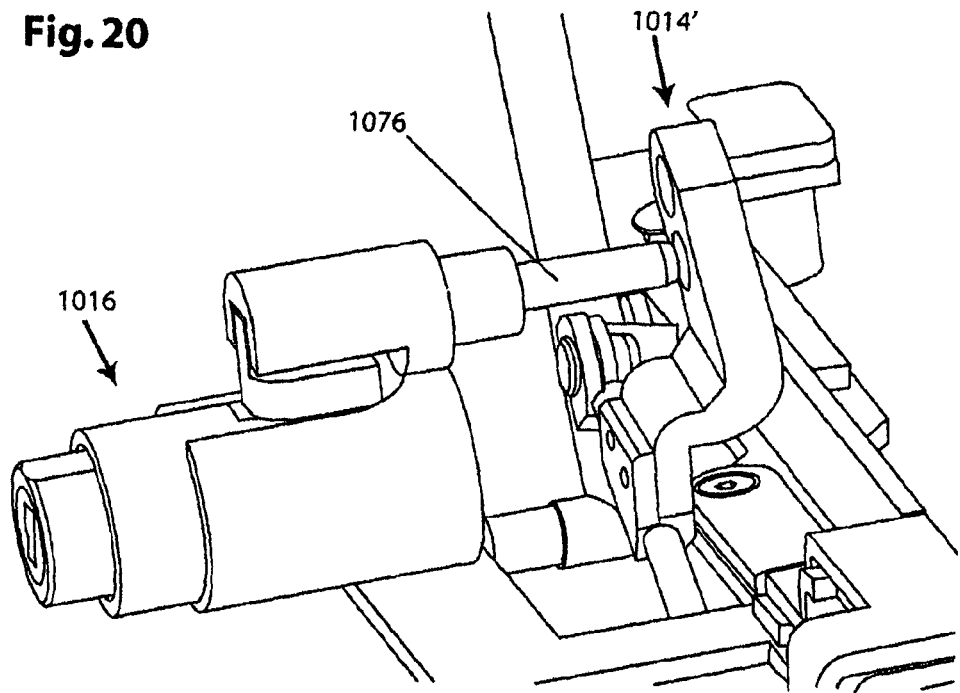
FIG. 20 is an enlarged, rear perspective view of the gear lever locking device of FIG. 11 in an unlocked position.
Figure 21:
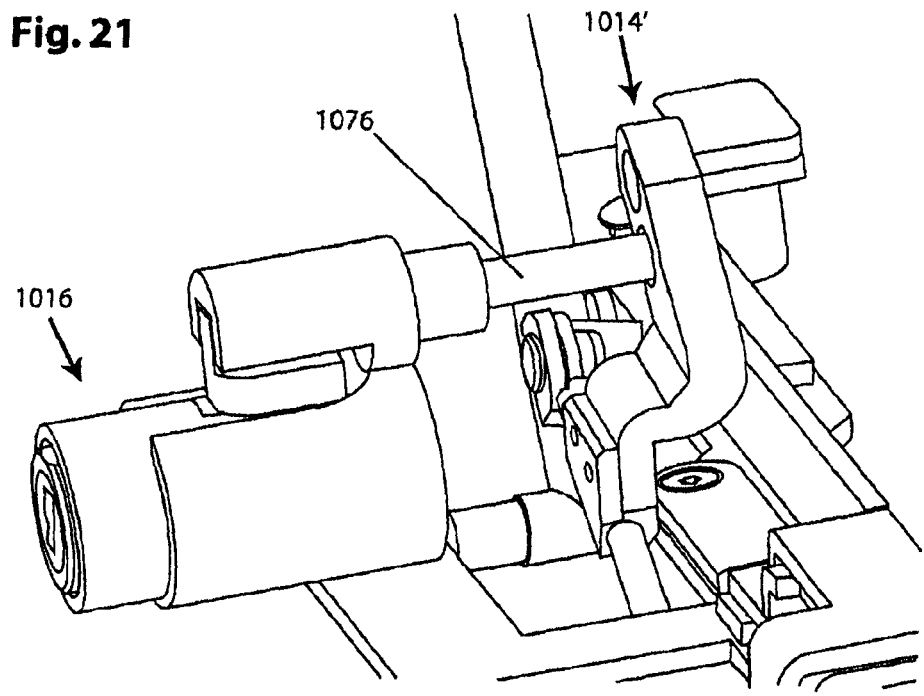
FIG. 21 is an enlarged, rear perspective view of the gear lever locking device of FIG. 11 in a locked position.

The locking mechanism 1016 includes a locking mechanism housing 1072, a turning mechanism 1074, a locking stud 1076 and a spring 1078. The turning mechanism 1074 is housed within the locking mechanism housing 1072. The turning mechanism 1074 and locking mechanism 1072 assembly is positioned within a lower portion 1030b of the cover element 1030 with a return spring 1080 positioned between the turning mechanism 1074 and the second lateral wall 1024 of the cover element 1030. The spring 1078 and locking stud 1076 are also housed within an upper portion 1030a of the cover member 1012 when the turning mechanism 1074 and locking mechanism housing 1072 is assembled within the lower portion 1030b of the cover member 1012. The turning mechanism 1074 includes a first stud 1082 (FIG. 12) arranged within a first stud sheath 1084. In operation, the first stud 1082 is actuatable by applying an external force such as manual pressing to the turning mechanism 1074 for moving the locking stud 1076 to its locked position (FIGS. 17, 19 and 21) within the locking mechanism 1016 and when the locking stud 1076 is received within one of the groove 1052 and hole 1050 of the connector 1014. The locking stud 1076 slides out of the groove 1052 or hole 1050 on the connector 1014 when the first stud 1082 inside the locking mechanism housing 1072 is moved to the unlocked position. In the unlocked configuration (FIGS. 16, 18 and 20), the key 1086 is used for unlocking, the return spring 1080 biases the locking mechanism housing 1072 out of its locked position. The first stud 1082 functions to prevent the locking stud 1076 from moving to the unlocked position.

The cover member 1012 is also configured to receive the locking stud 1076 about its lateral side. Specifically, the second lateral wall 1024 is configured to receive the locking stud 1076 to allow passage therethrough to the connector 1014. The cover member's cover element 1030 includes the upper portion 1030a and the lower portion 1030b. The upper portion 1030a includes a spring mounting opening 1030c within which the locking stud 1076 is slidable therein.

Figure 15:
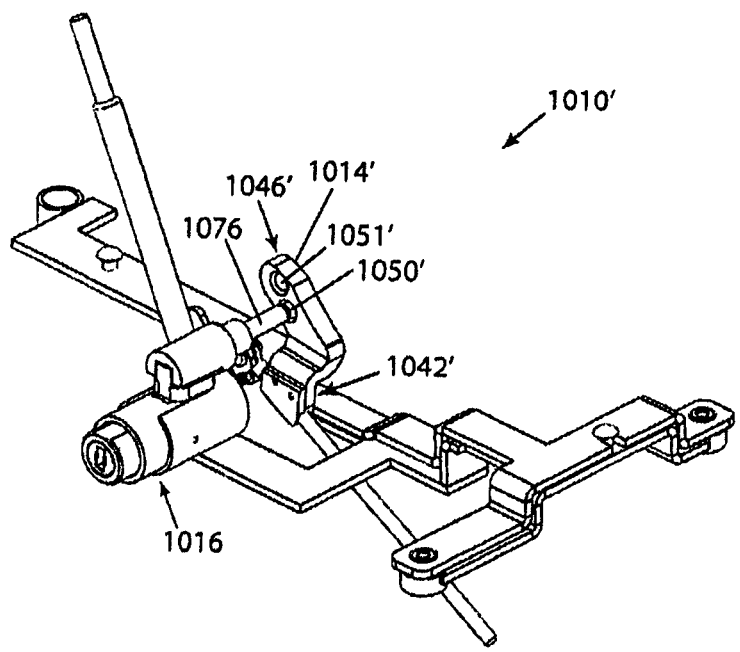
FIG. 15 is a top perspective view of an alternative embodiment of the gear locking device of FIG. 11.

FIG. 15 illustrates an alternative embodiment of the connector 1014'. The connector 1014' is configured, as best shown in FIG. 15, and includes a first end 1042' connectable to a portion of a gear lever and a second end 1046' that includes a first and a second hole 1050' and 1051' for receiving the locking stud 1076 of the locking mechanism 1016.

In sum, the gear lever locking device 1010 is to be installed inside a gear lever cover panel of a vehicle. The gear lever locking device 1010 is characterized in that it includes a cover member 1012 that is snugly fitted to cover the locking mechanism 1016 and the connector 1014. The lower edge of the cover member 1012 is coupled with the first fixing leg 1018 and the second fixing leg 1020. The first fixing leg 1018 and the second fixing leg 1020 are bent members with at least three protruding ends in the positions that correspond to the original mounting screws of the vehicle. The protruding ends of the first fixing leg 1018 and the second fixing leg 1020 include screw holes for mounting to the vehicle in the original position of the vehicle connected to the gear lever. On the first fixing leg 1018 and the second fixing leg 1020, there is provided the screw guards 1054, 1062. The screw guards 1054, 1062 are complementary in shape and closely cover the screws that fasten the first fixing leg 1018 and the second fixing leg 1020. The screw guards 1054, 1062 are fastened to the first fixing leg 1018 and the second fixing leg 1020 using e.g., screws 1070. The process of fastening the screw guards 1054, 1062 to the first and second fixing leg 1018, 1020 is carried out while the gear lever locking device 1010 is in the unlocked position. Subsequently, the screws 1070 may be used in fastening the screw guards 1054, 1062 with the aid of mechanical tools. However, it is impossible to use the mechanical tools to fasten the screws 1070 to the screw guards 1054, 1062 if the gear lever locking device 1010 is in the locked position.

Figure 14:
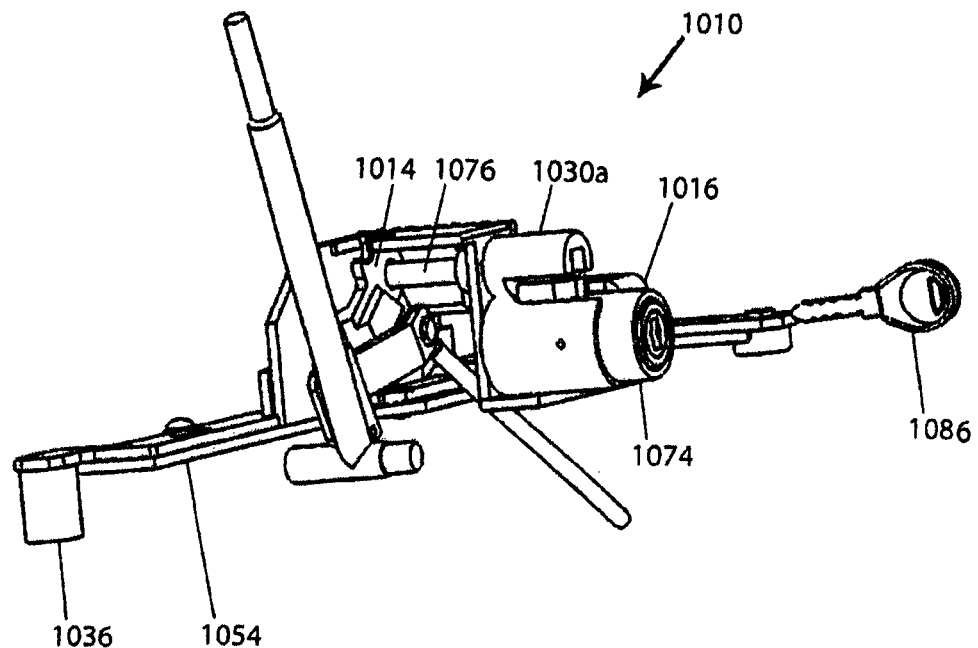
FIG. 14 is a perspective view of the gear lever locking device of FIG. 11 attached to a gear lever of a vehicle.

The aforementioned connector 1014 is a cast metal member, one end of which includes a pair of parallel flat protrusions. The fixing ends thereof are provided with respective holes for use in fixing to the coupling part of the original gear lever, gear sling, or gear sling end connected to the original gear lever, as shown in FIG. 14. At least a part of the other end of the connector 1014 is provided with a hole 1050 or a concaved notch 1052 or both for use in locking to the end of the locking stud 1076 of the locking mechanism 1014 to inhibit any movement of the gear lever.

The lateral portion of the cover member 1012 is designed for the installation of the locking stud 1076 and provided with a spring mounting opening 1030c inside of which the locking stud 1076 is slidable therein. The outer end of the locking stud 1076 includes the first stud 1082 of the turning mechanism 1074 arranged inside the locking mechanism housing 1072. The first stud 1082 is actuated to push the locking stud 1076 to be locked to the groove of the side of the cover member 1012 designated for the mounting of the locking stud 1076. There is provided the opening 1030c which is configured to receive the spring 1078 for mounting within the upper portion 1030a. The spring 1078 is slidable within the upper portion 1030a.

The locking stud 1076 engages the first stud 1082 of the locking mechanism 1016 arranged inside the locking mechanism housing 1072. The first stud 1082 is actuated to push the locking stud 1076 to be locked to the groove 1052 or the hole 1050 on the connector 1014 into the locked configuration. Either the groove 1052 or the hole 1050 is used depending upon the position of the gear lever itself, e.g., the gear levering being in a forwardly position (first gear) or a rearwardly position (second gear). The locking stud 1076 slides out of the groove 1052 or the hole 1050 on the connector 1014 while unlocking the first stud 1082 inside the locking mechanism housing 1072 to which the return spring 1078 is mounted. The spring 1078 pushes the body of the locking mechanism 1016 out of its locked position. The outer end of the locking mechanism housing 1072 is mounted to the locking mechanism 1016 having the first stud 1082 arranged inside the first stud sheath 1084. The stud sheath 1084 is actuated by the locking mechanism 1016. The first stud 1082 is locked to the locking mechanism housing 1072 to prevent the retreating movement of the locking stud 1076. Moreover, the locking mechanism 1016 can include a key 1086 used for locking and unlocking.

Figure 22:
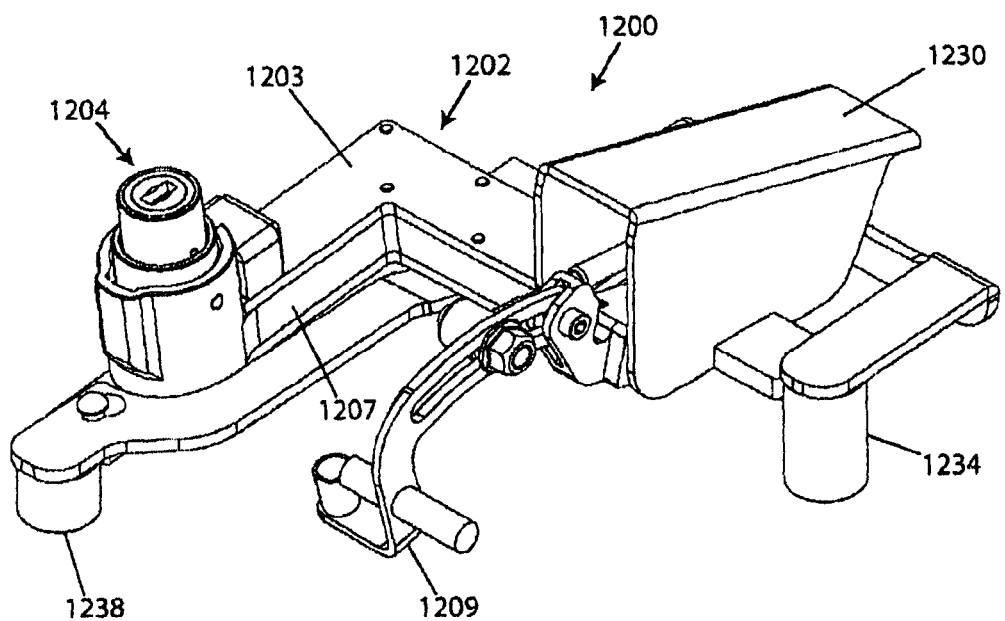
FIG. 22 is a perspective view of an alternative embodiment of a gear lever locking device applicable to the vehicle security system of FIG. 1.
Figure 23:
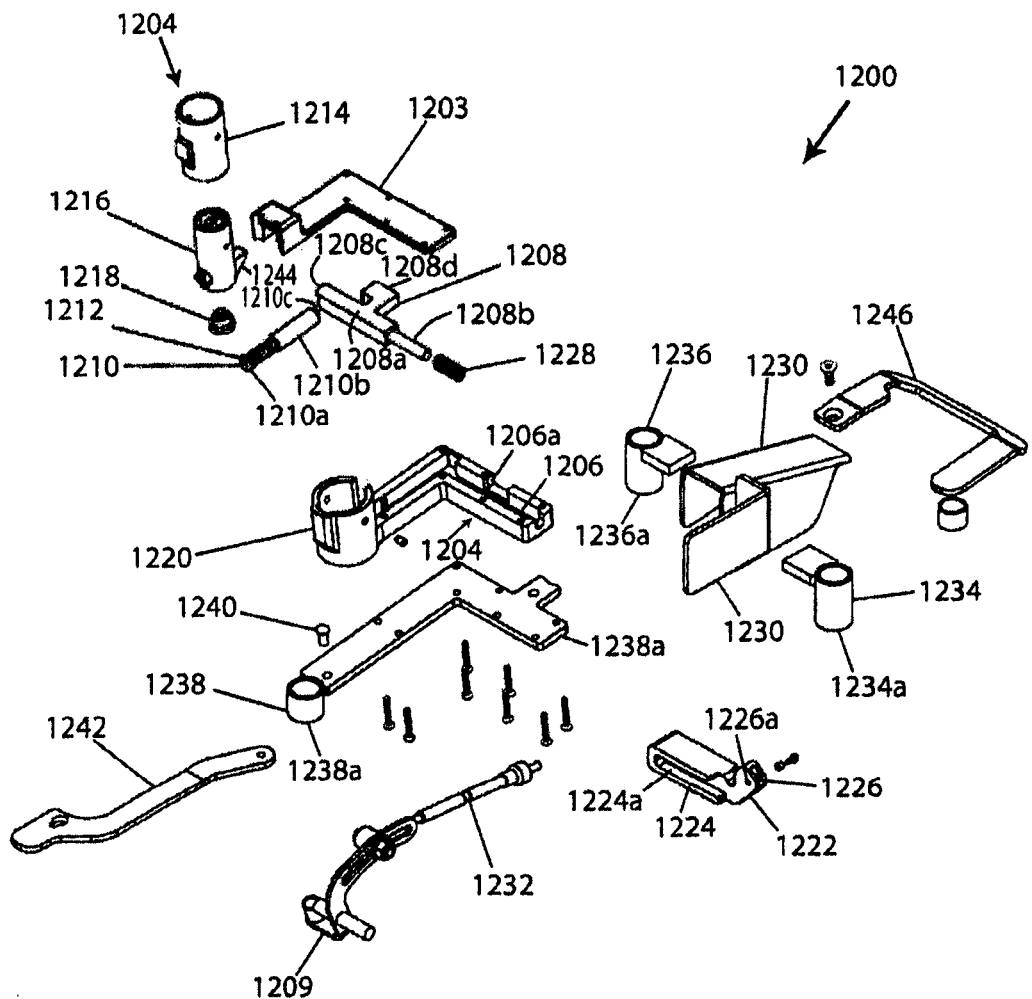
FIG. 23 is an exploded, perspective view of the gear locking device of FIG. 22.

The driving function locking device 12 can alternatively be a gear lever locking device 1200, as shown in FIGS. 22-26. The gear lever locking device 1200 is installed inside a gear lever cover panel of a vehicle. The gear lever locking device 1200 includes a stud chamber 1202, a locking mechanism 1204 and a sling retaining plate 1209, as shown in FIG. 22. The stud chamber 1202 is configured to have a shape in accordance with an inner space of the gear lever cover panel. Preferably, the stud chamber 1202 is configured having a substantially L-shaped housing configuration. The stud chamber 1202 includes an upper cover 1203 that can be disassembled and a housing groove 1206. The housing groove 1206 includes a portion for the installation of a stud 1208. The stud 1208 is configured, as best shown in FIG. 23, having a main body portion 1208a and a cylindrical extension 1208b extending from the main body portion 1208a about one end. About the opposite end, the main body portion 1208a includes an inclined plane 1208c. The inclined plane 1208c is configured to engage a stud pushing mechanism 1210. The stud 1208 is generally configured to be received within the housing groove 1206 about one leg of the L-shaped housing groove 1206.

The gear lever locking device 1200 also includes the stud pushing mechanism 1210, as shown in FIG. 11. The stud pushing mechanism 1210 is generally configured as a cylindrical stud having a first end 1210a configured to receive a spring 1212 that circumscribes the first end 1210a. The stud pushing mechanism 1210 has an opposite second end 1210b having a larger diameter than the first end 1210a. About the end of the second end 1210b is a curved plane 1210c, that is preferably configured to have a conical shape. The curved plane 1210c engages the inclined plane 1208c of the stud 1208. The stud pushing mechanism 1210 is arranged internally in a corresponding manner to the housing groove 1206, about its other leg portion that is perpendicular to the leg portion in which the stud 1208 is housed within.

The locking mechanism 1204 includes a locking mechanism chamber 1214, a turning mechanism 1216 and a return spring 1218. The locking mechanism chamber 1214 is configured to receive the turning mechanism 1216 therein. The locking mechanism chamber 1214 with the turning mechanism 1216 is then assembled within a locking mechanism housing 1220 that is connected to the stud chamber 1202. In the locking mechanism housing 1220 is the return spring 1218 positioned to bias the turning mechanism 1216.

Figure 24:
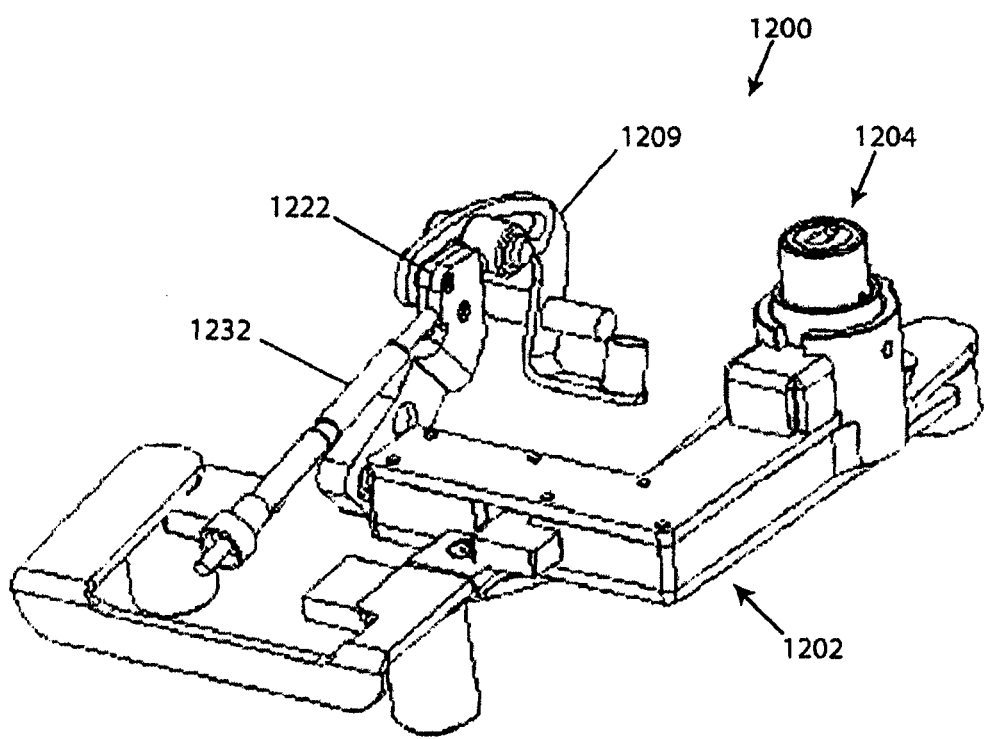
FIG. 24 is a partially exposed perspective view of the gear lever locking device of FIG. 22.
Figure 25:
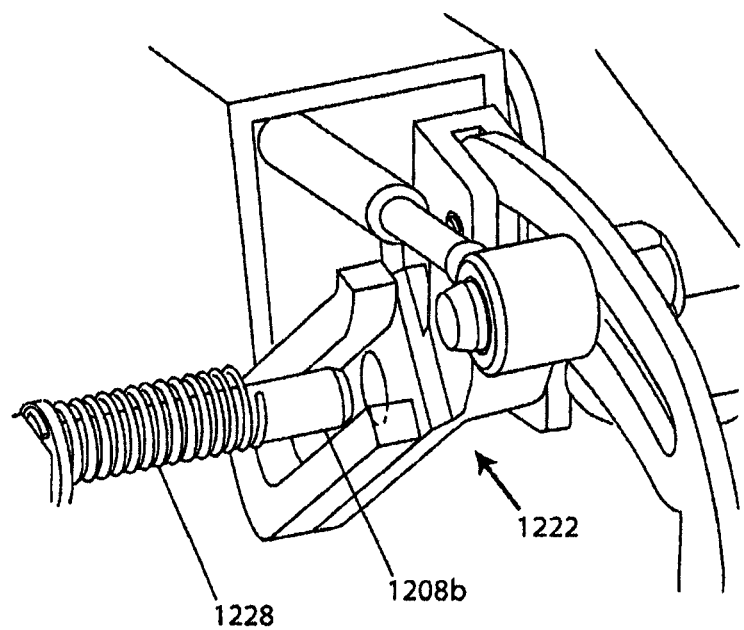
FIG. 25 is an enlarged, perspective view of a portion of the gear lever locking device of FIG. 22 in an unlocked position.
Figure 26:
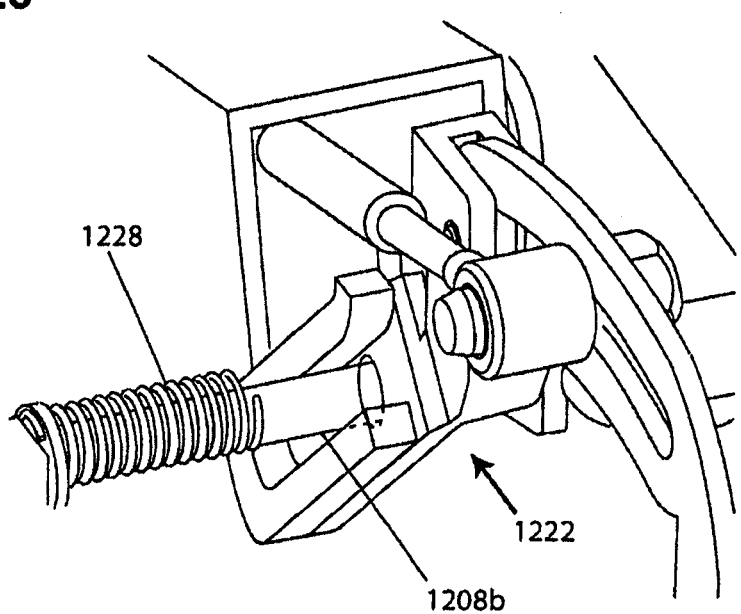
FIG. 26 is an enlarged, perspective view of a portion of the gear lever locking device of FIG. 22 in a locked position.

Connected to an opposite end of the stud chamber 1202, to which the locking mechanism housing 1220 is connected, is connected the sling retaining plate 1209. In particular, the sling retaining plate 1209 is connected to the stud chamber 1202 through an auxiliary connector 1222. The auxiliary connector 1222 is configured, as best shown in FIG. 23, and includes a sustaining groove 1224 and a curved extension 1226. The curved extension 1226 includes a through hole 1226a for receiving a fastener to fasten the sling retaining plate 1209 thereto (FIG. 23). The sustaining groove 1224 of the auxiliary connector 1222 is attached to the stud chamber 1202 as shown in FIG. 24. Specifically, the opening of the groove 1224a is oriented in facing engagement with the stud 1208 assembled within the housing groove 1206. Thus, in operation, the stud 1208 is insertable through the groove opening 1224a of the auxiliary connector 1222 at an end of the stud chamber 1202. When the stud 1208 extends through to the groove opening 1224a of the auxiliary connector 1222, the gear lever locking device 1200 is in the locked position (FIG. 26) to lock the movement of the sling retaining plate 1209. The sling retaining plate 1209 assembles to a gear lever of the vehicle, such as an automobile. In the unlocked position (FIG. 25), the stud 1208 withdraws from the auxiliary connector 1222 and slides back into the stud chamber 1202. A return spring 1228 circumscribes the cylindrical extension 1208b of the stud 1208 to bias the stud 1208 to the unlocked position within the stud chamber 1202.

The gear lever locking device 1200 further includes a cover wall member 1230, configured as best shown in FIG. 23. The cover wall member 1230 covers the auxiliary connector 1222 and is connected to a lateral side of the stud chamber 1202. The cover wall member 1230 also covers a portion of the sling retaining plate 1209 and the sling end connector 1232. The gear lever locking device 1200 also includes a means to connect to the gear lever housing frame of the vehicle by a number of fixing legs 1234, 1236, 1238, along with fixing legs fastening screws e.g., 1240. The fixing legs 1234, 1236 and 1238 are assembled to the gear lever locking device 1200, as shown in FIGS. 22 and 23. The fixing legs 1234, 1236, 1238, each include a cylindrical pipe positioned at a location of an existing screw of the gear lever housing frame for attaching directly thereto.

The auxiliary connector 1222 is a plate provided with the groove opening 1224a, that is a through hole for receiving, via insertion, the stud 1208 and in particular the cylindrical extension 1208b of the stud 1208. The auxiliary connector 1222 is locked in position by the stud 1208 in such a manner that the end of the auxiliary connector 1222 does not abut a floor of the vehicle or a vehicle mechanism. The auxiliary connector 1222 also includes a portion that serves as a mounting portion to be fixed to a groove end of the sling end retaining plate 1209, i.e., the curved extension 1226.

The stud 1208 also includes an auxiliary extension 1208d that extends from a lateral side of the stud 1208. The auxiliary extension 1208d extends through an opening 1206a on a lateral side of the stud chamber 1202 to obscure the screws fastening the screw guard 1242 that covers the fixing leg 1238, in order to prevent the removal of the fixing legs 1234, 1236, 1238 when the gear lever locking device 1200 is in the locked position.

The locking mechanism 1204 is installed inside the locking mechanism housing 1220 mounted at the end of the stud chamber 1202, about the end where the stud pushing mechanism 1210 is located. The turning mechanism 1216 of the locking mechanism 1204 includes a pin 1244 that is moved upwardly when the turning mechanism 1216 is moved to the locked configuration. The pin 1244, when moved upwardly, moves the stud pushing mechanism 1210 to engage the stud 1208.

The fixing legs 1234, 1236, 1238, each include a cylindrical pipe 1234a, 1236a, 1238a for covering screw heads that attach the fixing legs 1234, 1236, 1238 to the vehicle at a position that corresponds to the fixing leg retaining screw holes. The cylindrical pipes 1234a, 1236a, 1238a also include a lateral opening (not shown) for receiving a part of a protrusion.

In sum, the gear lever locking device 1200 is to be installed inside the gear lever cover panel. The gear lever locking device 1200 includes a stud chamber 1202 having an upper cover 1203 that is connected to the locking mechanism 1204. The stud chamber 1202 is shaped in accordance with the inner space of the gear lever covering panel. The lower part of the stud chamber 1202 is detachably attached to a fixing base 1238a. Within the inner space of the stud chamber 1202 is the stud mounting portion and the stud pushing mechanism 1210 arranged internally in a correspondent manner. The stud 1208 is inserted through a through hole at the end of the stud chamber 1202 to be locked with the auxiliary connector 1222 and slides back by the force exerted from the return spring 1228 and 1212 mounted on the stud 1208 and the stud pushing mechanism 1210, respectively.

One part on the lateral side of the stud 1208 includes an auxiliary extension 1208d protruding through the opening 1206a on the lateral side of the stud chamber 1202 to slide to obscure the screws fastening the screw guard 1246. This prevents the removal of the fixing legs 1234, 1236, 1238 of the gear lever locking device 1200 when the latter is in the locked position. The end adjacent to the stud 1208 connected with the cover wall member 1230 cast to cover the portion of the sling end connector 1232 and the sling retaining plate 1209. In addition, the lower part of the gear lever locking device 1200 comprises a number of fixing legs along with the fastening screws. The screw holes on the upper fixing legs have an upwardly extending pipe covering the screw head and handling the closing insertion of the cylindrical pipe e.g., 1234a at the lower end of the screw guard in the position that corresponds to the leg retaining screw hole.

The locking mechanism 1204 or the turning mechanism 1216 is installed inside the locking mechanism chamber/housing 1220 with fastening means mounted in the locking mechanism chamber 1220 and connected with the end of the side of the stud chamber 1202 where the stud pushing mechanism 1210 is located. The lock pressing mechanism includes a pin/pin end 1244 for use in moving the end of the stud pushing mechanism 1210 and the lower part of the locking mechanism chamber 1214 still has a return spring 1218.

The auxiliary connector 1222 is a plate provided with at least one opening 1224a for the insertion of the stud end 1208b to block in the locked position at the P or N position of the transmission. A portion on one end is used as the mounting portion to be fixed to the groove end of the conventional rotatable sling end retaining plate 1209. There is a groove 1224 at the lateral side of the auxiliary connector 1222 at the side connected to the stud 1208 for use in receiving the stud end 1208b in such a manner that the end of the auxiliary connector 1222 does not abut the vehicle floor or the vehicle mechanism.

Alternatively, auxiliary connector 1222 is a plate provided with at least one hole for the insertion of the stud end 1208b to block in the locked position. A portion on one end is used as the fixing portion with the gear sling end 1232 connected to the gear lever. Further, one portion on the screw guard 1242 comprises the openings for use in engaging with the stud head 1240 fastened at the upper part of the fixing leg in the correspondent positions as a mechanism in fastening the screw guard 1242.

The end of the stud pushing mechanism 1210 at which part is connected to the mechanical pin 1244 of the lock pressing mechanism 1216 is the inclined or curved plane used in abutting the inclined plane of the mechanical pin 1210c of the lock pressing mechanism 1216 to move the end of the stud pushing mechanism 1210. In addition, on the stud pushing mechanism 1210, there is provided a spring groove 1210a inside of which is installed the return spring 1212 to help in pushing the stud pushing mechanism 1210 backward when the gear lever locking device 1200 is unlocked.

Figure 27:
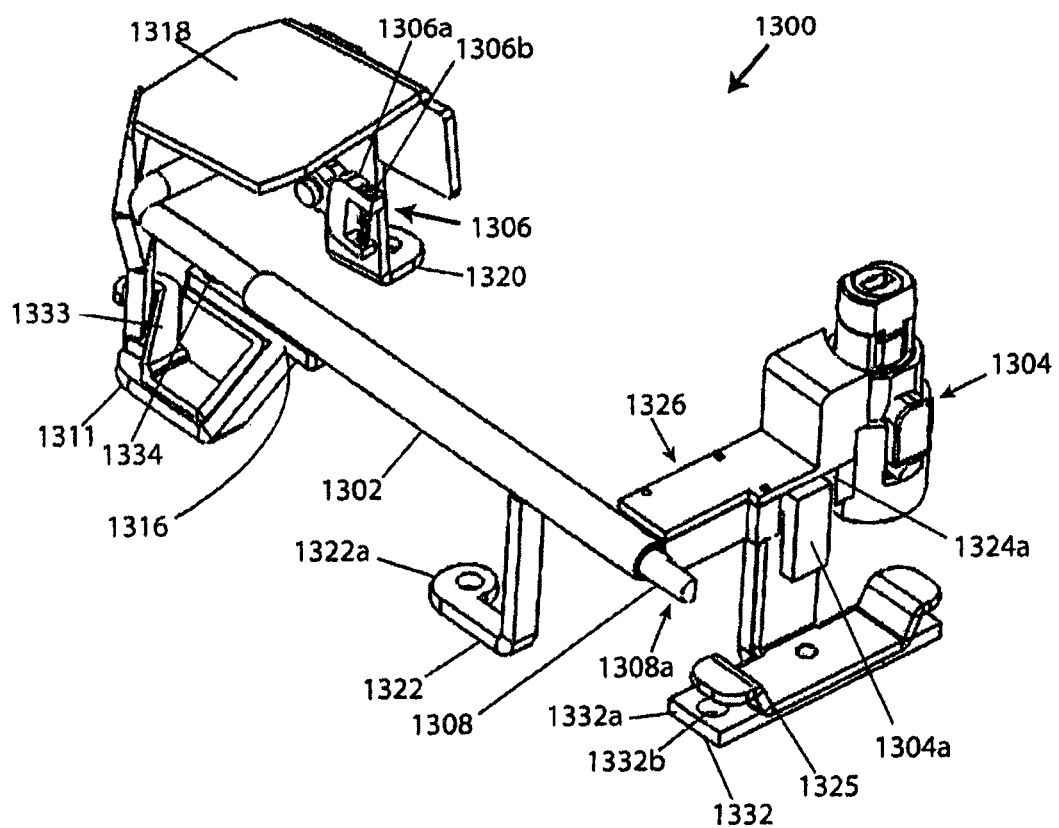
FIG. 27 is a perspective view of a gear lever locking device in accordance with another preferred embodiment applicable to the vehicle security system of FIG. 1.
Figure 28:
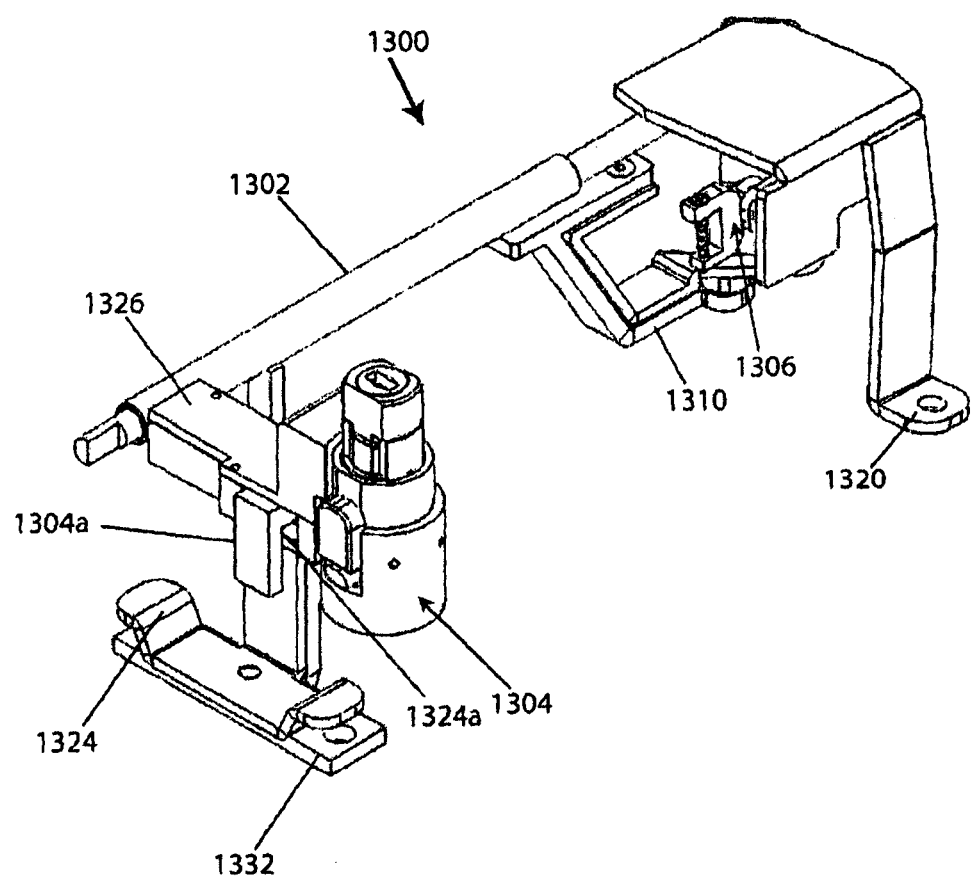
FIG. 28 is a rear perspective view of the gear lever locking device of FIG. 27.
Figure 29:
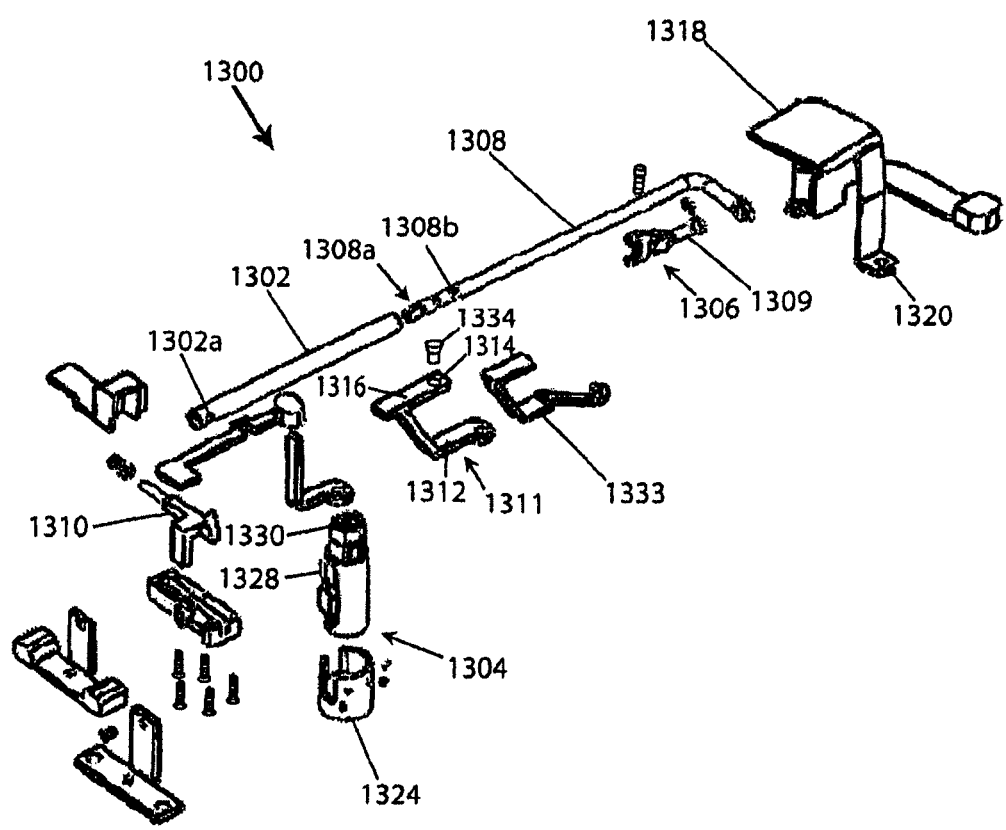
FIG. 29 is an exploded perspective view of the gear lever locking device of FIG. 27.

Additionally, the driving function locking device 12 can be a gear locking device 1300, as shown in FIGS. 27-32. The gear locking device 1300 includes an axle pipe 1302, a locking mechanism unit 1304 and an engagement member 1306. The axle pipe 1302 houses a sliding axle 1308 that is mounted within the axle pipe 1302. The axle pipe 1302 is configured as a tubular member. The sliding axle 1308 is configured as an L-shaped rod member having a plurality of cutouts about its first end 1308a. The second end 1308c of the sliding axle 1308 or its front end is curvedly bent, as shown in FIG. 29. The sliding axle 1308 also includes a tip about the second end 1308c of the smaller length segment that is connected to the engagement member 1306. That is, the engagement member 1306 is connected to the front end of the sliding axle 1308. The engagement member 1306 is configured as best shown in FIG. 27 to engage with a gear lever sling end retaining plate, or a gear lever sling of a vehicle.

The sliding axle 1308 also includes recesses or cutouts 1308*b* (FIG. 29) about its rear end or first end 1308*a*. The recesses 1308*b* are positioned along the sliding axel 308, so as to correspond to a P position or an N position of a gear lever of the vehicle. The recesses 1308*b* support or engage with a locking stud 1310 of the locking mechanism unit 1304. The locking stud 1310 extends through a through hole 1302*a* on the axle pipe 1302.

A lower front part of the axle pipe 1302 includes a fixing leg 1311 with a flange 1312 and a cast bent screw hole extending downwardly so as to be engaged with an original screw of the vehicle. About a rear end of the flange 1312 of the fixing leg 1311, there is provided an extension member extending upwardly to be engaged with a portion of the axle pipe 1302. The flange 1312 is also coupled to a lower part of an upper cover 1318 that covers a portion above the front end of the sliding axle 1308 to prevent the destruction thereof. The upper cover 1318 is configured, as best shown in FIGS. 27-29. The upper cover 1318 also includes a fixing leg 1320 that extends downwardly. About the lower part of the rear end of the axle pipe 1302 is attached a fixing leg 1322 having a flange 1322*a* (FIG. 27) facing downwardly.

Attached to a lateral portion of the axle pipe 1302 is the locking mechanism unit 1304. The locking mechanism unit 1304 is received within a fastening stud chamber 1324 that is connected to a lateral side of the axle pipe 1302 on an opposite side of a stud chamber 1326. The stud chamber 1326 includes the locking stud 1310 that is housed therein.

A turning mechanism 1330 is received and assembled within the locking mechanism unit 1304 and includes an end pushing stud 1328 that engages the locking stud 1310 when the locking mechanism unit 1304 is pressed or the turning mechanism 1330 is turned by a key.

About the lateral side of the stud chamber 1326, is connected a fixing leg 1332 that extends downwardly from the stud chamber 1326. Each end of the fixing leg 1332 has a flange 1332*a* with a screw hole 1332*b*. A screw guard 1325 is provided on each flange 1322*a* of the fixing leg 1332. Each screw guard 1325 has its end bent into a shape that completely covers the screw heads of the screws used in fastening the fixing leg 1332 to the vehicle. A portion of the screw guard 1325 is bent to be adjoined to the fixing leg 1332 and is connected thereto by a fastening means.

The locking mechanism unit 1304 also includes an extension member 1304*a* (FIG. 27) that extends through a lateral opening 1324*a* of the fastening stud chamber 1326. The extension member 1304*a* is used to slide over and cover the screw that fastens the screw guard 1325 so as to prevent the removal of the fixing leg 1322 of the gear lever locking device 1300 when in the locked position.

The fixing leg 1311 also includes a screw guard 1333 used in preventing the removal of a fixing leg fastening screw 1334. The fixing leg 1311 is connected to the gear lever housing frame by the screw 1334 in a position substantially beneath the sliding axle 1308 when the gear lever locking device 1300 is in the locked position. That is, the front portion of the sliding axle 1308 slides into a position that covers the screw 1334 (FIG. 27) when the sliding axle 1308 corresponds to a position of the key or end gear of the vehicle.

The turning mechanism 1330 or the lock pressing mechanism is installed inside the locking mechanism chamber 1324, which is connected to the stud chamber 1326. The stud chamber 1326 includes the end pushing stud or the stud pushing mechanism 1328. The turning mechanism 1330 also includes a driving pin (not shown) that is used in pushing the end of the pushing stud mechanism 1328. The turning mechanism 1330 is also configured to receive a key for use in turning the locking mechanism unit 1304 for use in locking or unlocking the gear lever locking device 1300 to the locking or unlocking position, respectively.

The engagement member 1306, as best shown in FIGS. 27 and 28, is configured to have a U-shaped configuration. The U-shaped member 1306*a* has an aperture extending through the parallel sides of the U-shaped member for receiving a fastener 1306*b*. The engagement member 1306 receives a gear lever or a gear lever sling of the vehicle. As shown in FIG. 29, the engagement member 1306 also includes a hinge member 1309 for pivotably connecting the engagement member 1306 with the sliding axle 1308 about its front end.

Figure 30:
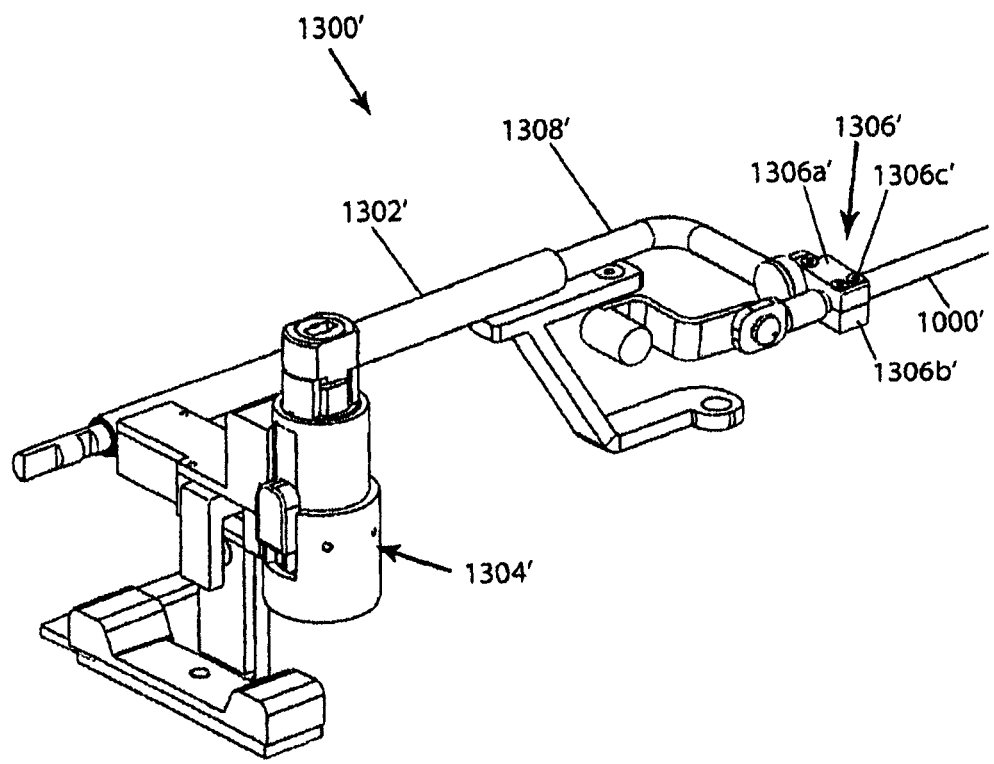
FIG. 30 is a perspective view of another embodiment of the gear lever locking device of FIG. 27 attached to a gear sling of a vehicle.
Figure 31:
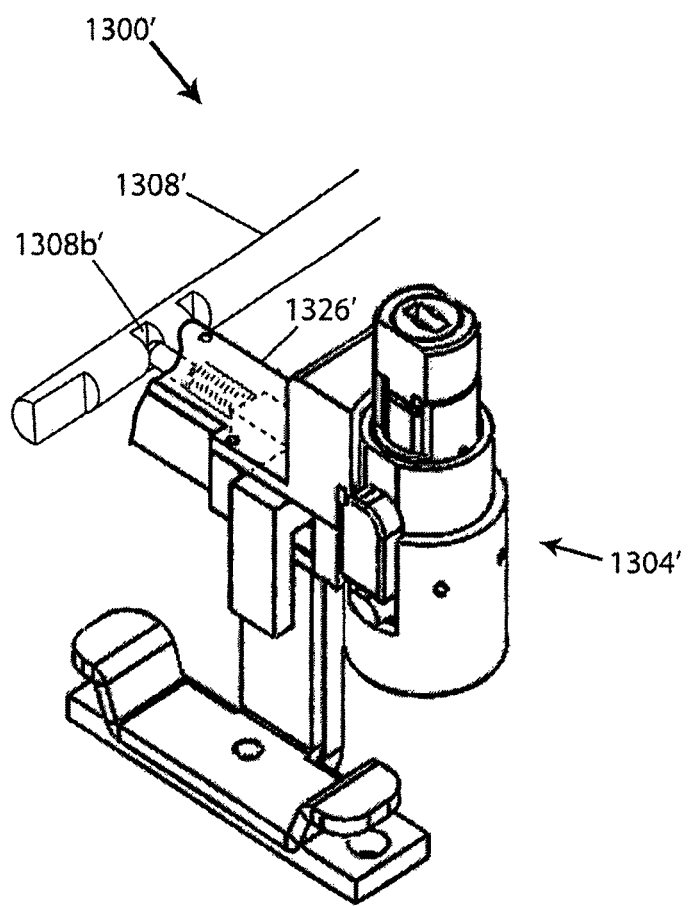
FIG. 31 is an enlarged, rear perspective view of a portion of the gear lever locking device of FIG. 30.
Figure 32:
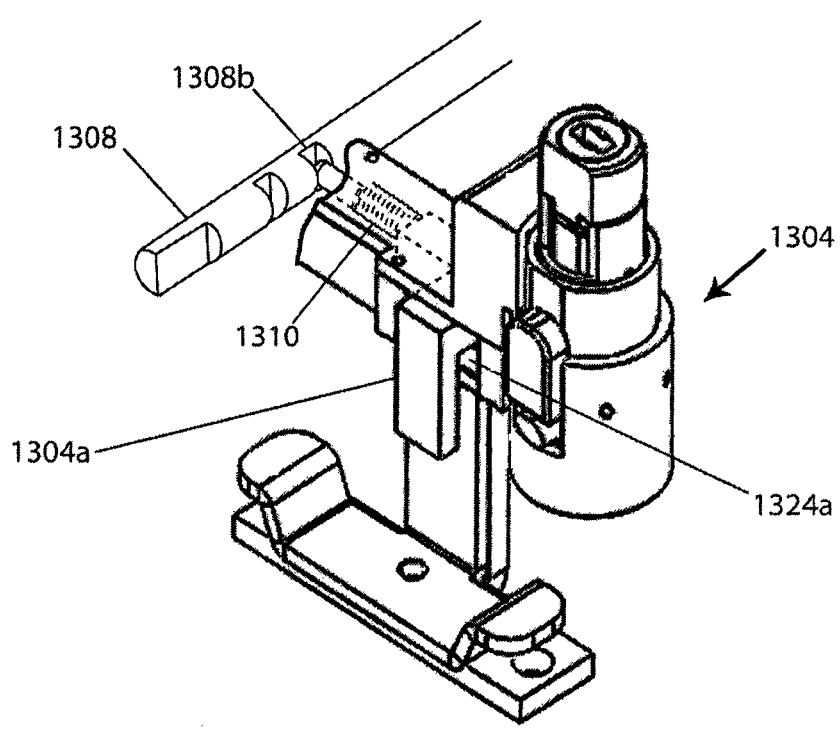
FIG. 32 is an enlarged, perspective view of a portion of the gear lever locking device of FIG. 30 in a locked position.
Figure 33:
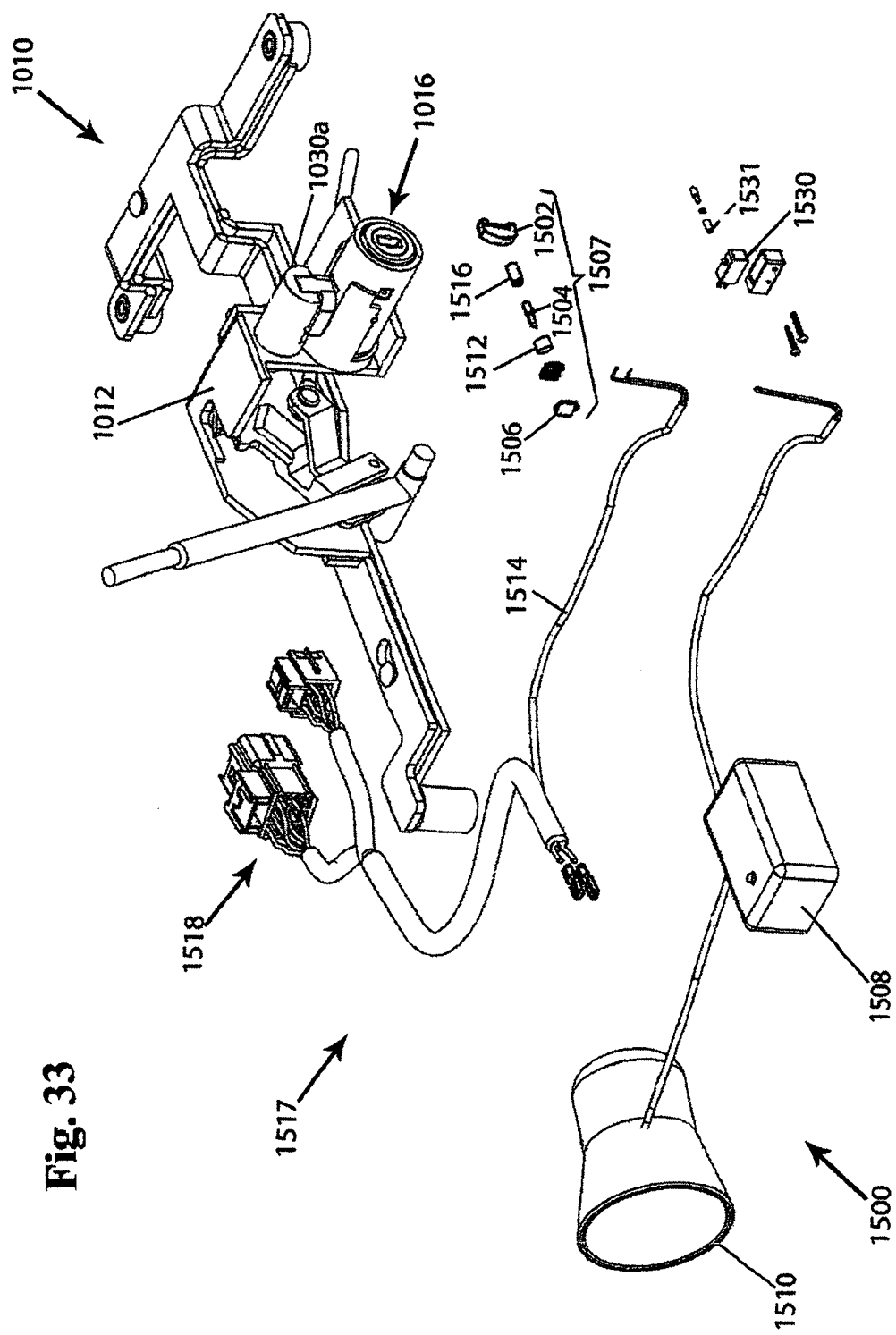
FIG. 33 is a perspective view of an alarm system and anti-start system for use with the gear lever locking device of FIG. 11, in accordance with another preferred embodiment of a gear lever locking device applicable to the vehicle security system of FIG. 1.
Figure 34:
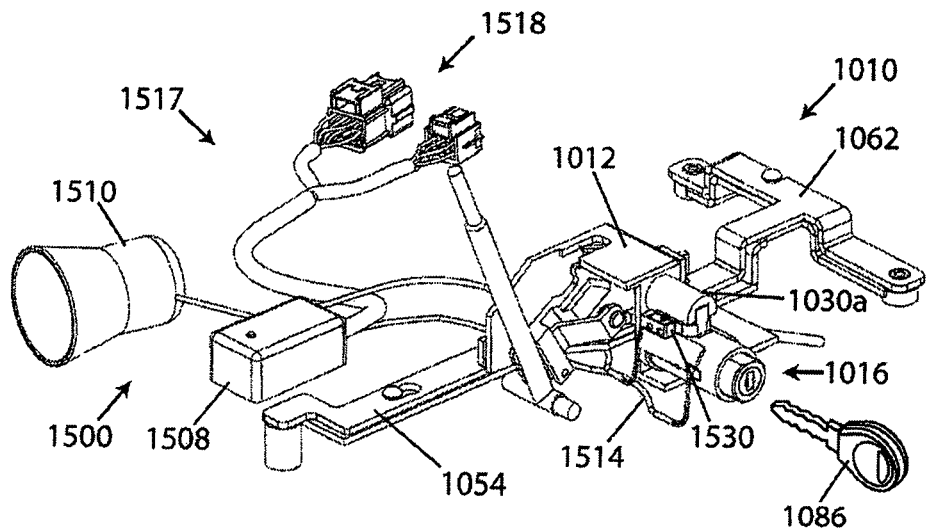
FIG. 34 is a perspective view of the alarm system and anti-start system of FIG. 33.

FIGS. 30 and 31 illustrate an alternative embodiment of the driving function locking device 12. The gear lever locking device 1300' in this embodiment is substantially the same as the gear lever locking device 1300 as described above, except for the configuration of the engagement member 1306'. The engagement member 1306' is configured, as shown, for receiving and fastening to a gear lever sling 1000' of the vehicle. The engagement member 1306' includes a pair of parallel plates 1306*a'*, 1306' having an aperture formed therethrough for receiving the gear lever sling 1000'. The parallel plates 1306*a'*, 1306*b'* are fastened together by e.g., screws 1306*c'*.

In sum, the gear lever locking device 1300 is to be installed inside the gear lever cover panel of a vehicle. The gear lever locking device 1300 includes an axle pipe 1302 that is mounted to the sliding axle 1308. The second end 1308*c* of the sliding axle 1308 is curvedly bend or "L" shaped, while its tip is provided with the engagement member 1306. The engagement member 3106 is to be engaged/connected to the gear lever sling end retaining plate or engaged with the gear lever sling end of a vehicle, as shown e.g., in FIG. 29. The first end 1308*a* of the sliding axle 1308 is provided with holes or slots in a position i.e., a sliding position, to that of a park "P" position or the neutral "N" position to support or engage the locking stud end 1310 of the locking mechanism unit 1304 extending through the through hole 1302*a* on the axle pipe 1302.

The lower front part of the axle pipe 1302 is provided with the fixing leg 1311 having the flange 1312 and the cast bent screw hole 1314 extending downwardly to be engaged with the original screw of the vehicle. At the rear end of the flange 1312 of the fixing leg 1311, there is provided an extension member 1316 extending upwardly to be engaged with a portion of the axle pipe 1302. The flange 1312 is also coupled to the lower part of the upper cover 1318 that covers the portion above the front end of the sliding axle 1308 to prevent the destruction or tampering thereof. At the other part of the upper cover plate 1318, there is the fixing leg 1320 extending downwardly therefrom.

At the lower part of the rear end of the axle pipe 1302, there is the fixing leg 1322 having a flange 1322*a* facing downwardly. In addition, the lateral portion of the rear end of the axle pipe 1302 comprises the locking mechanism unit 1304 of which a lateral part of the fastening stud chamber 1324 is connected to the lateral side of the axle pipe 1302 on the opposite side of the stud chamber 1326. The turning mechanism 1330 with the end pushing stud 1328 of the locking stud is used in pushing the lock mechanism 1304 when the lock mechanism 1304 is pressed or the turning mechanism 1330 is turned by the key.

At the lateral side of the stud axle or stud chamber 1326, there is the fixing leg 1332 extending downwardly. The fixing leg 1332 has a flange 1332*a* along with the screw hole 1332*b*. A screw guard 1325 is provided on the flange 1332*a* of the fixing leg 1332. Each of the ends of the screw guard 1325 is bent into the shape that completely covers the screw head used in connecting the fixing leg 1332 to the vehicle's gear lever housing frame. One end of the screw, guard 1324 is bent to be adjoined to the fixing leg 1332. The screw guard 1325 and the fixing leg 1332 are connected by fastening means, such as screws, studs, etc. One portion on the lateral side of the locking mechanism unit 1304 is provided with the extension member 1304*a* extending through the lateral opening 1324*a*. The extension member 1304*a* is operated to cover the screw fastening the fixing leg 1332 to the vehicle in order to prevent the removal of the fixing leg fastening screws of the gear lever locking device 1300 while in the locked position.

In addition, the fixing leg 1311 comprises the screw guard 1333 used in preventing the removal of the fixing leg fastening screws and connecting to the fixing leg 1311 by means of the fastening screws. The screw guard 1333 is functional in the position that the front portion of the end of the sliding axle 1308 slides into the position that covers the screws when the sliding axle 1308 is in the corresponding position as the P gear or N gear, while the gear lever locking device 1300 is in the locked position.

The turning mechanism 1330 or the lock pressing mechanism is installed inside the locking mechanism chamber 1324 that is connected with the stud chamber 1326 having the stud pushing mechanism 1310. The turning mechanism 1330 comprises a driving pin end used in pushing the end of the stud pushing mechanism 1310. Alternatively, the turning mechanism 1330 includes a key for use in turning to lock or unlock the gear lever locking device 1300 into the locking or unlocking position, respectively.

Figure 35:
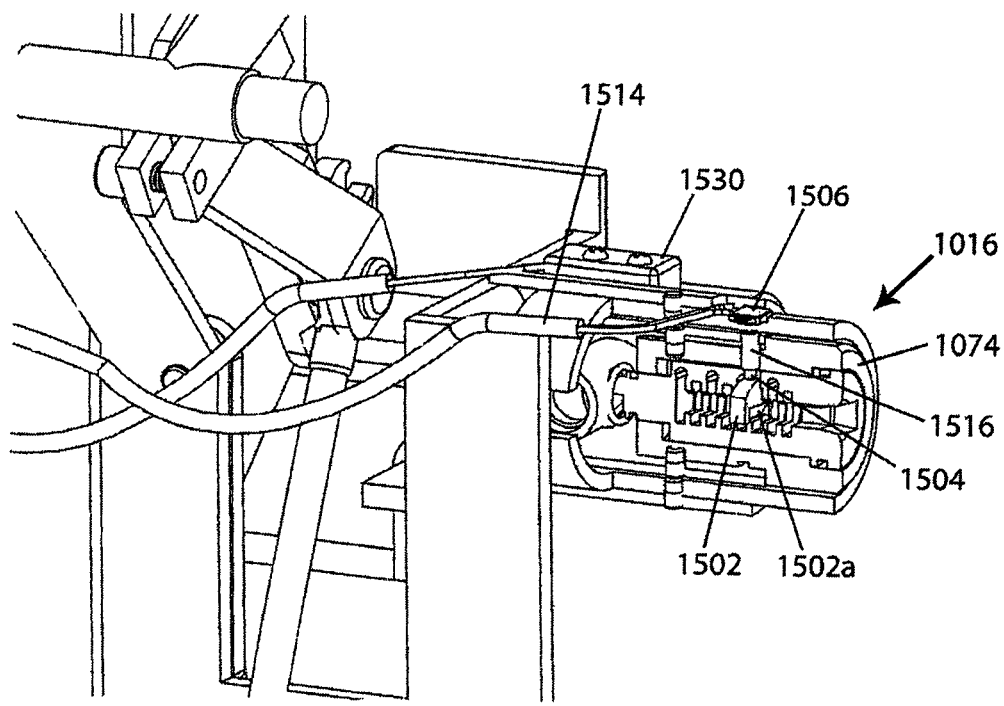
FIG. 35 is an enlarged, partial cut-away view of a locking mechanism connected to the alarm system and anti-start system of FIG. 33.
Figure 36:
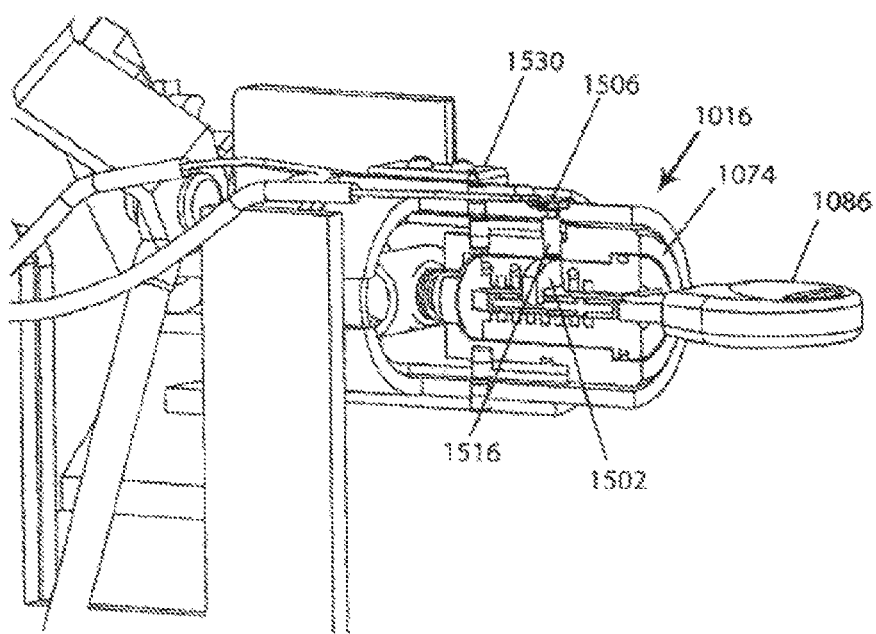
FIG. 36 is an enlarged, partial cut-away view of the locking mechanism of FIG. 35 with a key inserted therein.

Referring to FIGS. 33-37, the above-described embodiments of the gear lever locking device further includes an alarm system 1500 and an anti-start system 1517. The alarm system 1500 and anti-start system 1517 are anti-theft/security systems to prevent the vehicle from theft. The alarm system 1500 is an electrically supplied system that includes a micro switch set 1507, an electronic security system 1508, and an audible alarm device 1510. The micro switch set 1507 is attached via the through hole on the lateral side of the turning mechanism 1074 (FIG. 35). The alarm system 1500 applicable to the present invention, will now be described with reference to the gear lever locking device 1010 described above, however, the alarm system 1500 is compatible with any of the above-described embodiments of the gear lever locking device.

The gear lever locking device 1010 has a turning mechanism 1074 that is turned by the key 1086. The turning mechanism 1074 is further configured to include the micro switch set 1507 having a key code member 1502 with a protrusion 1504 for use in extending through a through hole to a micro switch 1506 (FIG. 35) installed on the body of the locking mechanism 1016 when the key 1086 is inserted into the locking mechanism 1016 for turning and unlocking the gear, lever locking device 1010. The micro switch 1506 is the mechanism used in supplying an electric current to activate the electronic security system 1508 of the alarm system 1500 to emit a code signal wave to determine a corresponding code signal wave of the key 1086 having a signal code storage device attached thereto or embedded therein. If the code signal from the key 1086 matches the code signal from the electronic security system 1508 installed inside the vehicle, the alarm system 1500 will not be triggered to sound the audible alarm device 1510. However, if the locking mechanism 1016 is unlocked by another different device or if the key 1086 does not include the correct code signal that matches the code signal from the electronic security system 1508 provided inside the vehicle, the electronic security system 1508 will turn on the alarm system 1500 and sound the audible alarm to alert the unusual situation.

That is, the aforementioned key code member 1502 includes the protrusion 1504 to be coupled to a rod 1516 used in pressing the micro switch 1506 coupled to a return spring 1512 (see FIG. 35). The rod 1516 extends to the micro switch 1506 having a signal wire 1514 connected to the electronic security system 1508 and a lower portion 1502*a* of the key code member 1502 is inclined corresponding with an insertion direction of the key 1086. The length of the rod 1516 matches the timely distance where the micro switch 1506 can operate.

The anti-start system 1517 applicable to the driving function locking device 12 will now be described with reference to the gear lever locking device 1010 described above, however, the anti-start system 1517 is compatible with any of the above-described embodiments of the gear lever locking device.

Figure 16:
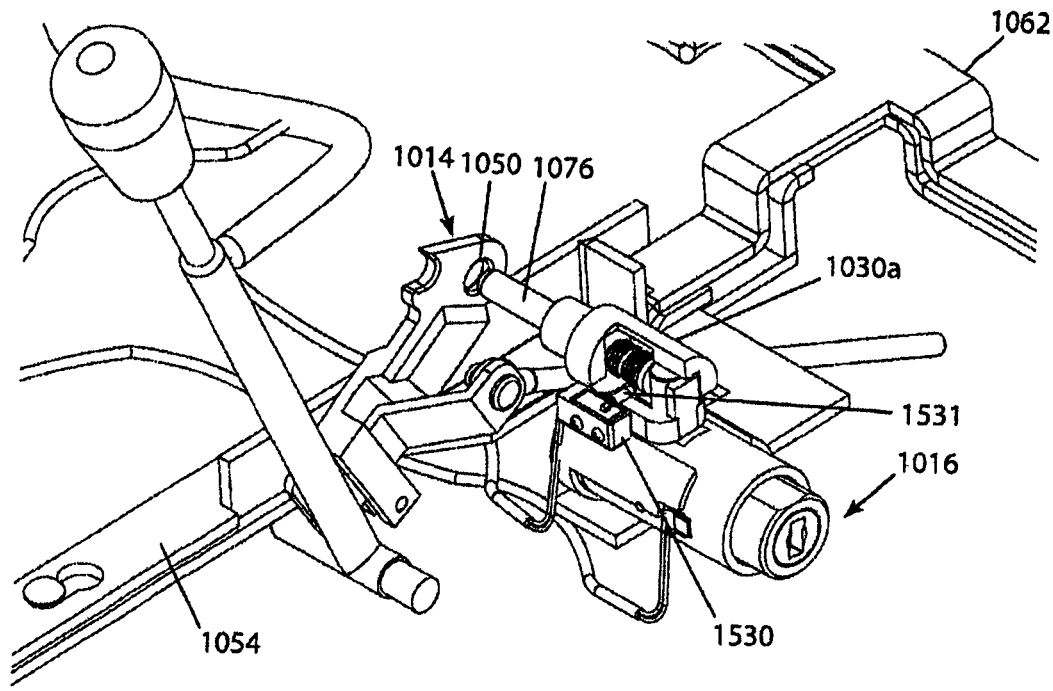
FIG. 16 is a top perspective view of the gear lever locking device of FIG. 11 in the unlocked position.
Figure 17:
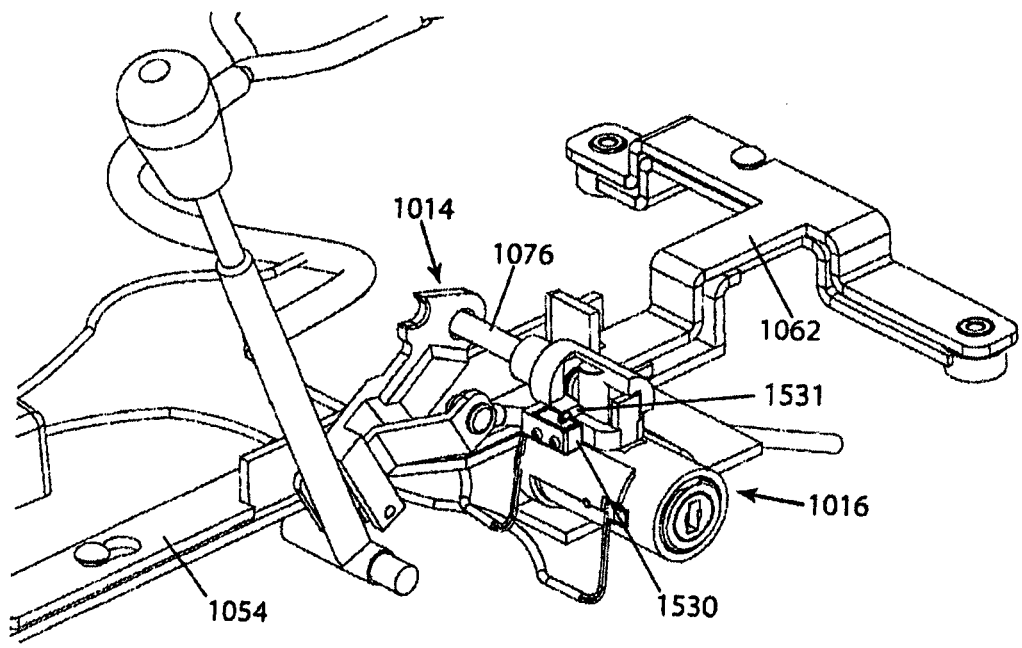
FIG. 17 is a top perspective view of the gear lever locking device of FIG. 11 in the locked position.
Figure 40:
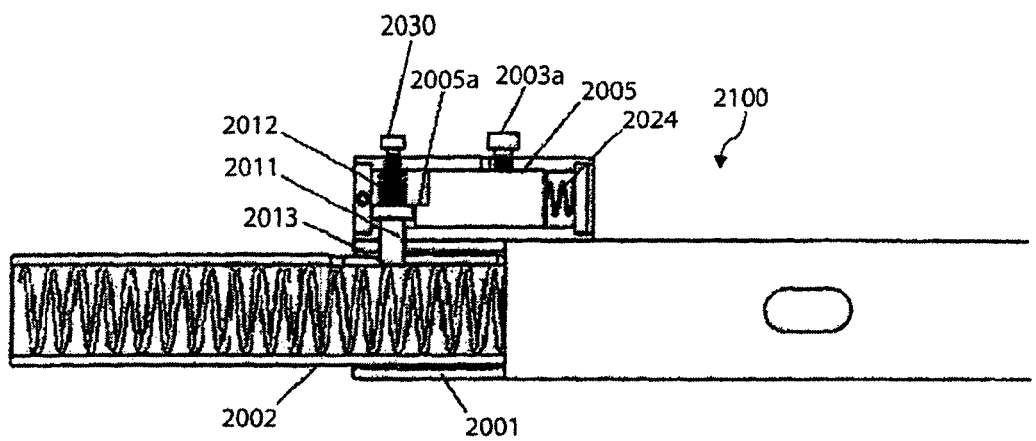
FIG. 40 is a cross-sectional view of the first embodiment of the anti-lock mechanism of FIG. 38 incorporated with the brake/clutch locking device, wherein the anti-lock mechanism is in an engaged position.

The anti-start system 1517 serves as an additional or optional anti-theft/security system to protect the vehicle from theft. The anti-start system 1517 includes a set of electric wires 1518 called a "wire socket." At one end, the wire socket 1518 is connected a micro switch 1530. At the other end, the wire socket 1518 is connected an electric system of the vehicle for supplying electricity, preferably at a position under the steering wheel system of the vehicle. The micro switch 1530 is attached on the lateral side of the upper portion 1030*a* of the cover member's cover element 1030, as shown in FIGS. 16, 17 and 40. The micro switch 1530 includes a switch pressing rod 1531 (FIG. 16) attached thereto and protruding through the opening on the lateral side of the cover element 1030.

When the gear lever locking device 1010 is in the locked position, the first stud 1082 (FIG. 12) will be slid to push against the switch pressing rod 1531. The switch pressing rod 1531 will slide to push a trigger 1530*a* (FIG. 16) on the micro switch 1530. Once the micro switch's trigger is pressed, the electricity supplied to the micro switch 1530 will be cut off since an electrical circuit is not completed, thus preventing the vehicle's engine from being started.

The first stud 1082 is slid out of the locked position and away from the trigger of the micro switch 1530 when the gear lever locking device 1010 is moved to an unlocked position, thereby completing the electrical circuit of the micro switch 1530. Electricity is then supplied to the anti-start system 1517, thereby allowing the engine to start and the regular movement of the gear lever.

Figure 37:
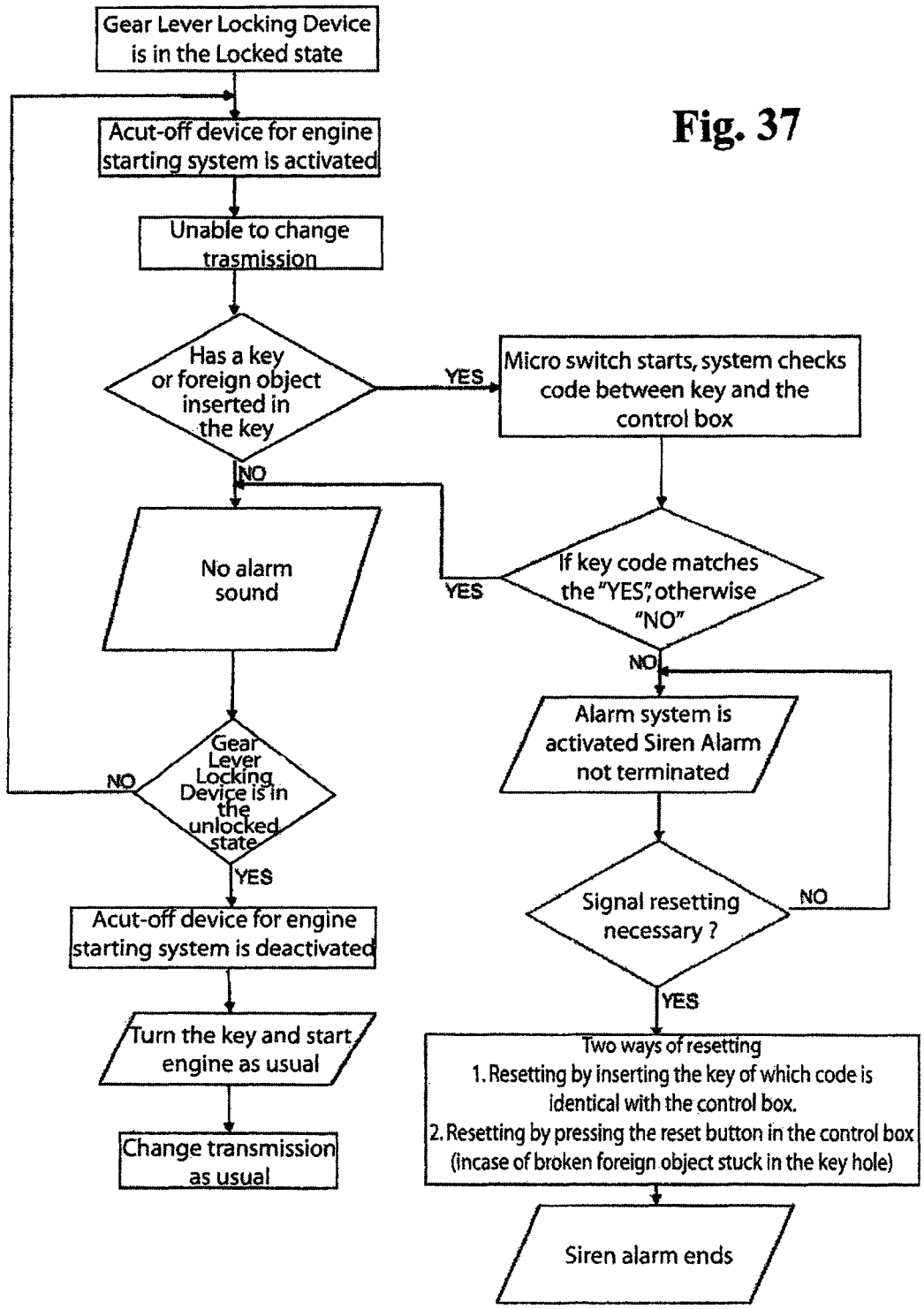
FIG. 37 is a flow diagram of the operational configuration of the alarm system and the anti-start system of FIG. 33.

FIG. 37 shows a flow diagram illustrating the operational configuration of the alarm system 1500 and the anti-start system 1517. When the gear lever locking device is in a locked state, the switch pressing rod 1531 will push the trigger 1530*a* on the micro switch 1530 of the anti-start system 1517. The supplied electricity to the micro switch 1530 will then be cut off since the electrical circuit is not complete. The vehicle's engine cannot then be started. In addition, when the turning mechanism 1074 is inserted with the key 1086 (FIG. 36) or invaded by some foreign object, the electronic security system 1508 will be activated by the micro switch 1506 and will transmit the signal wave to determine the code signal stored on a part of the key 1086. If the code signal matches the preset one, the alarm system will not be activated. On the other hand, if the code signal does not match the preset one, the alarm system 1500 will be triggered and remain active by the electronic security system 1508. The aforementioned electronic security system 1508 is able to then terminate the alarm system 1500 by inserting the key 1086 with the correct preset code or pressing the reset button on the electronic security system to reset the security system to the original condition.

Another embodiment of the alarm system can be described as follows. The turning mechanism 1074 along with one key code set includes a through hole. The two ends of the through hole are provided with an infrared switch on opposite sides. The infrared switch activates the electronic security system 1508 to emit the code signal wave to determine the code signal wave of the key 1086 having the signal code storage device attached thereto. If the code signal from the key 1086 matches the code signal from the electronic security system 1508 installed inside the vehicle, the sound alarm system will not be activated. If it is unlocked by another different device or if the key does not have a code signal that matches the code signal from the security system provided inside the vehicle, the security system will turn on the alarm system to alert the unusual situation.

Each of the components of the above described gear lever locking device embodiments can be made from metal, such as steel or iron, or any other strong material suitable for its intended use, such as a ceramic or composite material. Such materials are known in the art and a detailed description of such suitable materials is not necessary for a complete understanding of the present invention.

Additionally, the driving function locking device 12 can alternatively be, for example, a brake/clutch locking device as described in International Application Publication No. WO2011/087463, the entire disclosure of which is hereby incorporated herein by reference.

Figure 38:
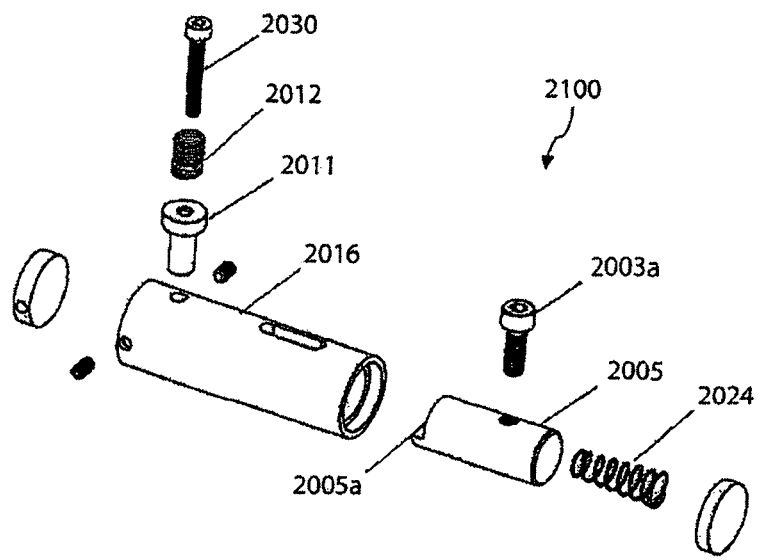
FIG. 38 is an exploded, perspective view of an embodiment of an anti-lock mechanism for use with a brake/clutch locking device applicable to the vehicle security system of FIG. 1.
Figure 39:
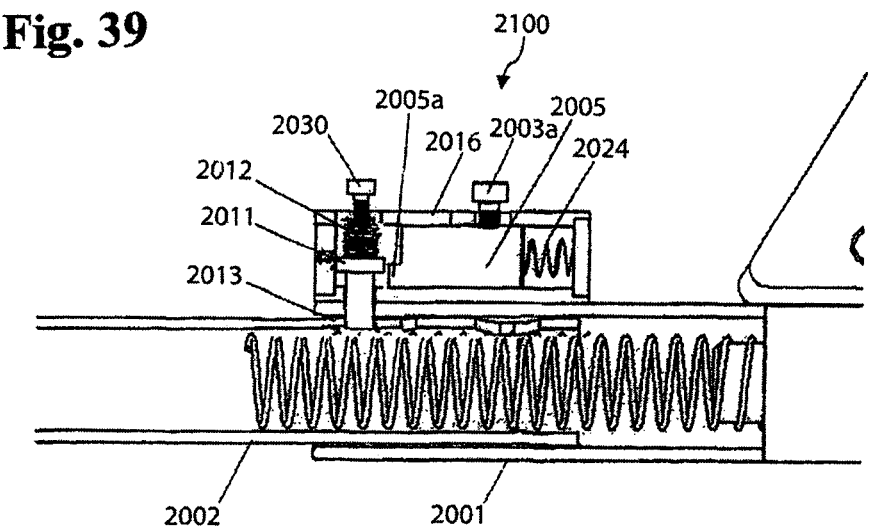
FIG. 39 is a cross-sectional view of a first embodiment of the anti-lock mechanism of FIG. 38 incorporated with the brake/clutch locking device, wherein the anti-lock mechanism is in a disengaged position.

For example, referring to FIGS. 38-40, the driving function locking device 12 can be an anti-lock mechanism 2100 for use with a brake/clutch locking device having an axial tube 2001 and a slidable axial tube 2002, a bored hole 2013 provided in a wall of the axial tube 2001 and on the slidable axial tube 2002 in a position upstream of a locking position of the brake/clutch locking device. The anti-lock mechanism 2100 comprises a block 2005 with appropriate shape and size slidable inside a mechanical chamber 2016. The block 2005 is provided with a spring 2024 used in pushing the rear end of the block 2005. The front end of the block 2005 has a shoulder portion 2005a having a shape corresponding to the protruding lower edge of a pin 2011 inside a pin chamber and provided with a coil spring 2012 to prevent the slidable axial tube 2002 from sliding to be locked in a locking position of the brake/clutch locking device through the bored hole 2013 provided on the wall of the axial tube 2001 and on the slidable axial tube 2002 in a position upstream of a locking position of the brake/clutch locking device of an automobile. When an external force of more than 20 kg-f is applied to the main structure of the automobile in a relative direction and angle, the block 2005 may produce sufficient kinetic energy for the block 2005 to overcome the coil spring 2024 resistance to compress the coil spring 2024 and thereby move the front shoulder 2005a of the block 2005 outwards the protruding edge of the pin 2011. The pin 2011, therefore, slides down into the bored hole 2013 and blocks the movement of the slidable axial tube 2002, which, in turn, prevents the brake/clutch locking device from sliding into the brake/clutch locking position. At the end of the pin 2011, an axle 2030 is provided extending through the wall of the mechanical chamber 2016 in the outward direction to pull the pin 2011 out of the position that blocks the slidable axial tube 2002 to place the pin 2011 onto the shoulder 2005a of the block 2005. The pin 20011 is placed into the position suitable for preventing the brake/clutch locking device from entering the locking position in relation with the retreating of the block 2005 along with the block holding axle 2003a protruding through a slot 16a on top of the mechanical chamber 2016.

Figure 41:
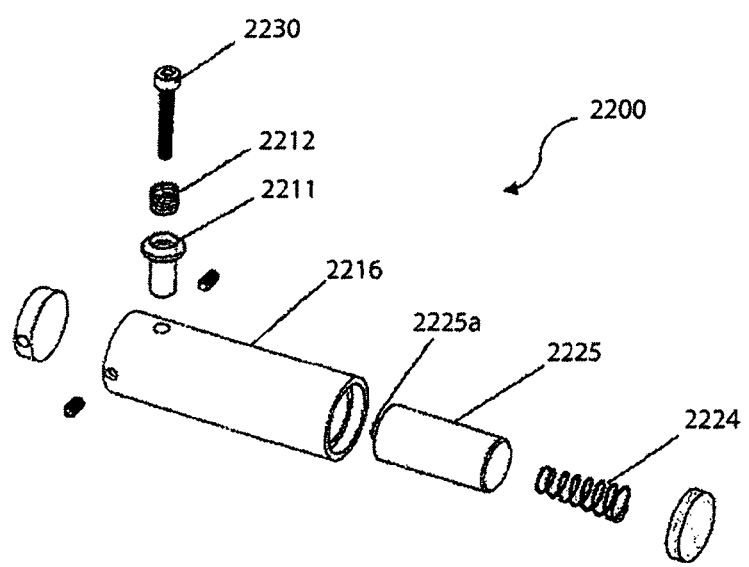
FIG. 41 is an exploded, perspective view of a second embodiment of an anti-lock mechanism for use with a brake/clutch locking device applicable to the vehicle security system of FIG. 1.
Figure 42:
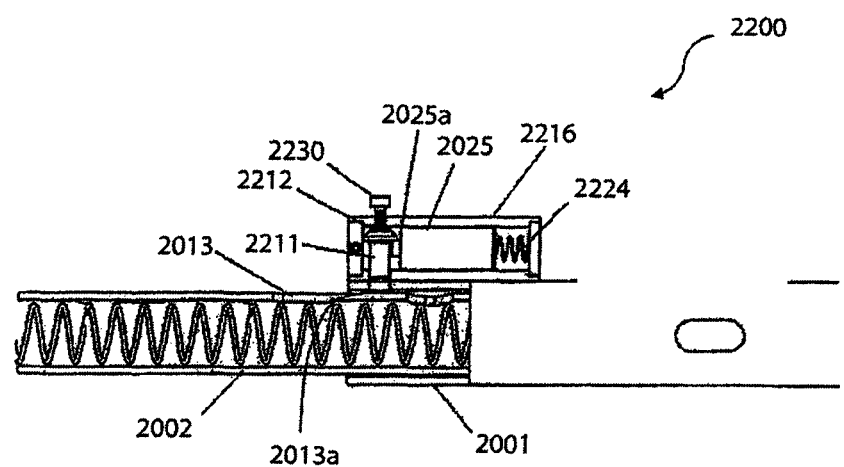
FIG. 42 is a cross-sectional view of the second embodiment of the anti-lock mechanism of FIG. 41 incorporated with the brake/clutch locking device, wherein the anti-lock mechanism is in a disengaged position.
Figure 43:
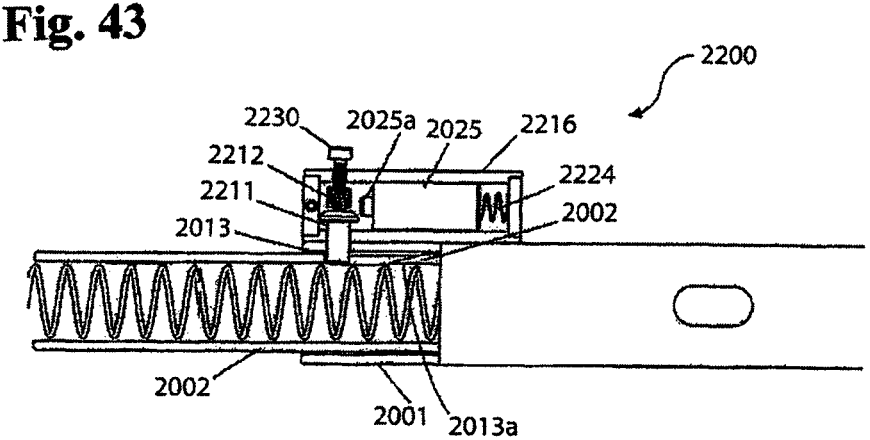
FIG. 43 is a cross-sectional view of the second embodiment of the anti-lock mechanism of FIG. 41 incorporated with the brake/clutch locking device, wherein the anti-lock mechanism is in an engaged position.

FIGS. 41-43 show another embodiment of the driving function locking device 12 having an anti-lock mechanism 2200 for use with the brake/clutch locking device having an axial tube 2001 and a slidable axial tube 2002, a bored hole 2013 provided in a wall of the axial tube 2001 and on the slidable axial tube 2002 in a position upstream of a locking position of the brake/clutch locking device. The anti-lock mechanism 2200 comprises a block 2025 having a shape and size suitable for a sliding motion within the mechanical chamber 2216 and a spring 2224 used in pushing the rear end of the block 2025. The front end of the block 2025 is in the shape of the axle 2025a with a rounded tip extending in correspondence with the protruding edge of the pin 2211 having a curved top located in the mechanical chamber 2216 and provided with a coil spring 2212 for use in preventing the slidable axial tube 2002 of the brake/clutch locking device from sliding to be locked in a locking position of the brake/clutch locking device through a bored hole 2013 provided on a wall of the axial tube 2001 and on the slidable axial tube 2002 in a position upstream of a locking position of the brake/clutch locking device of an automobile. One side of an edge of the bored hole 2013 on the slidable axial tube 2002 of the brake/clutch locking device for use with the anti-lock mechanism 2200 is a sloped section 2013a for convenience in pushing the end portion of the pin 2011 back into the position while the slidable axial tube 2002 is backed into the normal state. When an external force of more than 20 kg-f is applied to the main structure of the automobile in a relative direction and angle, the block 2025 may produce sufficient kinetic energy for the block 2025 to overcome the coil spring 2224 resistance to move the front shoulder 2025a of the block 2025, which is in the shape of the round axle outward from the protruding edge of the pin 2011. The pin 2011 thus slides down into the bored hole 2013 and prevents the slidable axial tube 2002 from moving into the locking position with the abovementioned pin end 2011 protruding out of the wall of the slidable axial tube 2002 in the crossing direction adjacent to the axial tube 2001. At the upper end portion of the pin 2011, there is an axle 2030 extending outward through the mechanical chamber 2016. In the present embodiment of FIG. 41-43, the resetting of the anti-lock mechanism 2200 occurs automatically without the need for the user to perform a manual reset as in the previous embodiment. Once the end portion of the pin 2011 meets the sloped portion 2013a, the continued movement of the slidable axial tube 2002 causes the pin 2011 to be urged upward back into the position while the slidable axial tube 2002 is in the normal state.

Figure 44:
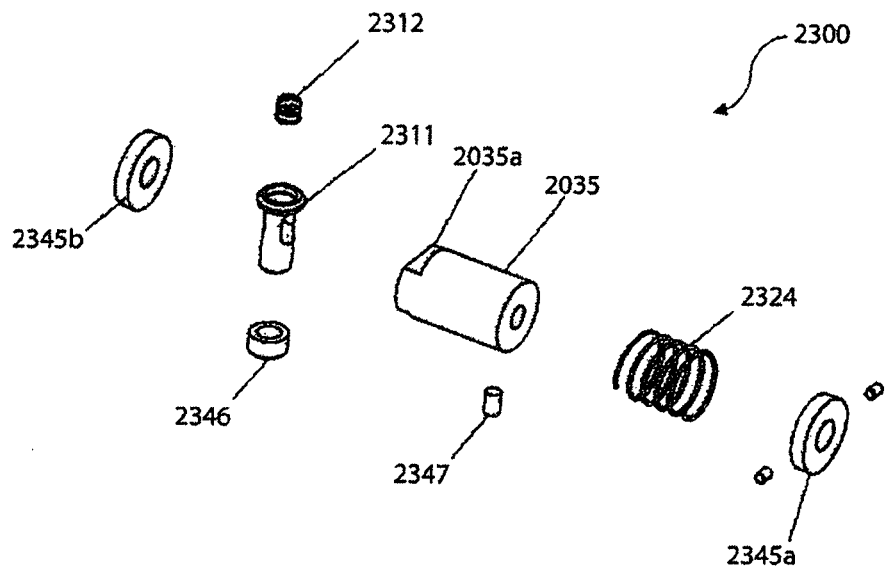
FIG. 44 is an exploded, perspective view of a third embodiment of an anti-lock mechanism for use with a brake/clutch locking device applicable to the vehicle security system of FIG. 1.
Figure 45:
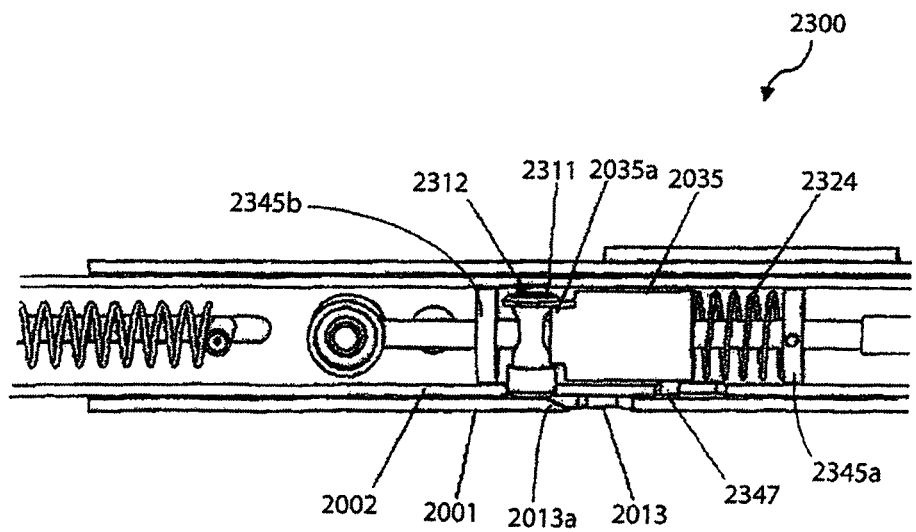
FIG. 45 is a cross-sectional view of the third embodiment of the anti-lock mechanism of FIG. 44 incorporated with the brake/clutch locking device, wherein the anti-lock mechanism is in a disengaged position.
Figure 46:
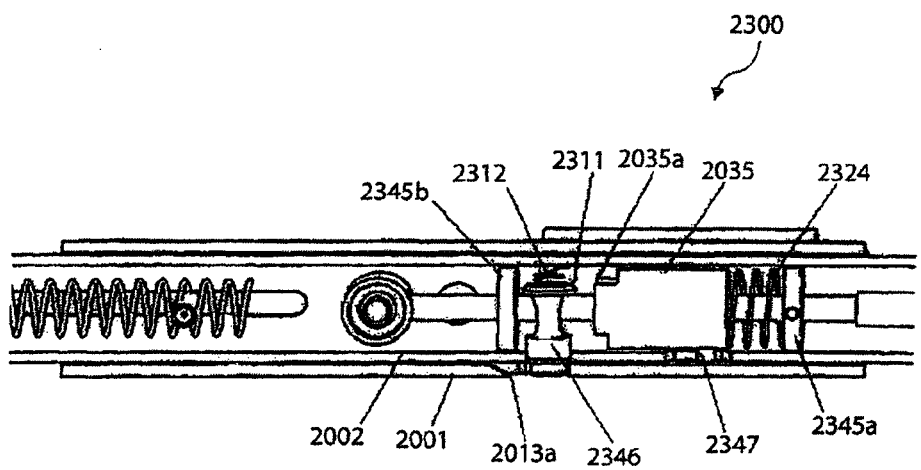
FIG. 46 is a cross-sectional view of the third embodiment of the anti-lock mechanism of FIG. 44 incorporated with the brake/clutch locking device, wherein the anti-lock mechanism is in an engaged position.

FIGS. 44-46 show a further embodiment of the driving function locking device 12 having an anti-lock mechanism 2300 for use with the brake/clutch locking device having an axial tube 2001 and a slidable axial tube 2002, a bored hole 2013 provided in a wall of the axial tube 2001 and on the slidable axial tube 2002 in a position upstream of a locking position of the brake/clutch locking device. The anti-lock mechanism 2300 comprises rings 2345a and 2345b that partitions the lock protecting mechanism chamber inside the slidable axial tube 2002. Inside the lock protecting mechanism chamber, the pin 2311 and the block 2035 with appropriate shape and size are slidable inside the slidable axial tube 2002 and engaged with an axle of the screwing mechanism 2006 of the brake/clutch locking device. The block 2035 is provided with a coil spring 2324. The front part of the block 2035 is in the form of a shoulder 2035a. The shoulder 2035a has a shape that corresponds to the protruding edge of the pin 2311 located inside the slidable axial tube 2002. The shoulder 2035a is also provided with the coil spring 2312 for preventing the slidable axial tube 2002 from sliding to be locked at the locking position of the brake/clutch locking device through a bush 2346 on the wall of the slidable axial tube 2002 and the bored hole 2013 on the wall of the axial tube 2001 in a position upstream of the locking position of the brake/clutch locking device of an automobile. One edge of the bored hole 2013 on the axial tube 2001 is a sloped portion 2013a for the sake of pushing the pin 2311 back into the normal position after the slidable axial tube 2002 slides back into the normal unlocked state. When an external force of more than 20 kg-f is applied to the main structure of an automobile in a relative direction and angle, the block 2035 may produce sufficient kinetic energy to the block 2035 to overcome the coil spring 2324 resistance to move the front shoulder 2035a of the block 2035 to outward from the protruding edge of the pin 2311. The pin 2311, therefore, slides down into the bored hole 2013 on the axial tube 2001 and prevents the slidable axial tube 2002 from moving into the locking position with the above-mentioned pin end 2311 protruding out of the wall of the slidable axial tube 2002 in the crossing direction adjacent to the axial tube 2001. At the end portion of the block 2035, there is provided an extending axle end 2347 in the groove on the wall of the slidable axial tube 2002 to prevent the pivotally movement of the block 2035 around the axle of the screwing mechanism 2006.

Figure 49:
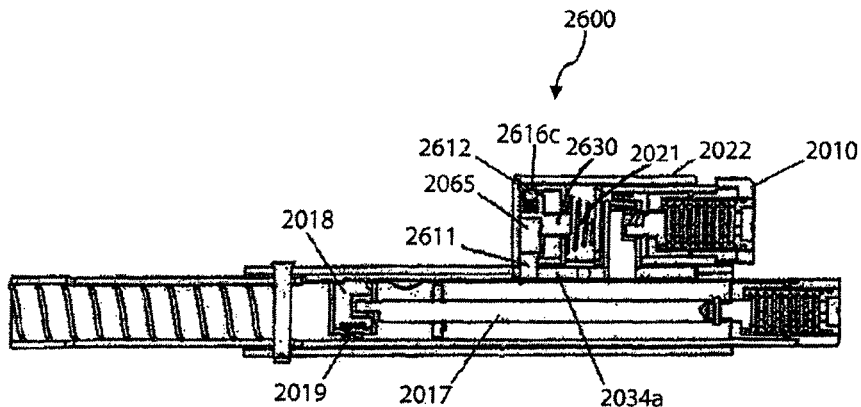
FIG. 49 is a cross-sectional view of the sixth embodiment of the anti-lock mechanism of FIG. 47 fixedly housed within a second locking mechanism of the brake/clutch locking device, wherein the anti-lock mechanism is in an engaged position.

FIGS. 47-49 show yet another embodiment of the driving function locking device 12 having an anti-lock mechanism 2600 for use with the brake/clutch locking device having an axial tube 2001 and a slidable axial tube 2002, a slot 2003a provided on a wall of the slidable axial tube 2002. The anti-lock mechanism 2600 comprises a block 2065 with appropriate shape and size slidable inside a mechanical chamber 2616 with a slot 2616a on a side wall of the mechanical chamber 2616. The mechanical chamber 2616 is placed in an end collar 2022 of the second locking mechanism 2010 of the brake/clutch locking device. The front end of the block 2065 has an axle 2630 protruding into the center hole 2016b which is opposite to the open end, of the mechanical chamber 2616. On one side of the block 2065 there is a dowel 2611 slidable in the slot 2616a and on the opposite side provided with a spring 2624 and a pin 2612 inside a hole 2065b. Two mating holes (2616c, 2616d) are provided corresponding to the pin 2612 on the internal wall of the mechanical chamber 2616. There is a spring 2021 at the front end of the mechanical chamber 2616, one end of the spring 2021 pushing the wall at the end of the second locking mechanism 2010 chamber. When an external force of more than 20 kg-f is applied to the main structure of an automobile in a relative direction and angle, sufficient amount of kinetic energy may be produced to move the block 2065 from the mating hole 2616c to the mating hole 2616d on the inner wall of the mechanical chamber 2616, at the same time the dowel 2611 will slide into proper place which is the slot 2034a of the plate 2034 of the brake/clutch locking device. The anti-locking mechanism is in an engaged position.

The resetting of the anti-lock mechanism 2600 from the engaged position to the disengaged position occurs when the user press the second locking mechanism 2010, the wall at the end of the second locking mechanism 2010 chamber will push the block 2065 back to the end of the collar 2022 to be ready for activation again.

Figure 50:
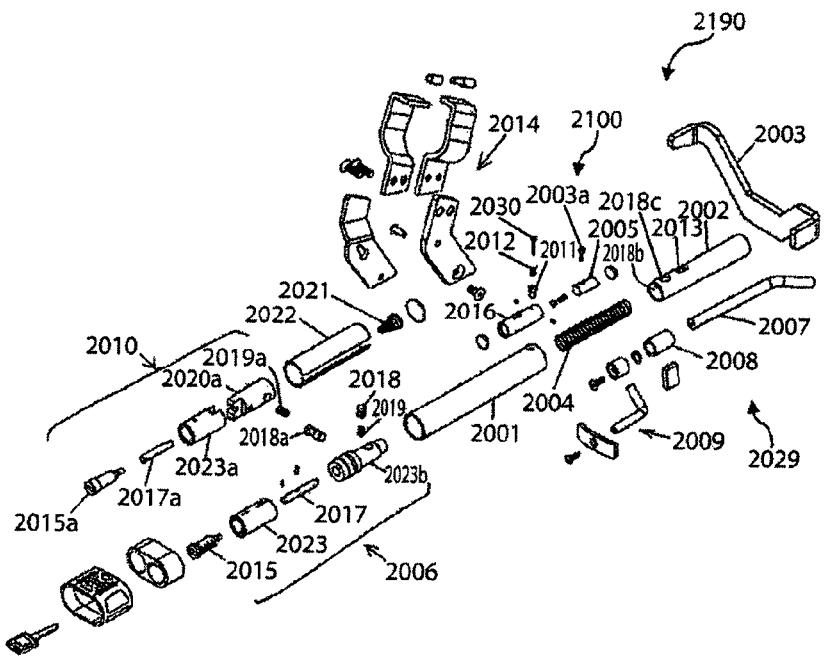
FIG. 50 is an exploded, perspective view of a first embodiment of a brake/clutch locking device incorporated with the first embodiment of the anti-lock mechanism as shown in FIG. 38.
Figure 51:
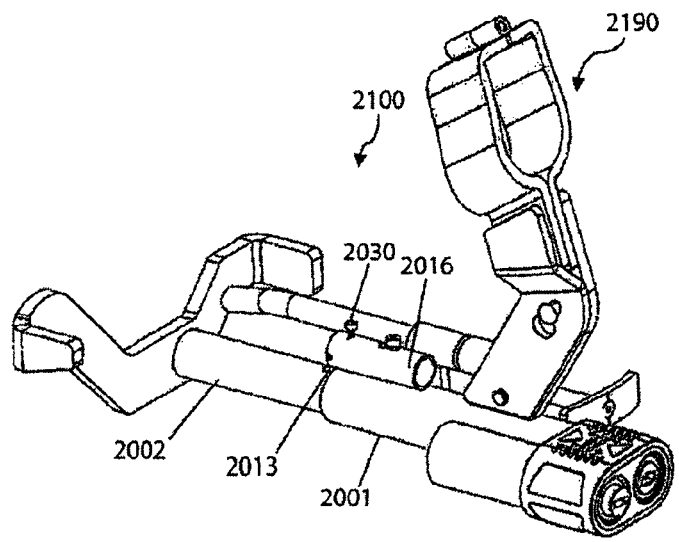
FIG. 51 is a perspective view of the first embodiment of the brake/clutch locking device incorporated with the first embodiment of the anti-lock mechanism as shown in FIG. 38.

FIGS. 50-51 show another embodiment of the driving function locking device 12 having a brake/clutch locking device 2190 that includes an anti-lock mechanism 2100. The brake/clutch locking device 2190 according to the present invention comprises an axial tube 2001 and a slidable axial tube 2002. One end of a slidable axial tube 2002 is inserted inside the axial tube 2001. The other end of the slidable axial tube 2002 is provided with the blocking panel rod 2003 attached thereto. Inside the axial tube 2001 is provided with a return spring 2004 wherein the axial tube 2001 and the slidable axial tube 2002 include a lock-pulling mechanism 2029. The lower end of a first lock pulling mechanism 2007 is connected with the brake/clutch panel-blocking rod 2003. The upper end of the first lock pulling mechanism 2007 is inserted through a collar 2008 supporting the first lock pulling mechanism 2007 on the wall of the axial tube 2001 and connected with the lower end of a second lock pulling mechanism 2009 used in defining a retreating sliding distance of the slidable axial tube 2002 to prevent movement out of the end of the axial tube 2001. The upper end of the axial tube 2001 is the mounting part for the first locking mechanism 2006 and the second locking mechanism 2010 on the side of the first locking mechanism 2006. On the upper end of the axial tube 2001 of the brake/clutch locking device further comprises the anti-lock mechanism 2100. The present brake/clutch locking device 2190 further comprises a holding leg 2014. One end of the holding leg 2014 is fixed to the axial tube 2001. The other end of the holding leg 2014 serves to secure the brake/clutch locking device to the vehicle, such as a steering wheel cylinder (steering column) or a brake booster of the vehicle, or a shaft, beam or column under the vehicle's console, or any other existing structure of the vehicle. Further, the present brake/clutch locking device 2190 also includes a first locking mechanism 6 on the upper end of the axial tube 2001 comprising a turning mechanism 2015 within the housing 2023 which is turned by a key and a pin 2017 working correspondingly wherein the pin 2017 includes a pin 2018 inside a housing 2023b along with a spring 2019 pushing an end of the slidable pin 2018 to be locked with the bored holes 2018c on the slidable axial tube 2002 located in the corresponding position when the second lock pulling mechanism 2009 is pulled to lock the brake/clutch locking device 2190. The lateral portion of the first locking mechanism 2006 further comprises a second locking mechanism 2010 having a turning mechanism 2015a which is turned by the key of the turning mechanism 2015 wherein a lower portion of the turning mechanism 2015a and a pin 2017a are connected to a second pin 2018a in the lower end groove detachably engaged to a ridge on the end portion 2020 of the second locking mechanism 2010. The second locking mechanism 2010 includes a second pin 2018a with a spring 2019a, and a spring 2021 pushing an end of the second locking mechanism 2010 wherein the second locking pin 2018a slides into the locking position through the groove on the chamber wall 2022 of the second locking mechanism 2010. After the slidable pin 2018 of the first locking mechanism 2006 is locked with the bored holes 2018c on the wall of the axial tube 2002, the break/clutch locking device 2160 is in a locking position. The second locking mechanism 2010 can be securably engaged in the locked position by pressing the second locking mechanism 2010 so that the second pin 2018a is inserted through the groove on the collar 2022, the bored hole of the axial tube 2001 and the bored hole 2018b on the wall of the abovementioned slidable axial tube 2002, which have been placed in a corresponding position. When engaged in the lock position, the second locking mechanism 2010 becomes a second level of security to secure the blocking panel rod 2003 to be immovably positioned to the rear of the brake/clutch pedals, thereby preventing operation of the pedals in the event first locking mechanism 2006 is damaged.

Figure 52:
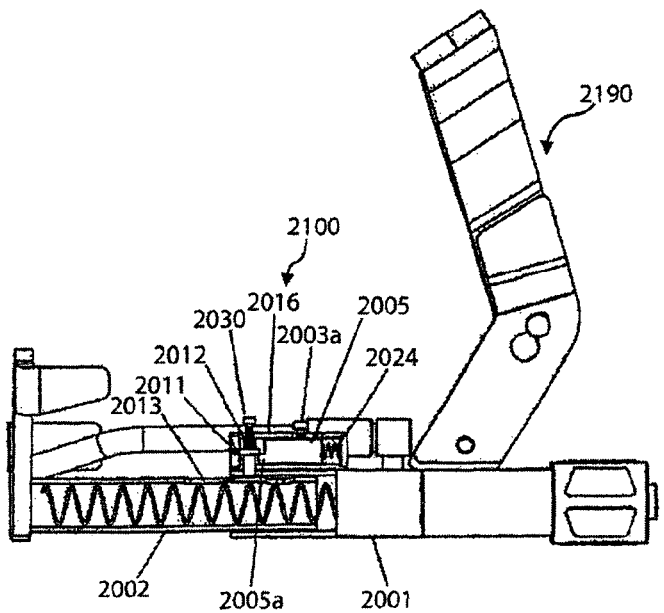
FIG. 52 is a cross-sectional view of the brake/clutch locking device incorporated with the first embodiment of the anti-lock mechanism of FIG. 51, wherein the anti-lock mechanism is in a disengaged position.
Figure 53:
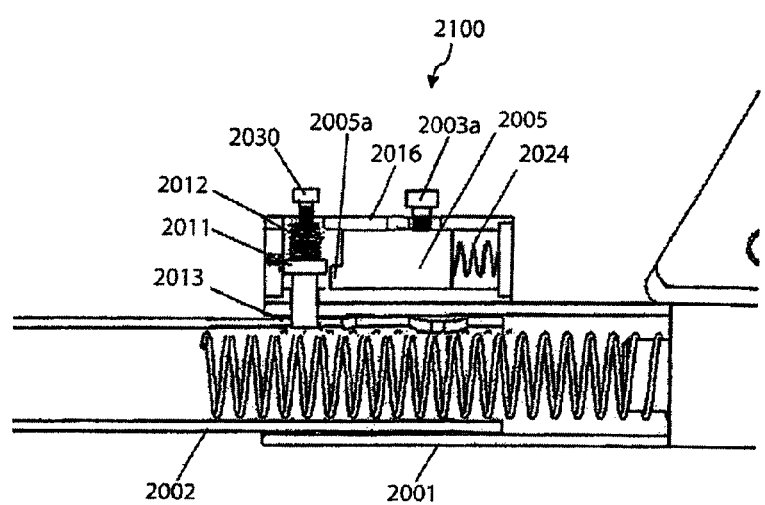
FIG. 53 is a cross-sectional view of the brake/clutch locking device incorporated with the first embodiment of the anti-lock mechanism of FIG. 51, wherein the anti-lock mechanism is in an engaged position.

According to FIGS. 51-53, the brake/clutch locking device 2190 having the anti-lock mechanism 2100 in which the anti-lock mechanism 2100 comprises a block 2005 with appropriate shape and size slidable inside the mechanical chamber 2016 and provided with a spring 2024 pushing the block 2005. The front portion of the block 2005 has a shoulder portion 2005a having a shape corresponding to the protruding lower edge of the pin 2011 inside the pin chamber and provided with a coil spring 2012 for preventing the slidable axial tube 2002 from sliding through bored hole 2013 provided on the wall of the axial tube 2001 and on the slidable axial tube 2002 in the predefined position upstream of the locking position of the brake/clutch locking device 2190. When an external force of more than 20 kg-f is applied to the main structure of an automobile in a relative direction and angle, sufficient amount of kinetic energy may be produced to move the front shoulder 2005a of the block 2005 from the protruding edge of the pin 2011. The pin 2011, therefore, slides down into the bored holes 2013 and blocks the movement of the slidable axial tube 2002, which, in turn, prevents the brake/clutch locking device from sliding into the brake/clutch locking position. On the top of the pin 2011, an axle 2030 is provided extending through the wall of the mechanical chamber 2016 in the outward direction to pull the pin 2011 out of the position that blocks the slidable axial tube 2002 to place the pin 2011 onto the shoulder 2005a of the block 2005. The pin 2011 is placed into the position suitable for preventing the brake/clutch locking device 2190 from entering into the locking position in relation with the retreating of the block 2005 along with the block holding axle 2003a protruding through the slot on the mechanical chamber 2016.

Figure 54:
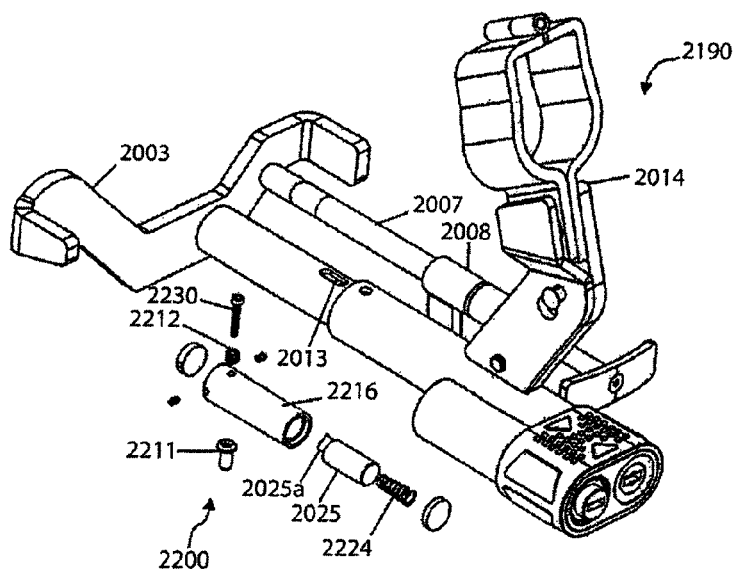
FIG. 54 is an exploded, perspective view of the first embodiment of a brake/clutch locking device incorporated with the second embodiment of the anti-lock mechanism as shown in FIG. 41.
Figure 55:
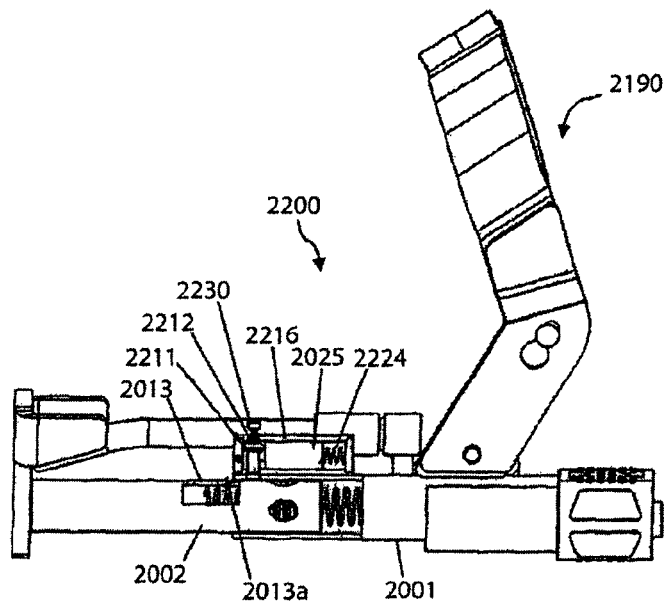
FIG. 55 is a cross-sectional view of the brake/clutch locking device incorporated with the second embodiment of the anti-lock mechanism of FIG. 54, wherein the anti-lock mechanism is in a disengaged position.
Figure 56:
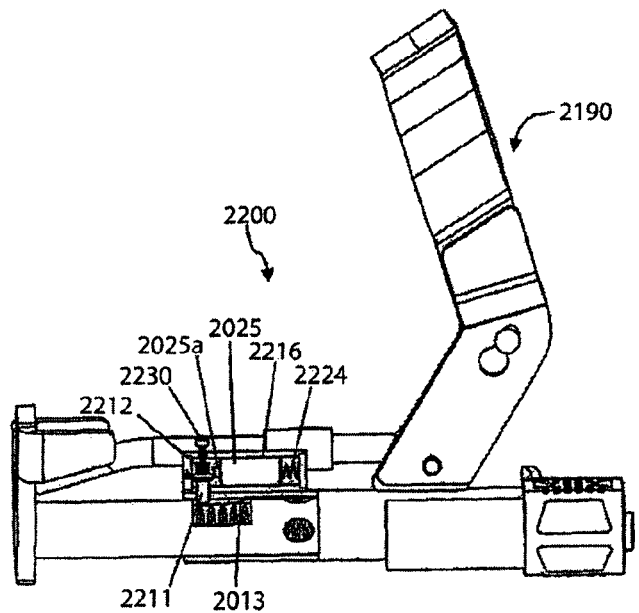
FIG. 56 is a cross-sectional view of the brake/clutch locking device incorporated with the second embodiment of the anti-lock mechanism of FIG. 54, wherein the anti-lock mechanism is in an engaged position.

According to FIGS. 54-56, the brake/clutch locking device 2190 having the anti-lock mechanism 2200 comprises a block 2025 with appropriate shape and size slidable inside the mechanical chamber 2216 and provided with a spring 2224 pushing the rear end of the block 2025. The front end 2025a of the block 2025 is in the shape of the axle with a rounded tip extending in correspondence with the protruding edge of the pin 2211 having a curved top and inside a pin chamber on top of the pin 2211 provided with a coil spring 2212 for preventing the slidable axial tube 2002 from sliding through the bored holes 2013 provided on the wall of the axial tube 2001 and on the slidable axial tube 2002 in a position upstream of the locking position of the brake/clutch locking device. One side of an edge of the bored hole 2013 on the slidable axial tube 2002 is a sloped portion for convenience in pushing the end portion of the pin 2211 back into the position while the slidable axial tube 2002 is back into the normal unlocked state. The bottom part of pin 2211 is curved to accommodate this slide action. Once the main structure of the automobile is subject to an external force of more than 20 kg-f in the relative direction and angle, the block 2025 may produce sufficient kinetic energy to move the block 2025 along with the front shoulder 2025a of the block 2025 which is in the shape of the round axle outward from the protruding edge of the pin 2211. The pin 2211 thus slides down to the bored holes 2013 and prevent the slidable axial tube 2002 from sliding into the locking position. One side of an edge of the bored hole 2013 on the slidable axial tube 2002 is a sloped portion for convenience in pushing the curved end portion of the pin 2211 back into the position while the slidable axial tube 2002 is in the normal unlocked state. At the end portion of the pin 2211, there is an axle 2230 extending outward through the mechanical chamber 2216.

Figure 57:
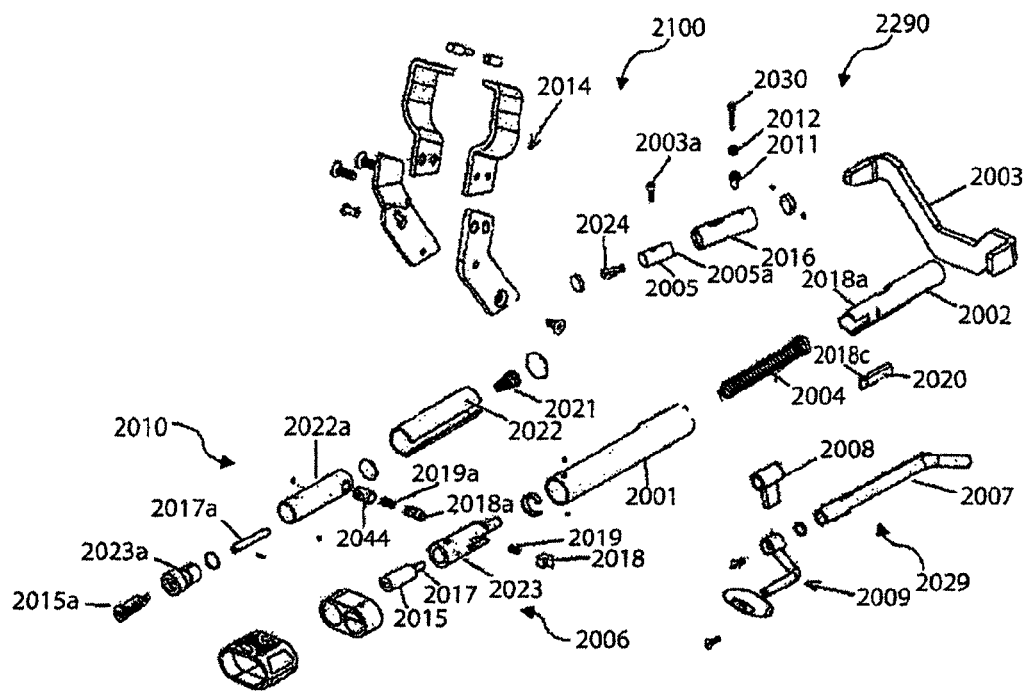
FIG. 57 is an exploded, perspective view of the second embodiment of a brake/clutch locking device incorporated with the first embodiment of the anti-lock mechanism as shown in FIG. 38.
Figure 58:
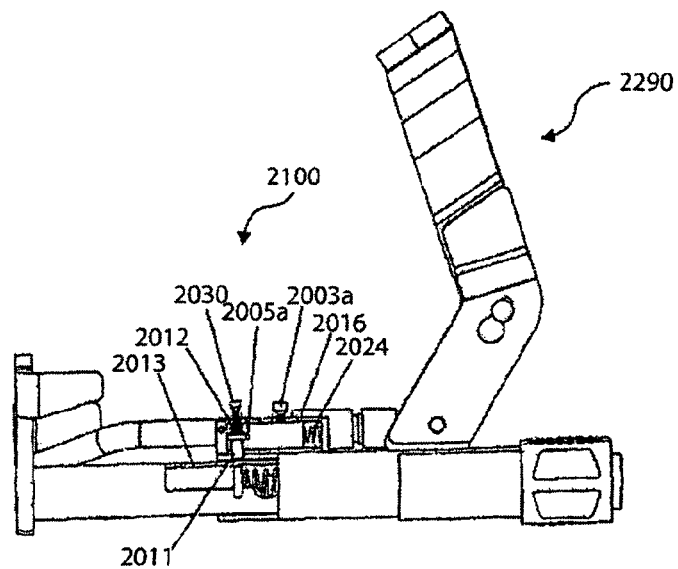
FIG. 58 is a cross-sectional view of the second embodiment of the brake/clutch locking device incorporated with the first embodiment of the anti-lock mechanism of FIG. 57, wherein the anti-lock mechanism is in a disengaged position.

According to FIGS. 57-58, there is shown yet another embodiment of the driving function locking device 12 having the anti-lock mechanism 2100 assembled with the brake/clutch locking device 2290. The brake/clutch locking device 2290 comprises a holding leg 2014. One end of the holding leg 2014 is fixed to an axial tube 2001, the other end of the holding leg 2014 serves to secure the brake/clutch locking device to the vehicle, such as a steering wheel cylinder/column or a brake booster of the vehicle, or a shaft, beam or column under the vehicle's console, or any other existing structure of the vehicle. A return spring 2004 is provided inside the axial tube 2001 wherein the slidable axial tube 2002 inserted inside. The lower end of the slidable axial tube 2002 is connected to a blocking panel rod 2003. A supporting axle 2007 is inserted in a collar 2008 connected to the axial tube 2001, the upper end of the supporting axle 2007 is connected to a pulling mechanism 2009 and the lower end of the supporting axle 2007 is connected to the panel blocking rod 2003. By pulling mechanism 2009, the panel blocking rod 2003 will be moved inwardly toward the axial tube 1 to move the brake/clutch locking device 2170 into the locking position. Further, the present brake/clutch locking device 2290 also includes a first locking mechanism 2006 comprising a turning mechanism 2015 which is turned by a key and a locking pin 2017 working correspondingly wherein the locking pin 2017 includes a locking pin 2018 along with a spring 2019 pushing the end of a slidable pin 2018 to be locked with an end 2018c of a two-fang rod 2020 provided at the end of the predetermined slidable axial tube 2002 located in the corresponding position when the brake/clutch locking device 2290 is in the locking position. The lateral portion of the first locking mechanism 2006 further comprises a second locking mechanism 2010 having a turning mechanism 2015a inside a housing 2023a wherein the lower portion of the turning mechanism 2015a engaged with a pin 2017a inside a housing 2022a corresponding to a locking pin 2018a in a housing 2044 is pushed with a spring 2019a through a slot of collar 2022 through the opening of the axial tube 2001 to the bored hole 2018d of the predetermined slidable axial tube 2002 located in the corresponding position to the locking position. The second locking mechanism 2010 can be securably engaged in the locked position by pressing the second locking mechanism 2010 so that the second pin 2018a is inserted through the groove on the collar 2022, the opening of the axial tube 2001 and the bored hole 2018d on the wall of the above-mentioned slidable axial tube 2002, which have been placed in a corresponding position. When engaged in the lock position, the second locking mechanism 2010 becomes a second level of security to secure the blocking panel rod 2003 to be immovably positioned to the rear of the brake/clutch pedals, thereby preventing operation of the pedals in the event first locking mechanism 2006 is damaged.

Figure 59:
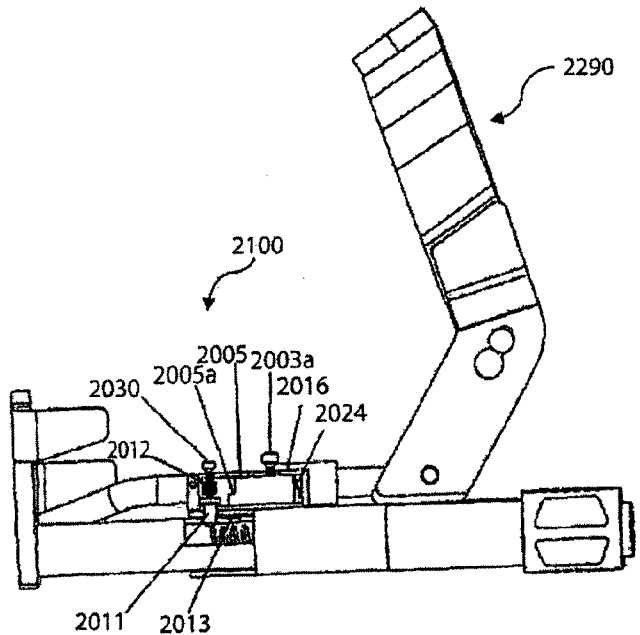
FIG. 59 is a cross-sectional view of the second embodiment of the brake/clutch locking device incorporated with the first embodiment of the anti-lock mechanism of FIG. 57, wherein the anti-lock mechanism is in an engaged position.

According to FIGS. 58-59, the brake/clutch locking device 2290 is incorporated with the anti-lock mechanism 2100 for use with the brake/clutch locking device. The anti-lock mechanism 2100 is mounted on the axial tube 2001. An anti-lock mechanism 2100 comprises a block 2005 with appropriate shape and size slidable inside the mechanical chamber 2016. The block 2005 is provided with a spring 2024 used in pushing the rear end of the block 2005. The front end of the block has a shoulder portion 2005 a having a shape corresponding to the protruding lower edge of a pin 2011 inside a mechanical chamber 2016. On the top of a pin 2011 is provided with a coil spring 2012 for preventing the slidable axial tube 2002 from sliding through the bored holes 2013 provided on the wall of the axial tube 2001 and on the slidable axial tube 2002 in a position upstream of a locking position of the brake/clutch locking device 2290. When an external force of more than 20 kg-f is applied to the main structure of an automobile in a relative direction and angle, sufficient kinetic energy may be produced for the block 2005 to move the front shoulder 2005a of the block 2005 outward from the protruding edge of the pin 2011. The pin 2011, therefore, slides down into the bored holes 2013 and blocks the movement of the slidable axial tube 2002, which, in turn, prevents the brake/clutch locking device 2290 from sliding into the brake/clutch locking position. On the top of the pin 2011, an axle 2030 is provided extending through the wall of the mechanical chamber 2016 in the outward direction to pull the pin 2011 out of the position that blocks the slidable axial tube 2002 to place the pin 2011 onto the shoulder 2005a of the block 2005 in the normal state again. The pin 2011 is placed into the position suitable for preventing the brake/clutch locking device 2290 from entering into the locking position in relation with the retreating of the block 2005 along with the block holding axle 2003a protruding through the slot on the mechanical chamber 2016.

Figure 60:
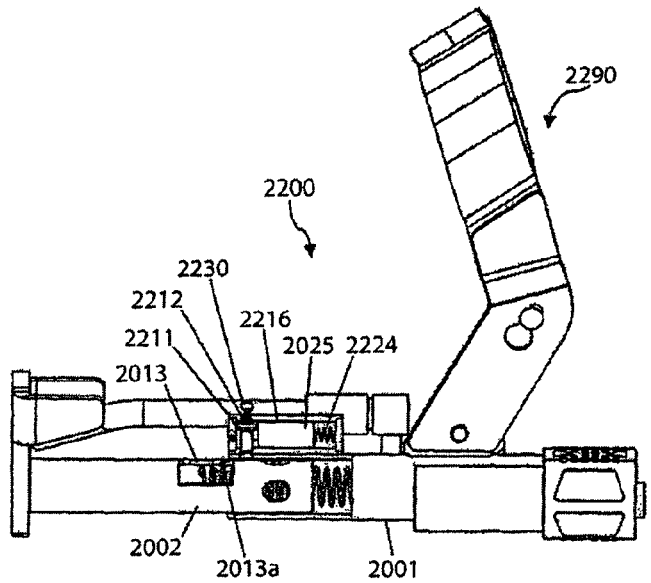
FIG. 60 is a cross-sectional view of the second embodiment of the brake/clutch locking device incorporated with the second embodiment of the anti-lock mechanism, wherein the anti-lock mechanism is in a disengaged position.
Figure 61:
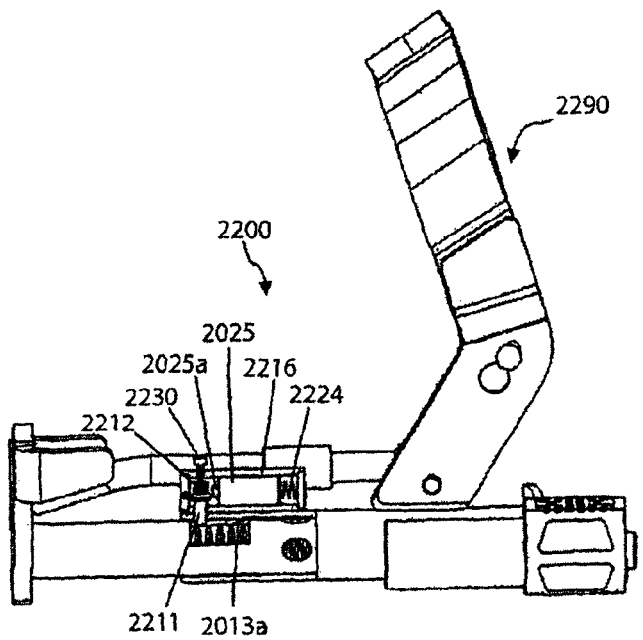
FIG. 61 is a cross-sectional view of the second embodiment of the brake/clutch locking device incorporated with the second embodiment of the anti-lock mechanism, wherein the anti-lock mechanism is in an engaged position.

According to FIGS. 60-61, the brake/clutch locking device 2290 is incorporated with the anti-lock mechanism 2200 for use with the brake/clutch locking device 2290. The anti-lock mechanism 2200 is mounted on the axial tube 2001. The anti-lock mechanism 2200 according to the present embodiment comprises a block 2025 having a shape and size suitable for a sliding motion within the mechanical chamber 2216 and a spring 2224 used in pushing the rear end of the block 2025. The front end of the block 2025 is in the shape of the axle 2025a with a rounded tip extending in correspondence with the protruding edge of the pin 2211 having a curved top provided with a coil spring 2212 for use in preventing the slidable axial tube 2002 from sliding through bored holes 2013 provided on the wall of an axial tube 2001 and on the slidable axial tube 2002 in a position upstream of a locking position of the brake/clutch locking device 2290. One side of an edge of the bored hole 2013 on the slidable axial tube 2002 is a sloped portion 2013a for convenience in pushing the end portion of the pin 2211 back into the position while the slidable axial tube 2002 is in the normal unlocked state. Once the main structure of an automobile is subject to an external force of more than 20 kg-f in the relative direction and angle, the sufficient kinetic energy may be produced for the block 2025 to move the front shoulder 2025a of the block 2025 from outward the protruding edge of the pin 2211. The pin 2211 thus slides down to the bored holes 203 and prevent the slidable axial tube 2002 from moving into the locking position of the brake/clutch locking device 2290. The sloped portion 2013a will pushing the end portion of the pin 2211 back into the position while the slidable axial tube 2002 is in the normal unlocked state. The bottom part of pin 2211 is curved to accommodate this sliding action. At the end portion of the pin 2211, there is an axle 2230 extending outward through the mechanical chamber 2216.

Figure 62:
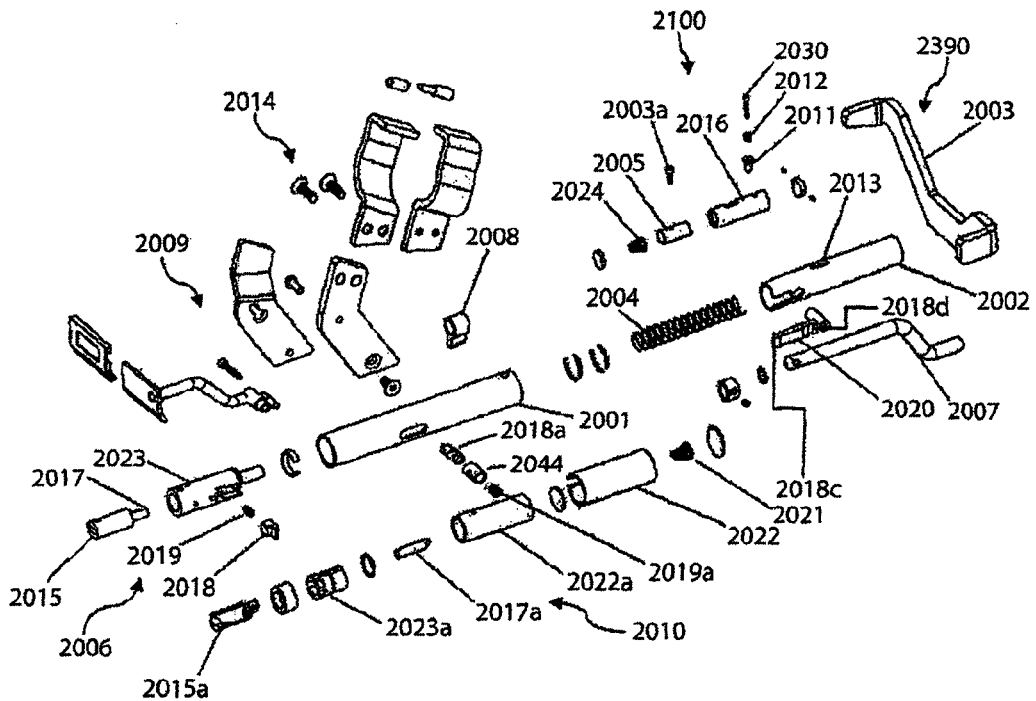
FIG. 62 is an exploded, perspective view of the third embodiment of a brake/clutch locking device incorporated with the first embodiment of the anti-lock mechanism.
Figure 63:
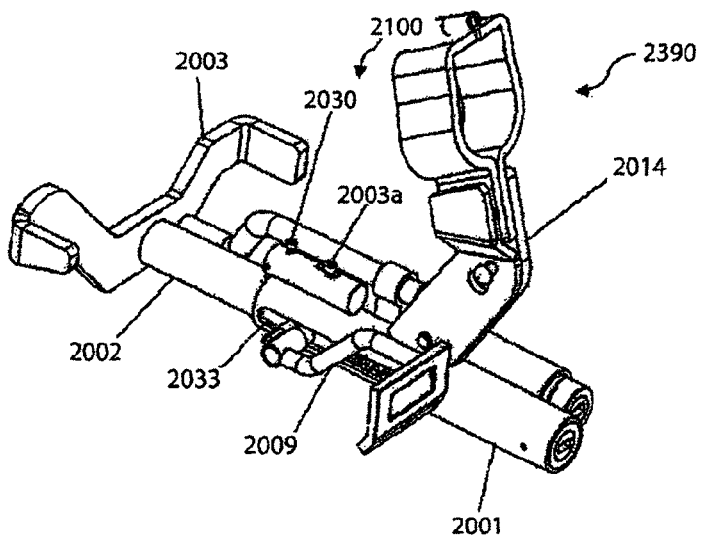
FIG. 63 is a perspective view of the third embodiment of the brake/clutch locking device incorporated with the first embodiment of the anti-lock mechanism of FIG. 62.

According to FIGS. 62-63, there is shown another embodiment of the driving function locking device 12 having the brake/clutch locking device 2390 incorporated with the anti-lock mechanism 2100. The brake/clutch locking device 2390 comprises a holding leg 2014. One end of the holding leg 2014 is fixed to an axial tube 2001, and the other end of the holding leg 2014 serves to secure the brake/clutch locking device to the vehicle, such as a steering wheel column or a brake booster of the vehicle, or a shaft, beam or column under the vehicle's console, or any other existing structure of the vehicle. A return spring 204 is provided inside the axial tube 2001 wherein the slidable axial tube 2002 inserted inside. The lower end of the slidable axial tube 2002 is connected to a blocking panel rod 2003. A line of opening 2033 for use as a connecting portion of the end gripping rod 209 with the slidable tube 2002 is provided on another side of the axial tube 2001. The line of the opening 2033 is a member that defines a retreating sliding distance of the slidable axial tube 2002 to prevent a movement out of the end of the axial tube 2001. By pulling the gripping rod 2009, the panel blocking rod 2003 will be moved inward to the axial tube 2001 in order to lock the brake/clutch locking device into the locking position. Further, the present brake/clutch locking device 2390 also includes a first locking mechanism 2006 comprising a turning mechanism 2015 which is turned by a key and a locking pin 2017 working correspondingly wherein the locking pin 2017 includes a locking pin 2018 along with a spring 2019 pushing the end of a slidable pin 2018 to be locked with an end 2018c of a two-fang rod 2020 provided at the end of the predetermined slidable axial tube 2002 located in the corresponding position when the brake/clutch locking device is in the locking position. The lateral portion of the first locking mechanism 2006 further comprises a second locking mechanism 2010 having a turning mechanism 2015a inside a housing 2023a wherein the lower portion of the turning mechanism 2015a engaged with a pin 2017a inside a housing 2022a corresponding to a locking pin 2018a in a housing 2044 is pushed with a spring 2019a through a slot of collar 2022 through the opening of the axial tube 2001 to be locked with an end 2018d of the two-fang rod 2020 located in the corresponding position by pressing the second locking mechanism 2010, thereby locking the brake/clutch locking device in the locked position.

Figure 64:
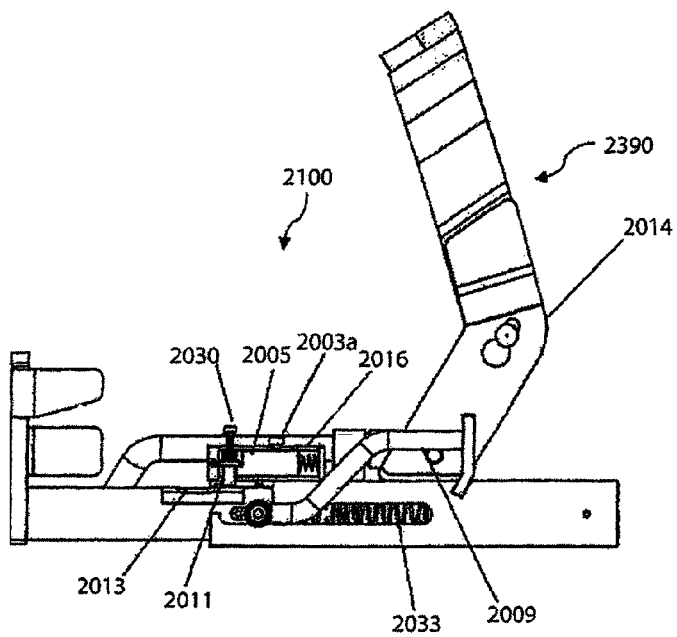
FIG. 64 is a cross-sectional view of the third embodiment of the brake/clutch locking device incorporated with the first embodiment of the anti-lock mechanism of FIG. 63, wherein the anti-lock mechanism is in a disengaged position.
Figure 65:
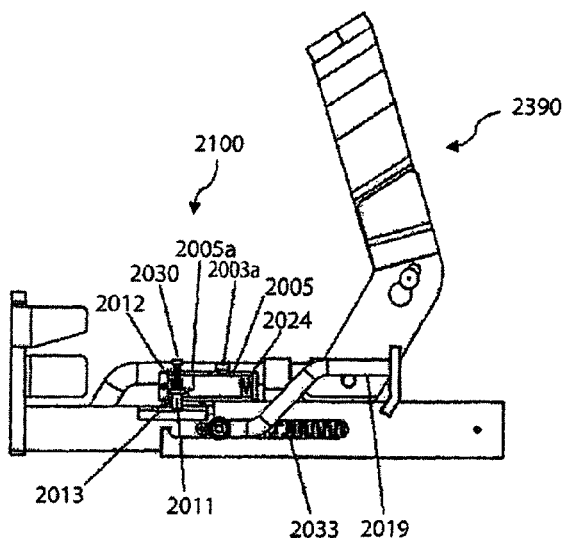
FIG. 65 is a cross-sectional view of the third embodiment of the brake/clutch locking device incorporated with the first embodiment of the anti-lock mechanism of FIG. 63, wherein the anti-lock mechanism is in an engaged position.

According to FIGS. 63-65, the brake/clutch locking device 2390 is incorporated with the anti-lock mechanism 2100 for use with the brake/clutch locking device. The anti-lock mechanism 2100 is mounted on the axial tube 2001. The anti-lock mechanism 2100 comprises a block 2005 with appropriate shape and size slidable inside the mechanical chamber 2016. The block 2005 is provided with a spring 2024 used in pushing the rear end of the block 2005. The front end of the block has a shoulder portion 2005a having a shape corresponding to the protruding lower edge of a pin 2011 and inside a pin chamber on top of a pin 2011 provided with a coil spring 2022 for use in preventing the slidable axial tube 2002 from sliding through the bored holes 2013 provided on a wall of the axial tube 2001 and on the slidable axial tube 2002 in a position upstream of a locking position of the brake/clutch locking device 2390. When an external force of more than 2020 kg-f is applied to the main structure of an automobile in a relative direction and angle, sufficient kinetic energy may be produced to the block 2005 to move the front shoulder 2005a of the block 2005 outward from the protruding edge of the pin 2011. The pin 2011, therefore, slides down into the bored holes 2013 and blocks the movement of the slidable axial tube 2002, which, in turn, prevents the brake/clutch locking device from sliding into the brake/clutch locking position. On the top of the pin 2011, an axle 2030 is provided extending through the wall of the mechanical chamber 2016 in the outward direction to pull the pin 2011 out of the position that blocks the slidable axial tube 2002 to place the pin 2011 onto the shoulder 2005a of the block 2005. The pin 2011 is placed into the position suitable for preventing the brake/clutch locking device from entering the locking position in relation with the retreating of the block 2005 along with the block holding axle 2003 a protruding through the slot on the mechanical chamber 2016.

Figure 66:
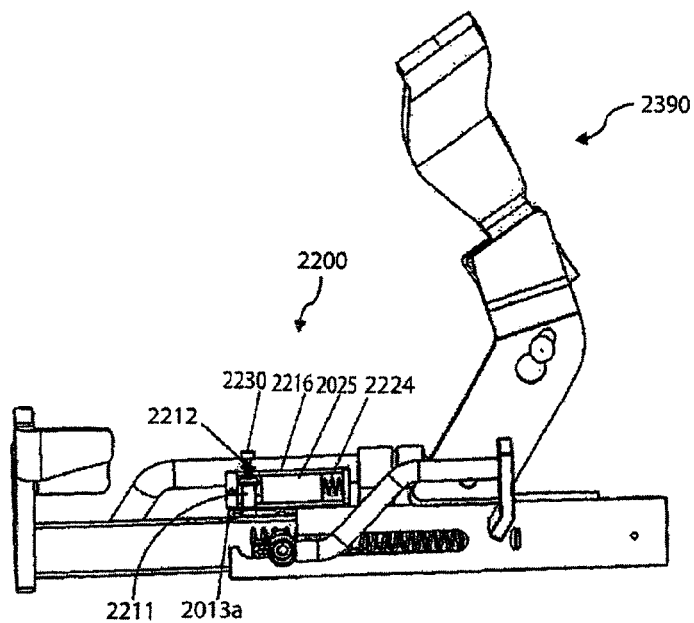
FIG. 66 is a cross-sectional view of the third embodiment of the brake/clutch locking device incorporated with the second embodiment of the anti-lock mechanism, wherein the anti-lock mechanism is in a disengaged position.
Figure 67:
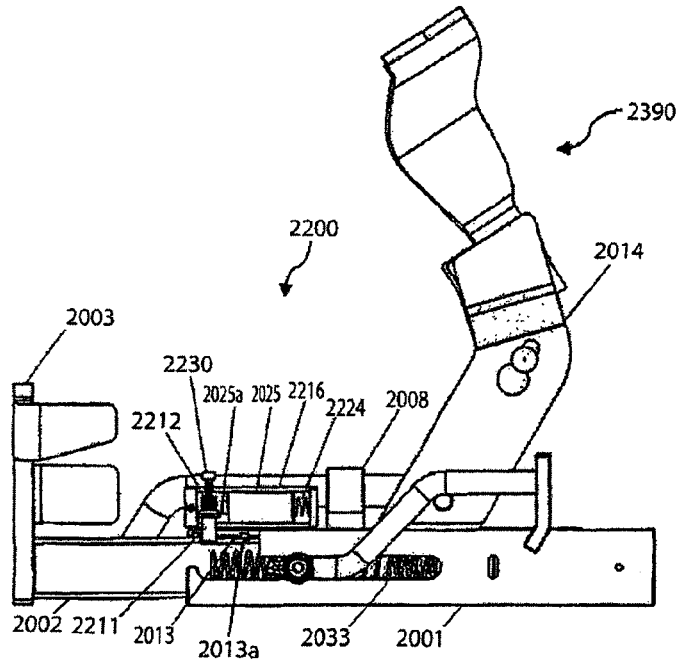
FIG. 67 is a cross-sectional view of the third embodiment of the brake/clutch locking device incorporated with the second embodiment of the anti-lock mechanism, wherein the anti-lock mechanism is in an engaged position.

According to FIGS. 66-67, the brake/clutch locking device 2390 is incorporated with the anti-lock mechanism 2200. The anti-lock mechanism 2200 is mounted on the axial tube 2001. The anti-lock mechanism 2200 has a block 2025 having a shape and size suitable for a sliding motion within the mechanical chamber 2216 and a spring 2224 is used to pushing the rear end of the block 2025. The front end 2025*a* of the block 2025 is in the shape of the axle with a rounded tip extending in correspondence with the protruding edge of the pin 2211. The pin 2211 has a curved top and inside a pin chamber on the top of the pin 2211 provided with a coil spring 2212 for use in preventing the slidable axial tube 2002 from sliding through bored holes 2013 provided on the wall of an axial tube 2001 and on the slidable axial tube 2002 in a position upstream of a locking position of the brake/clutch locking device 2390. One side of an edge of the bored hole 2013 on the slidable axial tube 2002 is a sloped portion 2013*a* for convenience in pushing the end portion of the pin 2211 back into the position while the slidable axial tube 2002 is in the normal unlocked state. Once the main structure of an automobile is subject to an external force of more than 20 kg-f in the relative direction and angle, the sufficient kinetic energy may be produced for the block 2025 to move the front shoulder 2025*a* of the block 2025 outward from the protruding edge of the pin 2211. The pin 2211 thus slides down to the bored holes 2013 and prevent the slidable axial tube 2002 from moving into the locking position of the brake/clutch locking device 3290. The bottom part of the pin 2211 is curved to accommodate this sliding action. At the end portion of the pin 2211, there is an axle 2030 extending outward through the mechanical chamber 2016.

Figure 68:
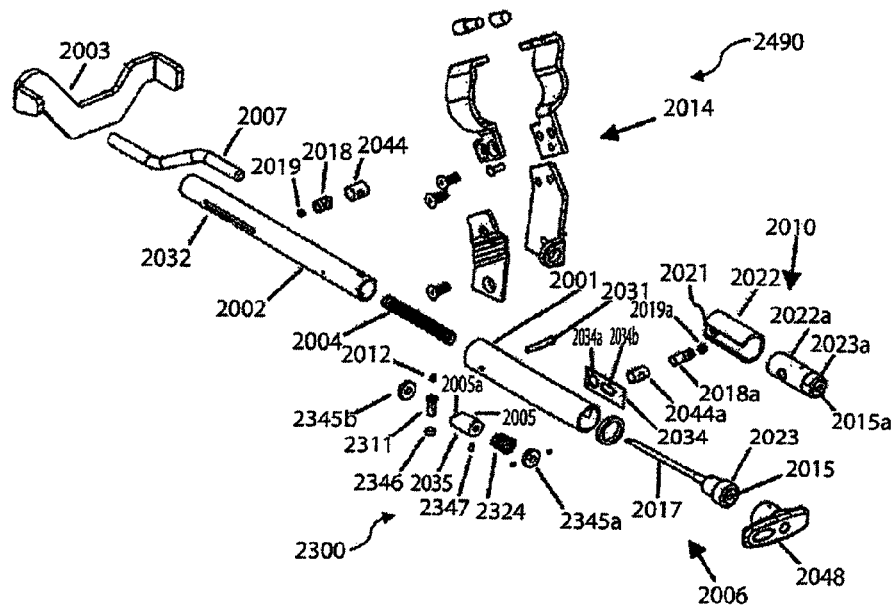
FIG. 68 is an exploded, perspective view of the fourth embodiment of a brake/clutch locking device incorporated with the fourth embodiment of the anti-lock mechanism.

According to FIG. 68, there is shown yet another embodiment of the driving function locking device 12 having the brake/clutch locking device 2490 incorporated with the anti-lock mechanism. The brake/clutch locking device 2490 comprises an axial tube 2001 and a slidable axial tube 2002. A slidable axial tube 2002 is inserted inside the axial tube 2001. The upper end of axial tube 2001 is mounted with a holding leg 2014 and a first locking mechanism 2006. The other end of the slidable axial tube 2002 is provided with a blocking panel rod 2003 attached thereto. A return spring 2004 is provided inside the slidable axial tube 2002. The axial tube 2001 is assembled with the slidable axial tube 2002 by a pin 2031, each end of which is attached to a wall of the axial tube 2001 on the opposite side and insert through a line of the opening 2032 on the wall of the slidable axial tube 2002 in a corresponding position for use as an upper blocking line of the return spring 2004 and a sliding distance defining member of the slidable axial tube 2002 as well. The upper end of the slidable axial tube 2002 is mounting part for the first locking mechanism 2006, and a second locking mechanism 2010 on the side of the first locking mechanism 2006. The first locking mechanism 2006 at the housing 2023 is enclosed by the pulling handle 2048. When the pulling handle 2048 is pulled, the in 2018 which is inside the slidable axial tube 202 will move along with the slidable axial tube 2002 to lock with a slot 2034*a* on a plate 2034 that is attached to the opening of the axial tube 2001, then the blocking panel rod 2003 slides inward to the axial tube 2001 to block the brake and clutch pedals of an automobile. The second locking mechanism 2010 having a turning mechanism 2015*a* inside a housing 2023*a* wherein the lower portion of the turning mechanism 2015*a* engaged with a pin 2017*a* inside a housing 2022*a* corresponding to a locking pin 2018*a* inside a housing 2044*a* which is push with a spring 2019*a* through a slot of the collar 2022 to a slot 2034*b* on a plate 2034 and a bored hole on the slidable axial tube 2002 located in the corresponding position to the locking position. By pressing the second locking mechanism 2010, the brake/clutch locking device will be locked in the locking position. A spring 2021 is placed at the closed end of the collar 2022 for pushing the lower end of the housing 2022*a* when unlock the second locking mechanism 2010.

Figure 69:
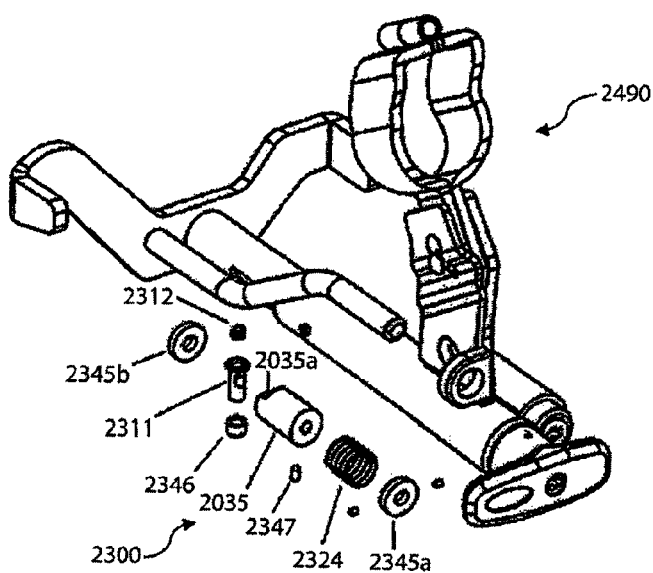
FIG. 69 is a perspective view of the fourth embodiment of the brake/clutch locking device incorporated with the fourth embodiment of the anti-lock mechanism of FIG. 68.
Figure 70:
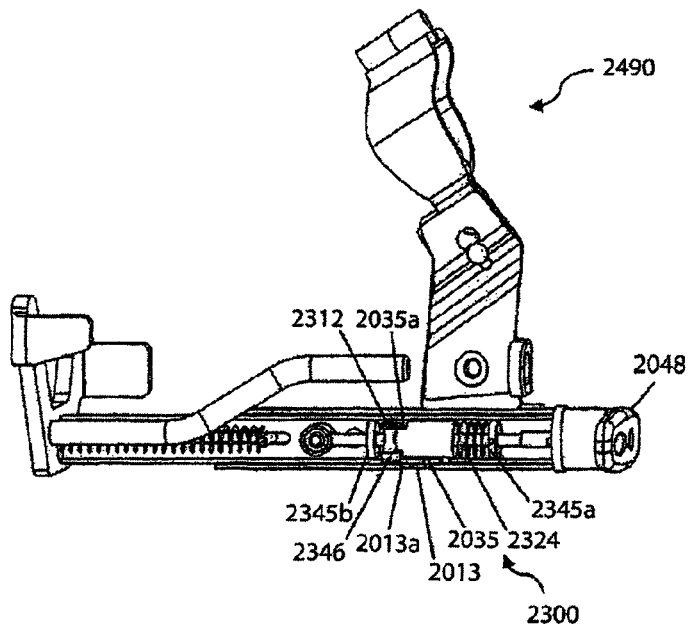
FIG. 70 is a cross-sectional view of the fourth embodiment of the brake/clutch locking device incorporated with the fourth embodiment of the anti-lock mechanism of FIG. 68, wherein the anti-lock mechanism is in a disengaged position.
Figure 71:
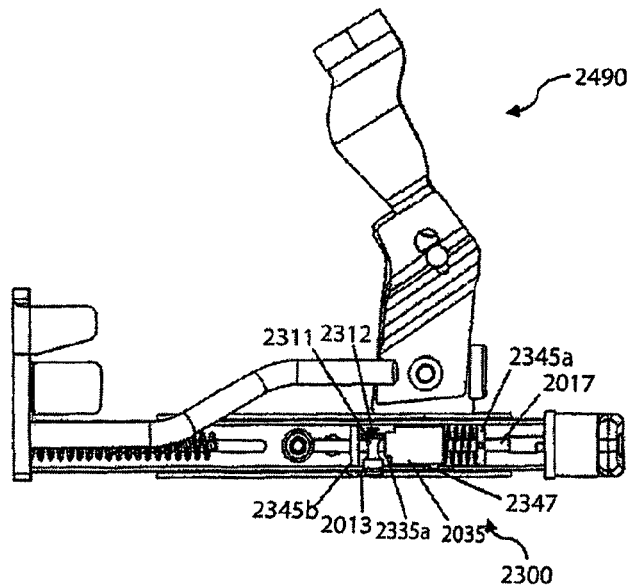
FIG. 71 is a cross-sectional view of the fourth embodiment of the brake/clutch locking device incorporated with the fourth embodiment of the anti-lock mechanism of FIG. 68, wherein the anti-lock mechanism is in an engaged position.

According to FIGS. 69-71, inside the slidable axial tube 2002 of the brake/clutch locking device 2490, further comprises the anti-lock mechanism 2300. The anti-lock mechanism 2300 comprises rings 2345*a*, 2345*b* partitioning the lock protecting mechanism chamber inside the slidable axial tube 2002 with the first locking mechanism 2006 and a first locking pin 2018 with a spring 2019 inside a housing 2044 in the slidable axial tube 2002. Inside the lock protecting mechanism chamber, a pin 2311 and a block 2035 are provided such that the pin 2311 and the block 2035 which has a shape and size appropriate for sliding inside the slidable axial tube 2002 and engaged with an axle 2017 of the first turning mechanism 2006 and provided with a spring 2324 pushing the block 2035. The front portion 2035*a* of the block 2035 has a shoulder portion having a shape corresponding to the protruding edge of the pin 2311 inside the pin chamber and provided with a coil spring 2312 for preventing the slidable axial tube 2002 from sliding through a bush 2346 on the wall of the slidable axial tube 2002 to enable the locking position of the brake/clutch locking device 2490. One edge of the bored hole 2013 on the axial tube 2001 is a sloped portion 2013*a* for convenience in pushing the end portion of the pin 2311 back into the position while the slidable axial tube 2002 is in the normal unlocked position. The bottom part of the pin 2311 is curved to accommodate this slide action. When an external force more than 20 kg-f is applied to the main structure of an automobile in a relative direction and angle, sufficient amount of kinetic energy may be produced to move the front shoulder 2035*a* of the block 2035 from the protruding edge of the pin 2311. Therefore, the end of the pin 2311 slides down into the bored holes 2013 and blocks the movement of the slidable axial tube 2002 into the locking position of the brake/clutch locking device with the abovementioned pin 2311 protruding out of the wall of the slidable axial tube 22 to block the edge of the axial tube 2001. At the end portion of the block 2035, an axle end protruding 2347 is provided such that a groove on the wall of the slidable axial tube 2002 will prevent the pivotal movement of the block 2035 around the first turning mechanism 2006.

Figure 72:
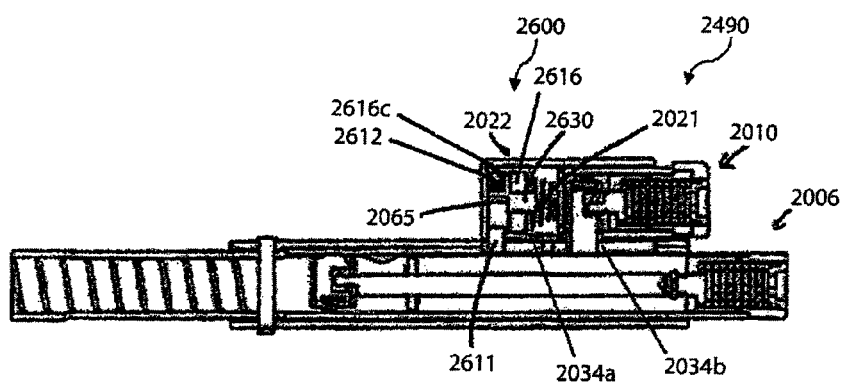
FIG. 72 is a cross sectional view of the sixth embodiment of anti-lock mechanism incorporated with the second locking mechanism of the fourth embodiment of the brake/clutch locking device, wherein in normal vehicle operating the anti-lock mechanism is in a disengaged position.
Figure 73:
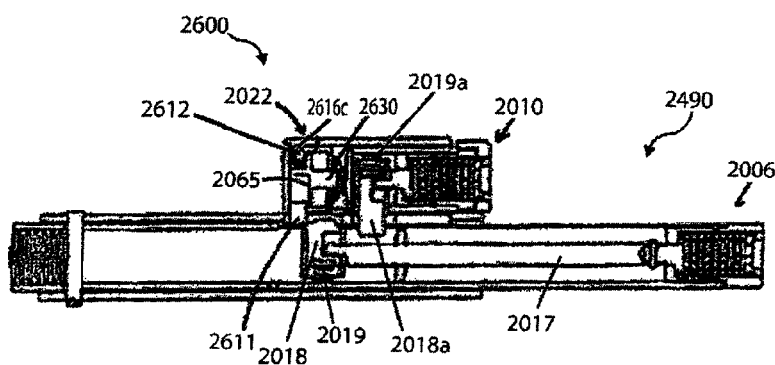
FIG. 73 is a cross sectional view of the sixth embodiment of anti-lock mechanism incorporated with the second locking mechanism of the fourth embodiment of the brake/clutch locking device, wherein in normal vehicle operating and when the brake/clutch locking device is in locked position, the anti-lock mechanism is in a disengaged position.
Figure 74:
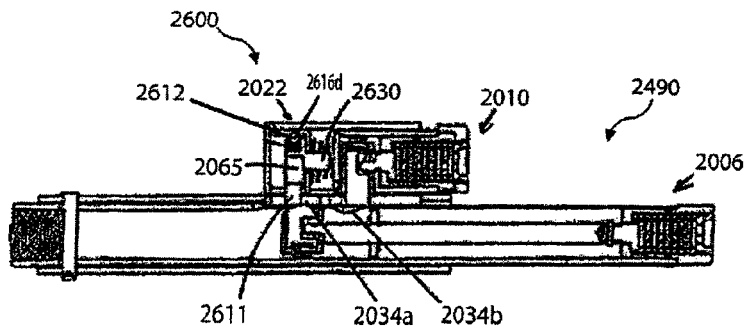
FIG. 74 is a cross sectional view of the sixth embodiment of anti-lock mechanism incorporated with the second locking mechanism of the fourth embodiment of the brake/clutch locking device, wherein in abnormal vehicle operating situation, the anti-lock mechanism is in an engaged position.

According to FIGS. 72-74, the slidable axial tube 2002 of the brake/clutch locking device 2490 further comprises the anti-lock mechanism 2600 for use with the brake/clutch locking device. The anti-lock mechanism 2600 comprises a block 2065 with appropriate shape and size slidable inside a mechanical chamber 2616. The mechanical chamber 2616 includes a slot 2616*a* on a side wall. The anti-lock mechanism 2600 is placed in an end of the collar 2022 of the second locking mechanism 2010 of the brake/clutch locking device 2490. The front end of the block 2065 has an axle 2630 protruding into the center hole 2616*b* which is opposite to the open end of the mechanical chamber 2616. On one side of the block 2065 there is a dowel 2611 slidable in the slot 2616*a* and on the opposite site provided with a spring 2624 and a pin 2612 inside a hole 2065*b*. Two mating holes (2616*c*, 2616*d*) are provided corresponding to the pin 2612 on the internal wall of the mechanical chamber 2616. A spring 2021 is provided at the front end of the mechanical chamber 2616, one end of the spring 2021 pushing the wall at the end of the second locking mechanism 2010 chamber. When an external force of more than 2020 kg-f is applied to the main structure of an automobile in a relative direction and angle, sufficient amount of kinetic energy may be produced to move the block 2065 from the mating hole 2616*c* to the mating hole 2616*d* on the inner wall of the mechanical chamber 2616, at the same time the dowel 2611 will slide into proper place which is the slot 2034*a* of the plate 2034, the anti-locking mechanism is in the engaging position, that is the locking position of the brake/clutch locking device 2490.

The resetting of the anti-lock mechanism 2600 from the engaged position to the disengaged position occurs when the user press the second locking mechanism 2010, the wall at the end of the second locking mechanism 2010 chamber will push the block 2065 back. In doing so, pushing pin 2612 becomes free from the second mating hole 2616*d* and moves to engage into the first mating hole 2616*c* where the block 2065 backs to the end of the collar 2222 to be ready for activation again.

According to the embodiments of the brake/clutch locking devices of this invention as described above, the process of unlocking is that the second locking mechanism 2010 will be unlocked first by the turning mechanism 2015*a* with the key. The spring 2021 will push the second locking mechanism 2010 back and release the pin 2018*a* out of the locking position. Then, by unlocking the first locking mechanism 2006 by rotating the turning mechanism 2015 with the key. The pin 2018 will be released from the locking position, then the spring 2004 will force the slidable axial tube 2002 pushing the blocking panel rod 2003 to unlock the brake/clutch of an automobile.

Figure 75:
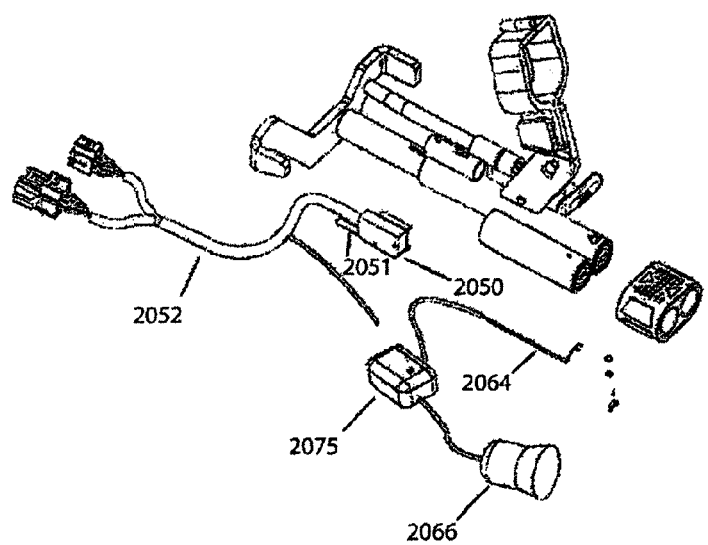
FIG. 75 is a perspective view of the first embodiment of the brake/clutch locking device incorporated with the first embodiment of the anti-lock mechanism, alarm system and anti-start system.

Anti-start system according to FIG. 75, the above brake/clutch locking device further comprises an engine cut off switch 2050 that will cut off the engine from starting system when the brake/clutch locking device is in the locked position to prevent the engine from starting, and the engine cut off switch functioning to connect the engine start system when the brake lever/clutch locking device is in the unlocked position to allow the engine starting and stepping on the brake/clutch pedals as usual. The engine cut off switch 2050 provided with a switch pressing rod 2051 is mounted at the lower end of the axial tube 2001 The function of the switch is related to the blocking rod 2003 presses the switch pressing rod 2051 to cut off the engine when the slidable axial tube 2002 slides to be locked in the locking position and the switch pressing rod 2051 will be released when the slidable axial tube 2002 is in the unlocked position. Then the engine can work again.

Figure 76:
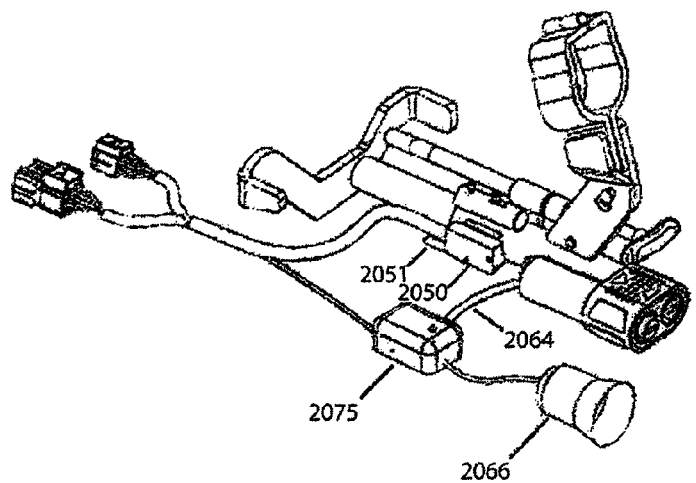
FIG. 76 is another perspective view of the brake/clutch locking device of FIG. 75.
Figure 77:
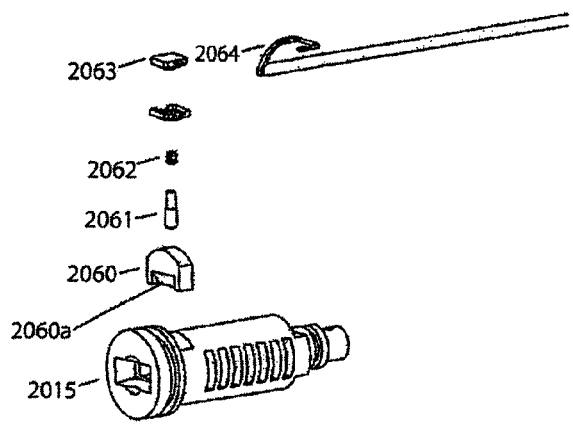
FIG. 77 is a perspective view of a micro switch set.
Figure 78:
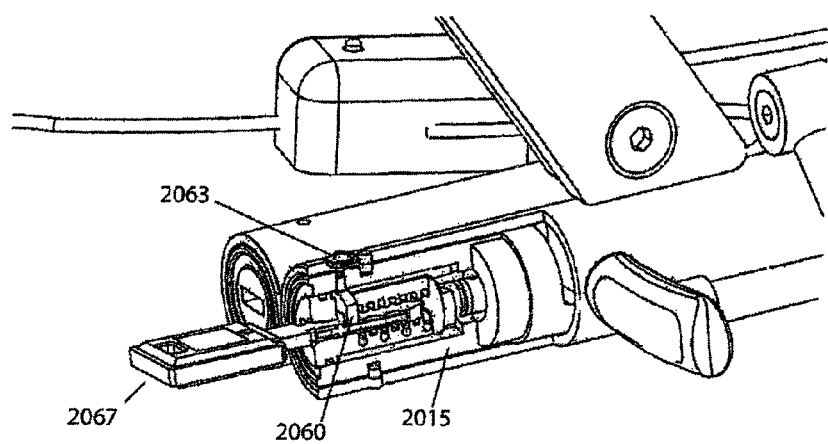
FIG. 78 is an enlarged, partial cut-away view of a locking mechanism connected to the alarm system and anti-start system with a key inserted therein.

Alarm system according to FIGS. 76-78, the first locking mechanism 2006 and the second locking mechanism 2010 comprise a turning mechanism 2015 which is turned by a key 2067. The turning mechanism 1205 comprises one key code set having a key code member 2060 including a protrusion for use in abutting through a through hole to the micro switch 2063 installed on the wall of the axial tube 2001. When a key 2067 is inserted to unlock the brake lever/clutch locking device, said micro switch 2063 is the mechanism used in activating the electronic security system 2075 to emit the code signal wave to determine the code signal wave of the key 2067 having the signal code storage device attached thereto. If the code signal from the key matches the code signal from the electronic security system 2075 installed inside the automobile, the sound alarm system will not be turned on via the sound alarm device 2066. If it is unlocked by any another different devices or a key without the code signal that matches the code signal from the security system provided inside the automobile, the security system will turn on the alarm system to alert the unusual situation.

That is to say, the aforementioned key code member 2060 includes the protrusion to be coupled to a rod 2061 used in pressing a micro switch 2063 having a return spring 2062. The rod 2051 extends to the micro switch 2063 having the signal wire 2064 connecting to the electronic security system 2075, and the lower portion of the key code member 2060*a* is inclined corresponding with an inserting direction. The length of the rod 2061 matches the distance where the micro switch 2063 can be operated.

Figure 79:
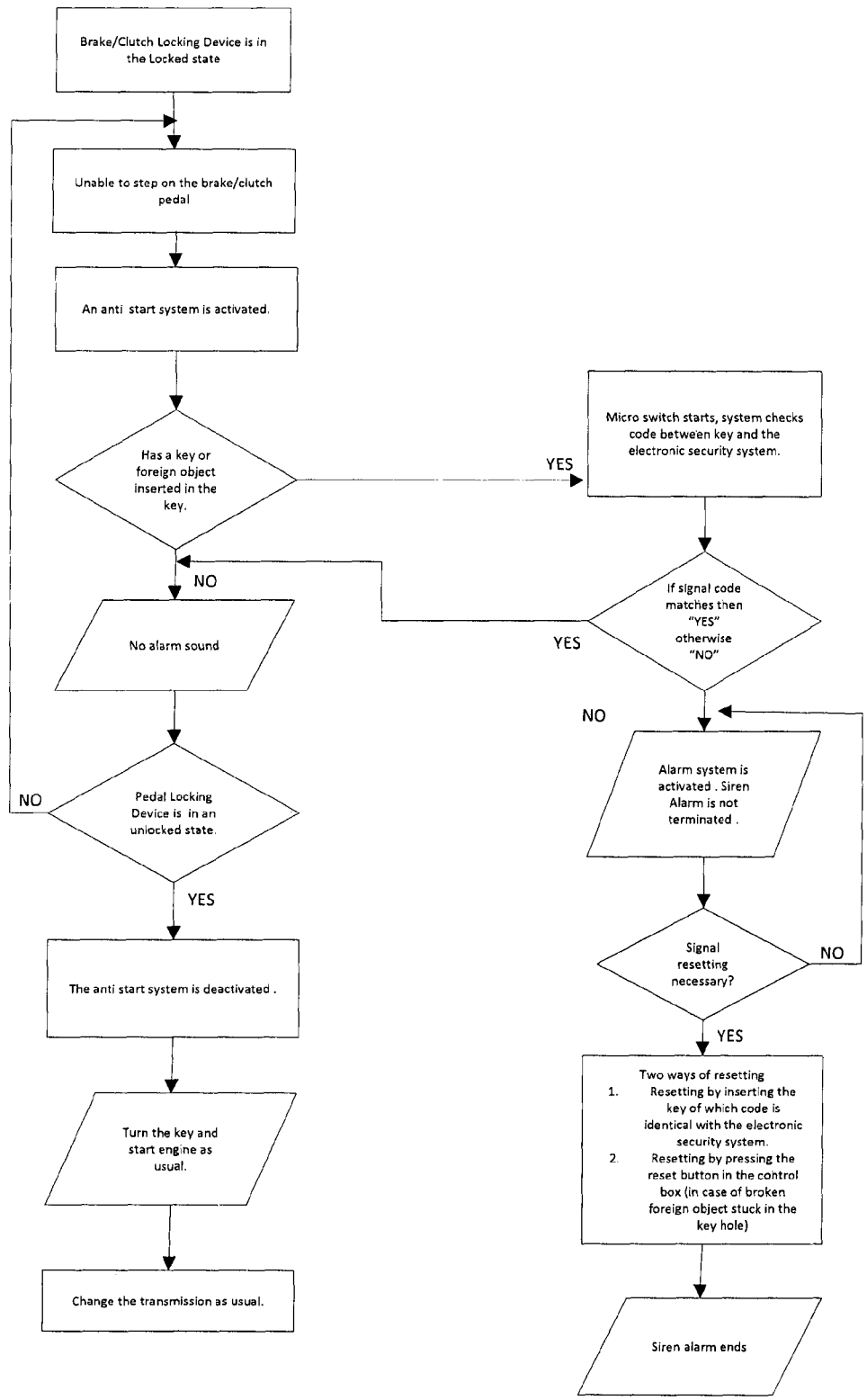
FIG. 79 is a flow diagram of the operational configuration of the alarm system and the anti-start system.

FIG. 79 shows the flow diagram of another embodiment of the security system of the locking mechanism of the brake lever/clutch locking device according to the present invention. When the turning mechanism 2015 is inserted with the key or invaded by some foreign objects, the security system will be activated by the micro switch 2063 and transmit the signal wave to determine the code signal stored on a part of the key. In case the code signal matches the preset one, the alarm device 2066 will not go off. On the other hand, in case the code signal does not match the preset one, the alarm system will be triggered and remain active by the security system. The aforementioned security system is able to terminate the alarm system by inserting the key with the correct preset code or pressing the reset button on the security box to reset the security system to the original condition before inserting the key or entering any foreign object into the turning mechanism 2015.

Figure 80:
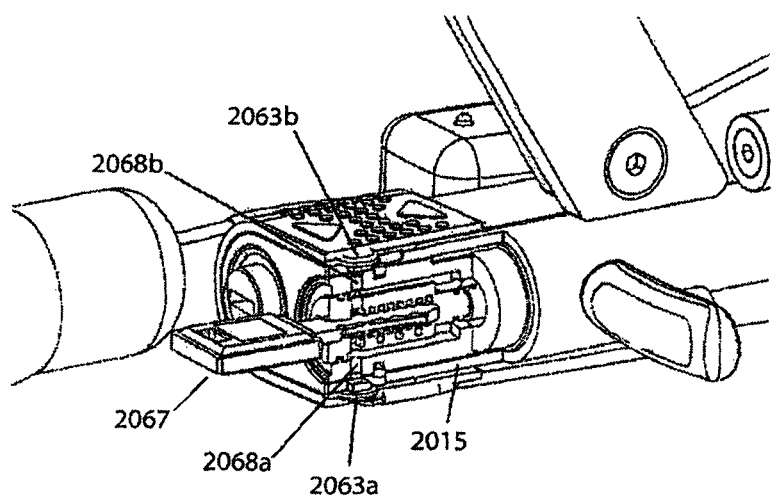
FIG. 80 is an enlarged, partial cut-away view of a locking mechanism connected to the alarm system and anti-start system and infrared switch with a key inserted therein.
Figure 81:
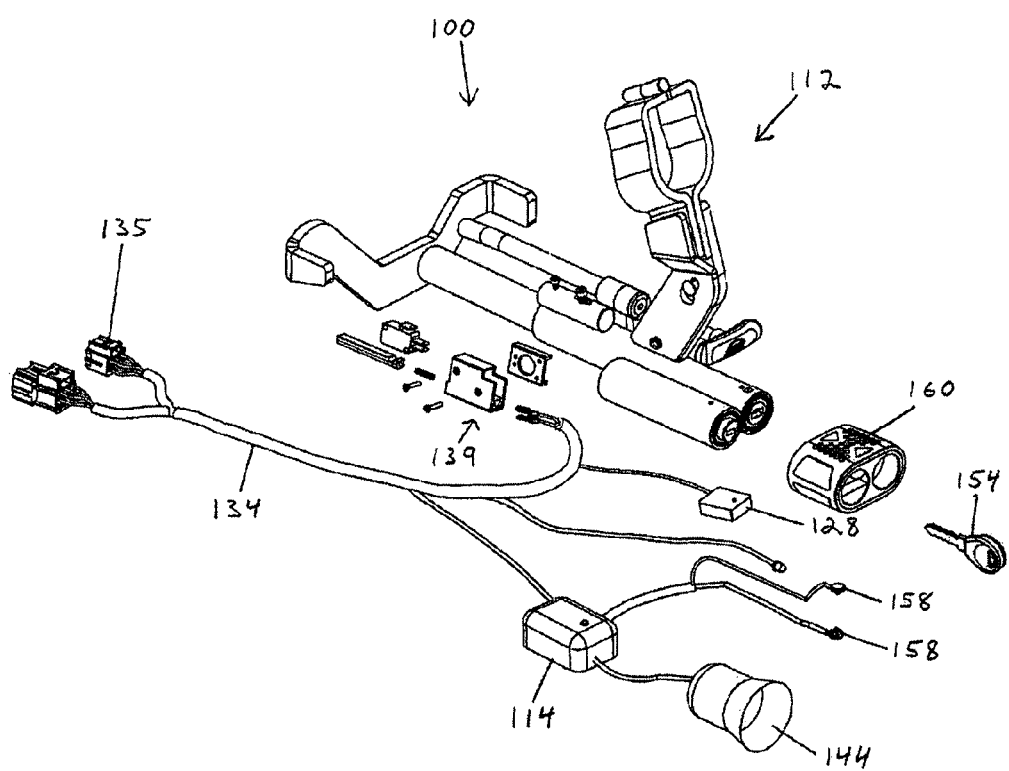
FIG. 81 is a partially exploded perspective view of a vehicle security system in accordance with a second preferred embodiment of the present invention.

According to FIG. 80, the present embodiment provided with the turning mechanism 2015 along with one key code set as mentioned above according to another embodiment includes a through hole. The two ends (2068*a*, 2068*b*) of the through hole are provided with the infrared switch (2063*a*, 2063*b*) on the opposite sides. The infrared switch activates the electronic security system 2075 to emit the code signal wave to determine the code signal wave of the key 2067 having the signal code storage device attached thereto. If the code signal from the key 2067 matches the code signal from the electronic security system 2075 installed inside the automobile, the sound alarm device 2066 will not go off. If it is unlocked by another different device or the key without the code signal that matches the code signal from the security system provided inside the automobile, the security system will turn on the alarm system to alert the unusual situation.

Figure 82:
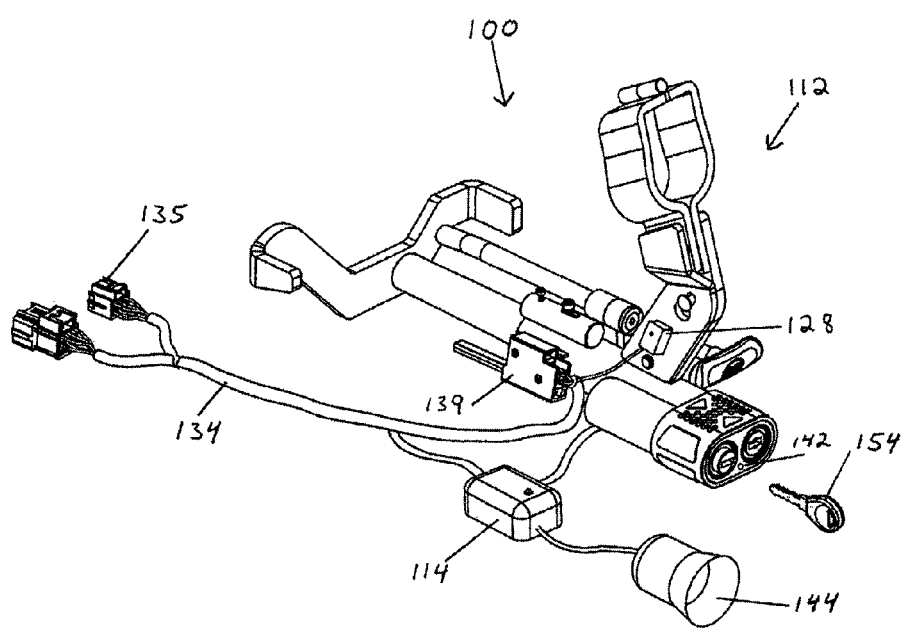
FIG. 82 is a perspective view of the vehicle security system of FIG. 81 in an unlocked position.
Figure 83:
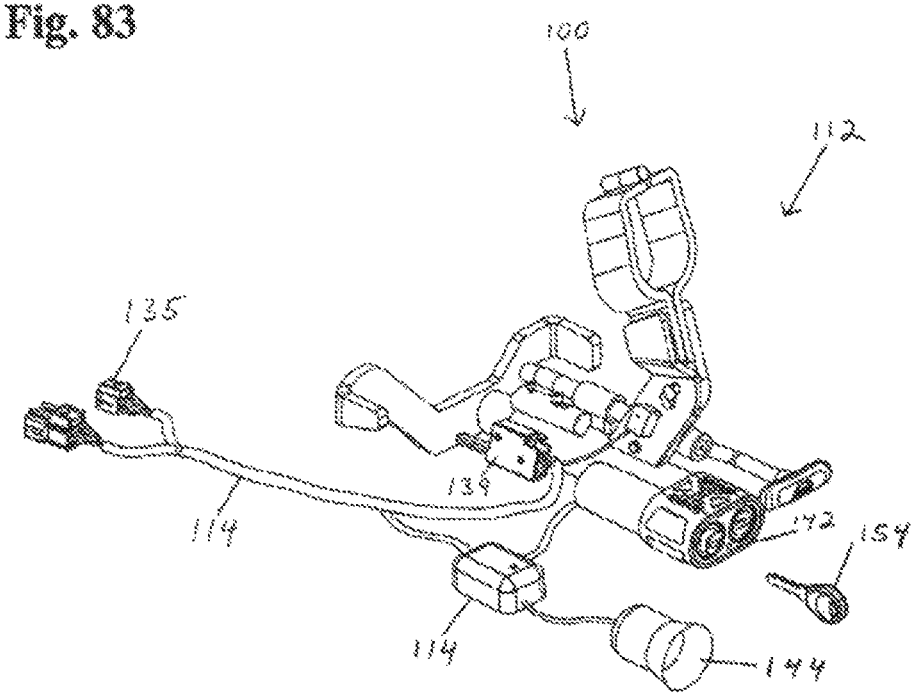
FIG. 83 is a perspective view of the vehicle security system of FIG. 81 in a locked position.
Figure 84:
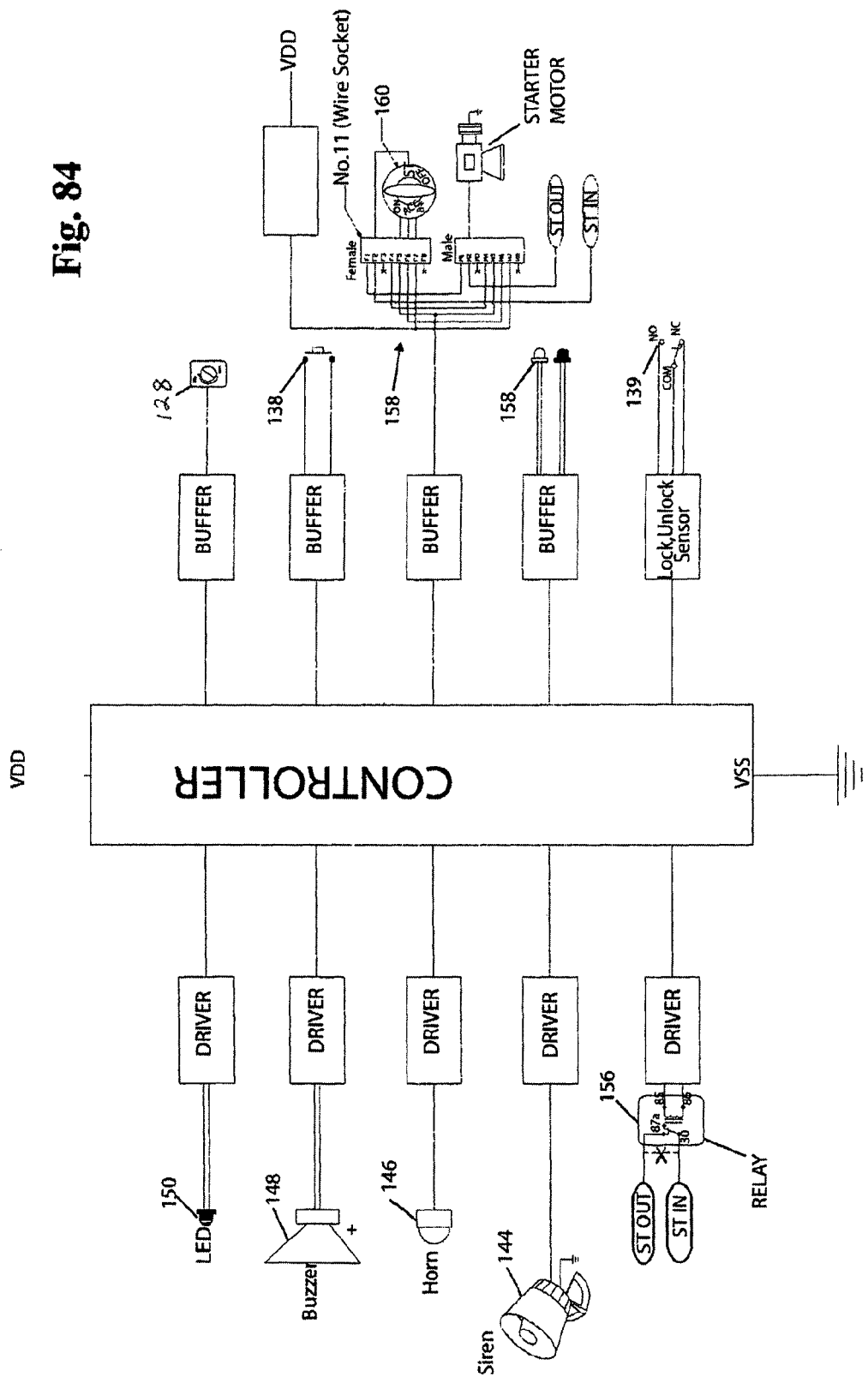
FIG. 84 is a schematic diagram of a controller of the vehicle security system of FIG. 81.

Referring to FIGS. 81-84, in a second preferred embodiment, the present invention provides for a vehicle security system 100 having a driving function locking device 112 and a controller 114. The driving function locking device 112 can be, for example a gear lever locking device or a brake/clutch locking device, as described above in the first preferred embodiment. The driving function locking device 112 is movable between a locked position (FIG. 83) for disabling a driving function of the vehicle and an unlocked position (FIG. 82).

The vehicle security system 100 is connected to a vehicle's electrical power supply, for example, via a power cable 134 and a wire socket 135. Such connections to a vehicle's power supply are known in the art and a detailed description of such power supply connections and operations is not necessary for a complete understanding of the present invention.

The controller 114 can be, e.g., a computer, a microcontroller, a logic controller, an integrated circuit and the like. The controller 114 is connected to an electrical power supply of the vehicle, an advisor 142, an engine cut-off 156, a lock sensor 139, a key control sensor 158, a shock sensor 128 and a tamper sensor 138. The advisor 142 can be, for example, an LED 150, a buzzer 148, a horn 146, a siren 144, and the like. The engine cut-off 156 disables an engine starter of the vehicle. The lock sensor 139 (or micro-switch) detects whether the driving function locking device 112 is in a locked or unlocked position. The shock sensor 128 operates to detect shocks or tampering with the driving function locking device 112 and activates the alarm e.g., siren 144, when such shocks or tampering is detected. The alarm can be deactivated with the chip card or remote, as further discussed below. The tamper sensor 138 can be connected to any suitable feature of the vehicle, such as a spare tire or vehicle hood, such that the tamper sensor 138 is activated if the spare tire is removed or the vehicle hood is opened when the vehicle security system is activated.

The controller 114 is configured to lock the driving function locking device 112 only when the transmission of the vehicle is in a park "P" or a neutral "N" position, activate the advisor 142 to advise that the driving function locking device 112 is in the locked position, and activate the engine cut-off 156 when the driving function locking device 112 is locked. The controller 114 is also configured to detect if an object has been inserted in a key switch 160 of the vehicle, and if so, activate the advisor 142 to issue a warning. Further, the controller 114 is configured to activate the advisor 142 to issue a warning if the tamper sensor 138 is activated, and activate the advisor 142 to issue a warning after a fixed time interval, e.g., 2, 3, 4, 5, 6, 7, 8, 9, or 10 or more seconds, such as 30, 40, or 50 seconds, upon detecting an object in the key switch 160 via the key control sensor 158.

Figure 86:
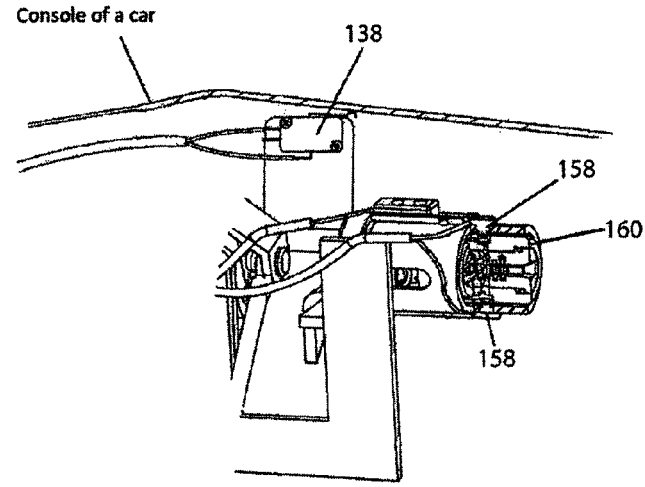
FIG. 86 is a partial cross-sectional perspective view of the key control sensor and key switch of FIG. 85.

The controller 114 can optionally be configured to activate the advisor 142 to advise that the driving function locking device 112 is in the locked position and activate the engine cut-off 156 when the driving function locking device 112 is locked. Referring to FIG. 86, the controller 114 is also configured to detect if an object has been inserted in the key switch 160 of the vehicle, and if so, activates the advisor 142 to issue a warning. Further, the controller 114 is configured to activate the advisor 142 to issue a warning if the tamper sensor 138 is activated, and activate the advisor 142 to issue a warning after a fixed time interval, e.g., 2, 3, 4, 5, 6, 7, 8, 9, or 10 or more seconds, such as 30, 40, or 50 seconds, upon detecting an object in the key switch 160.

The driving function locking device 112 is further configured to unlock when a user toggles an ignition switch via a key 154 of the vehicle a fixed number of times, e.g., 2, 3, 4, or 5 or more times.

Figure 87:
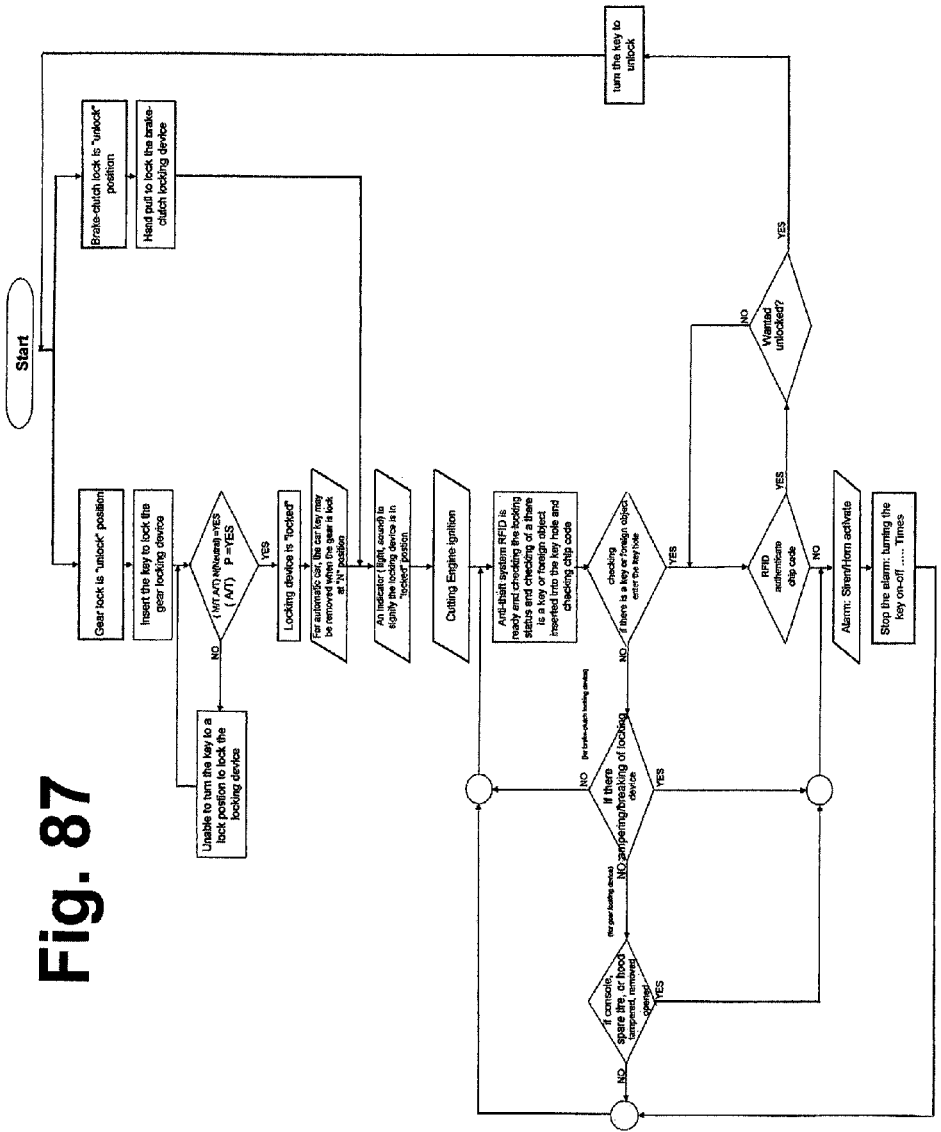
FIG. 87 is an operational flow diagram of the vehicle security system of FIG. 81 having a gear locking or brake/clutch locking device.
Figure 88:
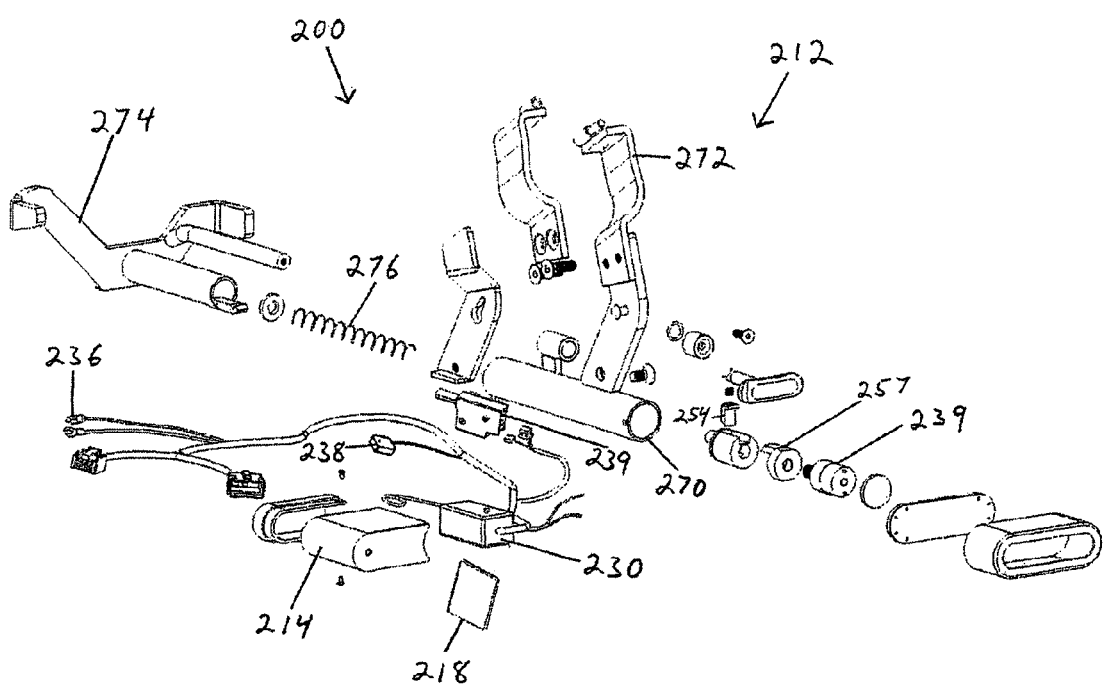
FIG. 88 is an exploded perspective view of a vehicle security system in accordance with a third preferred embodiment of the present invention.

FIG. 87 shows a flow chart of a preferred operation of the vehicle security system 100 in accordance with the second preferred embodiment. The vehicle security system 100 starts with the controller 114 determining whether or not the driving function locking device 112 in the locked or unlocked positions. To lock the vehicle security system 100, a user inserts a key 154 into the key switch 160 to lock the vehicle security system 100. Then the vehicle security system 100 determines whether or not the transmission of the vehicle is in the P or N position. If the transmission is not in the P or N position, the driving function locking device 112 of the vehicle security system 100 is prevented from moving to the locked position. However, if the vehicle security system 100 determines that the transmission of the vehicle is in the P or N position, the driving function locking device 112 is moved to the locked position. When in the locked position, the vehicle security system 100 allows a user to remove the key 154 from the key switch 160 when the gear is in either the N or P position.

When the vehicle security system 100 is locked, the vehicle security system 100 is configured to notify the user that the vehicle security system 100 is locked by activating the advisor 142, which provides for an audio or visual indication that the vehicle security system 100 is locked. Additionally, the vehicle security system's controller 114 is configured to activate the engine cut-off 156 when in the locked position. After the vehicle security system 100 is locked and the engine cut-off 156 is activated, the vehicle security system 100 is fully activated.

Figure 85:
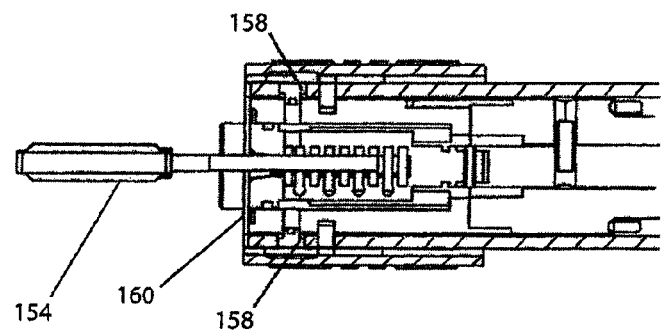
FIG. 85 is a cross-sectional side elevational view of a key control sensor and key switch of the vehicle security system of FIG. 81.

Referring back to FIG. 85, the vehicle security system includes a key control sensor 158 assembled with the key switch 160. The key control sensor 158 can be any sensor known in the art and suitable for the present embodiments intended purpose, however, the key control sensor 158 is preferably an infrared sensor. The key control sensor 158 is assembled to a key switch 160 and operatively connected to and in communication with the controller 114. The key control 158 allows the vehicle security system 100 to monitor and detect if a key or any foreign object is inserted into the key switch 160 e.g., by being positioned adjacent an entryway of the key switch 160.

In operation, the key control sensor 158 will detect if a foreign object, such as a pick or screw driver, etc., is inserted into the key switch 160. When the key control sensor 158 is an infra red sensor, the sensor detects a foreign object when the infra red beam between opposing ends of the infra red sensor is cut off or disturbed. Once the key control sensor 158 is activated, it triggers the controller 114 to activate the alarm after a predetermined time delay, such as 5, 6, 7, 8, 9, or 10 ore more seconds, such as 20, 30, 40 or 50 seconds, such as the vehicle's horn, or other audio and visual indicators, such as the vehicles tail and head lights, to notify that unauthorized access to the vehicle has occurred.

Referring back to FIG. 84, the controller 114 is also configured to have a time delay, e.g., 5, 6, 7, 8, 9, or 10 seconds, but could be more than 10 or less than 5 seconds if desired, before the controller 114 activates the alarm, in order to allow a user to deactivate the vehicle security system 100. Further, the vehicle security system 100 can be configured to allow an additional time delay with a warning (audio or visual) if the vehicle security system 100 is not unlocked within the predetermined time delay period.

The vehicle security system's tamper sensor 138 is activated to signal the controller 114 upon detecting an event, such as tampering with the vehicle's gear console. Additionally, the vehicle security system 100 can also include a shock sensor 128 for detecting an unwanted event, such as forced entry into the vehicle or destruction of the vehicle's glass windows. The tamper sensor 138 and/or shock sensor 128 upon detecting an event, signals the controller 114 to activate the alarm to notify that unauthorized access to the vehicle or tampering of the vehicle has occurred. The vehicle security system 100 can include one or more, or a plurality of tamper sensors 138 and shock sensors 128 positioned about a variety of locations on the vehicle.

The vehicle security system's alarm can be deactivated or shut off by the user upon pressing an "OFF" switch on a remote control or by toggling the key within the key switch 160 a predetermined number of times, e.g., 1, 2, 3, 4 or 5 times.

Referring to FIGS. 88-98, in accordance with a first aspect of a third preferred embodiment, the present invention provides a vehicle security system 200 that includes a driving function locking device 212 configured as a brake/clutch locking device 212' having a motor 230 driving mechanism, and a controller 214. The brake/clutch locking device 212' is similar in structure and function as that of the brake/clutch locking device 2190 described above, except for the inclusion of the controller 214, a motor 230, an engine cut-off 256, a microswitch 239, a shock sensor 238, an advisor 242, a transceiver 236 and a chip card 218 or a remote control 216, as further described below (see FIG. 97). Additionally, the brake/clutch locking device 212' differs from the brake/clutch locking device 2190 in that it is configured to operate without a key to lock the brake/clutch locking device 212' after it has been manually or automatically moved to the ready to lock position. Similar to the brake/clutch locking device 2190, however, the brake/clutch locking device 212' includes an axial tube 270, a holding leg 272, a panel-blocking rod 274 and a return spring 276.

Figure 108:
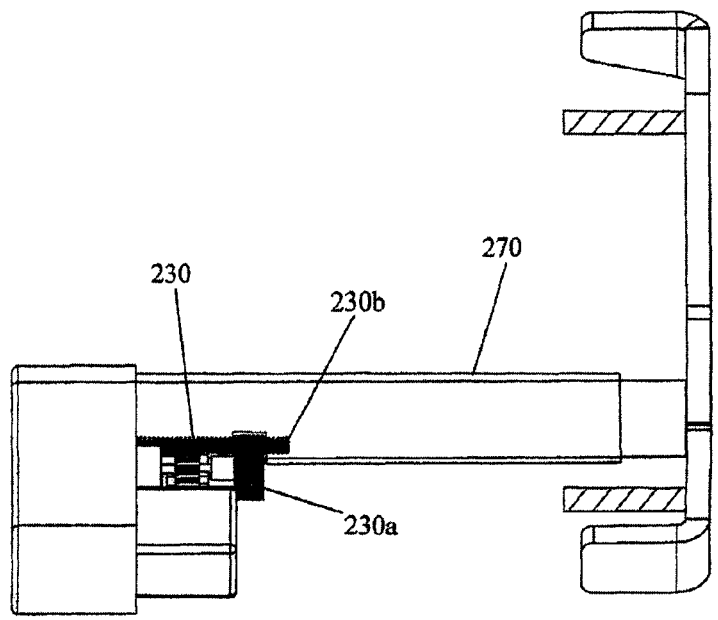
FIG. 108 is a partial cross-sectional elevational view of the vehicle security system of FIG. 91 showing a gear motor and an axial tube in a locked position.
Figure 108A:
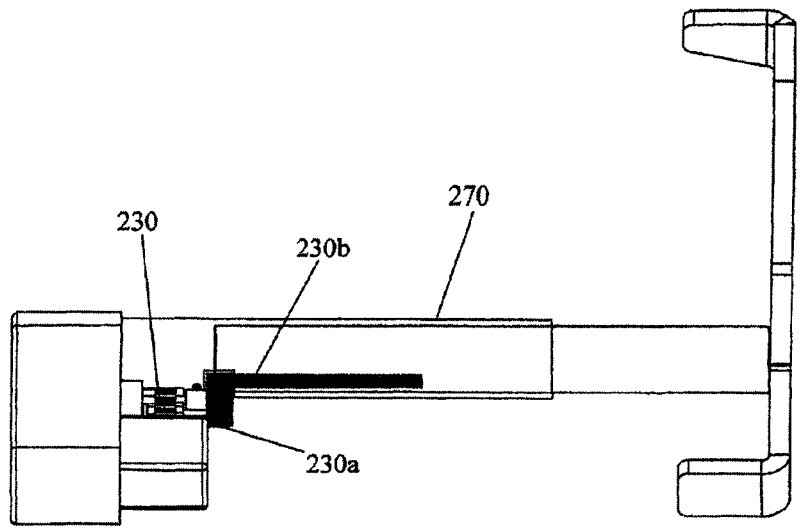
FIG. 108A is a partial cross-sectional elevational view of the vehicle security system of FIG. 108 showing the gear motor and axial tube in an unlocked position.

FIGS. 108 and 108A are partial cross-sectional elevational views of the driving function locking device 212. FIG. 108 shows the driving function locking device 212 in a locked position. In the locked position, the key of the vehicle is in the "OFF" position and the vehicle security system 200 is in the standby mode ready to receive a command to active the motor 230. The motor 230 is connected to a gear wheel 230a and a gear rail 230b which drives the axial tube 270 to the locked position.

FIG. 108A shows the driving function locking device 212 in an unlocked position. In the unlocked position, the key of the vehicle is in the "ON" position and the vehicle security system 200 is disabled.

The motor 230 is operatively connected to the controller 214. The controller is configured to operate the motor 230 to move the driving function locking device 212 between the locked and unlocked positions so as to provide an automatic means that moves the driving function locking 212 to the ready to lock position instead of manually moving the driving function locking device 212 to the ready to lock position.

Figure 89:
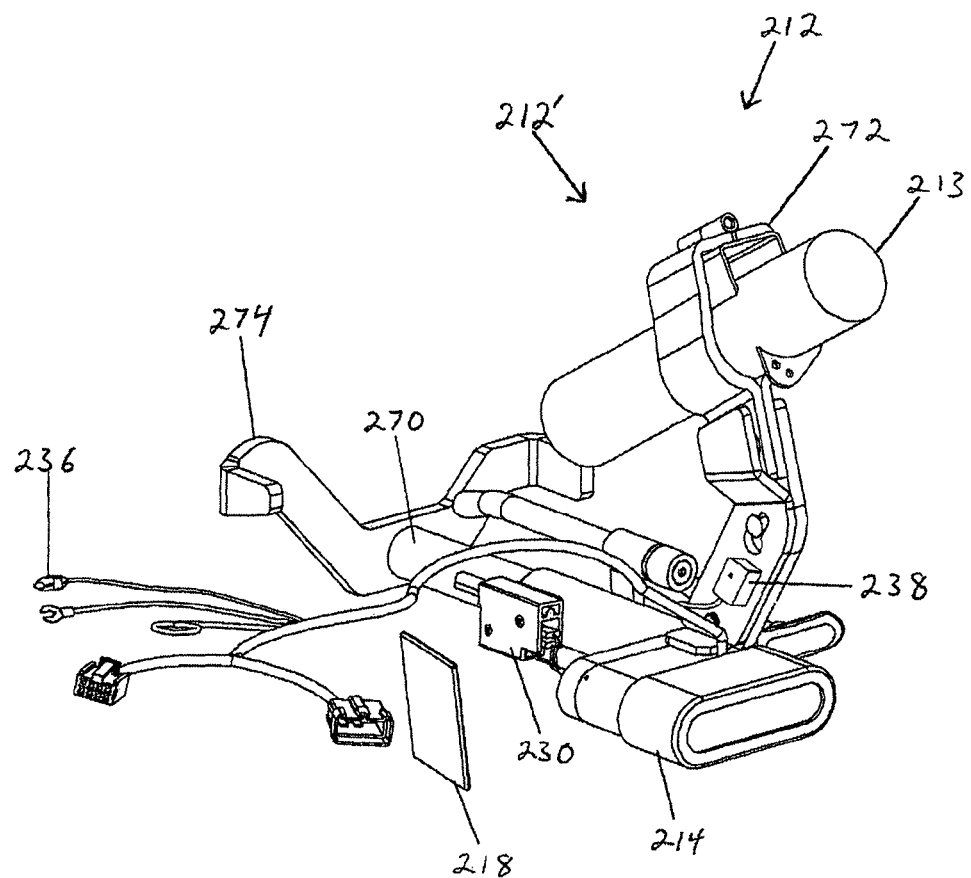
FIG. 89 is a perspective view of the vehicle security system of FIG. 88 in an unlocked position.
Figure 90:
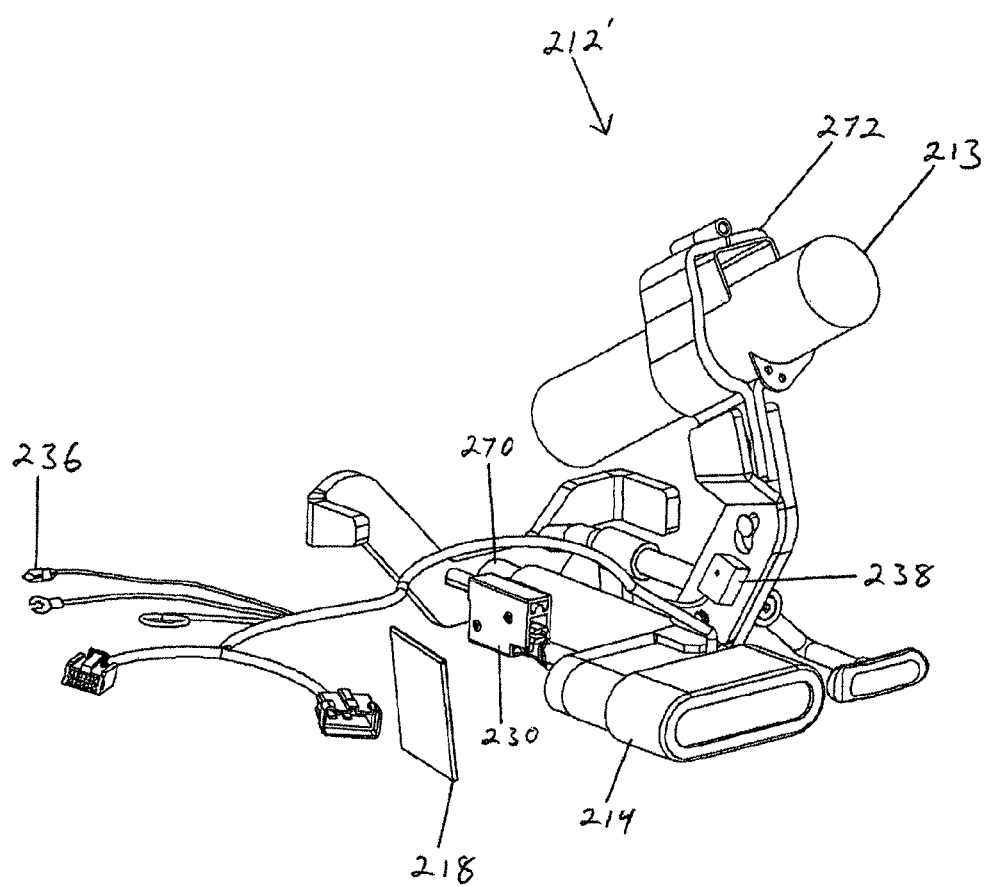
FIG. 90 is a perspective view of the vehicle security system of FIG. 88 in a locked position.
Figure 91:
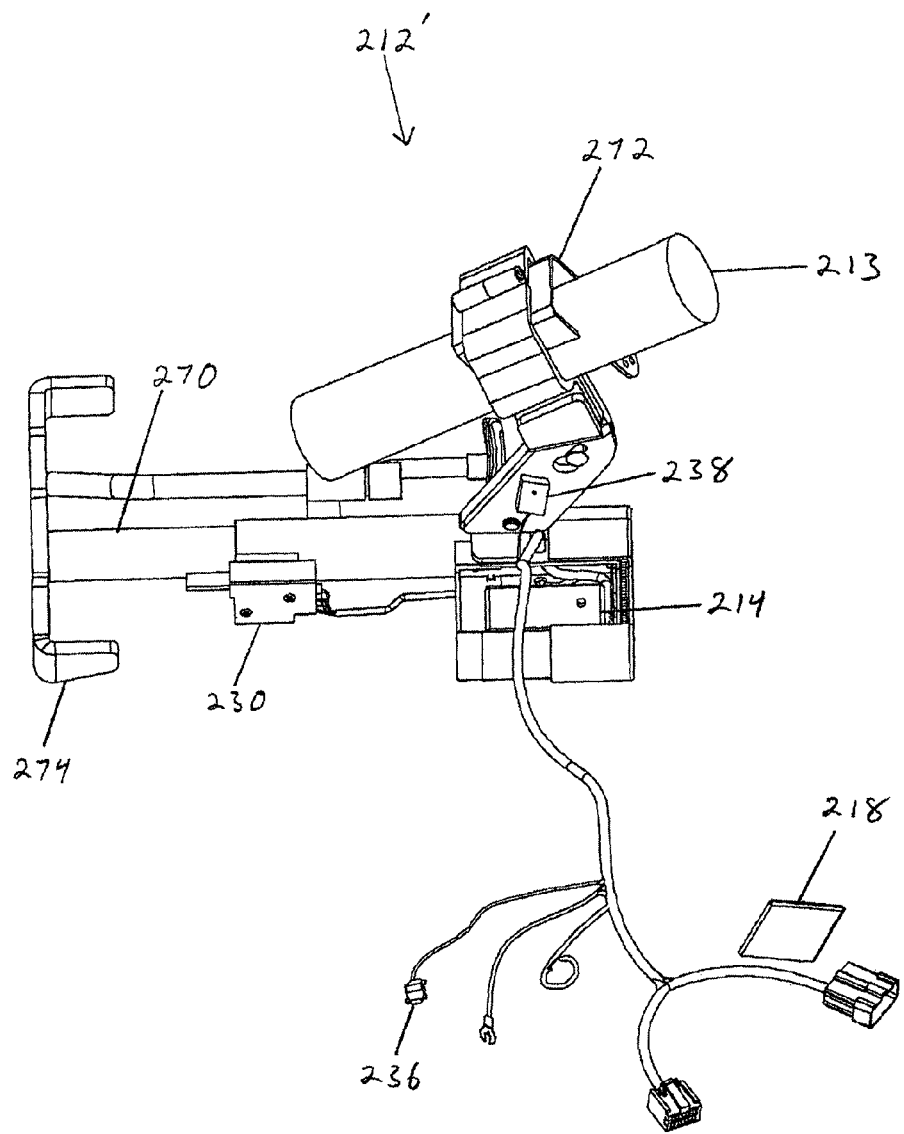
FIG. 91 is another perspective view of the vehicle security system of FIG. 88 in the unlocked position.

The brake/clutch locking device 212' is movable between a locked position (FIG. 90) for disabling a driving function of a vehicle and an unlocked position (FIG. 89). The brake/clutch locking device 212' is moved between locked and unlocked positions by the motor 230.

The controller 214 can be, e.g., a computer, a microcontroller, a logic controller, an integrated circuit and the like. The controller 214 (FIG. 97) is connected to an electrical power supply of the vehicle, similar to controllers 14 and 114 described in the above embodiments, and operatively connected to the advisor 242, the engine cut-off 256, the transceiver 236 and the shock sensor 238. The advisor 242 can be, for example, an LED 250, a buzzer 248, a horn 246, a siren 244, and the like. The engine cut-off 256 disables an engine starter of the vehicle.

Figure 98:
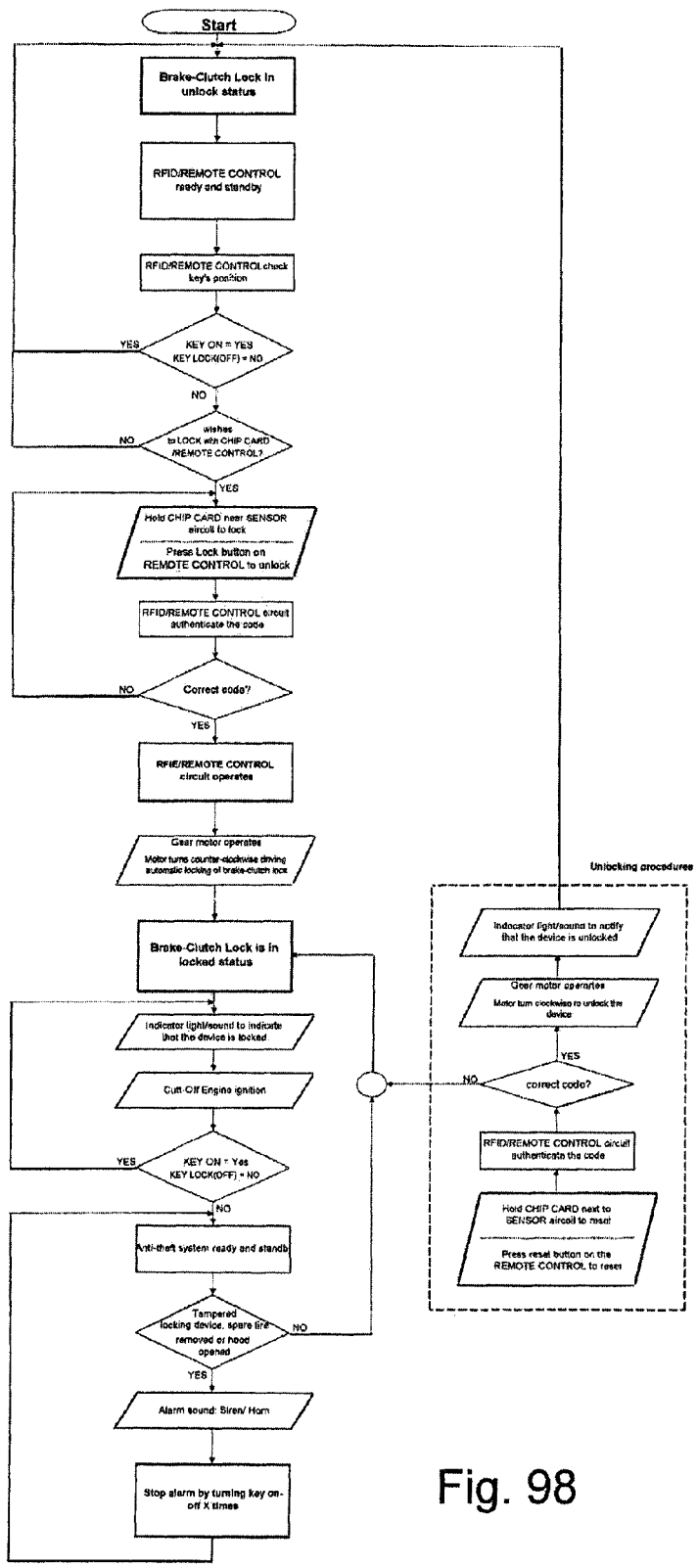
FIG. 98 is a flow diagram of the operational configuration of the vehicle security system of FIG. 88 configured with a gear lever locking device.
Figures 99, 100:
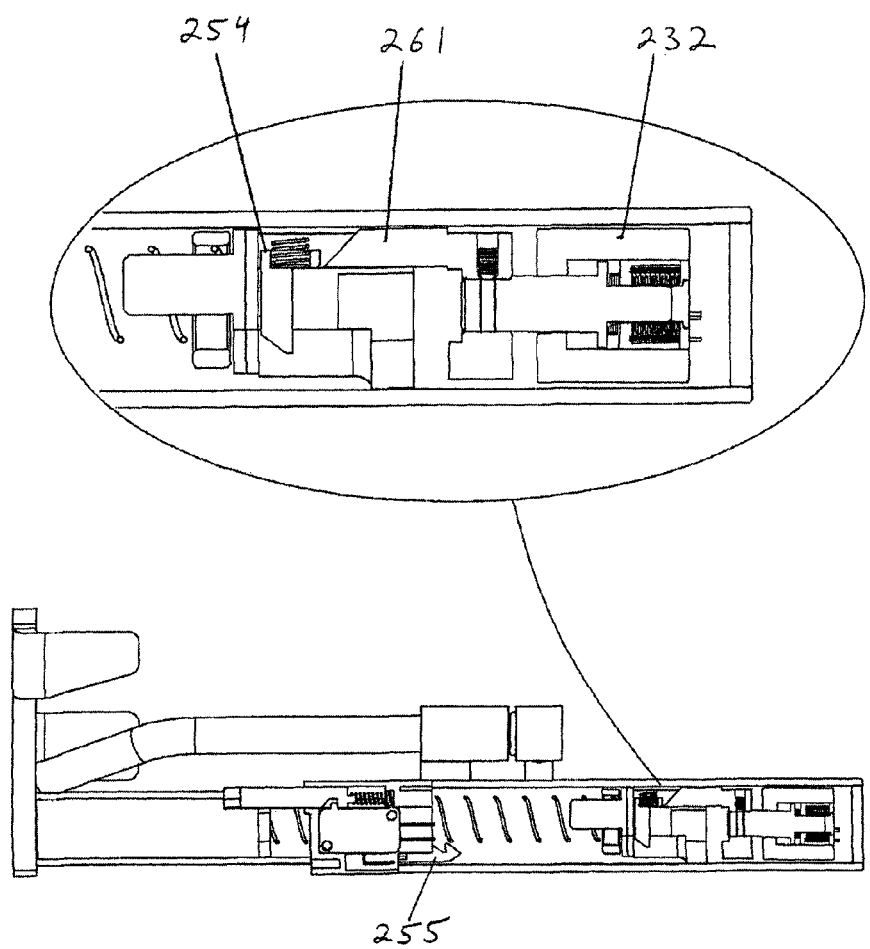
FIG. 99 is a partial cross-sectional plan view of an alternative aspect of the vehicle security system of FIG. 92 with a driving function locking device in an unlocked position, a locking member assembly in an unlocked position, and a solenoid driving member.
FIG. 100 is an enlarged partial view of the driving function locking device of FIG. 99.
Figures 101, 102:
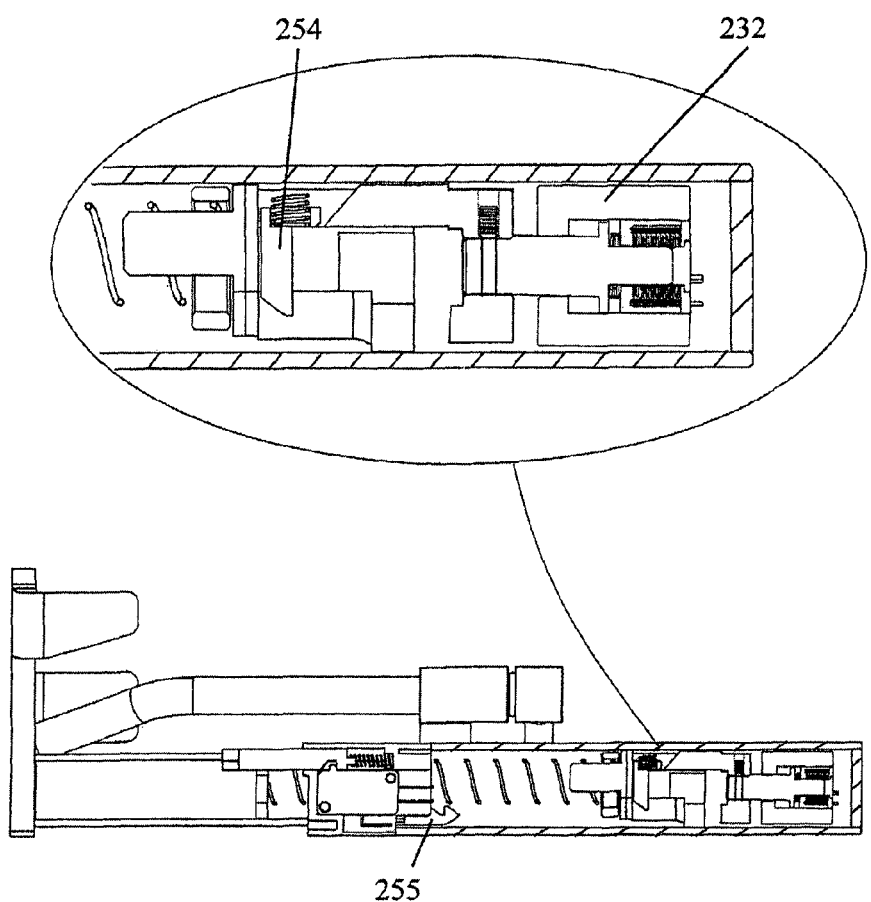
FIG. 101 is a partial cross-sectional plan view of the vehicle security system of FIG. 99 with the locking member assembly in a locked position.
FIG. 102 is an enlarged partial view of the driving function locking device of FIG. 101.

FIG. 98 shows an operational flow diagram of the vehicle security system 200 having a gear lever locking device in accordance with the first aspect of the third preferred embodiment. In operation, the brake/clutch locking device 212' is manually or automatically moved to the ready to lock position and then locked by activating the remote control 216 lock function or positioning the chip card 218 near an aircoil sensor 252.

Figure 92:
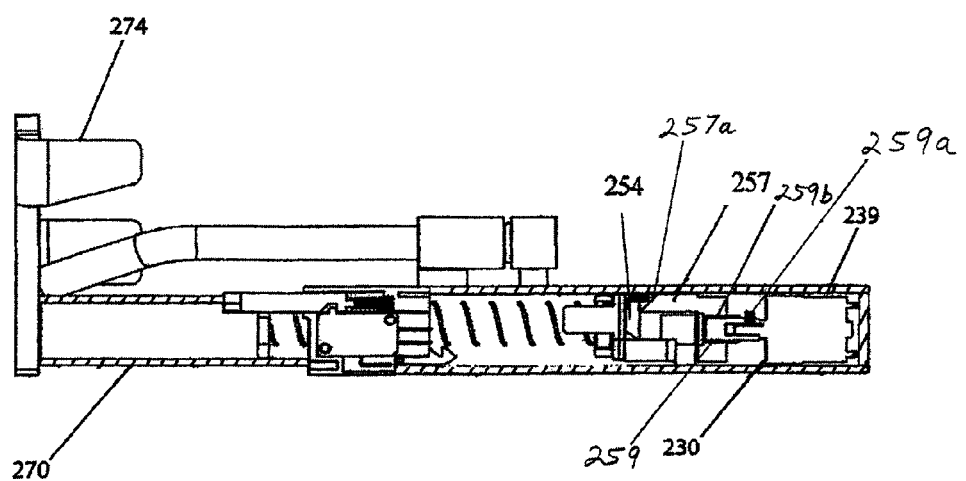
FIG. 92 is a partial cross-sectional plan view of the vehicle security system of FIG. 88 with a driving function locking device in an unlocked position and a locking member assembly in the unlocked position.
Figure 93:
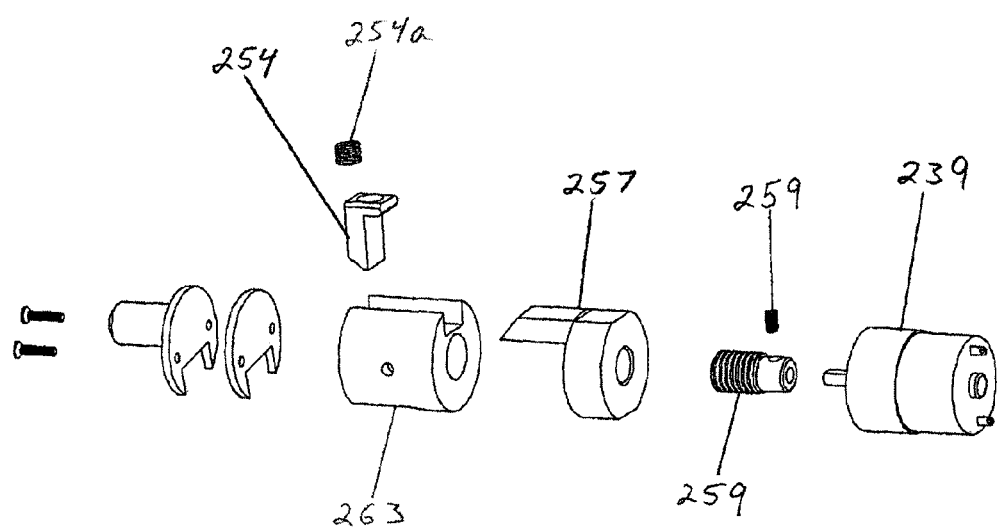
FIG. 93 is an exploded perspective view of a motor and lock assembly applicable to the embodiment of FIG. 88.
Figure 94:
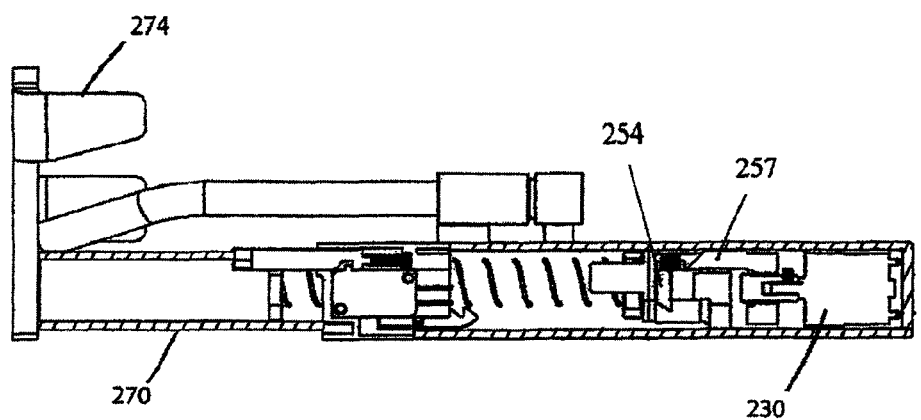
FIG. 94 is a partial cross-sectional plan view of the vehicle security system of FIG. 92 with the driving function locking device in the unlocked position and the locking member assembly in the locked position.

FIGS. 92 and 94 show the brake/clutch locking device 212' in the unlocked position before the brake/clutch locking device 212' is manually moved to the locking position. In FIG. 94, the pin driver 257 is slightly spaced from a locking pin 254. In FIG. 92, the pin driver 257 has been driven axially to push the locking pin 254 upwards so as to prevent the locking pin 254 from moving to a locked position. The pin driver 257 is configured to move axially within the locking chamber to move the locking pin 254 between locked and unlocked positions. The pin driver 257 has a slanted face 257a that corresponds to the configuration of the locking pin 254 and a hollow center 257b with female threads that engages threads on a connector 259. The connector 259 is coupled to the motor 239. Specifically, the connector 259 is a cylindrical connector having male threads and a hollow interior for receiving an extension member extending from the motor 239. The connector 259 also has an aperture for receiving a set screw 259a for fastening the connector 259 to the motor 239. FIG. 93 shows an exploded perspective view of the motor 239, connector 259, pin driver 257 and locking pin 254 assembly.

Figure 95:
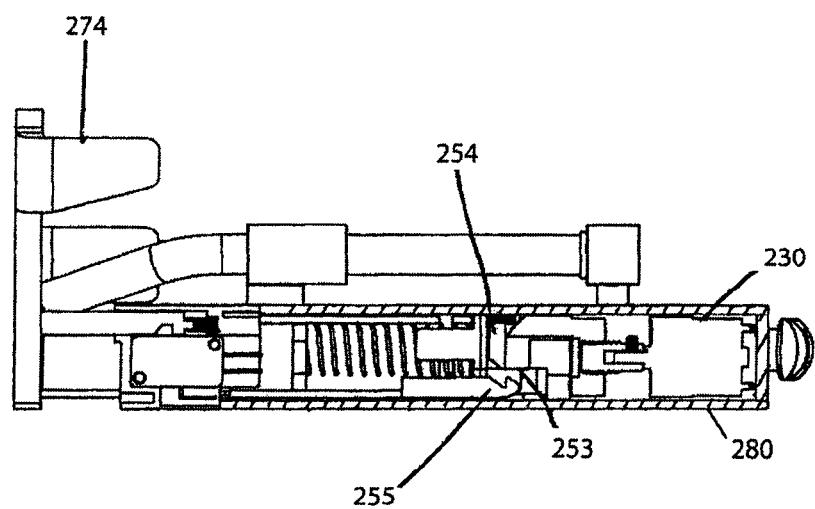
FIG. 95 is a partial cross-sectional plan view of the vehicle security system of FIG. 89 with a driving function locking device in a locking position and a locking member assembly in the unlocked position.
Figure 96:
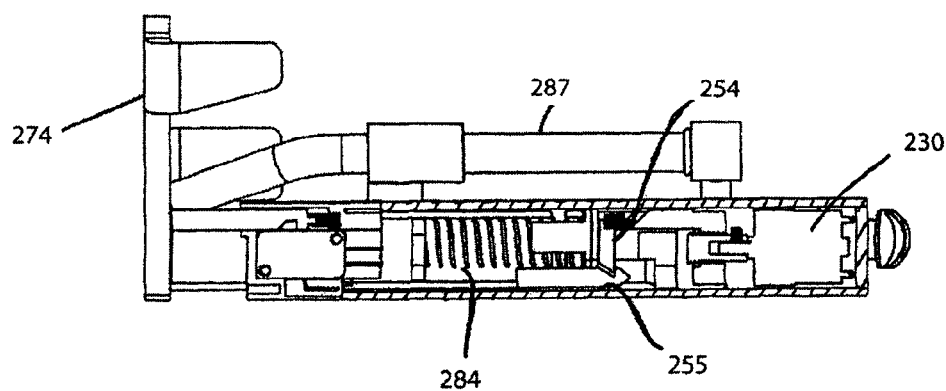
FIG. 96 is a partial cross-sectional plan view of the vehicle security system of FIG. 95 with the driving function locking device in the locking position and the locking member assembly in the locked position.
Figure 97:
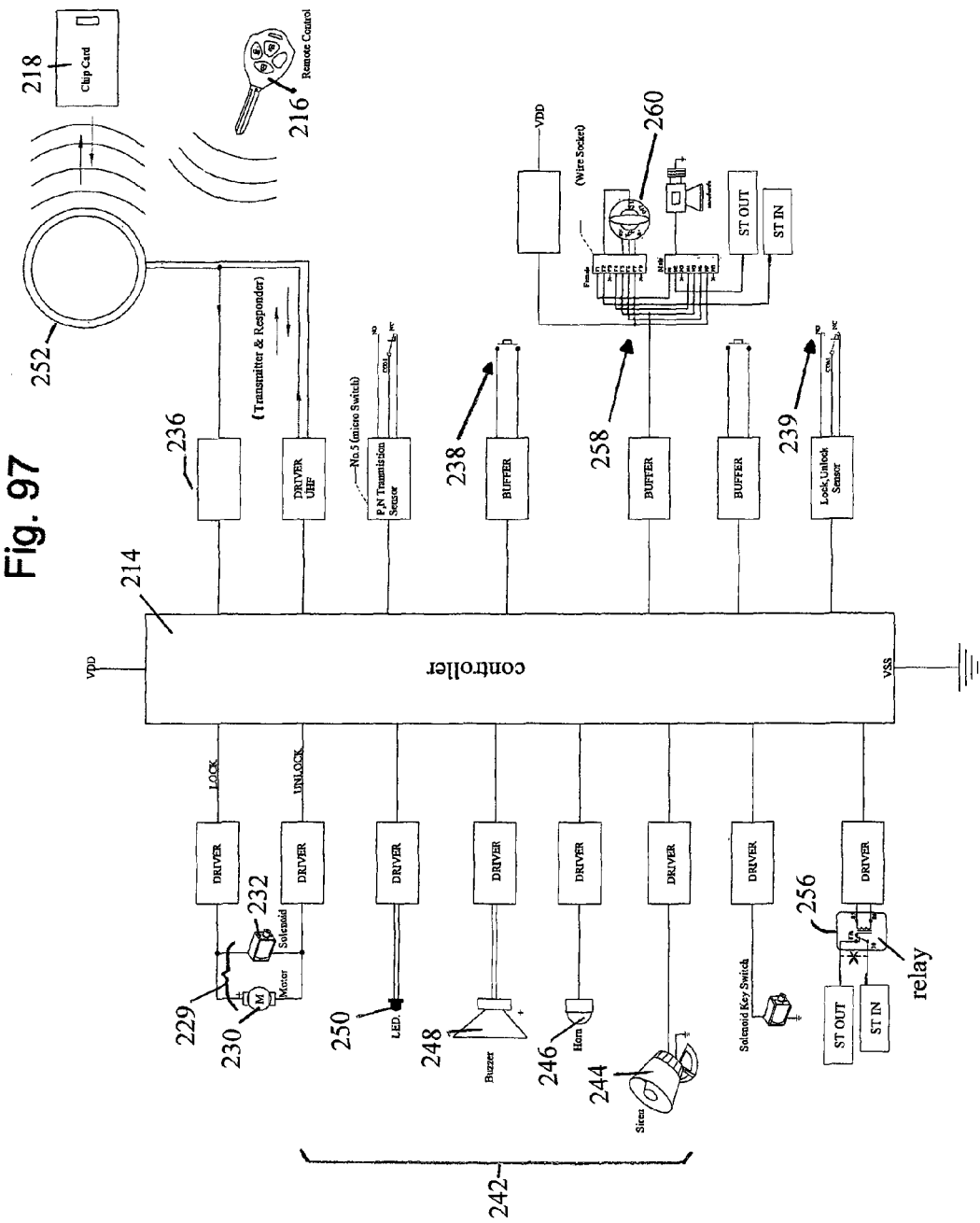
FIG. 97 is a schematic diagram of a controller of the vehicle security system of FIG. 88.

FIGS. 95 and 96 show the brake/clutch locking device 212' in the ready to lock and locking positions. Specifically, FIG. 95 shows the brake/clutch locking device 212' in the locking position before a locking pin 254 of a locking member assembly 253 is moved to the locked position to lock the brake/clutch locking device 212' in a locked state. The brake/clutch locking device 212' is manually moved to this position by the user. FIG. 96 shows the brake/clutch locking device 212' in the locked state with the locking pin 254 engaging a locking member 255 of the locking member assembly 253.

The remote control 216 and chip card 218 are each configured to transmit a signal to the controller's transceiver 236 that activates the motor 230 or solenoid 232 to move the brake/clutch locking device 212' to the locked position. For example, as shown in FIGS. 95 and 96, upon the user activating the remote control 216 or using the chip card 218 to activate the locking function of the brake/clutch locking device 212', the motor 230 drives the locking pin 254 to move from the unlocked position (FIG. 95) to the locked position (FIG. 96). Preferably, the remote control 216 is an RFID remote control.

In sum, the third preferred embodiment advantageously provides a vehicle security system 200 that operates without the use of a key, thereby rendering the vehicle security system more resistant to tampering compared to key based vehicle security systems. The third preferred embodiment provides a vehicle security system having a driving function locking device manually movable between a locked position for disabling a driving function of a vehicle and an unlocked position. The driving function locking device also includes the driving member 229 that moves the locking member assembly 253 between a locked position and an unlocked position for securing the driving function locking device in the locked position. The vehicle security system also includes the controller 214 connected to an electrical power supply of the vehicle and in communication with the transceiver 236 and either the remote control 216 or the chip card 218 that communicates with the transceiver 236 to lock and unlock the driving function locking device 212.

The controller 214 is also in communication with the advisor 242, the engine cut-off 256 for disabling an engine starter of the vehicle and the shock sensor 238. The operation and configuration of the advisor 242, the engine cut-off 256 and the shock sensor 238 is the same as discussed in the first preferred embodiment of the present invention. The controller 214 is configured to activate the advisor 242 to advise when the locking member assembly 253 of the driving function locking device 212 is in the locked position, and activates the engine cut-off 256 when the locking member assembly 253 is in the locked position.

Figure 107:
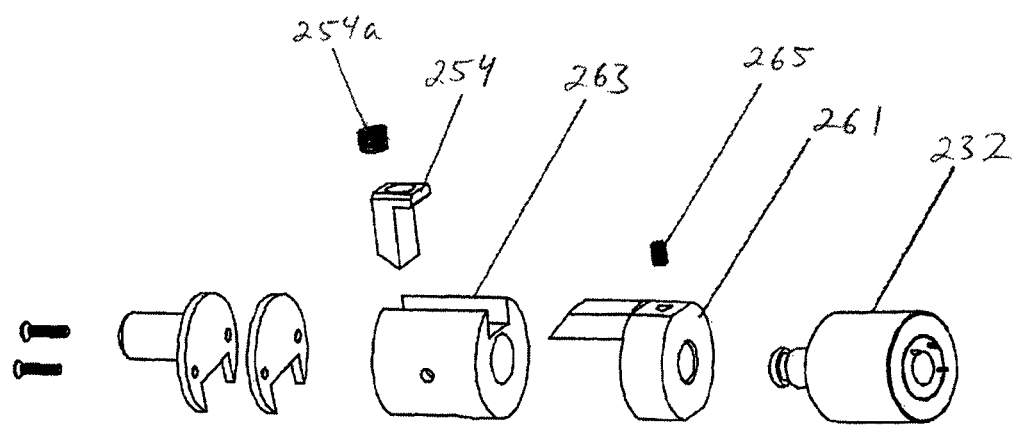
FIG. 107 is an exploded perspective view of a solenoid and lock assembly applicable to the embodiment of FIG. 99.

FIGS. 99-106 illustrate the brake/clutch locking device 212' having a driving member configured as a solenoid 232 instead of the motor 230, as for the first aspect of the third preferred embodiment, for driving movement of the locking pin 254 between the locked and unlocked position. FIG. 107 shows an exploded view of the solenoid 232, locking pin 254, a biasing member 254a, engagement member 261, and locking chamber 263 for receiving an extension member of the engagement member 261. The engagement member 261 has an annular end for receiving a shaft of the solenoid 232 and an elongated extension member for engaging the locking pin 254. The engagement member 216 and solenoid shaft are connected via a screw 265. The solenoid 232 operatively engages the engagement member 261 to move the engagement member 261 between first and second positions. In the first position the engagement member 261 moves the locking pin 254 to an unlocking position and in the second position, the engagement member 261 is spaced from the locking pin 254 and the biasing member 254a biases the locking pin 254 to a locking position.

To unlock the vehicle security system 200, the user can activate the remote control's unlock function or present the chip card 218 near the aircoil sensor 252 to send an unlocking command to the controller 214. Upon receipt of the unlocking command and authentication of the unlocking command, the controller 214 activates the motor 230 or solenoid 232, as the case may be, to move the locking pin 254 from the locked position to the unlocked position.

Figure 109:
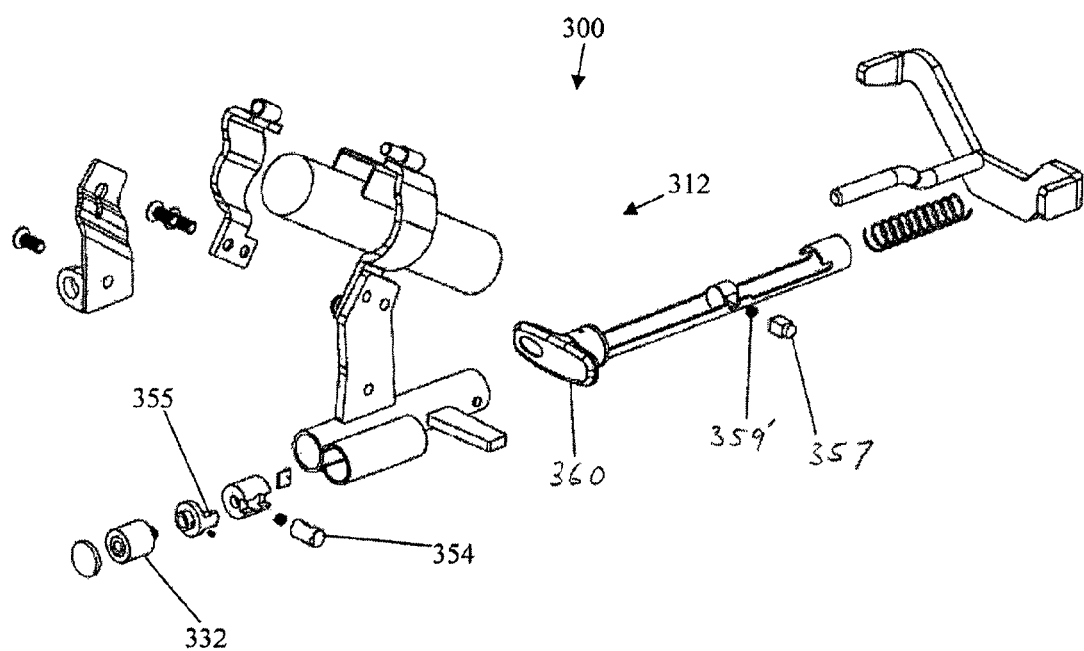
FIG. 109 is an exploded perspective view of a vehicle security system in accordance with a fourth preferred embodiment of the present invention.

FIG. 109 illustrates a first aspect of a fourth preferred embodiment of a vehicle security system 300 in accordance with the present invention. The vehicle security system 300 operates similarly to the vehicle security system 200 described above and has a driving function locking device 312 that is similar in structure and function to that of the brake/clutch locking device 2490 described above. The driving function locking device 312 also includes a solenoid 332 for moving a locking pin 354 between unlocked (FIG. 110) and locked (FIG. 113) position, and a hand pull 360. The locking pin 354 is positioned and oriented transversely to an engagement member 355 that is connected to the solenoid 332.

Figures 113, 113A:
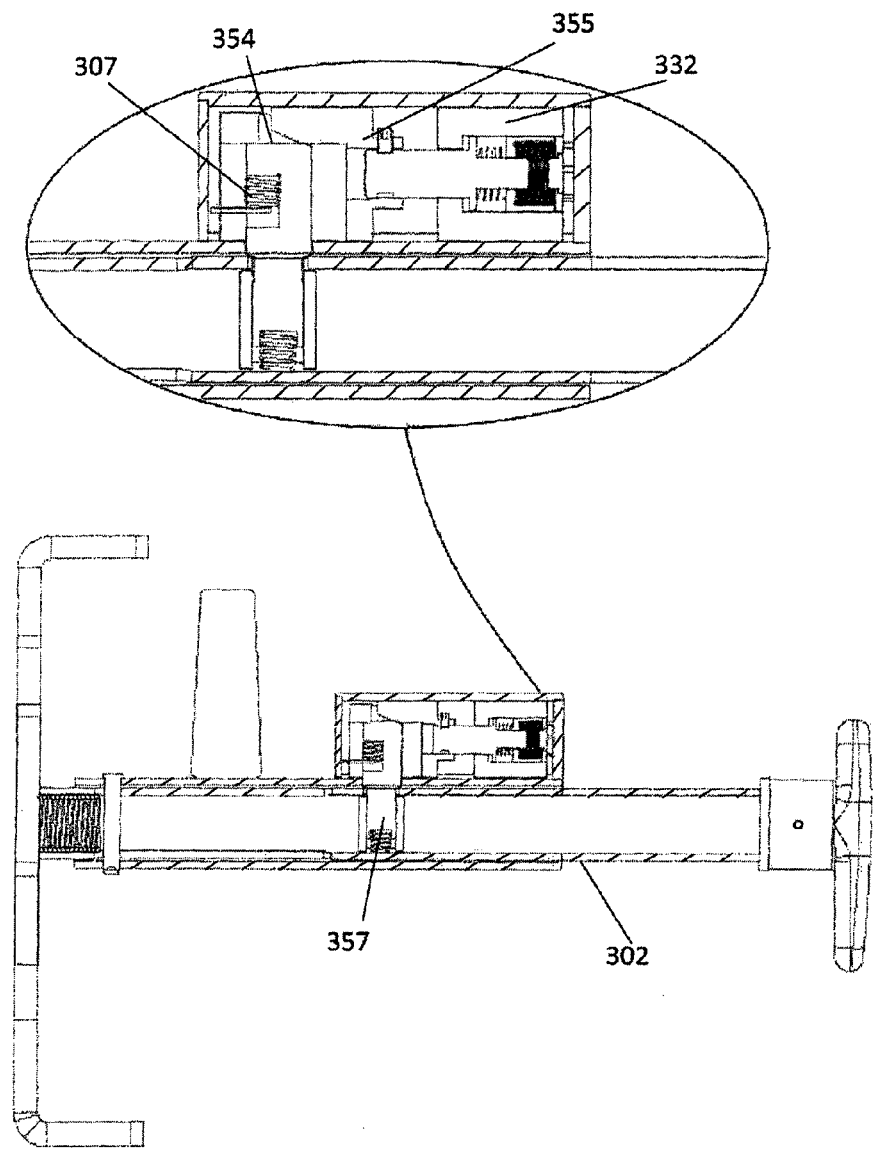

In operation, the solenoid 332 is configured to move in a direction parallel to a longitudinal direction of a slidable axial tube 302. As the solenoid 332 moves from a first position (FIG. 110) to a second position (FIG. 113) spaced from the first position, a chamfered engagement end 359 operatively engages a proximal end of the locking pin 354, which is positioned within a locking chamber 309, to move the locking pin 354 in a transverse direction relative to a direction of travel of the solenoid 332 and engagement member 355. Specially, the engagement member 355, which is mounted to a locking chamber 309, drives the locking pin 354 to move towards the slidable axial tube 302 and into an aperture 303 of the sliding axial tube 302 and a recess 305 of an axial tube 301, as shown in FIG. 113.

In other words, the engagement member 355, which includes an annular end and an extension member extending from the annular end, is operatively connected to the solenoid 332. The locking chamber 309 has a recess for receiving the engagement member and the locking pin 354. The solenoid 332 operatively engages the engagement member 355 to move the engagement member 355 between first and second positions. In the first position, a biasing member 307 biases the locking pin 354 to an unlocking position and in the second position the engagement member 355 engages the locking pin 354 to move the locking pin 354 in an opposite direction in which the locking pin 354 is biased by the biasing member 307 to a locking position.

Figures 110, 111:
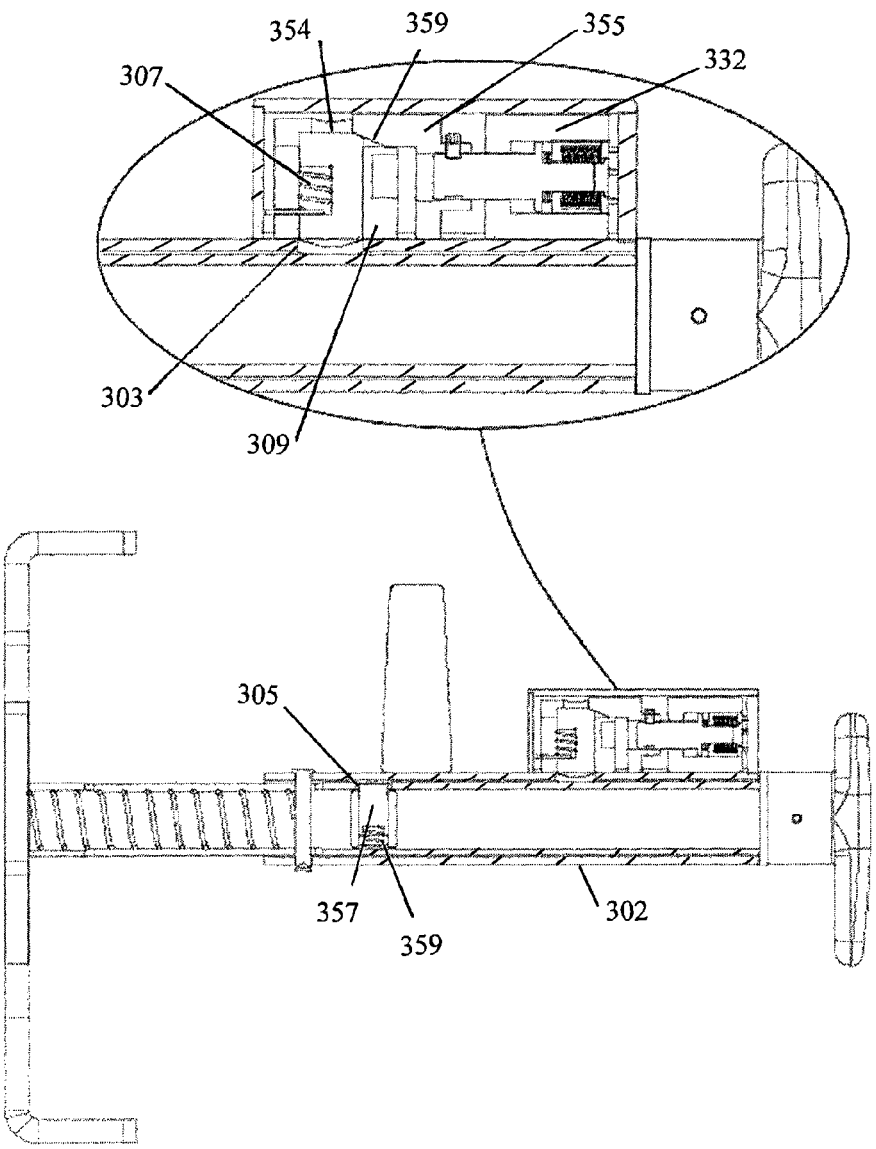
FIG. 110 is a partial cross-sectional elevational view of the vehicle security system of FIG. 109 in an unlocked position.
FIG. 111 is an enlarged partial view of a solenoid locking means of the vehicle security system of FIG. 109 in an unlocked position.

Referring to FIG. 110, in the unlocked position, the locking pin 354 is in a first position spaced furthest from the slidable axial tube 302 by a biasing member 307 that biases the locking pin 354 away from the slidable axial tube 302. The biasing member 307 can be a spring.

Figures 112, 112A:
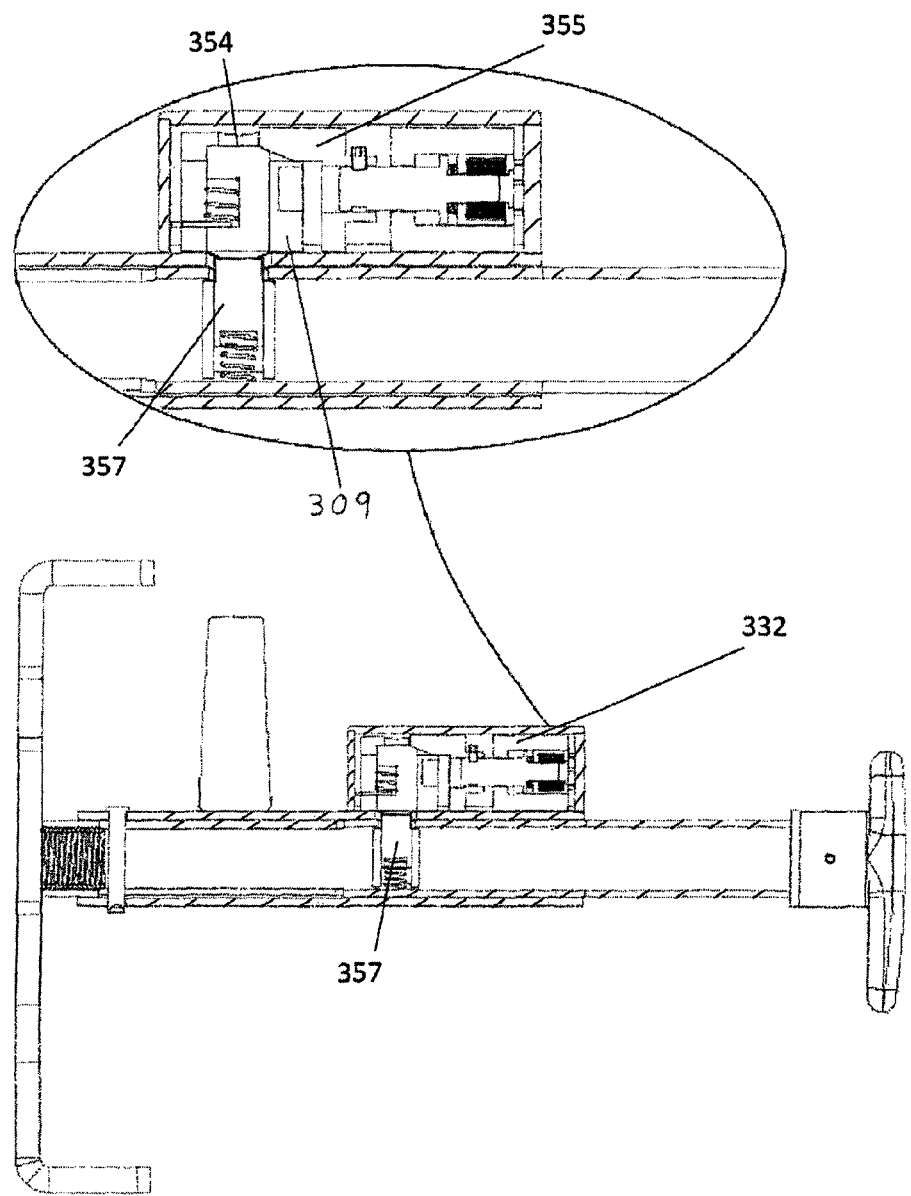
FIG. 112 is a partial cross-sectional elevational view of the vehicle security system of FIG. 109 in a locking position.
FIG. 112A is an enlarged partial view of a solenoid locking means of the vehicle security system of FIG. 109 in a locking position.

The slidable axial tube 302 includes a push pin 357 that is biased by another biasing member 359', which is preferably a compression spring. Thus, when the driving function locking device 312 is moved to the locking position (FIG. 112), the biasing member 259 biases the push pin 359' into the recess 303, thereby temporarily locking the driving function locking device 312 in the locking position until the solenoid 332 can fully lock the driving function locking device 312 in the locked position via the locking pin 354, as shown in FIG. 113.

Figure 111A:
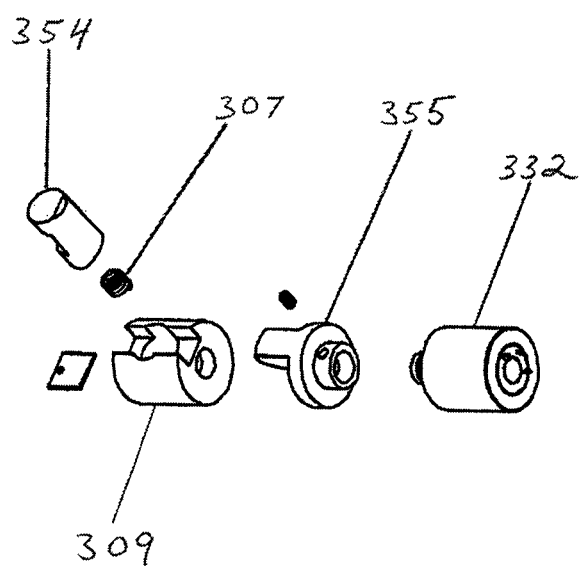
FIG. 111A is an exploded perspective view of a solenoid and lock assembly applicable to the embodiment of FIG. 110.

In other words, when the vehicle's engine is turned off or in the "KEY OFF" position, the controller sends a signal to the solenoid 332 causing the shaft of the solenoid to move away (to the opposite side) causing the engagement member 355 to move away from the locking pin 354. The spring 307 will bias the locking pin 354 away from the aperture 303. The push pin 357 is moved to the locking position (FIG. 112) once the hand-pull of the driving function locking device 312 is pulled by the user. Unlocking with the chip card or remote control causes the solenoid 332 to move the engagement member 355 to push the locking pin 354 away from the aperture 303 thereby releasing the locking pin 354. The spring within the slidable axial tube 302 will bias the driving function locking device 312 to move to the unlocked position. FIG. 111A shows an exploded view of the solenoid 332, engagement member 355, locking pin 354, spring 307 and locking chamber 309.

Figures 114, 114A:
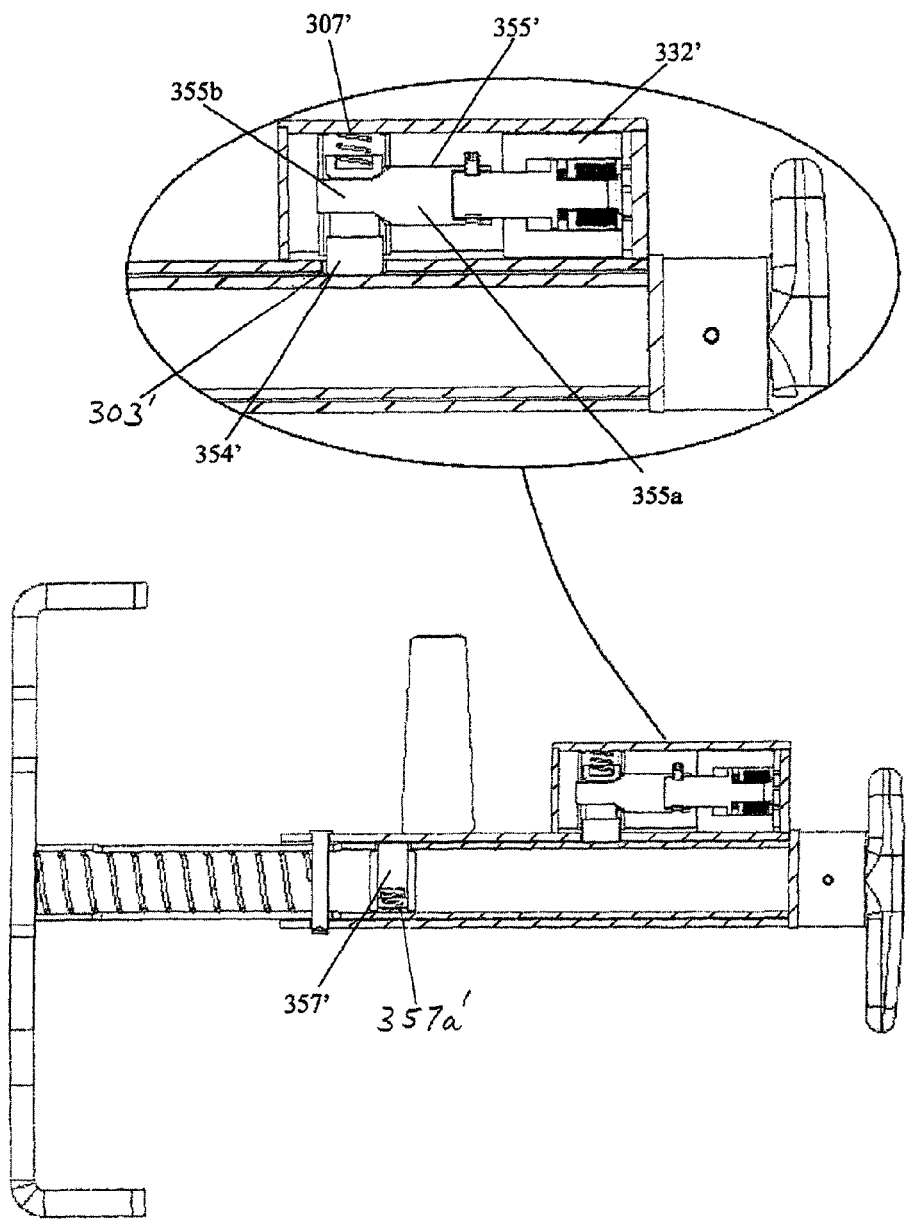
Figures 115, 115A:
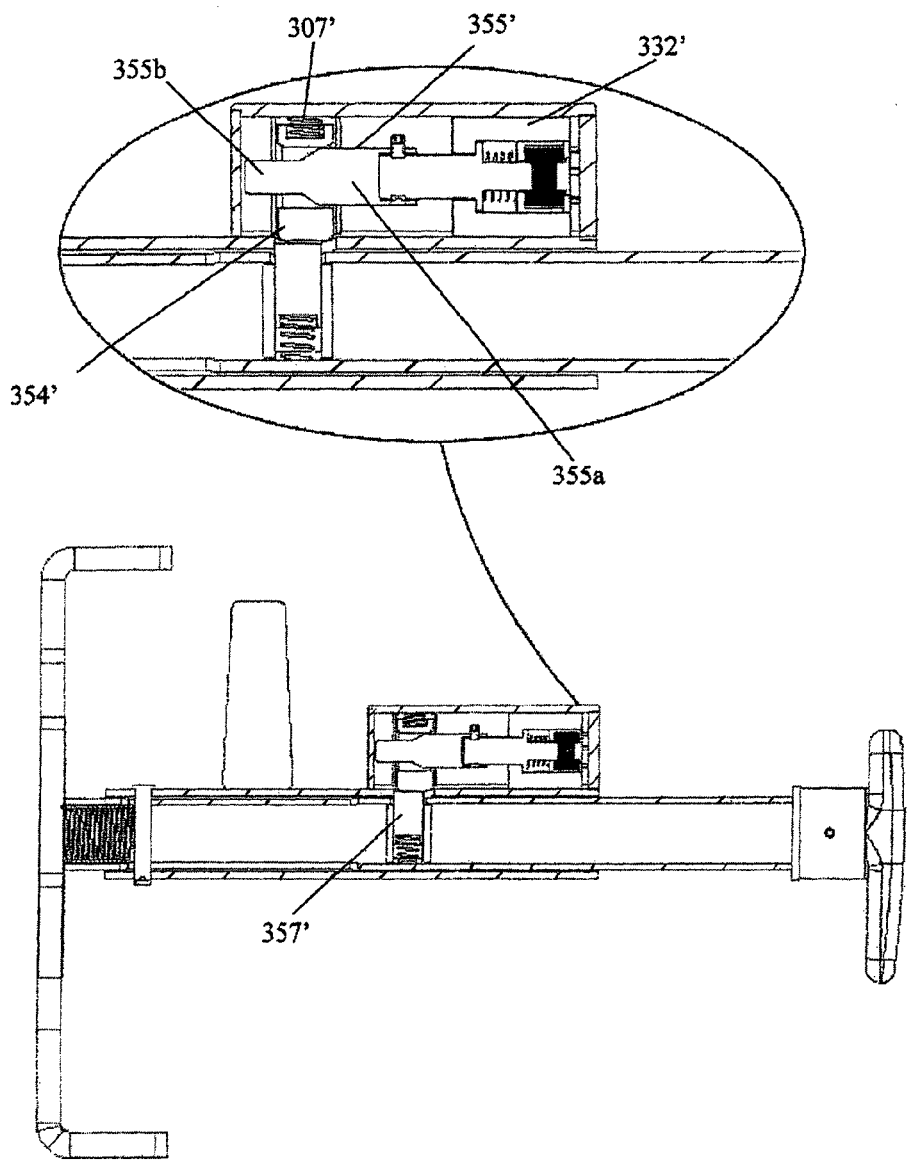
Figure 116:
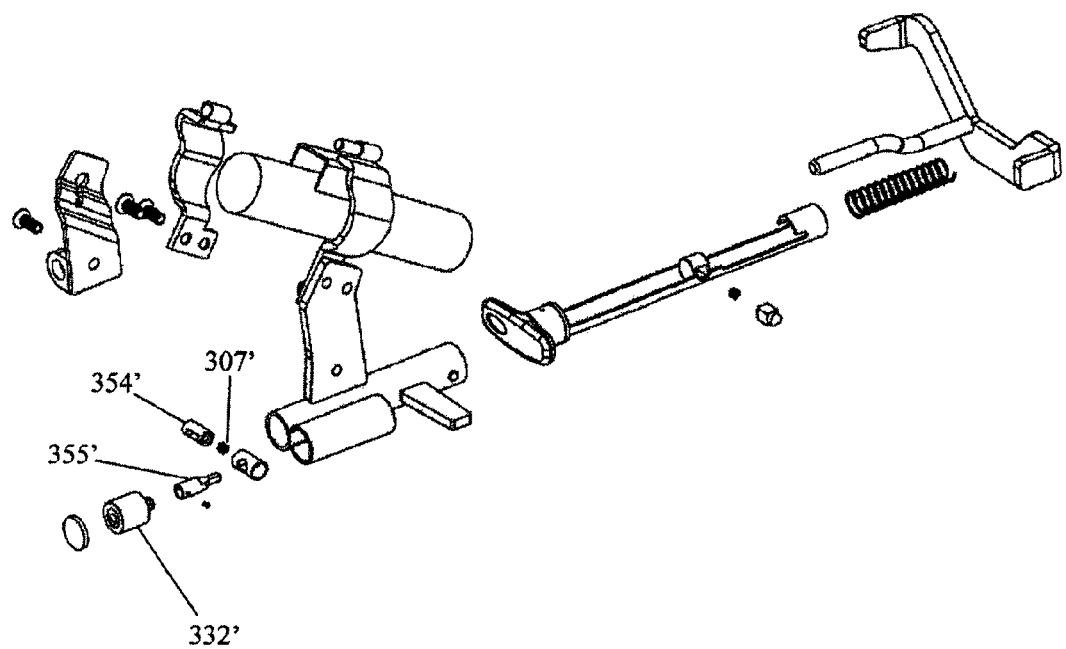
Figure 117:
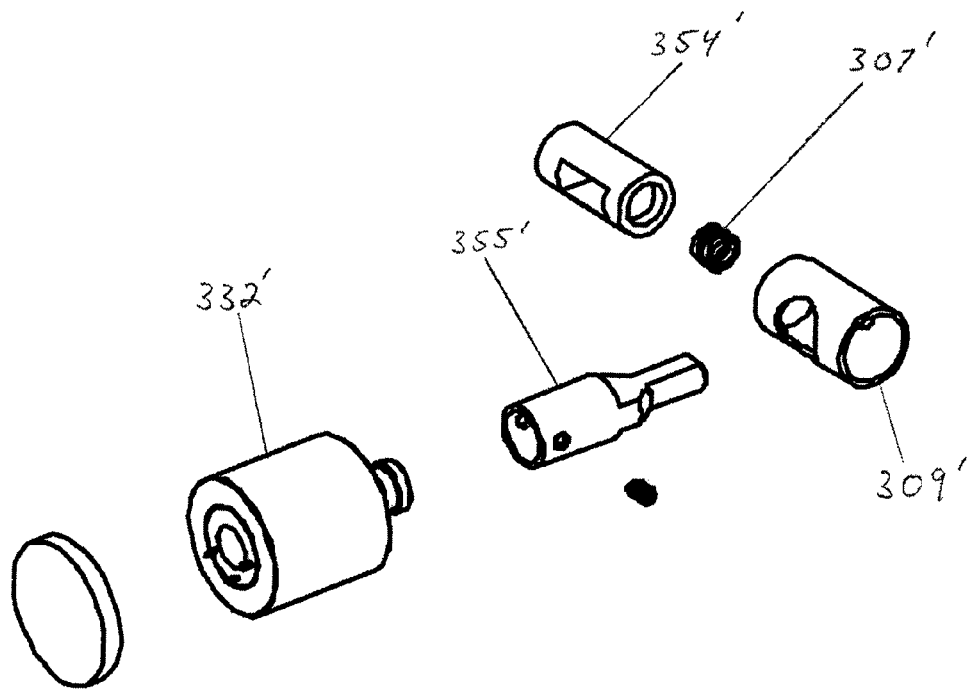

FIGS. 114-115 illustrate a second aspect of the fourth preferred embodiment of the vehicle security system 300 in accordance with the present invention. FIGS. 114 and 114A illustrate the driving function locking device 312 in an unlocked position and FIGS. 115 and 115A illustrate the driving function locking device 312 in a locked position. Similar to the first aspect, the second aspect of the fourth preferred embodiment has a motor gear 332', an engagement member 355', a locking pin 354' and a biasing member 307'. The locking pin 354', which is positioned within a locking chamber 309', is configured as shown in FIGS. 114A, 115A and 117. The engagement member 355' is driven by the motor 332'. The engagement member 355' has a body portion 355a and a nose portion 355b extending from the body portion 355a. The nose portion 355b has a smaller overall diameter compared to the body portion 355a. FIG. 117 shows an exploded view of the solenoid 332', engagement member 355', locking pin 354' and spring 307'.

In the unlocked position (FIGS. 114 and 114A), the push pin 357' is out of alignment with the locking pin 354'. Further, the engagement member's nose portion 355b is positioned within an aperture of the locking pin 354' such that a biasing member 307' biases the locking pin to engage the nose portion 355b. The biasing member 307' can be, e.g., a compression spring.

In the locked position (FIGS. 115 and 115A), the engagement member 355' is driven axially such that the body portion 355a is positioned within the locking pin 354' aperture. When in the locked position, the push pin 357 is also aligned with the position of the locking pin 354' to lock the driving function locking device 312 in place.

In operation, when the vehicle's engine is running or in the "KEY ON" position, the solenoid's shaft moves allowing the engagement member 355' to move away from the locking pin 354'. The spring 307' biases the locking pin 354' to move adjacent to an aperture 303' of the sliding axial tube to effective close the aperture 303' and preventing locking of the driving function locking device 312. When the vehicle's engine is not running or "key off", the solenoid's shaft is biased away allowing the engagement member 355' to move into the aperture 303' and causing the locking pin 354' to move away from the aperture. Thus, as the hand-pull of the driving function locking device 312 is pulled, the push pin 357' is moved to the locking position. Then the spring 357a' biases the push pin 357' into the aperture 303' to lock the driving function locking device 312 in position. At this time the alarm is in the standby position. The driving function locking device can be unlocked with the chip card or remote.

In other words, the engagement member 355' is operatively connected to the solenoid 332', which moves the engagement member 355' between first and second positions. In the first position the nose portion of the engagement member 355' is received within the locking chamber 309' and a biasing member 307' biases the locking pin 354' to an unlocking position. In the second position, the body portion of the engagement member 355' is received within the locking chamber 309' and moves the locking pin 354' in a direction opposite in which the locking pin 354' is biased by the biasing member 307' to a locking position.

Referring to FIGS. 118-126, in accordance with a first aspect of a fifth preferred embodiment, the present invention provides a vehicle security system as shown. The vehicle security system is directed to avoiding problems associated with an inability to start the vehicle when a micro-controller of the vehicle security system is broken or damaged. The vehicle security system includes a controller 403 and micro-controllers 404 which control operation of various sensors (including infrared sensor, key sensor, LED, buzzer, horn, siren, etc.) of the vehicle security system's locking device. The micro-controller 404 is connected to a wiring set which receives signals from key switching and sends electrical signals to the vehicle security system. If the micro-controller 404 is broken or damaged, the relay inside the controller 403 will not operate, and hence it will not be possible to start the vehicle. Therefore, the vehicle security system of the present embodiment aims to eliminate this problem by introducing an additional micro-switch to enable starting of the vehicle so that the vehicle owner can e.g., bring the vehicle in for repairing the damaged micro-controller.

The vehicle security system includes a wiring set having a male wiring socket 401 which is electrically connected to the vehicle's existing electrical system, and a female wiring socket 402 which is electrically connected to a key hole of the vehicle. The male and female sockets 401, 402 are electrically connected. A first micro-switch 414 and a second micro-switch 415 are assembled within a housing which is assembled to a brake/clutch locking device or gear locking device applicable to the present invention, such as those described in the above embodiments. Anti-theft sensors, such as a shock sensor, infrared sensor, spare tire sensor, horn/siren, LED are each electrically connected to the controller 403 of the vehicle security system. The male and female wiring sockets 401, 402 are electrically connected to the first micro-switch 414, the second micro-switch 415 and the controller 403 of the vehicle security system.

Figure 118:
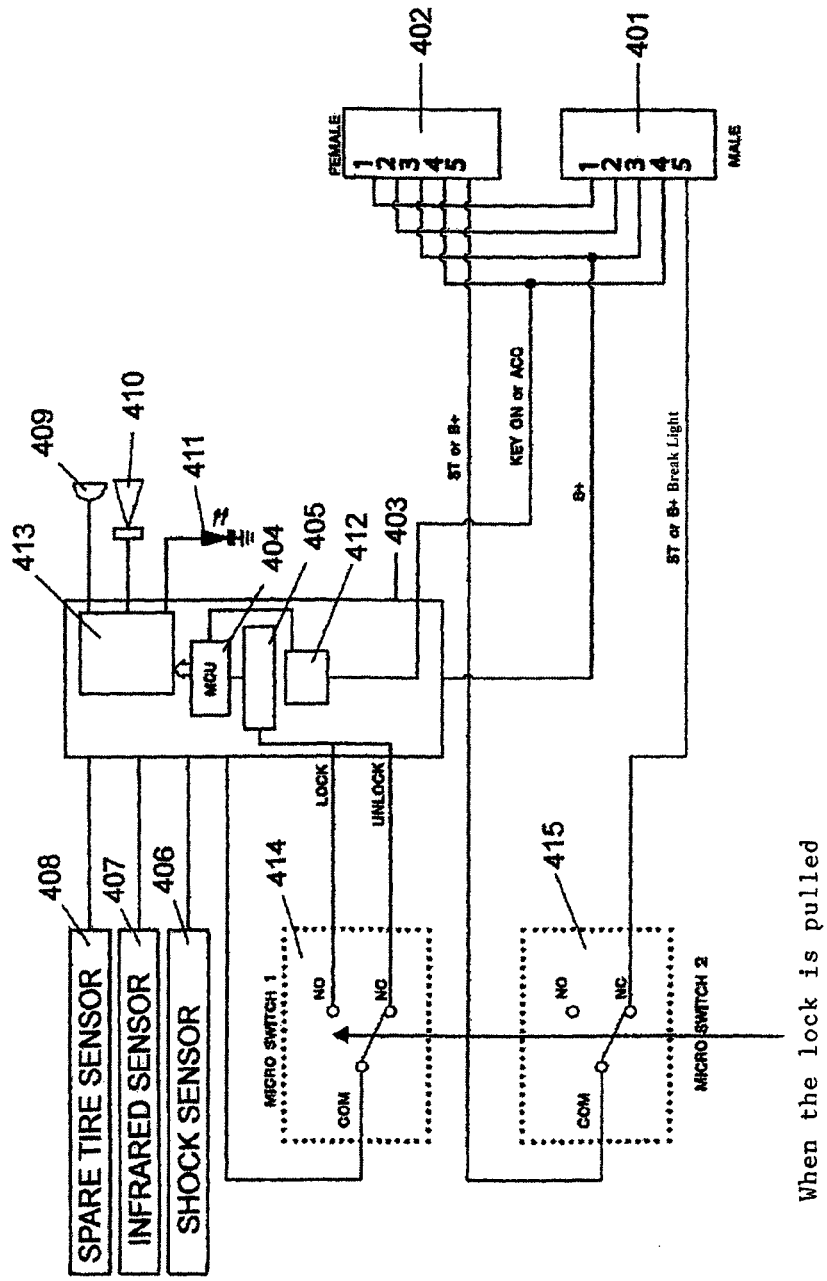

FIG. 118 illustrates an electrical circuit diagram of the first aspect of the fifth preferred embodiment of the present invention and includes the male wiring socket 401 which is electrically connected to the vehicle's existing electrical system, and the female wiring socket 402 which is electrically connected to a key hole of the vehicle. The terminals of the male wiring socket 401 are electrically connected to the respective corresponding terminals of the female wiring socket 402.

The controller 403 of the vehicle security system includes a micro-controller 404 for controlling operations of various sensors (as mentioned above) and is electrically connected to an energy saving unit 405 for cutting off electrical connection to the micro-controller 404 (e.g., when in an unlocked state). The micro-controller 404 is electrically connected to a key switching sensor (to Key on or ACC) and feed such signals to the micro-controller 404. Wherein at ACC the micro-controller sends electrical signals to and detects operation of the sensors e.g., shock sensor 406, infrared sensor 407, spare tire sensor 408, buzzer 409, horn/siren 410, and LED 411.

The first micro-switch 414 and the second micro-switch 415 are assembled inside a housing (not shown). The first micro-switch and the second micro-switch 414, 415 operate in concert for locking and unlocking the vehicle security system. In an unlocking status, the first micro-switch 414 and the second micro-switch 415 are at COM and NC.

In the unlocked status, the COM at the first micro-switch 414 is electrically connected to the controller 403, and the NC at the first micro-switch 414 is connected to the energy saving unit 405. NO at the first micro-switch 414 is electrically connected to the energy saving unit 405 in the locked status.

One of the terminals, for example, the 5th terminal of the male wiring socket 401 is a start light or a wire direct from a battery B+ or brake light electrically connected to the NC of the second micro-switch 415. One of the terminals, for example, the 3rd terminal of the male wiring socket 401 and the 3rd terminal of the female wiring socket 402, both of which are electrically connected to one another, are electrically connected to a wire from the battery to be connected to the controller 403. One of the terminals, for example, the 4th terminal of the male wiring socket 401 and the 4th terminal of the female wiring socket 402, both of which are electrically connected to one another, are electrically connected to a wire at the key hole at Key on or ACC to be connected to a key switch sensor.

The 5th terminal of the female wiring socket is a Start light or a wire direct from a battery B+ or brake light and is electrically connected to COM of the second micro-switch 415.

As the brake/clutch locking device or the gear locking-device of the vehicle security system (such as those described in the above embodiments) is pulled to a lock position, the first and the second micro-switches 414, 415 change their positioning at COM and NC to COM and NO. At this position, the key used for starting the vehicle is turned and the electrical is shifted from the unlocked position to the locked position and cuts off of the electrical, which connects the key hole and the vehicle starting system. For vehicles with a push start button this will cut off the electrical from the battery or brake light connected the start button and the Body Control Module (BCM or ECU).

Thereafter, the controller 403 of the vehicle security system operates to check the operation of various sensors and whether such sensors are operational i.e., functioning and able. If damages or irregularities are detected, the micro-controller 404 will send a signal to the controller 403 to emit notification (e.g., via buzzer) to notify the vehicle owner so that the owner can bring the vehicle in for repairs. If no damages or irregularities are detected, the vehicle security system will enter a standby mode as programmed and the micro-controller 404 sends a signal to the controller 403 to activate the LED to a blinking status to notify that the vehicle security system is functioning and in standby mode.

In a locked position and standby mode, if a key is turned ON, the micro-controller 404 will emit a notification to warn the user that the vehicle security system is in a locked status and that it should be unlocked before starting the vehicle.

In a locked position and standby mode, if other keys or other foreign objects are inserted into the key hole, the infrared sensor at the key hole will activate. Further, if there is tampering of the vehicle security system, the shock sensor 406 will activate, or if a spare tire is removed, the spare tire sensor 408 will activate. These will lead to the micro-controller 404 to send signals to the controller 403 to send signals to the horn or siren 410 to emit warning sounds notifying the owner that a theft is possibly taking place.

As the vehicle security system unlocked, the energy saving unit 405 will cut off electrical power supplied to each sensor/micro-controller within the controller to prolong the life span of the items. The vehicle's electrical system will return to normal.

Figure 119:
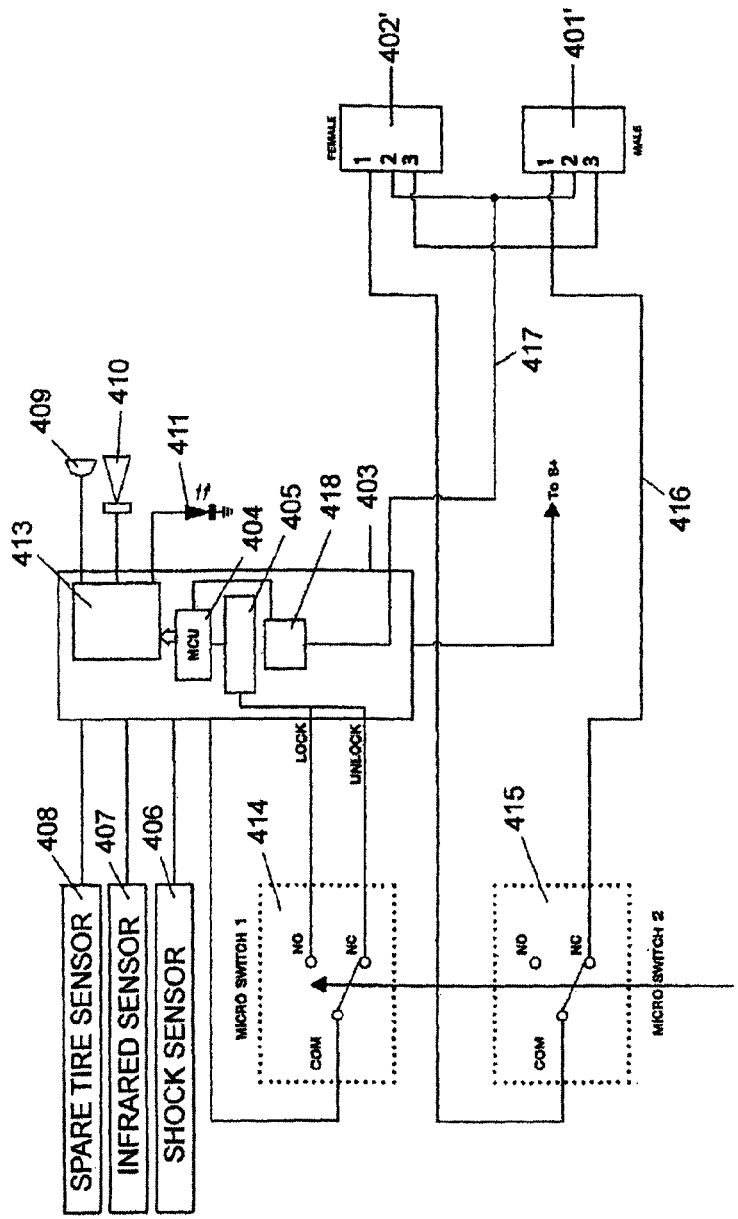

FIG. 119 illustrates a second aspect of the fifth preferred embodiment of the present invention. This embodiment operates similarly to the first aspect of the fifth preferred embodiment. However, in this aspect, the male and female wiring sockets 401', 402' are now connected to a brake light system of the vehicle (instead of the key hole as in the first aspect of the fifth preferred embodiment) and are now called male/female brake light wiring sockets. The male brake light wiring socket 401' and the female brake light wiring socket 402' are electrically connected to the brake light system. The 2nd and 3rd terminals of the male brake light wiring socket 401' are connected to the respective 2nd and 3rd terminals of the female brake light wiring socket 402'. The micro-controller 404 is connected to other various sensors as described in the first aspect of the fifth preferred embodiment. The micro-controller 404 is also connected to a sensor connected to a braking pad to detect braking of the vehicle and feed a signal received therefrom to the micro-controller 404 which will send signals to other various sensors such as shock sensor 406, infrared sensor 407, spare tire sensor 408, controller 413 of buzzer 9, horn/siren 410, and LED 411.

The first micro-switch 414 and the second micro-switch 415 are assembled inside a housing (not shown). The first micro-switch 414 and the second micro-switch 415 operate in concert upon locking and unlocking of the vehicle security system. In the unlocking status, the first micro-switch and the second micro-switch 414, 415 are at COM and NC.

The COM at the first micro-switch 414 is electrically connected to the controller 403 and the NC at the first micro-switch 414 is connected to the energy saving unit 405 in the unlocked status. NO at the first micro-switch 414 is electrically connected to the energy saving unit 405 in the locked status.

The 1st terminal of the male brake light wiring socket 401' is wiring for supplying power to a display light for detecting braking 416 of the vehicle and is electrically connected to NC of the second micro-switch 415. The 2nd terminal of the male brake light wiring socket 401' and the 2nd terminal of the female brake light wiring socket 402' are connected to one other and electrically connected to a signaling wire for detecting braking 417 to be connected to a braking sensor. The 1st terminal of the male brake light wiring socket 401' is connected to COM of the second micro-switch 415. The controller 403 of the vehicle security system is electrically connected to the vehicle's battery.

In operation, as the vehicle security system's locking device for brake/clutch lock or gear lock is activated (i.e., pulled), the first micro-switch and the second micro-switch 414, 415 operate in concert and shift from COM and NC to COM and NO. For vehicles with a push start button this position of the first micro-switch and the second micro-switch 414, 415 will shift electrical from the unlocked to the locked status and cut off electrical supply for detecting braking 416 which is connected to the brake and the Body Control Module (BCM).

Thereafter, the controller 403 of the vehicle security system operates to check operation of the various sensors and whether such sensors, for example, the shock sensor 406 or the infrared sensor 407 are functioning and able. If damages or irregularities are detected, the micro-controller 404 will send a signal to the controller 403 to emit notification (example via buzzer 409) to notify the vehicle owner so that the owner can bring the vehicle in for repairs. If no damages or irregularities are detected, the vehicle security system will enter a standby mode as programmed and the micro-controller 404 sends a signal to the controller 403 to activate the LED 411 to blinking status to notify that the vehicle security system is functioning and in standby mode.

In a locked position and standby mode, if a brake is applied in order to push start the vehicle, the micro-controller 404 will emit notification to warn the user that the vehicle security system is in a locked status and that it should be unlocked before starting the vehicle.

In a locked position and standby mode, if other keys or other foreign objects are inserted into the key hole, the infrared sensor 407 at the key hole will activate. Further, if there is tampering of the vehicle security system, the shock sensor 406 will activate, or if a spare tire is removed, the spare tire sensor 408 will activate. These will lead to the micro-controller 404 to send a signal to the controller 403 to send a signal to the horn or siren 410 to emit a warning sound notifying the owner that a theft is possibly taking place.

As the vehicle security system is unlocked, the energy saving unit 405 will cut off electrical power supplied to each sensor/micro-controller within the controller 403 to prolong the life span of the items. The vehicle's electrical system will then return to a normal operating state.

Figure 120:
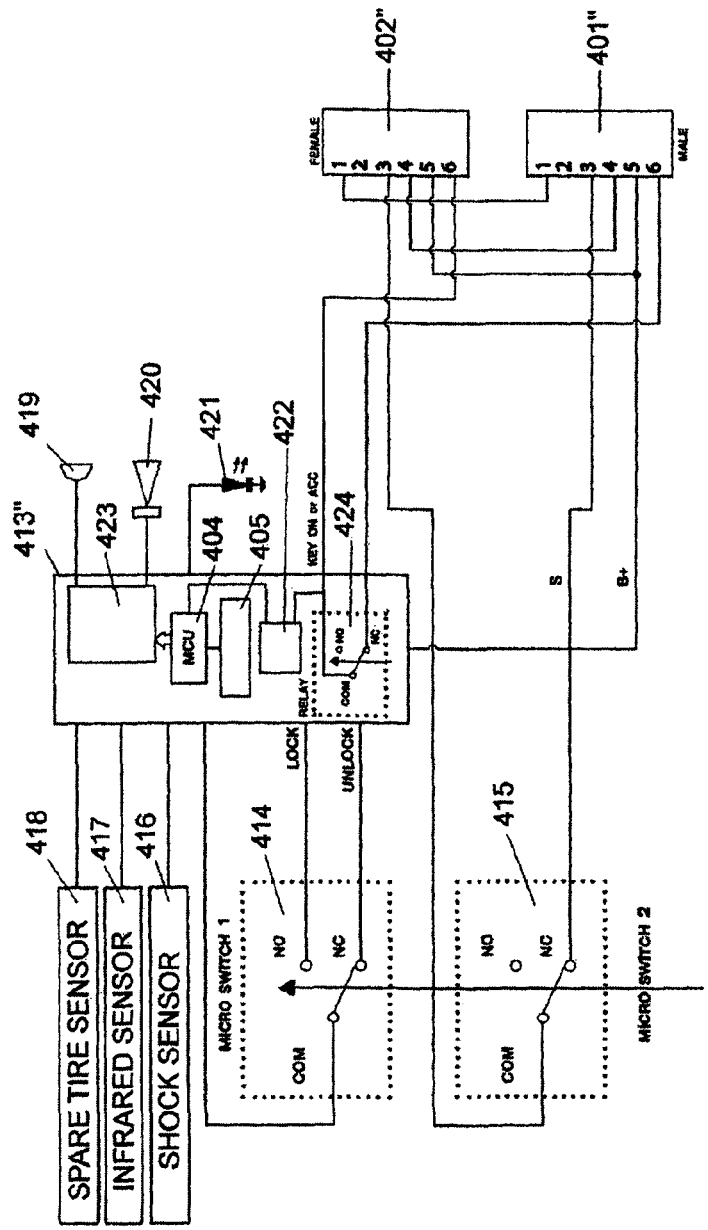

FIG. 120 illustrates a third aspect of the fifth preferred embodiment of the present invention. The third aspect of the fifth preferred embodiment operates similarly as the first aspect of the fifth preferred embodiment. However, in this aspect, the male wiring socket 401" is electrically connected to the vehicle's electrical system and the female wiring socket 402" is electrically connected to a key hole of the vehicle. The 1st, 4th, 5th terminals of the male wiring socket 401" are electrically connected to the respective corresponding 1st, 4th, 5th terminals of the female wiring socket 402".

The controller 413" of the vehicle security system includes a micro-controller 404 for controlling operations of various sensors 416, 417, 418, 419 (as mentioned above) electrically connected to an energy saving unit 415 for cutting off electrical power to the micro-controller 404 (e.g., in an unlocked state). The micro-controller 404 is electrically connected to a key switching sensor (to Key On or ACC) and feeds signal to the micro-controller 404. When situated at the ACC position electrical is supplied to axillary devices including the micro-controller 404 which shall then detects operation of the sensors e.g., shock sensor 416, infrared sensor 417, spare tire sensor 418, buzzer 419, horn/siren 420, LED 421, and key switch sensor 422 to "Key on" or "ACC" is electrically connected to COM of relay assembly 424 within the controller 413".

The first micro-switch 414 and the second micro-switch 415 are assembled inside a housing (not shown). The first micro-switch and the second micro-switch 414, 415 operate in concert upon locking and unlocking of the vehicle security system. In the unlocking status, the first micro-switch and the second micro-switch 414, 415 are at COM and NC.

The COM at the first micro-switch 414 is electrically connected to the controller 413" and the NC at the first micro-switch 414 is connected to the micro-controller 413" in the unlocked status. NO at the first micro-switch 414 is electrically connected to controller 413" in the locked status.

The 3rd terminal of the male wiring socket 401" is a circuit wiring electrically connected to NC of the second micro-switch 415 for controlling voltage during an "engine off" state as the key switch (S) is turned. The 6th terminal of the male wiring socket 401" is connected to NC of the relay assembly 424 within the controller 413".

The 5th terminal of the male wiring socket 401" and the 5th terminal of the female wiring socket 402" are connected to one another and connected to the vehicle's battery and connected to the controller 413".

The 3rd terminal of the female wiring socket 402" is connected to COM of the second micro-switch 415. The 6th terminal of the female wiring socket 402" is wired to a key switch at Key On or ACC of which is connected to COM of the relay assembly 424 within the controller 413"

In operation, as the vehicle security system's locking device for brake/clutch lock or gear lock is activated (e.g., pulled), the first micro-switch and the second micro-switch 414, 415 operate in concert and shift from COM and NC to COM and NO. In this position, for vehicles which use a key for starting the vehicle, turning the key switch (S) will cause the shift from unlocked to locked status and cut off electrical circuit of which controls voltage during the "engine off" state which connects the key hole and (S) the Body Control Module (BCM).

Thereafter, the controller 413" of the vehicle security system operates to check operation of various sensors and whether such sensors, for example, the shock sensor 406 or the infrared sensor 407 are functioning and able. If damages or irregularities are detected, the micro-controller 404 sends a signal to the controller 413" to emit notification (example via buzzer 419) to notify the vehicle owner so that the owner can bring the vehicle in for repairs. If no damages or irregularities are detected, the vehicle security system will enter a standby mode as programmed and the micro-controller 404 sends a signal to the controller 413" to activate the LED to blinking status to notify that the vehicle security system is functioning and in standby mode.

In a locked and standby mode, the vehicle security system will immediately cut off starting of the engine as the key is turned (for safety reason). The micro-controller 404 sends a warning signal to notify the driver that the vehicle security system is in a locked position and that unlocking is needed before starting the vehicle.

As the locking device is activated, the mechanism to initiate engine cut-off is started whereby the second micro-switch 415 cuts off electrical circuitry that controls the voltage during engine off at turning of a key switch (S), which connects the BCM with the key. As a result, when the key is turned to Key On or ACC, the wire which received electrical from the battery will send electrical to and activate the relay 424 inside the controller 413" to cut off electrical supply at Key On or ACC position which connects the key hole and the BCM and hence starting the vehicle is not possible.

In a locked position and standby mode, if other keys or other foreign objects are inserted into the key hole, the infrared sensor at the key hole will activate. Further, if there is tampering of the locking device, the shock sensor 406 will activate, or if a spare tire is removed, the spare tire sensor 408 will activate. These will lead to the micro-controller 404 to send a signal to the controller 413" to send a signal to the horn or siren 420 to emit a warning sound notifying the owner that a theft is possibly taking place.

As the vehicle security system is unlocked, the energy saving unit 405 will cut off electrical power supplied to each sensor/micro-controller within the controller 413" to prolong the life span of the items. The vehicle's electrical system then returns to normal.

Figure 121:
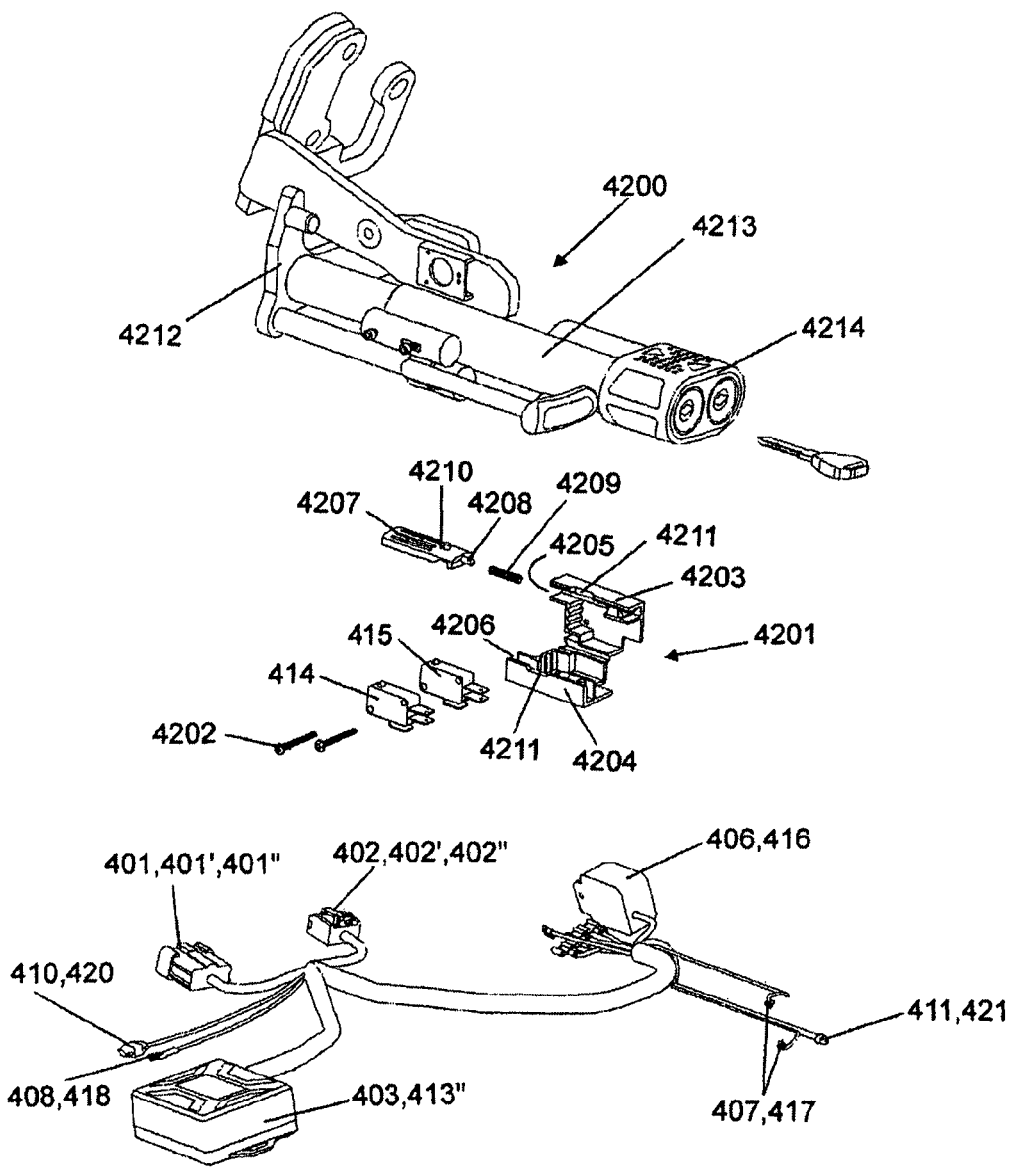

As shown in FIGS. 121 and 122, the wiring set according to the first, second and third aspects of the fifth preferred embodiment is assembled to a brake/clutch locking device 4200. The male wiring socket 401, 401', 401" and the female wiring socket 402, 402', 402" are electrically connected as described above. The various sensors are electrically connected to the controller as described above. The first micro-switch and the second micro switch 414, 415 are assembled inside a housing 4201. The hosing 4201 is fastened/assembled to a side of the brake/clutch locking device of the vehicle security system as described in any of the above embodiments of the present invention.

The housing 4201 is configured to include a first body 4203 and a second body 4204 of symmetrical shapes and size in order to couple to one another. The inside of the first body 4203 and the second body 4204 provides spaces for positioning of the first and second micro-switch 414, 415 therein and next to one another. The leg of the first and second micro-switches 414, 415 point upward. At the upper side edge inside the first body 4203 and the second body 4204, are internal grooves 4205 and 4206 respectively for insertion of a controlling plate 4207 which lies horizontally and movably within the channel 4205 and 4206. The controlling plate 4207 is configured as a flat plate having a size corresponding to a width of the first body 4203 and the second body 4204. The tip of the inner side of the positioning plate 4207 is prepared with a pin 4208 for engaging with (receiving) a spring coil 4209. The top of the controlling plate 4207 is prepared with a distance regulating stud 4210 which is movable within a slot 4211 on the top of the first body 4203 and the second body 4204.

FIG. 123 shows the first, second and third aspects of the fifth preferred embodiment of the present invention assembled to the brake/clutch locking device 4200 and ready to function. The male wiring socket 401, 401', 401" and the female wiring socket 402, 402', 402" are electrically connected to one another and the shock sensor 406, 416, infrared sensor 407, 417, spare tire sensor 408, 418, horn/siren 410, 420 and LED bulb 411, 421 which are electrically connected to controller 403, 413". The male wiring socket 401, 401', 401" and the female wiring socket 402, 402', 402" are electrically connected to the first micro-switch and the second micro-switch 414, 415 as described above. The LED bulb 411, 421 are inserted through a shaft 4213 of the brake/clutch locking device 4200 to be assembled to a cap 4214 of the vehicle security system's locking device 4200.

FIG. 124 shows the wiring set according to the first, second and third aspects of the fifth preferred embodiment of the present invention assembled to the brake/clutch locking device 4200. As an end 4212 of the locking device 4200 is pulled, it causes the controlling plate 4207 to move up and trigger the first micro-switch 414 and the second micro-switch 415 to activate in concert and shift from COM and NC to COM and NO and hence cause the locking device 4200 to function as described above.

FIG. 125 shows the wiring set according to the first, second and third aspects of the fifth preferred embodiment of the present invention as assembled to a gear locking device 4300. The male wiring socket 401, 401', 401" and the female wiring socket 402, 402', 402" are electrically connected to one another and the shock sensor 406, 416, infrared sensor 407, 417, spare tire sensor 408, 418, horn/siren 410, 420 and LED bulb 411, 421 and are electrically connected to controller 403, 413". The male wiring socket 401, 401', 401" and the female wiring socket 402, 402', 402" are electrically connected to the first micro-switch and the second micro-switch 414, 415 as described above. The LED bulb 411, 421 is positioned outside a gear console next to a key set 4301 of the gear locking device 4300.

FIG. 126 shows a wiring set according to the first, second and third aspects of the fifth preferred embodiment of the present invention as assembled to the gear locking device 4300. As the gear locking device 4300 is activated, it will cause the controlling plate 4207 to move up and trigger the first micro-switch 414 and the second micro-switch 415 to activate in concert and shift from COM and NC to COM and NO and hence cause the locking device 4300 to function as described above.

Referring to FIGS. 127-134, in accordance with a first aspect of a sixth preferred embodiment, the present invention provides a vehicle security system as shown. The first aspect of the sixth preferred embodiment is directed to a vehicle securing locking device with an alternative arrangement on how the locking device operates in terms of emitting a warning if there is tampering with the vehicle. In the previously described modules/embodiments, the mechanism of emitting a warning relies on an electrical aspect utilizing sensors, a micro-controller, etc. which could make the cost of the locking device to become too expensive. Thus, the present aspect of this embodiment of the invention provides an alternative solution whereby the mechanism of emitting warning relies on a combination of electrical and mechanical elements. The mechanical element in this case is the use of "a spring coil" with spring coil sensor.

FIG. 127 shows an embodiment of a wiring set of a vehicle security locking device according to the present embodiment that includes: a male wire socket 501 electrically connected to the vehicle's electrical system and a female wire socket 502 electrically connected to a key socket of the vehicle. The terminal of each wire of the male socket 501 is electrically connected to the corresponding wire on the female wire socket 502. The vehicle security locking device further includes a first micro-switch 503 and a second micro-switch 504 positioned inside a housing. The housing is assembled to the vehicle locking device. The first micro-switch 503 and a second micro-switch 504 operate correspondingly together with the locking and unlocking of the vehicle locking device. In an unlocked position, the first and the second micro-switches 503, 504 are at COM and NC.

The COM of the first micro-switch 503 is electronically connected to a time delay 506 embedded inside a controller 505. The NC of the first micro-switch 503 is electrically connected to a ground in an unlocking position. The NO of the first micro-switch 503 is electrically connected to a controller in the locking position.

As an example, a 5th terminal of the male wire socket 501 is a START (ST) wire or a wire connected to a vehicle battery (B+) or a brake light of the vehicle of which is electrically connected to NC of the second micro-switch 504.

A 3rd terminal of the male wire socket 501 and a 3rd terminal of the female wire socket 502 (of which are connected to one another) are electrically connected to the battery and subsequently connected to the controller. The controller 505 is electrically connected to the NO of the first micro-switch 503 which is electrically connected to the controller 505 in a locking position.

A 5th terminal of the female wire socket is a START (ST) wire or a wire connected to the vehicle battery (B+) or a brake light of the vehicle electrically connected to COM of the second micro-switch 504.

The controller 505 is fitted with a time delay for delaying activation of a relay assembly 507. The time delay is, electrically connected to the COM of the first micro-switch 503 as well as being electrically connected to the relay assembly inside the controller 505.

The relay assembly 507 includes a spring coil 508 electrically connected to the time delay and subsequently connected to a dual relay assembly 509. In a standby mode COM 1 and COM 2 of the dual relay assembly is at NC1 and NC2 and COM 1 is electrically connected to NO 2. NO 1 is electrically connected to the vehicle horn/siren 510 and NO 2 is connected to the ground.

The relay assembly 507 inside the controller 505 is electrically connected to a spring movement sensor 511 and a spare-tire sensor 512. The spring movement sensor 511 defines a spring coil 513 having one end electrically connected to a ground wiring. The inside of the spring coil 513 is fitted with an electrical conducting rod 514 having one end electrically connected to the spring coil 508 of the relay assembly 507.

Once the vehicle locking device or the vehicle driving function locking device is activated, the first and the second micro-switches 503, 504 activate at the same time and change from COM and NC to COM and NO positions. In this position, for the vehicle which is started by turning a key, causes an electrical cut off at unlocking to lock and cut off the START (ST). For vehicles which are started by a push start button, this position will result in a cut off of electrical connection with a battery or a brake light (which connected to the push start button and the Body Control Module (BCM or ECU)). Thereafter, the vehicle security locking device will detect an operation of the spring movement sensor 511 during a standby mode.

If there is tampering with the vehicle locking device while the device is activated, the spring movement sensor 511 will activate whereby the spring coil 513 will vibrate and touch the electrical conducting rod (inserted inside the spring coil 513) which is connected to the spring coil 508 of the relay assembly 507 and thus complete the electrical connection of the dual relay 509 causing the system to emit a warning sound. The system continues to emit a warning until an unlocking of the vehicle security locking device occurs. The system operates in the same manner with other various sensors for example, a key hole sensor, a spare tire sensor (for detecting if there is tampering or theft attempt of the spare tire), etc.

FIG. 128 shows a second aspect of the sixth preferred embodiment of the present invention having a wiring of the vehicle locking device. This embodiment is almost identical to the above described first aspect of the sixth preferred embodiment. However, in this embodiment, the time delay, which is electrically connected to a COM and the first micro-switch 503 will also be electrically connected to a resistor 515 which is connected to an LED bulb 516. Thus, in a locking position, the LED bulb 516 (which receives current from battery and through the resistor) is activated to display that the locking mode is on.

FIG. 129 shows a third aspect of the sixth preferred embodiment of the present invention having a wiring of the vehicle locking device similar to the second aspect of the sixth preferred embodiment as described above. However, in this aspect, there is a modification in the spring movement sensor 511. Instead of having the electrical conducting rod 514 inserted inside the spring coil as in the earlier embodiment, the electrical conducting rod is modified into a tube 519 and is used to surround the spring coil 513. That is, in a standby mode with the locking device in a locking mode, if there is tampering with the device or theft attempt, the sensor connecting to that specific part of the vehicle will cause the spring coil 513 to vibrate and hit the electrical conducting tube 519 completing the electrical connection for the device to emit a warning.

FIG. 130 illustrates how the wiring set of the first aspect of the sixth preferred embodiment is assembled to a brake/clutch locking device 5100.

FIG. 131 illustrates how the wiring set of the second aspect of the sixth preferred embodiment is assembled to the locking device 5100. In this embodiment, the wiring for the LED bulb is inserted through the shaft 5102 of the locking device and fitted inside a cap 5103 of the brake/clutch locking device.

FIG. 132 illustrates how the wiring set of the third aspect of the sixth preferred embodiment is assembled to the brake/clutch locking device 5100.

FIG. 133 illustrates how the wiring set the second aspect of the sixth preferred embodiment is assembled to a gear locking device 5200. In this case, the LED bulb 516 is placed outside the gear console next to a key set 5201.

FIG. 134 illustrates how the wiring set of the third aspect of the sixth preferred embodiment is assembled to a gear locking device 5200. In this case, the LED bulb 516 is placed outside the gear console next to a key set 5201.

The mechanism of operation of the controller, micro-controller, the male wiring socket and the female wiring socket and the electrical circuitry to complete the electrical connection of the device in order for the device as illustrate in FIG. 130-134 to function and operates are as described in the earlier embodiment of the sixth embodiment of the present invention.

It will be appreciated by those skilled in the art that changes could be made to the preferred embodiments described above without departing from the broad inventive concept thereof. For example, additional components and steps can be added to the various vehicle security systems. It is to be understood, therefore, that this invention is not limited to the particular embodiment disclosed, but it is intended to cover modifications within the spirit and scope of the present invention as defined by the appended claims.

We claim:

1. A vehicle security system (10) comprising:
   (a) a driving function locking device (12) movable between a locked position for disabling a driving function of a vehicle and an unlocked position;
   (b) a controller (14) operatively connected to the driving function locking device (12) and an electrical power supply of the vehicle and in communication with a transceiver (36);
   (c) a remote control (16) that remotely communicates with the transceiver to lock and unlock the driving function locking device or disable the driving function locking device; and
   (d) a chip card (18) that remotely communicates with the transceiver,
   wherein the controller (14) is configured to
   deactivate the driving function locking device (12) when the transceiver (36) receives a deactivation signal from the chip card (18) and the remote control (16),
   move the driving function locking device (12) to the locked position after a locking command code transmitted by the chip card (18) is authenticated;
   automatically move the driving function locking device (12) to the locked position after a fixed period of time upon receipt of an auto command code transmitted by the remote control (16); and
   wherein the controller (14) is further configured to determine if a gear of the vehicle is in a park position or a neutral position, and when in the park or neutral position, the controller (14) locks the driving function locking device (12) to disable the driving function of the vehicle after a command code provided by the chip card (18) is authenticated or automatically locks the driving function locking device to disable the driving function of the vehicle after a fixed period of time upon receipt of a command code provided by the remote control (16).

2. The vehicle security system of claim 1, wherein the remote control (16) is a radio frequency identification (RFID) remote control and the controller (14) is a microcontroller, a computer, or an integrated circuit.

3. The vehicle security system of claim 1, wherein when the driving function locking device (12) is moved from the unlocked position to the locked position, the controller activates an engine cut-off (56) for disabling an engine starter of the vehicle, an advisor (42) advises that the vehicle is disabled, and a low power mode for operation of the controller (14) is initiated.

4. The vehicle security system of claim 3, wherein the advisor (42) is at least one of a light emitting diode, a buzzer, a horn and a siren and the controller (14) is connected to a tamper sensor (38) and configured to lock the driving function locking device (12) and activate an advisor (42) to issue a warning when the tamper sensor is activated.

5. The vehicle security system of claim 1, wherein the driving function locking device (12) is configured to move to the unlocked position when the controller (14) receives an unlocking command code from the chip card (18) or the remote control (16), and authenticates the unlocking command code, or when a user toggles an ignition switch of the vehicle with a key (54) of the vehicle a fixed number of times.

6. The vehicle security system of claim 5, wherein when the unlocking command code is not authenticated, an advisor (42) issues a warning.

7. The vehicle security system of claim 1, wherein the driving function locking device (12) includes at least one of a motor (30) and a solenoid (32) to move the driving function locking device (12) between locked and unlocked positions.

8. The vehicle security system of claim 1, further comprising a key control sensor (58) operatively connected to the controller and configured to detect an object within a key switch of the vehicle.

9. The vehicle security system of claim 1, wherein the driving function locking device (12) is a gear lever locking device or a brake/clutch locking device.

10. The vehicle security system of claim 9, wherein the gear lever locking device comprises:
    a cover member (1012);
    a first fixing leg member (1018);
    a second fixing leg member (1020), wherein the first fixing leg member (1018) and the second fixing leg member (1020) are structurally configured to be positioned at, at least two positions corresponding to positions of original mounting screws in a vehicle for attaching the cover member (1012) to the vehicle;
    a locking mechanism (1016) connected to the cover member (1012);
    a connector 10(14) housed within the housing and connectable to a gear lever of the vehicle, the connector (1014) being moveable between a locked and an unlocked position;
    wherein the cover member (1012) is configured to cover the locking mechanism (1016) and the connector (1014), the cover member (1012) including a lower edge (1027), wherein the lower edge (1027) of the cover member (1012) is coupled with the first fixing leg member (1018) and the second fixing leg member (1020),
    wherein the first fixing leg member (1018) and the second fixing leg member (1020) each have protruding ends that include a pipe or a screw hole for mounting to the vehicle in the position of the original mounting screws of the vehicle,
    wherein the first fixing leg member (1018) and the second fixing leg member (1020) each include a first screw guard (1054) and a second screw guard (1062), wherein the first and second screw guards (1054, 1062) are complementary in shape and cover screws that fasten the first fixing leg member (1018) and the second fixing leg member (1020) to the vehicle, and wherein the screws fasten the first and second screw guards (1018, 1020) to the first fixing leg member (1018) and the second fixing leg member (1020), respectively in a position on the vehicle such that access to the screws is blocked by the gear lever when the gear lever locking device (1010) is in the locked position and access to the screws is accessible when the gear lever locking device is in the unlocked position.

11. The vehicle security system of claim 9, wherein the gear lever locking device is configured for installation inside a gear lever cover panel of a vehicle, the gear lever locking device comprising:

a stud chamber (1202) configured to have a shape in accordance with an inner space of the gear lever cover panel, the stud chamber (1202) having:

an upper cover (1203) that can be disassembled, an inside that includes a portion for the installation of a stud (1208) and a stud pushing mechanism (1210) that is arranged internally in a correspondent manner, wherein the stud (1208) is inserted through a through hole (1226*a*) at an end of a stud chamber (1202) configured to be locked with an auxiliary connector (1222) and, when unlocked, the stud (1208) slides back by a force exerted from a return spring (1228) mounted on the stud (1208) and the stud pushing mechanism (1210), respectively, and the end of the stud chamber (1202) on a lateral side is connected to a cover wall member (1230) that covers a portion of a sling end connector (1232) and the sling retaining plate (1209), the lower part of the gear lever locking device (1200) further comprising at least one fixing leg along with fixing leg fastening screws, wherein the auxiliary connector (1222) is a plate provided with at least one through hole for the insertion of the stud end (1208*b*) to block in a locked position on one end of which is a curved extension (1226) that is a portion used as a mounting portion to be fixed to the end of the sling end retaining plate (1209), and a sustaining groove (1224) at a lateral side of the auxiliary connector (1222) at a side connected to the stud (1208) for receiving the stud end (1208*b*) in such a manner that the end of the auxiliary connector (1222) does not abut a floor of the vehicle or a vehicle mechanism.

12. The vehicle security system of claim 9, wherein the gear lever locking device comprises:

an axle pipe (1302);

a sliding axle (1308), wherein the axle pipe (1302) is to be mounted to the sliding axle (1308) and a first end (1308*a*) of the sliding axle (1308) is curvedly bent, the sliding axle (1308) having a tip that includes an engagement member (1306) configured to be engaged with a gear lever sling end retaining plate or a gear lever sling end;

wherein a second end (1308*c*) of the sliding axle (1308) includes a recess or cutout (1308*b*) in the sliding position corresponding to a P position or a N position of a gear lever to support a locking stud end (1310) of a locking mechanism unit (1304) extending through a through hole (1302*a*) on the axle pipe (1302);

wherein a lower front part of the axle pipe (1302) includes a fixing leg (1311) comprising a flange (1312) and a cast bent screw hole (1314) extending downward to be engaged with an original screw of a vehicle, and at a rear end of the flange (1312) of the fixing leg (1311), there is provided an extension member (1316) extending upwardly to be engaged with a portion of the axle pipe (1302);

wherein the flange (1312) is coupled to a lower part of an upper cover (1318) that covers a portion above the front end of the sliding axle (1308) to prevent the destruction, and at an other part of the upper cover plate (1318), there is a fixing leg (1320) extending downwardly;

wherein at the lower part of the second end of the axle pipe (1302), there is a fixing leg (1322) having a flange (1322*a*) facing downward;

the locking mechanism unit (1304) is connected to a lateral portion of the rear end of the axle pipe (1302), wherein a lateral part of a fastening stud chamber (1324) is connected to the lateral side of the axle pipe (1302) on the opposite side of the stud chamber (1326);

a turning mechanism (1330) with an end pushing stud (1328) used in pushing the locking stud when the lock is pressed or the turning mechanism (1330) is turned by a key;

at the lateral side of the stud chamber (1326), there is a fixing leg (1332) extending downwardly, wherein the fixing leg (1332) has a flange (1332*a*) along with a screw hole (1332*b*); and a screw guard (1325) is provided on the flange of the fixing leg, wherein at least two ends of the screw guard (1325) are bent into a shape that covers the screw heads of the screws, and a portion of the screw guard (1325) is bent to be adjoined to the fixing leg (1332) and is connected to the fixing leg (1332) by a fastener, and one portion on the lateral side of the locking mechanism unit (1304) is provided with an extension member (1304*a*) extending through the lateral opening (1324*a*) used in sliding to cover the screw that fastens the screw guard to prevent the removal of the fixing leg of the gear lever locking device (1300) while in the locked position.

13. The vehicle security system of claim 9, wherein the gear lever locking device comprises:

a sliding axle chamber (1402) having a sliding axle (1404) slidable within the sliding axle chamber (1402);

a locking mechanism unit (1406) having a turning mechanism (1440), wherein the turning mechanism (1440) is turnable inside the locking mechanism chamber (1442) and wherein the locking mechanism unit (1406) is attached to a lateral side of the sliding axle chamber (1402) for use in driving a locking stud (1448) to be locked with a stud hole (1405*a*) in the sliding axle (1404) when the gear lever locking device (1400) is in a locked position;

a gear lever transverse member (1408) coupled to a first end of the sliding axle (1404); and a first seat unit (1410) and a second seat unit (1412) extending from part of an outer wall of the sliding axle chamber (1402) to be fastened to positions corresponding to original screw positions of a vehicle, wherein the gear lever transverse member (1408) is includes:

a loop member (1424), wherein the loop member (1424) has a transverse aperture (1428), wherein one side of the transverse aperture (1428) is a circular opening (1430) that is larger than a lateral slot (1432) on an opposite end of the transverse aperture (1428), for use in hooking with a gear lever of the vehicle, an extension member (1426) extending from the loop member (1424); and a connector (1434) for connecting the gear lever transverse member (1408) to the sliding axle (1404).

14. The vehicle security system of claim 9, wherein the gear lever locking device is an anti-lock mechanism (2100) for use with a brake/clutch locking device having an axial tube (2001) and a slidable axial tube (2002), a bored hole (2013) provided in a wall of the axial tube (2001) and on the slidable axial tube (2002) in a position upstream of a locking position of the brake/clutch locking device, the anti-lock mechanism comprising:

a mechanical chamber (2016) having a wall;
a pin (2011) in the mechanical chamber (2016) for use in preventing the slidable axial tube (2002) from sliding through the bored hole (2013) provided on the wall of the axial tube (2001) and on the slidable axial tube (2002) in the position upstream of the locking position of the brake/clutch locking device, the pin (2011) having an upper end with a protruding lower edge; a coil spring (2012) biasing the pin (2011);
a block (2005) having a front end and a rear end, the front end having a shoulder portion having a shape corresponding to the protruding lower edge of the pin (2011), the block (2005) having an appropriate shape and size slidable inside the mechanical chamber (2016) between a first position in which the shoulder portion supports the protruding lower edge of the pin (2011) and a second position allowing the pin (2011) to slide down into the bored hole (2013) and block the movement of the slidable axial tube (2002), which, in turn, prevents the brake/clutch locking device from sliding into the brake/clutch locking position;
a spring (2024) configured to apply a pushing force to the rear end of the block (2005);
an axle (2030) provided at the upper end of the pin (2011) extends through the wall of the mechanical chamber (2016) in an outward direction to pull the pin (2011) out of a position that blocks the slidable axial tube (2002) to place the pin (2011) onto the shoulder (2005a) of the block (2005); and
a block holding axle (2003a) protruding through the wall of the mechanical chamber (2016), operatively coupled to the block (2005) and configured to move the block between the first and second positions to allow the pin (2011) to be placed into a position suitable for preventing the brake/clutch locking device from entering the locking position in relation with the retreating of the block (2005),
wherein when an external force is applied to the main structure of an automobile in a relative direction and angle, the block (2005) produces sufficient kinetic energy to overcome the spring force by the spring (2024), the block (2005) is then moved from the first position to the second position.

15. The vehicle security system of claim 9, wherein the gear lever locking device is an anti-lock mechanism (2200) for use with a brake/clutch locking device having an axial tube (2001) and a slidable axial tube (2002), a bored hole (2013) provided in a wall of the axial tube (2001) and on the slidable axial tube (2002) in a position upstream of a locking position of the brake/clutch locking device, the bored hole (2013) on the slidable axial tube (2002) having a sloped portion (2013a), the anti-lock mechanism comprising:

a mechanical chamber (2216) having a wall;
a pin (2211) in the mechanical chamber (2216) for use in preventing the slidable axial tube (2002) from sliding through the bored hole (2013) and passing the axial tube wall (2001) and the slidable axial tube (2002) in the position upstream of the locking position of the brake/clutch locking device, the pin having an end portion and a curved top with a protruding lower edge;
a coil spring (2212) biasing the pin (2211);
a block (2025) having a front end and a rear end, the front end having a shoulder portion having a shape of an axel (2025a) with a rounded tip extending in correspondence with the protruding edge of the pin (2211), the block (2025) having a mass and an shape and a size slidable inside the mechanical chamber (2216) between a first position in which the tip (2025a) supports the protruding lower edge of the pin (2211) and a second position allowing the pin (2211) to slide down into the bored hole (2013) and prevent the slidable axial tube (2002) from moving into the locking position, the end portion of the pin (2211) protruding out of the wall of the slidable axial tube (2002) in a crossing direction adjacent to the axial tube (2001) and preventing the slidable axial tube (2002) from moving into the locking position;
a spring (2224) configured to apply a pushing force to the rear end of the block (2025); and
an axle (2230) provided at the upper end of the pin (2211) extends through the wall of the mechanical chamber (2216) in an outward direction,
wherein when an external force is applied to the main structure of an automobile in a relative direction and angle, the block (2025) produces sufficient kinetic energy to overcome the spring force by the spring (2224), the block (2025) is then moved from the first position to the second position, and
wherein the sloped portion (2013a) of the bored hole (2013) on the slidable axial tube (2002) is for convenience in pushing the end portion of the pin (2211) back into the mechanical chamber (2216) while the slidable axial tube (2002) is backed into the normal state.

16. The vehicle security system of claim 9, wherein the gear lever locking device is an anti-lock mechanism (2300) for use with the brake/clutch locking device having an axial tube (2001) and a slidable axial tube (2002), a bored hole (2013) provided in a wall of the axial tube (2001) and on the slidable axial tube (2002) in a position upstream of a locking position of the brake/clutch locking device, the bored hole (2013) on the slidable axial tube (2002) having a sloped portion (2013a), the anti-lock mechanism (2300) is characterized by comprising:

a ring (2345a) and a ring (2345b) partitioning a lock protecting mechanism chamber inside a slidable axial tube (2002);
a pin (2311) inside the lock protecting mechanism chamber, the pin (2311) having a protruding edge of the pin (2311) located inside a pin chamber;
a block (2035) inside the lock protecting mechanism chamber, the block (2035) having a shape and size slidable inside a slidable axial tube (2002) and engaged with an axle of a screwing mechanism (2006), the block (2035) having a coil spring (2324); a front part of the block (2035) forming a shoulder (2035a) having a rounded tip shape corresponding to the protruding edge of the pin (2011), the shoulder (2203a) having a coil spring (2312) for preventing the slidable axial tube (2002) from sliding through a bush (2346) which is provided on the wall of the slidable axial tube (2002) and the bored hole (2013) on the axial tube wall (2001) in a position upstream of a locking position of a brake/clutch locking device of an automobile, one edge of the bored hole (2013) is the sloped portion (2013a) for pushing the pin (20311) back into a lock-ready position after the slidable axial tube (2002) slides back into a normal unlocked state, wherein when an external force is applied to the main structure of an automobile in a relative direction and angle, the block (2035) produces sufficient kinetic energy to overcome the spring force by the spring (2324), the block (2035) is then moved from the first position to the second position; and an axle (2347) at an end portion of the block (2035) extending into a groove on a wall of the slidable axial tube (2002) for preventing a pivotally movement of the block (2035) around an axle of the screwing mechanism (2006), wherein the front shoulder (2035a) of the block (2035) moves out from under the protruding edge of the pin (2311), the pin (2311) slides down into the bored hole (2013) and a pin end protruding from the slidable axial tube wall (2002) blocks the edge of the axial tube (2001) preventing the slidable axial tube (2002) from entering the locking position when the main structure of the automobile is subject to an external force in a relative direction and angle.

17. The vehicle security system of claim 9, wherein the gear lever locking device is an anti-lock mechanism (2400) for use with the brake/clutch locking device having an axial tube (2001) and a slidable axial tube (2002), a bored hole (2013) provided on the slidable axial tube (2002) in a position upstream of a locking position of the brake/clutch locking device, the anti-lock mechanism (2400) is characterized by comprising:

a pin (2411) inside the slidable axial tube (2002); a block (2045) having appropriate shape and size slidable inside the slidable axial tube (2002), and engaging with the return spring (2004) of the brake/clutch locking device; the block (2045) has a rounded shoulder (2045b); a lower end of the return spring (2004) pushes the block (2045) on the rounded shoulder (2045b); the other end of the return spring (2004) pushes the end of the first locking mechanism (2006) connected inside the axial tube (2001); the pin (2411) with a coil spring (2412) for driving the end portion of the pin (2411) to slide into the bored hole (2013), when an external force of more than 20 kg-f is applied to the main structure of an automobile in a relative direction and angle, the block (2045) produces sufficient kinetic energy to overcome the spring force by the spring (2004), the block (2045) is then moved from the first position to second position; and an axle (2045c) at an end portion of the block (2045) extending into a slot on a wall of the slidable axial tube (2002) for preventing the block (2045) from movement around horizontal axis of the block;

wherein when an external force is applied to the main structure of an automobile in a relative direction and angle, the block (2045) produces sufficient kinetic energy to overcome the spring force by the spring (2004), the front shoulder (2045b) of the block (2045) is then moved inwardly to the spring (2004) and causes the coil spring (2412), pin (2411) move along with the block (2045), and the pin (2411) slides down into the bored hole (2013) preventing the slidable axial tube (2002) from entering the locking position.

18. The vehicle security system of claim 9, wherein the gear lever locking device is an anti-lock mechanism (2600) for use with the brake/clutch locking device having an axial tube (2001) and a slidable axial tube (2002), a first locking mechanism (2006) and a second locking mechanism (2010), the anti-lock mechanism (2600) is characterized by comprising:

a block (2065) with appropriate shape and size slidable inside a mechanical chamber (2616) with a slot (2616a) on a side wall of the mechanical chamber (2616), the mechanical chamber (2616) is placed in an end collar (2022) of the second locking mechanism (2010) of the brake/clutch locking device, the front end of the block (2065) has an axle (2630) protruding into the center hole (2616b) which is opposite to the open end of the mechanical chamber (2616);

a dowel (2611) on one side of the block (2065), slidable in the slot (2616a) and on the opposite side provided with a spring (2624) and a pin (2612) inside a hole (265b);

two mating holes (2616c, 2616d) are provided corresponding to the pin (2612) on the internal wall of the mechanical chamber (2616), one end of a spring (2021) is provided at the front end of the mechanical chamber (2616) and the other end of the spring (2021) is pushing at one end of a chamber of the second locking mechanism (2010), when an external force of more than 20 kg-f is applied to the main structure of an automobile in a relative direction and angle, the block (2065) produces sufficient kinetic energy to overcome the spring force by the spring (2624), the block (2065) is then moved from the mating hole (2616c) to the mating hole (2616d), and the dowel (2611) is then placed into a slot (2034a) of a plate (2034) of the brake/clutch locking device.

19. The vehicle security system of claim 9, wherein the gear lever locking device is a brake/clutch locking device (2190) for use in a vehicle having one or more pedals and a steering column, the brake/clutch locking device comprising:

an axial tube (2001);

a slidable axial tube (2002) having one end in the axial tube (2001) and other end;

a bored hole (2013) provided in a wall of the axial tube (2001) and on the slidable axial tube (2002) in a position upstream of a locking position of the brake/clutch locking device; a blocking panel rod (2003) attached to the other end of the slidable axial tube (2002);

a holding leg (2014) for securing the brake/clutch locking device to the vehicle;

a return spring (2004) inside the axial tube (2001), the return spring operatively coupled to the slidable axial tube (2002);

a lock-pulling mechanism (2029) comprising:

a first lock pulling mechanism (2007) connected with the brake/clutch panel-blocking rod (2003), the upper end of the first lock pulling mechanism (2007) is inserted through a collar (2008) supporting the first lock pulling mechanism (2007) on the wall of the axial tube (2001);

a second lock pulling mechanism (2009) connected with the first lock pulling mechanism (2007) for defining a retreating sliding distance of the slidable axial tube (2002) to prevent the movement out of the end of the axial tube (2001);

a first locking mechanism (2006) connected to an upper end of the axial tube (2001), for locking the blocking panel rod (2003) in the locked position; the first locking mechanism (2006) comprising:

a turning mechanism (2015) within the housing (2023) which is turned by a key and a pin (2017) working correspondingly wherein the pin (2017) includes a pin (2018) inside a housing (2023b) along with a spring (2019) pushing an end of the slidable pin (2018) to be locked with the bored holes (2018c) on the slidable axial tube (2002) located in the corresponding position when the second lock pulling mechanism (2009) is pulled to lock the brake/clutch locking device (2190);

a second locking mechanism (2010) installed on the side of the first locking mechanism (2006), for locking the blocking panel rod (2003) in the locked position after the first locking mechanism has been locked, the second locking mechanism (2010) connected to the upper end of the axial tube (2001); the second locking mechanism (2010) comprising:

a turning mechanism (2015*a*) which is turned by the key of the turning mechanism (2015) wherein a lower portion of the turning mechanism (2015*a*) and a pin (2017*a*) include a second pin (2018*a*) in the lower end groove detachably engaged to a ridge on the end portion (2020*a*) of the second locking mechanism (10), a second pin (2018*a*) with a spring (2019*a*), and a spring (2021) pushing an end of the second locking mechanism (2010) wherein the second locking pin (2018*a*) slides into the locking position through the groove on the collar (2022) of the second locking mechanism (2010), the second locking mechanism (2010) can be securably engaged in the locked position by pressing the second locking mechanism (2010) so that the second pin (2018*a*) is inserted through the groove on the collar (2022), the bored hole of the axial tube (2001) and the bored hole (2018*b*) on the wall of the abovementioned slidable axial tube (2002), which have been placed in a corresponding position; and an anti-lock mechanism connected to the upper end of the axial tube (2001);

wherein the anti-lock mechanism is for use in preventing the brake/clutch locking device from engaging in the locked position in an abnormal operating situation.

20. The vehicle security system of claim 9, wherein the gear lever locking device is a brake/clutch locking device (2290) for use in a vehicle having one or more pedals and a steering column, the brake/clutch locking device comprising:

an axial tube (2001);

a slidable axial tube (2002) having one end in the axial tube (2001) and other end;

a bored hole (2013) provided in a wall of the axial tube (2001) and on the slidable axial tube (2002) in a position upstream of a locking position of the brake/clutch locking device (2290);

a blocking panel rod (2003) attached to the other end of the slidable axial tube (2002);

a holding leg (2014) for securing the brake/clutch locking device (2290) to the vehicle;

a return spring (2004) inside the axial tube (2001), the return spring (2004) operatively coupled to the slidable axial tube (2002);

a supporting axle (2007) is inserted in a collar (2008) connected to the axial tube (2001), the upper end of the supporting axle (2007) is connected to a pulling mechanism (2009) and the lower end of the supporting axle (2007) is connected to the panel blocking rod (2003);

a first locking mechanism (2006) connected to an upper end of the axial tube (2001), for locking the blocking panel rod (2003) in the locked position; the first locking mechanism (2006) comprising:

a turning mechanism (2015) which is turned by a key and a locking pin (2017) working correspondingly wherein the locking pin (2017) includes a locking pin (2018) along with a spring (2019) pushing the end of a slidable pin (2018) to be locked with an end (2018*c*) of a two-fang rod (2020) provided at the end of the predetermined slidable axial tube (2002) located in the corresponding position when the brake/clutch locking device (2290) is in the locking position;

a second locking mechanism (2010) installed on the side of the first locking mechanism (2006) for locking the blocking panel rod (2003) in the locked position after the first locking mechanism has been locked, the second locking mechanism (2010) connected to the upper end of the axial tube (2001); the second locking mechanism (2010) comprising:

a turning mechanism (2015*a*) inside a housing (2023*a*) wherein the lower portion of the turning mechanism (2015*a*) engaged with a pin (2017*a*) inside a housing (2022*a*) corresponding to a locking pin (2018*a*) in a housing (2044) is pushed with a spring (2019*a*) through a slot of a collar (2022) through the opening of the axial tube (2001) to the bored hole (2018*d*) of the predetermined slidable axial tube (2002) located in the corresponding position to the locking position, the second locking mechanism (2010) is securably engaged in the locked position by pressing the second locking mechanism (2010) so that the second pin (2018*a*) is inserted through the groove on the chamber wall (2022), the opening of the axial tube (2001) and the bored hole (2018*d*) on the wall of the slidable axial tube (2002); and an anti-lock mechanism connected to the upper end of the axial tube (2001);

wherein the anti-lock mechanism is for use in preventing the brake/clutch locking device from engaging in the locked position in an abnormal operating situation.

21. The vehicle security system of claim 9, wherein the gear lever locking device is a brake/clutch locking device (2390) for use in a vehicle having one or more pedals and a steering column, the brake/clutch locking device comprising:

an axial tube (2001) having a side wall and another side wall spaced from the side wall, an axially extending opening (2033) in the other side wall;

a slidable axial tube (2002) having one end in the axial tube (2001) and other end for connecting with a blocking panel rod (2003), wherein the opening (2033) is a member that defines a retreating sliding distance of the slidable axial tube (2002) to prevent a movement out of the end of the axial tube (2001);

a bored hole (2013) provided in a wall of the axial tube (2001) and on the slidable axial tube (2002) in a position upstream of a locking position of the brake/clutch locking device; a blocking panel rod (2003) attached to the other end of the slidable axial tube (2002);

a holding leg (2014) for securing the brake/clutch locking device to the vehicle;

a return spring (2004) inside the axial tube (2001), the return spring operatively coupled to the slidable axial tube (2002);

a gripping rod (2009) slidably attached to the opening (2033), wherein when pulling the gripping rod (2009), the blocking panel rod (2003) is then moved inward to the axial tube (2001) to move the brake/clutch locking device (2390) into the locked position;

a first locking mechanism (2006) connected to an upper end of the axial tube (2001), for locking the blocking panel rod (2003) in the locked position; the first locking mechanism (6) comprising:

a turning mechanism (2015) which is turned by a key and a locking pin (2017) working correspondingly wherein the locking pin (2017) includes a locking pin (2018) along with a spring (2019) pushing the end of the pin (2018) to be locked with an end (2018*c*) of a two-fang rod (2020) provided at the end of the predetermined slidable axial tube (2002) located in the corresponding position when the brake/clutch locking device (2390) is in the locking position;

a second locking mechanism (2010) installed on the side of the first locking mechanism (2006) for locking the blocking panel rod (2003) in the locked position after the first locking mechanism (2006) has been locked, the second locking mechanism (2010) connected to the upper end of the axial tube (2001); the second locking mechanism (2010) comprising:

a turning mechanism (2015*a*) inside a housing (2023*a*) wherein the lower portion of the turning mechanism (2015*a*) engaged with a pin (2017*a*) inside a housing (2022*a*) corresponding to a locking pin (2018*a*) in a housing (2044) is pushed with a spring (2019*a*) through a slot of a collar (2022) through the opening of the axial tube (2001) to be locked with an end (2018*d*) of a two-fang rod (2020) connected to the slidable axial tube (2002) located in the corresponding position to the locking position, the second locking mechanism (2010) is securably engaged in the locked position by pressing the second locking mechanism (2010) so that the second pin (2018*a*) is inserted through the groove on the collar (2022), and the opening of the axial tube (2001) is locked with an end (2018*d*) of a two-fang rod (2020) connected to the slidable axial tube (2002), which have been placed in a corresponding position; and an anti-lock mechanism connected to the upper end of the axial tube (2001);

wherein the anti-lock mechanism is for use in preventing the brake/clutch locking device from engaging in the locked position in an abnormal operating situation.

22. The vehicle security system of claim 9, wherein the gear lever locking device is a brake/clutch locking device (2490) for use in a vehicle having one or more pedals and a steering column, the brake/clutch locking device comprising:

an axial tube (2001);

a slidable axial tube (2002) having one end in the axial tube (2001) and other end;

a return spring (2004) inside the slidable axial tube (2002); wherein the axial tube (2001) is assembled with the slidable axial tube (2002) by a pin (2031), each end of the pin (2031) attached to a wall of the axial tube (2001) on an opposite side and insert through a line of the opening (2032) on the wall of the slidable axial tube (2002) in a corresponding position for use as an upper blocking line of a return spring (2004) and a sliding distance defining member of the slidable axial tube (2002);

a bored hole (2013) provided in a wall of the axial tube (2001);

a blocking panel rod (2003) attached to the other end of the slidable axial tube (2002);

a holding leg (2014) for securing the brake/clutch locking device (2490) to the vehicle;

a first locking mechanism (2006) connected to an upper end of the slidable axial tube (2002), for locking the blocking panel rod (2003) in the locked position; the first locking mechanism (2006) comprising:

a turning mechanism (2015) which is turned by a key and a locking pin (2017) working correspondingly wherein the locking pin (2017) includes a locking pin (2018) along with a spring (2019) pushing the end of the pin (2018) to be locked with a slot (2034*a*) on a plate (2034) when the pulling handle (2048) is pulled, thereby the blocking panel rod (2003) slides inward to the axial tube (2001) to block the brake and clutch pedals of an automobile;

a second locking mechanism (2010) installed on the side of the first locking mechanism (2006) for locking the blocking panel rod (2003) in the locked position after the first locking mechanism (2006) has been locked, the second locking mechanism (2010) connected to the lateral side of the axial tube (2001); the second locking mechanism (2010) comprising:

a turning mechanism (2015*a*) inside a housing (2023*a*) wherein the lower portion of the turning mechanism (2015*a*) engaged with a pin (2017*a*) inside a housing (2022*a*) corresponding to a locking pin (2018*a*) in a housing (2044*a*) is pushed with a spring (2019*a*) through a slot of a collar (2022) through a slot (2034*b*) on the plate (2034) and a bored hole on the slidable axial tube (2002) located in the corresponding position to the locking position, the second locking mechanism (2010) is securably engaged in the locked position by pressing the second locking mechanism (2010) so that the second pin (2018*a*) is inserted through the groove on the collar (2022);

an anti-lock mechanism (2300) incorporated inside the slidable axial tube (2002);

wherein the anti-lock mechanism (2300) is for use in preventing the brake/clutch locking device from engaging in the locked position in an abnormal operating situation; wherein the anti-lock mechanism (2300) comprising:

a ring (2345*a*) and a ring (2345*b*) partitioning a lock protecting mechanism chamber inside a slidable axial tube (2002);

a pin (2311) inside the lock protecting mechanism chamber, the pin (2311) having a protruding edge of the pin (2311) located inside a pin chamber;

a block (2035) inside the lock protecting mechanism chamber, the block (2035) having a shape and size slidable inside a slidable axial tube (2002) and engaged with an axle of a screwing mechanism (2006), the block (2035) having a coil spring (2324); a front part of the block (2035) forming a shoulder (2035*a*) having a rounded tip shape corresponding to the protruding edge of the pin (2311), the pin (2311) having a coil spring (2312) for preventing the slidable axial tube (2002) from sliding through a bush (2346) which is provided on the wall of the slidable axial tube (2002) and the bored hole (2013) on the axial tube wall (2001) in a position upstream of a locking position of a brake/clutch locking device of an automobile, one edge of the bored hole (2013) is the sloped portion (2013*a*) for pushing the pin (2311) back into a lock-ready position after the slidable axial tube (2002) slides back into a normal unlocked state, wherein when an external force is applied to the main structure of an automobile in a relative direction and angle, the block (2035) produces sufficient kinetic energy to overcome the spring force by the spring (2324), the block (2035) is then moved from the first position to the second position; and an axle (2347) at an end portion of the block (235) extending into a groove on a wall of the slidable axial tube (2002) for preventing a pivotally movement of the block (2035) around an axle of the screwing mechanism (2006), wherein the front shoulder (2035*a*) of the block (2035) moves out from under the protruding edge of the pin (2311), the pin (2311) slides down into the bored hole (2013) and a pin end protruding from the slidable axial tube wall (2002) blocks the edge of the axial tube (2001) preventing the slidable axial tube (2002) from entering the locking position when the main structure of the automobile is subject to an external force in a relative direction and angle.

23. The vehicle security system of claim 1, wherein the driving function locking device (12) includes:
a driving member (239);
an engagement member (257) operatively connected to the driving member, the engagement member having an annular end and an extension member extending from the annular end; and
a locking chamber (263) having a recess for receiving the engagement member and a locking pin (254),
wherein the driving member operatively engages the engagement member for moving the engagement member between first and second positions, and wherein in the first position the engagement member moves the locking pin to an unlocking position and in the second position, the engagement member is spaced from the locking pin and a biasing member (254a) biases the locking pin to a locking position.

24. The vehicle security system of claim 1, wherein the driving function locking device (12) includes:
a driving member (332);
an engagement member (355) operatively connected to the driving member, the engagement member having an annular end and an extension member extending from the annular end; and
a locking chamber (309) having a recess for receiving the engagement member and a locking pin (354), and
wherein the driving member operatively engages the engagement member for moving the engagement member between first and second positions, and wherein in the first position a biasing member (307) biases the locking pin to an unlocking position and in the second position the engagement member engages the locking pin to move the locking pin in an opposite direction in which the locking pin is biased by the biasing member to a locking position.

25. The vehicle security system of claim 1, wherein the driving function locking device (12) includes:
a driving member (332');
an engagement member (355') operatively connected to the driving member, the engagement member having a body portion and a nose portion; and
a locking chamber (309') having an aperture for receiving the engagement member and a locking pin (354'),
wherein the driving member operatively engages the engagement member for moving the engagement member between first and second positions, and wherein in the first position the nose portion is received within the locking chamber and a biasing member (307') biases the locking pin to an unlocking position and in the second position the body portion is received within the locking chamber and moves the locking pin in a direction opposite in which the locking pin is biased by the biasing member to a locking position.

26. The vehicle security system of claim 1, further comprising:
a first micro-switch (414) operatively connected to the controller and configured to correspondingly move between a locked status and an unlocked status when the driving function locking device is moved between the locked position and the unlocked position; and
a second micro-switch (415) operatively connected to the controller and configured to correspondingly move between a locked status and an unlocked status when the driving function locking device is moved between the locked position and the unlocked position; and
wherein the controller (14) further comprises:
a male wiring socket (401) electrically connected to the vehicle,
a female wiring socket (402) electrically connected to the male wiring socket and a key hole of the vehicle, and
a micro-controller (404) operatively connected to at least one anti-theft sensor and a key switching sensor, and wherein the micro-controller is configured to determine if the at least one anti-theft sensor is operational.

27. The vehicle security system of claim 1, further comprising:
a first micro-switch (503) operatively connected to the controller and configured to correspondingly move between a locked status and an unlocked status when the driving function locking device is moved between the locked position and the unlocked position; and
a second micro-switch (504) operatively connected to the controller and configured to correspondingly move between a locked status and an unlocked status when the driving function locking device is moved between the locked position and the unlocked position; and
wherein the controller (14) further comprises:
a male wiring socket (501) electrically connected to the vehicle,
a female wiring socket (502) electrically connected to the male wiring socket and a key socket of the vehicle, and
a relay assembly (507) operatively connected to a spring sensor (511), wherein the relay assembly includes a spring coil (508) configured to complete an electrical connection of the relay assembly when the spring sensor is activated.

28. A vehicle security system (200) comprising:
(a) a driving function locking device (212) manually movable between a locking position for disabling a driving function of a vehicle and an unlocked position, the driving function locking device having a driving member (229) that moves a locking member assembly (253) between a locked position and an unlocked position for securing the driving function locking device in a locked position;
(b) a controller (214) operatively connected to the driving member and an electrical power supply of the vehicle, and in communication with a transceiver (236);
(c) at least one of a remote control (216) and a chip card (218) in communication with the transceiver to lock and unlock the driving function locking device; and
wherein the driving function locking device (212) includes:
a driving member;
an engagement member (257) operatively connected to the driving member, the engagement member having an annular end and an extension member extending from the annular end; and
a locking chamber (263) having a recess for receiving the engagement member and a locking pin (254),
wherein the driving member operatively engages the engagement member for moving the engagement member between first and second positions, and wherein in the first position the engagement member moves the locking pin to an unlocking position and in the second position, the engagement member is spaced from the locking pin and a biasing member (254*a*) biases the locking pin to a locking position.

29. The vehicle security system of claim 28, wherein the controller (214) is in communication with an advisor (241), an engine cut-off (256) for disabling an engine starter of the vehicle and a shock sensor (238) and the controller is configured to activate the advisor to advise when the locking member assembly (253) of the driving function locking device (212) is in the locked position, and activate the engine cut-off when the locking member assembly is in the locked position.

30. The vehicle security system of claim 28, wherein the controller (214) is a microcontroller, a computer, or an integrated circuit, the advisor (242) is at least one of a light emitting diode, a buzzer, a horn and a siren, and the driving member (239) is at least one of a motor (230) and a solenoid (232).

31. The vehicle security system of claim 28, wherein the driving function locking device (212) is a gear lever locking device or a brake/clutch locking device.

32. The vehicle security system of claim 28, wherein the locking member assembly (253) includes a locking pin (254) and a locking member (255) for engaging with the locking pin.

33. The vehicle security system of claim 28, wherein the driving function locking device (212) includes:
a driving member;
an engagement member (355) operatively connected to the driving member, the engagement member having an annular end and an extension member extending from the annular end; and
a locking chamber (309) having a recess for receiving the engagement member and a locking pin (354), and
wherein the driving member operatively engages the engagement member for moving the engagement member between first and second positions, and wherein in the first position a biasing member (307) biases the locking pin to an unlocking position and in the second position the engagement member engages the locking pin to move the locking pin in an opposite direction in which the locking pin is biased by the biasing member to a locking position.

34. The vehicle security system of claim 28, wherein the driving function locking device (212) includes:
a driving member;
an engagement member (355') operatively connected to the driving member, the engagement member having a body portion and a nose portion; and
a locking chamber (309') having an aperture for receiving the engagement member and a locking pin (354'),
wherein the driving member operatively engages the engagement member for moving the engagement member between first and second positions, and wherein in the first position the nose portion is received within the locking chamber and a biasing member (307') biases the locking pin to an unlocking position and in the second position the body portion is received within the locking chamber and moves the locking pin in a direction opposite in which the locking pin is biased by the biasing member to a locking position.

35. A vehicle security system (100) comprising:
(a) a driving function locking device (112) movable between a locked position for disabling a driving function of a vehicle and an unlocked position; and
(b) a controller (114) operatively connected to the driving function locking device and an electrical power supply of the vehicle, an advisor (142), an engine cut-off (156) for disabling an engine starter of the vehicle, a lock sensor (139) for determining whether the driving function locking device (112) is in the locked or unlocked position, a key control sensor (158) and a tamper sensor (138),
wherein the controller (114) is configured to
activate the advisor (142) to advise that the driving function locking device is in the locked position and activate the engine cut-off (156) when the driving function locking device is in the locked position,
activate the advisor to issue a warning when an object inserted in a key switch (160) of the vehicle has been detected by the key control sensor,
activate the advisor to issue a warning when the tamper sensor (138) is activated, and
activate the advisor to issue a warning after a fixed time interval upon detecting an object in the key switch (160); and
wherein the driving function locking device (112) includes:
a driving member (239);
an engagement member (257) operatively connected to the driving member, the engagement member having an annular end and an extension member extending from the annular end; and
a locking chamber (263) having a recess for receiving the engagement member and a locking pin (254),
wherein the driving member operatively engages the engagement member for moving the engagement member between first and second positions, and wherein in the first position the engagement member moves the locking pin to an unlocking position and in the second position, the engagement member is spaced from the locking pin and a biasing member (254*a*) biases the locking pin to a locking position.

36. The vehicle security system of claim 35, therein the controller (114) is further configured to move the driving function locking device (112) to the locked position only when a gear of the vehicle is in a park or a neutral gear position.

37. The vehicle security system of claim 35, wherein the driving function locking device (112) moves to the unlocked position when the key switch of the vehicle is toggled with a key (154) of the vehicle a fixed number of times.

38. The vehicle security system of claim 35, wherein the controller (114) is a microcontroller, a computer, or an integrated circuit and the advisor (142) is at least one of a light emitting diode, a buzzer, a horn and a siren.

39. The vehicle security system of claim 35, wherein the driving function locking device (112) is a gear lever locking device or a brake/clutch locking device and includes at least one of a motor (130) and a solenoid (132) to move the driving function locking device between locked and unlocked positions.

40. The vehicle security system of claim 35, wherein the driving function locking device (112) includes:
a driving member (332);
an engagement member (355) operatively connected to the driving member, the engagement member having an annular end and an extension member extending from the annular end; and
a locking chamber (309) having a recess for receiving the engagement member and a locking pin (354), and
wherein the driving member operatively engages the engagement member for moving the engagement member between first and second positions, and wherein in the first position a biasing member (307) biases the locking pin to an unlocking position and in the second position the engagement member engages the locking pin to move the locking pin in an opposite direction in which the locking pin is biased by the biasing member to a locking position.

41. The vehicle security system of claim 35, wherein the driving function locking device (112) includes:
- a driving member (332');
- an engagement member (355') operatively connected to the driving member, the engagement member having a body portion and a nose portion; and
- a locking chamber (309') having an aperture for receiving the engagement member and a locking pin (354'),
- wherein the driving member operatively engages the engagement member for moving the engagement member between first and second positions, and wherein in the first position the nose portion is received within the locking chamber and a biasing member (307') biases the locking pin to an unlocking position and in the second position the body portion is received within the locking chamber and moves the locking pin in a direction opposite in which the locking pin is biased by the biasing member to a locking position.

* * * * *